US011533314B2

(12) United States Patent
Badawy et al.

(10) Patent No.: US 11,533,314 B2
(45) Date of Patent: *Dec. 20, 2022

(54) SYSTEM AND METHOD FOR PREDICTIVE PLATFORMS IN IDENTITY MANAGEMENT ARTIFICIAL INTELLIGENCE SYSTEMS USING ANALYSIS OF NETWORK IDENTITY GRAPHS

(71) Applicant: SAILPOINT TECHNOLOGIES, INC., Wilmington, DE (US)

(72) Inventors: Mohamed M. Badawy, Round Rock, TX (US); Jostine Fei Ho, Austin, TX (US); Rajat Kabra, Austin, TX (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/139,824

(22) Filed: Dec. 31, 2020

(65) Prior Publication Data
US 2022/0086162 A1    Mar. 17, 2022

Related U.S. Application Data

(63) Continuation of application No. 17/024,560, filed on Sep. 17, 2020, now Pat. No. 10,938,828.

(51) Int. Cl.
*H04L 9/40*    (2022.01)
*G06N 5/04*    (2006.01)
*G06N 20/00*    (2019.01)

(52) U.S. Cl.
CPC ............ *H04L 63/102* (2013.01); *G06N 5/04* (2013.01); *G06N 20/00* (2019.01)

(58) Field of Classification Search
None
See application file for complete search history.

(56) References Cited

U.S. PATENT DOCUMENTS

| 7,526,785 | B1 | 4/2009 | Pearson et al. |
| 7,725,416 | B2 | 5/2010 | Buss |
| 8,065,712 | B1 | 11/2011 | Cheng |
| 8,209,742 | B2 | 6/2012 | Schreiber et al. |
| 8,656,161 | B2 | 2/2014 | Nakae |

(Continued)

OTHER PUBLICATIONS

Saltzer, Jerome H. et al., "The Protection of Information in Computer Systems," Proceedings of the IEEE, 63(9), Sep. 1975, pp. 1278-1308.

(Continued)

*Primary Examiner* — Cai Y Chen
(74) *Attorney, Agent, or Firm* — Sprinkle IP Law Group

(57) ABSTRACT

Systems and methods for embodiments of a graph based artificial intelligence systems for identity management are disclosed. Embodiments of the identity management systems disclosed herein may utilize artificial intelligence approaches for determining health indicators for the identity management state of an enterprise. Specifically, in certain embodiments, an artificial intelligence based identity management systems may utilize one or more components to generate signals associated with the identity management state of an enterprise based on a network identity graph and evaluate feature spaces of these input signals from these components based on a global objective function or the like.

21 Claims, 44 Drawing Sheets

(56) References Cited

U.S. PATENT DOCUMENTS

| | | | |
|---|---|---|---|
| 8,683,546 B2 | 3/2014 | Dunagan | |
| 9,077,728 B1 | 7/2015 | Hart | |
| 9,246,945 B2 | 1/2016 | Chari et al. | |
| 9,286,595 B2 * | 3/2016 | Taneja | G06Q 10/103 |
| 9,288,232 B2 | 3/2016 | Chari et al. | |
| 9,516,053 B1 | 12/2016 | Muddu | |
| 9,679,125 B2 | 6/2017 | Bailor | |
| 9,699,196 B1 | 7/2017 | Kolman | |
| 9,787,688 B2 * | 10/2017 | Jagtap | G06F 21/6218 |
| 9,819,685 B1 | 11/2017 | Scott | |
| 9,992,230 B1 | 6/2018 | Haverty | |
| 10,298,589 B2 | 5/2019 | Cleaver | |
| 10,341,430 B1 | 7/2019 | Badawy et al. | |
| 10,348,735 B2 | 7/2019 | Anderson | |
| 10,432,639 B1 | 10/2019 | Bebee | |
| 10,476,952 B1 | 11/2019 | Badawy | |
| 10,476,953 B1 | 11/2019 | Badawy | |
| 10,523,682 B1 | 12/2019 | Badawy | |
| 10,554,665 B1 | 2/2020 | Badawy | |
| 10,621,368 B2 | 4/2020 | Ravizza | |
| 10,643,135 B2 | 5/2020 | Farrell | |
| 10,681,056 B1 | 6/2020 | Badawy | |
| 10,791,170 B2 | 9/2020 | Badawy | |
| 10,848,499 B2 | 11/2020 | Badawy | |
| 10,862,928 B1 | 12/2020 | Badawy | |
| 10,938,828 B1 | 3/2021 | Badawy | |
| 11,122,050 B2 | 9/2021 | Badawy | |
| 11,196,775 B1 | 12/2021 | Badawy | |
| 11,196,804 B2 | 12/2021 | Badawy | |
| 11,227,055 B1 | 1/2022 | Badawy | |
| 11,295,241 B1 | 4/2022 | Badawy | |
| 11,388,169 B2 | 7/2022 | Badawy | |
| 2002/0026592 A1 | 2/2002 | Gavrila et al. | |
| 2002/0184535 A1 | 12/2002 | Moaven | |
| 2006/0277341 A1 | 12/2006 | Johnson | |
| 2007/0067845 A1 | 3/2007 | Wiemer | |
| 2007/0226248 A1 | 9/2007 | Darr | |
| 2008/0091681 A1 | 4/2008 | Dwivedi et al. | |
| 2008/0147584 A1 | 6/2008 | Buss | |
| 2008/0288330 A1 | 11/2008 | Hildebrand | |
| 2009/0222894 A1 | 9/2009 | Kenny et al. | |
| 2009/0300711 A1 | 12/2009 | Tokutani et al. | |
| 2009/0320088 A1 | 12/2009 | Gill | |
| 2010/0082695 A1 | 4/2010 | Hardt | |
| 2010/0274815 A1 | 10/2010 | Vanasco | |
| 2011/0162034 A1 | 6/2011 | Nagaratnam | |
| 2011/0209196 A1 | 8/2011 | Kennedy | |
| 2012/0023576 A1 | 1/2012 | Sorensen et al. | |
| 2012/0216243 A1 | 8/2012 | Gill et al. | |
| 2012/0246098 A1 | 9/2012 | Chari et al. | |
| 2013/0232539 A1 | 9/2013 | Polunin | |
| 2013/0254833 A1 | 9/2013 | Nicodemus et al. | |
| 2013/0283339 A1 | 10/2013 | Biswas et al. | |
| 2014/0207813 A1 | 7/2014 | Long | |
| 2015/0128211 A1 | 5/2015 | Kirner | |
| 2015/0379429 A1 | 12/2015 | Lee | |
| 2016/0065594 A1 | 3/2016 | Srivastava | |
| 2016/0203327 A1 | 7/2016 | Akkiraju | |
| 2016/0294645 A1 | 10/2016 | Kirner | |
| 2016/0294646 A1 | 10/2016 | Kirner | |
| 2017/0103164 A1 | 4/2017 | Dunlevy | |
| 2017/0103165 A1 | 4/2017 | Dunlevy | |
| 2017/0103194 A1 | 4/2017 | Wechsler | |
| 2017/0147790 A1 | 5/2017 | Patel | |
| 2017/0195415 A1 | 7/2017 | Versteeg | |
| 2017/0220964 A1 | 8/2017 | Datta Ray | |
| 2017/0310552 A1 | 10/2017 | Wallerstein | |
| 2017/0329957 A1 * | 11/2017 | Vepa | G06F 21/445 |
| 2017/0364534 A1 | 12/2017 | Zhang | |
| 2018/0013777 A1 | 1/2018 | DiValentin | |
| 2018/0025064 A1 | 1/2018 | Atlas | |
| 2018/0069899 A1 | 3/2018 | Lang | |
| 2018/0137589 A1 | 5/2018 | Kenthapadi | |
| 2018/0316665 A1 | 11/2018 | Caldera | |
| 2018/0375886 A1 | 12/2018 | Kirti | |
| 2019/0114342 A1 | 4/2019 | Orun | |
| 2019/0349273 A1 | 11/2019 | Rikovic | |
| 2019/0362263 A1 | 11/2019 | Harris | |
| 2020/0007555 A1 | 1/2020 | Jadhav | |
| 2020/0050966 A1 | 2/2020 | Enuka | |
| 2020/0151619 A1 | 5/2020 | Mopur | |
| 2020/0169603 A1 | 5/2020 | Badawy | |
| 2020/0259840 A1 | 8/2020 | Badawy | |
| 2020/0274880 A1 | 8/2020 | Badawy | |
| 2020/0274894 A1 | 8/2020 | Argoeti | |
| 2020/0382515 A1 | 12/2020 | Badawy | |
| 2020/0382586 A1 | 12/2020 | Badawy | |
| 2021/0021631 A1 | 1/2021 | Okutan | |
| 2021/0097052 A1 | 4/2021 | Hans | |
| 2021/0112065 A1 | 4/2021 | Yang | |
| 2021/0168150 A1 | 6/2021 | Ross | |
| 2021/0174305 A1 | 6/2021 | Schornack | |
| 2021/0287107 A1 | 9/2021 | Badawy | |
| 2021/0360000 A1 | 11/2021 | Badawy | |
| 2021/0392172 A1 | 12/2021 | Badawy | |
| 2022/0046086 A1 | 2/2022 | Badawy | |
| 2022/0166804 A1 | 5/2022 | Badawy | |
| 2022/0269990 A1 | 8/2022 | Badawy | |

OTHER PUBLICATIONS

Bishop, Matt et al., "We have Met the Enemy and He is Us," NSPW '08: Proceedings of the 2008 workshop on New Security paradigms, Sep. 2008, 11 pgs.

Frank, Mario et al., "A probabilistic approach to hybrid role mining," CCS '09, Nov. 2009, 11 pgs.

Molloy, Ian et al., "Generative Models for Access Control Policies: Applications to Role Mining Over Logs with Attribution," Proceedings of the 17th ACM Symposium on Access Control Models and Technologies, SACMAT, Jun. 2012, 11 pgs.

Blei, David M. et al., "Latent Dirichlet Allocation," Journal of Machine Learning Research 3, Jan. 2003, pp. 993-1022.

McDaniel, Patrick et al., "Securing Distributed Applications Using a Policy-based Approach," Ann Arbor, Dec. 19, 2003, 48109-2122, 24 pgs.

Chen, Ying et al., "Data Mining and Service Rating in Service-Oriented Architectures to Improve Information Sharing," 2005 IEEE Aerospace Conference, (Version 7, Updated Jan. 27, 2005) Mar. 2005, 11 pgs.

Molloy, Ian, "Automatic Migration to Role-Based Access Control," CERIAS Tech Report 2010-34, Purdue University, IN, Thesis Dissertation/Acceptance, Aug. 2010, 178 pgs.

Ene, Alina et al., "Fast Exact and Heuristic Methods for Role Minimization Problems," SACMAT '08 Proceedings of the 13th ACM symposium on Access control models and technologies, Estes, CO, Jun. 11-13, 2008, pp. 1-10.

Harrison, Michael A., et al., "Protection in Operating Systems," Communications of the ACM, vol. 19, No. 8, Aug. 1976, pp. 461-471.

Li, Ninghui et al., "Access Control Policy Combining: Theory Meets Practice," Proceedings of the 14th ACM symposium on Access control models and technologies SACMAT '09, Jun. 3-5, 2009, 10 pgs.

Schneider, Fred B., "Least Privilege and More," IEEE Security & Privacy, vol. 1, Issue 5, Sep. 2003, pp. 209-213.

Office Action for U.S. Appl. No. 13/970,174, dated Nov. 4, 2014, 22 pgs.

Office Action for U.S. Appl. No. 13/904,350, dated Nov. 14, 2014, 33 pgs.

Office Action for U.S. Appl. No. 13/904,350, dated Apr. 27, 2015, 28 pgs.

Office Action for U.S. Appl. No. 13/970,174, dated Jun. 24, 2015, 16 pgs.

Xu, Wei et al., Taint-Enhanced Policy Enforcement: A Practical Approach to Defeat a Wide Range of Attacks, 15th USENIX Security Symposium, 2006, pp. 121-136.

International Search Report and Written Opinion for International Patent Application No. PCT/US2019/062743, dated Jan. 13, 2020, 6 pgs.

(56) References Cited

OTHER PUBLICATIONS

Office Action for U.S. Appl. No. 16/814,291, dated May 11, 2022, 15 pgs.
Office Action for U.S. Appl. No. 17/101,406, dated Apr. 27, 2021, 13 pgs.
Lindquist, Jennifer et al., "Effective degree network disease models," Journal of Mathematical Biology, 62, 2011, pp. 143-164.
Office Action for U.S. Appl. No. 17/180,357, dated May 10, 2021, 13 pgs.
Notice of Allowance for U.S. Appl. No. 16/861,335, dated Apr. 28, 2022, 9 pgs.
Notice of Allowance for U.S. Appl. No. 17/180,357, dated Jan. 11, 2022, 6 pgs.
Notice of Allowance for U.S. Appl. No. 17/101,406, dated Sep. 1, 2021, 7 pgs.
Sabrina, Fariza, "A Novel Entitlement-based Blockchain-enabled Security Architecture for IoT," 29th International Telecommunication Networks and Applications Conf. (ITNAC), IEEE, 2019, 7 pgs.
Office Action for U.S. Appl. No. 17/180,357, dated Sep. 1, 2021, 11 pgs.
Notice of Allowance for U.S. Appl. No. 16/582,862, dated Jun. 21, 2021, 7 pgs.
Notice of Allowance for U.S. Appl. No. 17/389,497, dated Oct. 29, 2021, 10 pgs.
Notice of Allowance for U.S. Appl. No. 16/998,702, dated Jul. 23, 2021, 10 pgs.
European Search Report for Application No. 19891392.3, dated Jun. 22, 2022, 11 pgs.
Notice of Allowance issued for U.S. Appl. No. 16/998,719, dated Jul. 12, 2022, 12 pages.
Notice of Allowance for U.S. Appl. No. 16/814,291, dated Aug. 3, 2022, 17 pgs.
Notice of Allowance for U.S. Appl. No. 17/039,594, dated Aug. 19, 2022, 18 pgs.

\* cited by examiner

| Department | Job_Title | Location | Number_of_singletons |
|---|---|---|---|
| "NA" | "Service Account" | "NA" | 57 |
| "IT-QA" | "Contractor-Quality Assurance Analyst" | "_Manila" | 32 |
| "IT-Application Delivery" | "Software Engineer, Sr" | "Tampa" | 18 |
| "NA" | "NA" | "NA" | 17 |
| "IT-Client Services" | "Systems Engineer, Sr" | "Tampa" | 11 |
| "IT-Application Delivery" | "Software Engineer" | "Tampa" | 9 |
| "IT-Application Delivery" | "Mgr, Application Development" | "Tampa" | 8 |
| "IT-Application Delivery" | "Software Engineer, Lead" | "Tampa" | 6 |
| "IT-Enterprise Info Management" | "Data Engineer, Sr" | "Tampa" | 6 |
| "IT-Enterprise Info Management" | "Mgr, Enterprise Info Mgmt" | "Tampa" | 6 |
| "IT-Application Delivery" | "Business Systems Analyst, Sr" | "Tampa" | 5 |
| "IT-Enterprise Info Management" | "Data Engineer" | "Tampa" | 5 |
| "IT-Application Delivery" | "Application Administrator" | "Tampa" | 5 |
| "IT-Enterprise Info Management" | "Data Engineer, Associate" | "Tampa" | 4 |
| "IT-Client Services" | "Systems Engineer, Lead" | "Tampa" | 4 |
| "IT-Enterprise Info Management" | "Contractor-Data Engineer" | "Tampa_WIT" | 4 |

FIG. 22

SYSTEM AND METHOD FOR PREDICTIVE PLATFORMS IN IDENTITY MANAGEMENT ARTIFICIAL INTELLIGENCE SYSTEMS USING ANALYSIS OF NETWORK IDENTITY GRAPHS

RELATED APPLICATION(S)

This application is a continuation of, and claims a benefit of priority under 35 U.S.C. 120 of, U.S. patent application Ser. No. 17/024,560 filed Sep. 17, 2020, entitled "SYSTEM AND METHOD FOR PREDICTIVE PLATFORMS IN IDENTITY MANAGEMENT ARTIFICIAL INTELLIGENCE SYSTEMS USING ANALYSIS OF NETWORK IDENTITY GRAPHS," issued as U.S. Pat. No. 10,938,828, which is hereby incorporated herein for all purposes

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to computer security. In particular, this disclosure relates to the application of artificial intelligence to identity management in a distributed and networked computing environment. Even more specifically, this disclosure relates to enhancing computer security in a distributed networked computing environment through the use of predictive platforms for accurate decision making and recommendations in an identity management context, including the use of graph based analysis of identity management artifacts and the prioritization and evaluation of determinations and recommendations based on such graph based analysis.

BACKGROUND

Acts of fraud, data tampering, privacy breaches, theft of intellectual property, and exposure of trade secrets have become front page news in today's business world. The security access risk posed by insiders—persons who are granted access to information assets—is growing in magnitude, with the power to damage brand reputation, lower profits, and erode market capitalization.

Identity Management (IM), also known as Identity and Access Management (IAM) or Identity Governance (IG), is, the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving governance, access risk management, and compliance to the forefront of identity management. To effectively meet the requirements and desires imposed upon enterprises for identity management, these enterprises may be required to prove that they have strong and consistent controls over who has access to critical applications and data. And, in response to regulatory requirements and the growing security access risk, most enterprises have implemented some form of user access or identity governance.

Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Organizations that are unable to focus their identity compliance efforts on areas of greatest access risk can waste time, labor, and other resources applying compliance monitoring and controls across the board to all users and all applications. Furthermore, with no means to establish a baseline measurement of identity compliance, organizations have no way to quantify improvements over time and demonstrate that their identity controls are working and effectively reducing access risk.

Information Technology (IT) personnel of large organizations often feel that their greatest security risks stemmed from "insider threats," as opposed to external attacks. The access risks posed by insiders range from careless negligence to more serious cases of financial fraud, corporate espionage, or malicious sabotage of systems and data. Organizations that fail to proactively manage user access can face regulatory fines, litigation penalties, public relations fees, loss of customer trust, and ultimately lost revenue and lower stock valuation. To minimize the security risk posed by insiders (and outsiders), business entities and institutions alike often establish access or other governance policies that eliminate or at least reduce such access risks and implement proactive oversight and management of user access entitlements to ensure compliance with defined policies and other good practices.

One of the main goals of identity management, then, is to help users identify and mitigate risks. In many cases, however, identity management systems may produce a wide variety of signals regarding such identity management, including recommendations, actions or other signals for users involved in such identity management. The sheer volume of these types of signals can be overwhelming for users, leaving them confused about which of these signals are actually important or significant. The user therefore cannot prioritize such signals and is typically has no idea which of the recommended actions would achieve desired progress toward minimization of security risk or more generally increasing the overall "health" of their identity management ecosystem.

Accordingly, it is desirable for identity management solutions to offer tools to assist in the assessment of identity management signals to produce a coherent or prioritized list of actions or recommendations for a user to assist in ameliorating identity governance issues and proactively address potential issues that could negatively impact security across an enterprise.

SUMMARY

To illustrate certain aspect in more detail, as may be understood, an identity management system may have many different components that generate different outputs, including data, recommendations, actions, alerts, actions, notifications, etc. (collectively referred to as signals). Thus, in many cases, use of these identity management systems and the implementation of identity governance tasks may rely on an (e.g., human) user's ability to prioritize and implement such signals. Between the rapid evolution of an enterprise's identity management data and the large volume of signals generated by components of an identity management system (which may increase or be driven at least in part by the evolution of such identity management data), the burden on human users may grow quite large, overwhelming even the most knowledgeable or savvy of such users. These users may thus have difficulty prioritizing such signals and lack any significant degree of knowledge about the signals and how to achieve desired progress toward minimization of security risk or more generally increasing the overall "health" of their identity management ecosystem based on such signals.

As mentioned, it is accordingly desirable for identity management systems to offer tools to assist in the assessment of identity management signals to evaluate or provide actions or recommendations from the identity management system such that a coherent or prioritized list of actions and recommendations can be provided to a user to assist in ameliorating identity governance issues and proactively address potential issues that could negatively impact security across an enterprise.

To those ends, among others, embodiments of identity management systems that include an identity governance management agent (IGMA) are disclosed. Embodiments of such identity management systems may include a number of components that produce a number of signals at regular time intervals. Thus, each of these components may send a number of (e.g., input) signals to the IGMA for an enterprise on a regular basis based on identity management data of an enterprise. These input signals may include data such as data generated from the modeling or analysis of identity management data of the enterprise using, for example network identity graphs. These signals may also include identity management recommendations or actions or other types of signals Thus, these input signals may include static or dynamic activity or usage data, role validation and management data, health scores for role structures, or data on certification requests and approval or denial of such requests, among other data. From these input signals the IGMA may also derive one or more additional input signals, where those derived input signals may include input signals that are reflective of a dynamic change in one or more input signals over a time period.

In certain embodiments, these components may include a peer group analysis component, a role mining or access modeling component, a role validation component, an access recommender component or an outlier and anomaly detection component among others. These components may be supported or utilize a network identity graph (e.g., supported by a graph data store) representing the enterprise's identity management artifacts. For example, according to certain embodiments, a peer group analysis component may run a community detection algorithm on the identity graph and may allow an on-demand queries of the identity graph. A role mining and access component may provide the output of a community detection algorithm of a scoped population of the identity graph. Specifically, roles may be validated and prioritized based on particular graph-analytic properties that translate from domain expertise, such as a density of clusters (e.g., percentage of strong similarity relationships with respect to all possible relationships in a clique), cluster diameters (max degrees of separation within the cluster), or other graph related data.

A role validation component may utilize graph analysis to validate new roles as new nodes on a role graph. Roles that are extremely similar to each other may be recommended for a consolidation action. New potential roles that are too similar to existing ones may be deprioritized accordingly. Roles that are highly dissimilar to all existing roles are identified as outliers, recommended for certification, or another action taken. Role validation can be performed locally to particular scoped populations as well. Another component may include an access recommender component. Such a component may provide a recommender system for access items (entitlements, roles, etc.). Such recommendations may be coupled or prioritized. A machine interpretation may also be provided to explain the outputs of such a component, for example, in terms of aggregated historical data as well as particular relevant network graph features. Other components may be utilized and are fully contemplated herein.

Thus, embodiments of an IGMA employed in an identity management system can aggregate and coordinate the input signals from these multiple components to prioritize and rank the signals, including alerts, recommended actions or notifications or to trigger or automate actions. Moreover, embodiments of the IGMA may perform an overall analysis or assessment of the identity management health of the enterprise based on the input signals associated with an enterprise based on artificial intelligence techniques. The signals, including recommended actions or notifications can then be ranked according to, for example, which of the actions will have a most significant or beneficial impact on the overall identity management health of that enterprise. Such a qualitative assessment may be achieved according to certain embodiments through the use or optimization of a global objective or loss function.

Embodiments of such a function may be defined heuristically as a set of rules (e.g., based on knowledge of the identity management domain or enterprise knowledge). Other embodiments may utilize regression models based on data points derived from or corresponding to input signals. In a particular embodiment, clustering may be used to define a global objective or loss function for use by the IGMA. Specifically, the data points (e.g., values) corresponding to, or derived from, the input signals from the components of the identity management system may each comprise values for a feature, the set of which form a (e.g., multi-dimensional) feature space. A set of example feature spaces may then be determined for labeling. For example, in some embodiments, an identity management system may be a multi-tenant system servicing as an identity management system in association with multiple enterprises. Thus, an example feature space may comprise values for each of the set of features for an enterprise for a particular point (or points) in time. An example feature space may also be determined based on other methodology, for example, manual generation of example values for the features, computer generated values for the set of features comprising the feature space, sampling of values for the feature space, or other methodology.

Each of these example feature spaces may then be assigned a label. Specifically, each identity management state represented by the values for example feature sets may be provided to a domain expert or other type of user that may provide a label for at least some of the example identity management states based on the values of the associated feature spaces. This label may be associated with a health indication or status of the identity management health of an enterprise as represented by the example identity management state. This may be a binary label such as good/bad, acceptable/unacceptable, secure/unsecure, healthy/unhealthy, or may be another type of label.

Once at least some of the example identity management states is labeled, these identity management states may be clustered based on the assigned label. Specifically, clustering can be performed on each of the identity management states represented by each of the labeled feature spaces. In cases where labels are provided (e.g., by domain experts or other users) for only a subset of the example identity management states, a bootstrapping process may occur whereby the initially labeled identity management states may be clustered, and based on this initial clustering the remainder of the example identity management states may be assigned clusters and labels accordingly. In this manner, similar identity management states may be identified or clustered across all of the example identity management state represented by their corresponding example feature spaces. This clustering may be k-means clustering or almost any suitable clustering algorithm desired. Based on the resulting clusters of the example label identity management states a decision boundary may be determined wherein the decision boundary comprises a corresponding functional definition for such a decision boundary. This decision boundary may represent, for example, a boundary between an "acceptable" or "good" identity management state of an enterprise and an "unacceptable" or "bad" identity management state of an enterprise.

The values for a feature space for an identity management state of a particular enterprise can then be obtained by the IGMA and the location of the identity management state of the enterprise relative to the decision boundary determined using the functional definition of the decision boundary. Specifically, in certain embodiments, such a functional definition may be utilized by the IGMA to determine a scalar value representing a health of the identity management state for the enterprise. Such a scalar value may be determined based on, for example, a nearest (or other) distance measure from the location of the identity management state of the enterprise to a closest (or other) point on the determined decision boundary.

The state or location of an identity management state relative to the decision boundary or other clusters may also allow an IGMA to determine or rank input signals (e.g., collected as input signals from the component of the identity management system). In particular, once the identity management state of an enterprise is located relative to the decision boundary, the IGMA can determine which of the (change of) values of the data points of the identity management state would have a highest or greatest influence on moving the location of the identity management state of the enterprise closer to, or across, the decision boundary (e.g., at the closest point of the identity management state to the decision boundary). In other words, the IGMA may determine which of the signals received as an input signal or otherwise determined may have the greatest influence on the identity management state, or would result in, or effect, the largest of amount of movement or change of the identity management state toward the decision boundary (e.g., closer to an "acceptable" or "good" identity management state).

In this manner, embodiments of an IGMA may be utilized to rank, surface or otherwise expose important signals (e.g., alerts or notifications) from each of the components from which signals are received. Specifically, components of an identity management system may produce signals (such a s trigger alerts, notifications, or other signals) quite frequently (e.g., hourly, daily, etc.). However, given the number of components in some identity management systems coupled with the frequency of such signaling may lead to such signals being treated as noise or being otherwise disregarded by their intended recipient (e.g., an administrator or the identity governance user) who may view such signals through, for example, a dashboard or other interface of an identity management system. By utilizing an IGMA that can prioritize, or rank, input signals based on their effect on an identity management state of an enterprise, the IGMA may be able to surface such signals from different components to a user based on this prioritization or ranking. This capability also means that an IGMA may collect or accumulate such signals over a period of time (e.g., where that period of time may be greater than a frequency at which one or more of the components providing such input signals generates such signals). At the end of this period of time (or at some regular intervals or when a user checks through an interface of the identity management system), the IGMA may surface a set of signals based on the ranking of such signals (e.g., as determined from the decision boundary) to a user or other entity.

The prioritization of such signals may also be utilized by the IGMA to trigger or automate actions associated with one or more top ranking signals. This automation may be achieved through quantitatively optimizing a global objective or loss function (e.g., using, for example machine learning (ML) or artificial intelligence (AI)) based on the signals and triggering the performance, for example, of a recommended action associated with an input signal received from a component.

In one embodiment, then, an identity management system may include a data store, a processor and a non-transitory, computer-readable storage medium, including computer instructions. The computer instructions can be for obtaining identity management data from one or more source systems in a distributed enterprise computing environment of an enterprise, the identity management data comprising data on a set of roles, a set of entitlements, and a set of identities, the set of roles, set of entitlements and set of identities utilized in identity management in the distributed enterprise computing environment. The identity management data may be evaluated to determine the set or roles, identities of the set of identities associated with each of the set of roles and entitlements of the set of entitlements associated with the set of roles and a first identity graph can be generated from the identity management data.

Input signals for the enterprise can be received at a first time, where the input signals were determined by a set of components of the identity management system based on the first identity graph. Based on these input signals values for a first identity management state of the enterprise at the first time can be determined based on the input signals, wherein the identity management state comprises a feature space including a set of features associated with the set of components that determined the input signals based on the first identity graph and the values for the first identity management state include a value for each of the set of features.

A health indicator of the first identity management state of the enterprise can be determined based on the application of a global objective function to the values for the set of features of the first identity management state and the health indicator for the first identity management state of the enterprise presented to a user of the identity management system through an interface of the identity management system.

In one embodiment, at least one of the set of features is a dynamic feature determined based on a first value for a feature in the set of features of the first identity management state of the enterprise at the first time and a second value for the feature in a second identity management state of the enterprise at a second time.

According to some embodiments, the global objective function is associated with a decision boundary. The decision boundary may, for example, be determined by: determining a training set of identity management states, obtaining labels for each identity management state of the training set of identity management states, wherein each labels indicates indicate the health represented by the values of the feature space of the associated labeled identity management state, clustering the labeled training set of identity management states to determine a set of clusters of the labeled training set of identity management states, and determining the decision boundary based on the set of clusters.

In an embodiment, the components include one or more of a graph generator, a role miner, a role assessor, an intelligent agent or an outlier detector.

In a particular embodiment, at least one of the input signal based on the first identity graph is determined by the role miner or role assessor and is one or more of a score based on role similarity or role concurrency in the first identity graph or a statistic indicating fragmentation of a role structure in the first identity graph or indicating a percentage of identities without roles.

In a specific embodiment, at least one of the input signal based on the first identity graph is determined by the graph generator and is one or more a number of cliques or peer groups are in the first identity graph, an indicator of density of such cliques or peer groups, an indication of a number of roles there are in the first identity graph or a modularity of a portion of the first identity graph.

Embodiments provide numerous advantages over previously available systems and methods for measuring access risk. As certain embodiments are based on a graph representation of identity management data, the graph structure may serve as a physical model of the data, allowing more intuitive access to the data (e.g., via graph database querying, or via graph visualization techniques). This ability may yield deeper and more relevant insights for users of identity management systems. Such abilities are also an outgrowth of the accuracy of the results produced by embodiments as disclosed.

As such, these embodiments of identity management systems may allow an accurate approach to determinations of identity management health in identity governance and remedial or other actions that may be taken to improve the health of the state of an enterprises identity management. Moreover, the graph format used by certain embodiments, allows the translation of domain and enterprise specific concepts, phenomena, and issues into tangible, quantifiable, and verifiable hypotheses which may be examined or validated with graph-based algorithms. Accordingly, embodiments may be especially useful in assessing identity management health and in compliance with security policies or the like.

Additionally, embodiments as disclosed may offer the technological improvement of reducing the computational burden and memory requirements of systems implementing these embodiments through the improved data structures and the graph processing and analysis implemented by such embodiments. Accordingly, embodiments may improve the performance and responsiveness of identity management systems that utilize such embodiments of identity graphs and clustering approaches by reducing the computation time and processor cycles required (e.g., and thus improving processing speed) and simultaneously reducing memory usage or other memory requirements.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 22 depicts example data for singleton identities.

DETAILED DESCRIPTION

Figure 1:
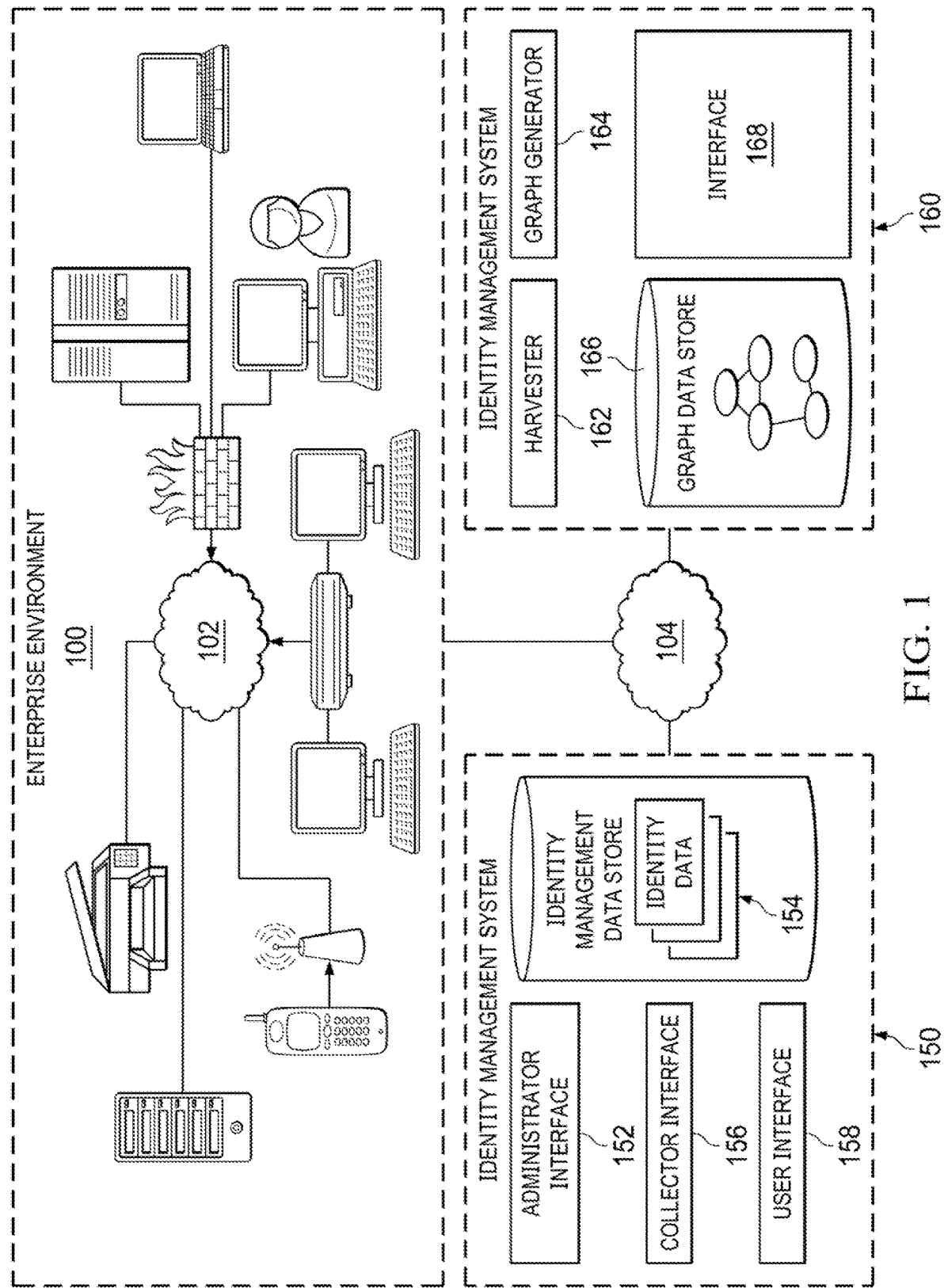
FIG. 1 is a block diagram of a distributed networked computer environment including one embodiment of an identity management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more details regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented Identity Management in association with their distributed networked computer environments. Identity Management solutions allow the definition of a function or an entity associated with an enterprise. An identity may thus represent almost physical or virtual entity, place, person or other item that an enterprise would like to define. Identities can therefore represent, for example, functions or capacities (e.g., manager, engineer, team leader, etc.), title (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual entity, place, person or other item. Each of these identities may therefore be assigned zero or more entitlements with respect to the distributed networked computer environments. An entitlement may be the ability to perform or access a function within the distributed networked computer environments, including, for example, accessing computing systems, applications, file systems, particular data or data items, networks, subnetworks or network locations, etc.

To facilitate the assignment of these entitlements, enterprises may also be provided with the ability to define roles within the context of their Identity Management solution. A role within the context of Identity Management may be a collection of entitlements. These roles may be assigned a name or identifiers (e.g., manager, engineer, team leader) by an enterprise that designate the type of user or identity that should be assigned such a role. By assigning a role to an identity in the Identity Management context, the identity may be assigned the corresponding collection of entitlements associated with the assigned role. Accordingly, by defining these roles enterprises may define a "gold standard" of what they desire their identity governance to look like.

Thus, by managing the roles within the enterprise computing environment, the assignment of entitlements and the proliferation of these roles or entitlements may be controlled. However, escalating security and privacy concerns are driving governance, access risk management, and compliance to the forefront of Identity Management. Yet many companies still struggle with how to focus compliance efforts to address actual risk in what usually is a complex, distributed networked computing environment. Decisions about which access roles or entitlements are desirable to grant a particular user are typically based on the business roles that the user plays within the organization. In large organizations, granting and maintaining roles and user access entitlements is a difficult and complex process, involving decisions regarding whether to grant roles or entitlements to thousands of users and hundreds of different applications and databases. This complexity can be exacerbated by high employee turnover, reorganizations, and reconfigurations of the various accessible systems and resources.

However, to effectively meet the requirements and desires imposed upon enterprises for Identity Management, these enterprises may be required to prove that they have strong and consistent controls over who has access to critical applications and data. Generally then, what is desired are effective system and methods for providing a holistic view and assessment of the overall access model health across an enterprise, and specifically for assessing the health of role structures within an enterprise. More specifically, it is desirable for identity management solutions to offer role assessment capability whereby roles may be ascertained from the identity management data associated with enterprise and the structure of these roles assessed or presented to a user. Additionally, it may be desirable to present an assessment metric for these roles, where the metric is a reflection, for example, of the quality or health of the structure of the set of roles.

To those ends, among others, attention is now directed to the embodiments of artificial intelligence based identity governance systems that provide such role assessment. Specifically, embodiments of the identity management systems disclosed herein may utilize a network graph approach to improve identity governance, including the assessment of roles associated with the identity management data of an enterprise. In particular, embodiments of identity management systems as disclosed may provide role assessment based on a network graph that includes roles of an enterprise. Embodiments may thus generate a network identity graph that includes nodes for identities, entitlements, roles or other identity management artifacts of an enterprise. Such a network identity graph may be, or may include, a role graph having nodes representing roles associated with the enterprise and edges representing similarities between the roles (e.g., represented by the nodes). These edges may comprise a similarity weight determined, based on, for example, shared entitlements between the roles or by concurrent identities (e.g., a number of identities that share those roles).

In one embodiment, for example, the role graph may be an access role graph that is a role graph modeled in terms of entitlement (e.g., access) similarities between all the roles. A weight may be computed for the access similarity relationship based on the entitlements shared between the two roles and the number of entitlements the roles include. Embodiments of these access role graphs may give high-level of abstractions on the overall access model of an enterprise while accurately reflecting the global role (access) structure. As such, these access role graphs may be useful, for example, as a role provisioning QA (Quality Assessment) tool indicating overall well-being of an enterprise's role structure, in recommending consolidation of redundant roles, or verifying how new roles may fit in the current access model.

As another embodiment, for example, the role graph may be a concurrency role graph (also referred to as a concurrency or concurrent graph) that is modeled in terms of concurrent identities shared between roles. A weight may be computed for the concurrency similarity relationship based on the number of identities which share those roles and the number of identities that have those roles. These concurrency graphs may be useful as a "role-profiling assistant" identifying concurrent patterns of peer access, simplifying business rules, or surfacing potential profiles for new joiners. These concurrency graphs may also allow users to dive deeper and profile roles within units of an enterprise when applied with scoping of the concurrency graph.

Moreover, according to embodiments, various metrics may be determined for assessing the quality or health of the role structure of an enterprise based on an access role graph or a concurrency role graph. Specifically, optimal (e.g., ideal) network or graph topologies for access and concurrency graphs can be inferred. Graph based metrics may thus provide a starting point to standardize quality scoring for role structures and access models. In one embodiment, a combination of graph based metrics may be utilized to measure a role graph structure with respect to an ideal graph topology optimized for the enterprise. Such a scoring system allows personalization taking into account the trade-off between compliance-driven and enablement-driven governance strategies. Thus role data, including for example, visual depictions of role graphs for the enterprise or quality assessment scores may be presented to a user through embodiments of the identity management systems as depicted herein.

Embodiments as disclosed herein may thus provide role assessment from an enterprise's actual identity management data. By determining a current snapshot of the roles mined from an actual state of the enterprise's identity governance structure, the enterprise roles as defined by the users of the enterprise may be compared with a desired state of the roles to reduce discrepancies therebetween, including for example, the identification of new roles, the evolution of the enterprise defined roles to match the evaluation of the actual role structure (e.g., the assessed roles), or the performance housekeeping on the assignment of entitlements or roles within the enterprise to more particularly tailor the actual role structure to an ideal role structure.

In certain cases, the efficacy of embodiments of role assessment in an identity management system may depend at least partially on the state of the identities, entitlements or roles within a distributed computing enterprise. Accordingly, before embodiments of the role assessment are discussed in more detail, it may be useful to an understanding of certain embodiments if the analysis and use of roles, entitlements and identities of an enterprise by embodiments of artificial intelligence identity governance systems are discussed in more detail, as such data may be used in the role assessment itself.

With that in mind, it may be understood that good governance practice in the identity space relies on the 'social' principle that identities with strongly similar attributes should be assigned similar, if not identical, access entitlements. In the realm of identity governance and administration, this approach allows for a separation of duties and thus makes it feasible to identify, evaluate, and prioritize risks associated with privileged access. As part of a robust identity management system, it is therefore highly desirable to analyze an enterprise's data to identify potential risks. In principle, strictly enforced pre-existing governance policies should ensure that identities with strongly similar access privileges are strongly similar. It would thus be desirable to group or cluster the identities of an enterprise into peer groups such that the identities in a peer group are similar with respect to the set of entitlements assigned to the identities of that group (e.g., relative to other identities or other groups). Peer grouping of the identities within an enterprise (or viewing the peer groups of identities) may allow, for example, an auditor or other person performing a compliance analysis or evaluation to quantitatively and qualitatively assess the effectiveness of any applicable pre-existing polices, or lack thereof, and how strictly they are enforced.

However, the data utilized by most identity management systems is not strictly numerical data. Often this data includes identifications of identities (e.g., alphanumeric identifiers for an identity as maintained by an identity management system) and identifications of entitlements or roles associated with those identities (e.g., alphanumeric identifiers for entitlements or roles as maintained by the identity management system). This data may also include data identifying roles (e.g., alphanumeric identifiers or labels for a role as maintained by an identity management solution) and identifications of entitlements associated with those roles (e.g., alphanumeric identifiers for the collection of entitlements associated with those roles). Clustering of this type of categorical data (e.g., for peer grouping of identities) is typically a harder task than clustering data of numerical type. In particular, clustering categorical data is particularly challenging since intuitive, geometric-based, distance measures experienced in real life, e.g., Euclidean distance, by definition, are exclusive to numerical data. A distance measure is a crucial component of any clustering algorithm as it is utilized at the lowest level to determine how similar/dissimilar two data points are.

For example, the one-hot-encoding data transform, which can convert categorical data into numerical data, does not work in these types of cases. Due to large number of entitlements, when combining the numerical, high-dimensional, one-hot encoded data with traditional geometric distances (e.g., Euclidean), distances between data points will be quite large and will make it hard, if not impossible, for a clustering algorithm to yield meaningful outputs. This is a direct mathematical outcome to the high dimensionality of the ambient space. It is a well-documented issue in data science literature, and the applicable nomenclature is "curse of dimensionality". Typical dimensionality reduction techniques (e.g., PCA, t-SNE, etc.) have been experimented with, but due to the way these clustering algorithms manipulate numerical data, the resulting transforms may manipulate the original data in ways that are not interpretable, hence not useful in this context.

Accordingly, conventional statistical clustering such as K-modes, or K-modes used in association with a data-mining, pattern-finding algorithm such as Equivalence Class Transformation (ECLAT), have thus proven inadequate. Many of the reasons for the inadequacy of such typical clustering approaches have to do with the computationally intensive nature of the computer implementations of such clustering, which are both computationally and memory intensive, reducing or hindering the performance and responsiveness of identity management systems that utilize such clustering approaches.

Attempts to remedy these problems by altering the clustering to discard or ignore less popular identities or entitlements to enhance the signal-to-noise ratio in their application have been less than successful, achieving neither adequate results in the clusters determined or in improving the performance or memory usage of systems which employ such clustering. Other workarounds for these deficiencies have also proven unworkable to this type of identity and entitlement data.

Moreover, when attempting to cluster based on categorical data, typical clustering algorithms do not capture the social aspects of identity governance. Homophily in social networks, as defined in social sciences, is the tendency of individuals to associate and bond with similar others. In identity governance, homophily in the identity space usually results as a consequence of enforcing the governance principle that similar identities should be assigned similar access entitlements. It is thus important to attempt to capture, or otherwise utilize this homophily, when peer grouping for identity management. As a consequence of all these deficiencies, the results from prior approach to identity clustering in the context of identity management were harder to interpret, yielding fewer insights, and negatively impacting the performance, efficiency, and overall quality of identity management systems. The data-driven clustering approach of identities into peer groups remains, however, a crucial component of identity management in a distributed and networked computing environment for a variety of reasons, including the usefulness of reviewing and visualizing such clusters of identities for auditing and compliance purposes.

Accordingly, to ameliorate these issues, among other ends, embodiments of the identity management systems disclosed herein may utilize a network graph approach to peer grouping of identities and entitlements of distributed networked enterprise computing environment. Specifically, in certain embodiments, data on the identities and the respective entitlements assigned to each identity as utilized in an enterprise computer environment may be obtained by an identity management system. Using the identity and entitlement data, then, a network identity graph may be constructed, where the nodes of the graph correspond to, and represent, each of the identities or entitlements. Each edge (or relationship) of the graph may join two nodes of the graph and be associated with a similarity weight representing a degree of similarity between the identities or entitlements of the respective nodes. The identity graph may then be pruned to remove weak edges (e.g., those edges whose similarity weight may fall below a pruning threshold). The pruned identity graph can then be clustered into peer groups of identities or entitlement groups (e.g., using a graph based community detection algorithm). These peer groups of identities (or entitlements) can then be stored (e.g., separately or in the identity graph) and used by the identity management system. For example, a visual representation of the graph may be presented to a user of the identity management to assist in compliance or certification assessments or evaluation of the identities and entitlements as currently used by the enterprise.

In certain embodiments, the clustering of identities or entitlements may be optimized based on a peer group assessment metric, such as, for example, graph modularity determined based on the identity graph or the determined peer groups. For instance, in one embodiment, if a peer group assessment metric is below (or above) a quality threshold a feedback loop may be instituted whereby the pruning threshold is adjusted by some amount (up or down) and the originally determined identity graph is pruned based on the adjusted pruning threshold (or the previously pruned identity graph may be further pruned). This newly pruned identity graph can then be clustered into new peer groups of identities or entitlements and a peer group assessment metric determined based on the newly pruned identity graph or the newly determined peer groups. If this new peer assessment metric is now above (or below) the quality threshold the feedback loop may stop and these peer groups of identities or entitlements can then be stored (e.g., separately or in the identity graph) and used by the identity management system.

Otherwise, the feedback loop may continue by again adjusting the pruning threshold further (e.g., further up or further down relative to the previous iteration of the feedback loop), re-pruning the identity graph based on the adjusted pruning threshold, clustering this newly pruned graph, determining another peer group assessment metric and comparing this metric to the quality threshold. In this manner, the feedback loop of adjustment of the pruning threshold, re-pruning the graph, re-clustering the identity graph into peer groups may be repeated until the peer group assessment metric reaches a desired threshold. Moreover, by tailoring the peer group assessment metric and quality threshold to include or reflect domain or enterprise specific criteria, the clustering results (e.g., the peer groups of identities or entitlements resulting from the clustering) may more accurately reflect particular requirements or the needs of a particular enterprise or be better tailored to a particular use.

Embodiments may thus provide a number of advantages including allowing more intuitive access to the data (e.g., via graph database querying, or via graph visualization techniques), which may, in turn, yield deeper and more relevant insights for users of identity management systems. Moreover, embodiments as disclosed may offer the technological improvement of reducing the computational burden and memory requirements of systems implementing these embodiments through the improved data structures and the graph processing and analysis implemented by such embodiments. Accordingly, embodiments may improve the performance and responsiveness of identity management systems that utilize such embodiments. Likewise, embodiments may be dynamic with respect to time, allowing the development update processes using deltas between snapshots of data collection, bringing down operational costs and improving the performance and robustness of embodiments. Moreover, the graph format used by certain embodiments, allows the translation of domain and enterprise specific concepts, phenomena, and issues into tangible, quantifiable, and verifiable hypotheses which may be examine or validate with graph based algorithms. Accordingly, embodiments may be especially useful in assessing risk and in compliance with security policies or the like.

Turning first to FIG. 1, then, a distributed networked computer environment including one embodiment of an identity management system is depicted. Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 100. Users can include employees, supervisors, managers, IT personnel, vendors, suppliers, customers, robotic or application based users, etc. associated with enterprise 100.

Users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Thus, to accomplish their responsibilities, users may have entitlements to access resources of the enterprise environment 100. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 100 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; or for other reasons. Access risks can also arise from roles in enterprise environment 100 which may shift, change, evolve, etc. leaving entitlements non optimally distributed among various users.

To assist in managing the entitlements assigned to various users and more generally in managing and assessing access risks in enterprise environment 100, an identity management system 150 may be employed. Such an identity management system 150 may allow an administrative or other type of user to define one or more identities, one or more entitlements, or one or more roles, and associate defined identities with entitlements using, for example, an administrator interface 152. The assignment may occur, for example, by directly assigning an entitlement to an identity, or by assigning a role to an identity whereby the collection of entitlements comprising the role are thus associated with the identity. Examples of such identity management systems are Sailpoint's IdentityIQ and IdentityNow products. Note here, that while the identity management system 150 has been depicted in the diagram as separate and distinct from the enterprise environment 100 and coupled to enterprise environment 100 over a computer network 104 (which may the same as, or different than, network 102), it will be realized that such an identity management system 150 may be deployed as part of the enterprise environment 100, remotely from the enterprise environment, as a cloud based application or set of services, or in another configuration.

An identity may thus be almost physical or virtual thing, place, person or other item that an enterprise would like to define. For example, an identity may be a capacity, groups, processes, physical locations, individual users or humans or almost any other physical or virtual entity, place, person or other item. An entitlement may be an item (e.g., token) that upon granting to a user will allow the user to acquire a certain account or privileged access level that enables the user to perform a certain function within the distributed networked enterprise computer environment 100. Thought of another way, an entitlement may be a specific permission granted within a computer system, such as access to a particular building (based on a user's key badge), access to files and folders, or access to certain parts of websites. Entitlements may also define the actions a user can take against the items they have access to, including, for example, accessing computing systems, applications, file systems, particular data or data items, networks, subnetworks or network locations, etc. Each of these identities may therefore be assigned zero or more entitlements with respect to the distributed networked computer environments.

To facilitate the assignment of these entitlements, enterprises may also be provided with the ability to define roles through the identity management system 150. A role within the context of the identity management system 150 may be a collection of entitlements. These roles may be assigned a name or identifiers (e.g., manager, engineer_level_2, team leader) by an enterprise that designate the type of user or identity that should be assigned such a role. By assigning a role to an identity using the identity management system 150, the identity may be assigned the corresponding collection of entitlements associated with the assigned role.

The identity management system 150 may thus store identity management data 154. The identity management data 154 stored may include a set of entries, each entry corresponding to and including an identity (e.g., alphanumerical identifiers for identities) as defined and managed by the identity management system, a list or vector of entitlements or roles assigned to that identity by the identity management system, and a time stamp at which the identity management data was collected from the identity management system. Other data could also be associated with each identity, including data that may be provided from other systems such as a title, location or department associated with the identity. The set of entries may also include entries corresponding to roles, where each entry for a role may include the role identifier (e.g., alphanumerical identifier or name for the role) and a list or vector of the entitlements associated with each role. Other data could also be associated with each role, such as a title, location or department associated with the role.

Collectors 156 of the identity management system 150 may thus request or otherwise obtain data from various touchpoint systems within enterprise environment 100. These touchpoint systems may include, for example Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite.

Accordingly, the collectors 156 of the identity management system 150 may obtain or collect event data from various systems within the enterprise environment 100 and process the event data to associate the event data with the identities defined in the identity management data 154 to evaluate or analyze these events or other data in an identity management context. A user may interact with the identity management system 150 through a user interface 158 to access or manipulate data on identities, roles, entitlements, events or generally perform identity management with respect to enterprise environment 100.

As part of a robust identity management system, it is desirable to analyze the identity management data 154 associated with an enterprise 100. Specifically, it is desirable to group or cluster the identities or entitlements of an enterprise 100 into peer groups such that, for example, the identities in a peer group are similar with respect to the set of entitlements assigned to the identities of that group (e.g., relative to other identities or other groups) or, to determine peer groups of entitlements such that entitlement patterns and assignment may be determined and role mining performed.

Peer grouping of the identities within an enterprise (or viewing the peer groups of identities) may allow, for example, an auditor other person performing a compliance analysis or evaluation to quantitatively and qualitatively assess the effectiveness of any applicable pre-existing polices, or lack thereof, and how strictly they are enforced. Similarly, peer grouping of entitlements may allow roles to be determined from such entitlement groups and outlier entitlements to be identified. This information may, in turn, be utilized to redefine or govern existing roles as defined in the identity management system 150 and allow users of the identity management system 150 greater visibility into the roles of the enterprise 100.

Accordingly, an identity management system 160 may include a harvester 162 and a graph generator 164. The harvester 162 may obtain identity management data from one or more identity management systems 150 associated with enterprise 100. The identity management data may be obtained, for example, as part of a regular collection or harvesting process performed at some regular interval by connecting to, and requesting the identity management data from, the identity management system 150. The identity management data stored may thus include a set of entries, each entry corresponding to and including an identity as defined and managed by the identity management system, a list or vector of entitlements or roles assigned to that identity by the identity management system, and a time stamp at which the identity management data was collected from the identity management system 150. The identity management data may also include a set of entries for roles, each entry corresponding to and including a role as defined and managed by the identity management system 150 and a list or vector of entitlements assigned to that role by the identity management system 150, and a time stamp at which that identity management data was collected from the identity management system 150.

Graph generator 164 may generate a peer grouped identity graph from the obtained identity management data. Specifically, in one embodiment, a property (identity) graph may be generated from the identity management data obtained from the enterprise. Each of the identities and entitlements from the most recently obtained identity management data may be determined and a node of the graph created for each identity and entitlement. An edge is constructed between every pair of nodes (e.g., identities) that shares at least one entitlement and between every pair of nodes (e.g., entitlements) that shares at least one identity. Each edge of the graph may also be associated with a similarity weight representing a degree of similarity between the identities of the respective nodes joined by that edge, or between the entitlements of the respective nodes joined by that edge. It will be noted here that while a similarity weight may be utilized on edges between both identity nodes and entitlement nodes, the similarity weight type, determination and value may be determined differently based upon the respective type of node(s) being joined that weighted edge. Accordingly, the obtained identity management data may be represented by an identity graph (e.g., per enterprise) and stored in graph data store 166.

Once the identity graph is generated by the graph generator 164, the graph may then be pruned to remove edges based on their weighting. Again, the pruning of edges between identity nodes and entitlements nodes may be accomplished in the same, or a different manner. For example, a pruning threshold utilized to prune edges between identity nodes may be different than a pruning threshold utilized to prune edges between entitlement nodes as well as across customers.

The pruned identity graph can then be used to cluster the identities into peer groups of identities or to cluster the entitlements into peer groups of entitlements. This clustering may be accomplished, for example, a community-detection algorithm. This clustering result may also be optimized by the graph generator 164 through the use of a feedback loop to optimize the pruning of the edges until a desired metric for assessing the quality of the peer groups generated exceeds a desired threshold or satisfies certain (e.g., optimization or other) criteria. It will be noted here as well, that while the peer grouping of both identities or entitlements may be determined in embodiments, the peer grouping may be accomplished in the same or different manners for identities and entitlements in different embodiments. For example, the community detection, optimization, feedback loop or quality assessment metric may all be the same or different when clustering the identity or entitlements of the entitlement graph. It will also be noted here, that while identities and entitlements are discussed herein as examples of identity management artifacts that are represented as nodes in the graph, as discussed above, other identity management artifacts (e.g., roles, groups, etc.) may also be represented as nodes in the identity graph, and may be similar clustered or grouped into peer groups.

More generally, then, the pruning and clustering of the identity nodes of the identity graph may be performed separately from the pruning and clustering of the entitlement nodes of the identity graph. Accordingly, the property graph may comprise at least two subgraphs, the identities subgraph comprising at least the identity nodes and edges between these identity nodes and the entitlement subgraph comprising at least the entitlement nodes and edges between those entitlement nodes. Once the peer groups of identities or entitlements are determined, the peer groups can then be stored (e.g., separately or in the property graph itself) and used by the identity management system 160. For example, each peer group of identities (also referred to herein as an identity group) may be assigned a peer group identifier and the peer group identifier associated with each identity assigned to the peer group by storing the peer group identifier in association with the node in the graph representing that identity. Similarly, each peer group of entitlements (e.g., also referred to herein as an entitlement group) may be assigned a peer group identifier and the peer group identifier associated with each entitlement assigned to the peer group by storing the peer group identifier in association with the node in the graph representing that entitlement.

An interface 168 of the identity management system 160 may use the identity graph in the graph data store 166 or associated peer groups to present one or more interface which may be used for risk assessment, as will be discussed. For example, an interface 168 may present a visual representation of the graph, the identities, entitlements, or the peer groups in the identity graph to a user of the identity management system 160 associated with enterprise 100 to assist in compliance or certification assessments or evaluation of the identities, entitlements or roles as currently used by the enterprise (e.g., as represented in identity management data 154 of identity management system 150).

Before moving on, it will be noted here that while identity management system 160 and identity management system 150 have been depicted separately for purposes of explanation and illustration, it will be apparent that the functionality of identity management systems 150, 160 may be combined into a single or a plurality of identity management system as is desired for a particular embodiment and the depiction and separation of the identity management systems and their respective functionality has been depicted separately solely for purposes of ease of depiction and description.

Figure 2:
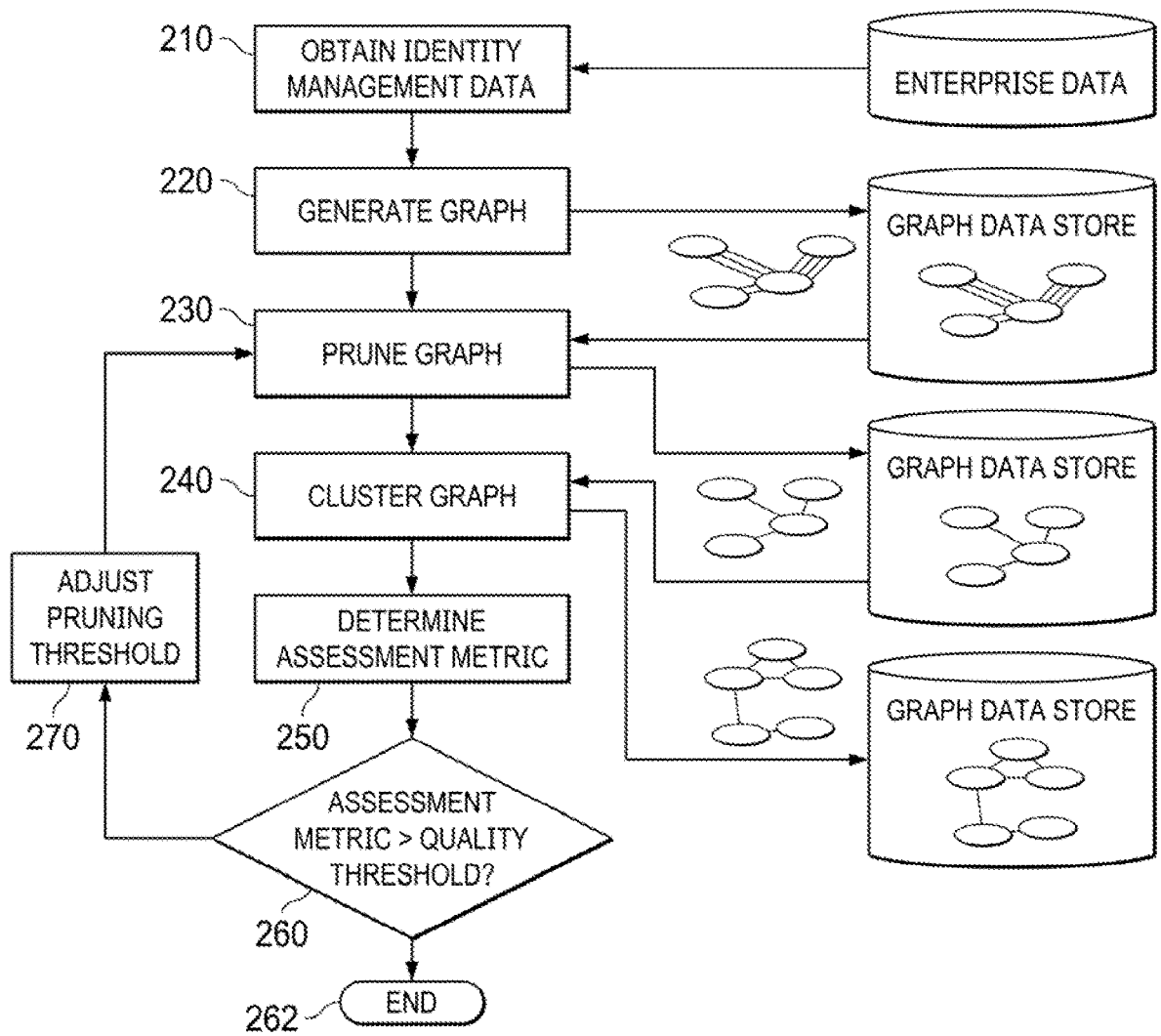
FIG. 2 is a flow diagram of one embodiment of a method for peer group detection and analysis using cluster based analysis of identity graphs.

Turning now to FIG. 2, a flow diagram for one embodiment of a method for determining peer groups of identities using a graph database is depicted. Embodiments of such a method may be employed by graph generators of identity management systems to generate identity graphs and associated peer groups from identity management data, as discussed above. It will be noted here, that while this embodiment is described in association with the determination of peer groups of identities in the identity graph, similar embodiments may be applied to entitlement nodes and associated similarity relationships of an identity graph to determine peer groups of entitlements in such an identity graph.

Initially, at step 210, identity management data may be obtained. As discussed, in one embodiment, this identity management data may be obtained from one or more identity management systems that are deployed in association with an enterprise's distributed computing environment. Thus, the identity management data may be obtained, for example, as part of a regular collection or harvesting process performed at some regular interval by connecting to, requesting the identity management data from, an identity management system. The identity management data may also be obtained on a one-time or user initiated basis.

As will be understood, the gathering of identity management data and determination of peer groups can be implemented on a regular, semi-regular or repeated basis, and thus may be implemented dynamically in time. Accordingly, as the data is obtained, it may be stored as a time-stamped snapshot. The identity management data stored may thus include a set of entries, each entry corresponding to and including an identity (e.g., alphanumerical identifiers for identities) as defined and managed by the identity management system, a list or vector of entitlements assigned to that identity by the identity management system, and a time stamp at which the identity management data was collected from the identity management system. Other data could also be associated with each identity, including data that may be provided from an identity management system such as a title, location or department associated with the identity. The collection of entries or identities associated with the same times stamp can thus be thought of as a snapshot from that time of the identities and entitlements of the enterprise computing environment as management by the identity management system.

As an example of identity management data that may be obtained from an identity management system, the following is one example of a JavaScript Object Notation (JSON) object that may relate to an identity:

```
{
    "attributes": {
        "Department": "Finance",
        "costcenter": "[R01e, L03]",
        "displayName": "Catherine Simmons",
        "email": "Catherine.Simmons@demoexample.com",
        "empId": "1b2c3d",
        "firstname": "Catherine",
        "inactive": "false",
        "jobtitle": "Treasury Analyst",
        "lastname": "Simmons",
        "location": "London",
        "manager": "Amanda.Ross",
        "region": "Europe",
        "riskScore": 528,
        "startDate": "12/31/2016 00:00:00AM UTC",
        "nativeIdentity_source_2": "source_2",
        "awesome_attribute_source_1": "source_1",
        "twin_attribute_a" : "twin a",
        "twin_attribute_b" : "twin b",
        "twin_attribute_c" : "twin c"
    },
    "id": "2c9084ee5a8de328015a8de370100082",
    "integration_id": "iiq",
    "customer_id": "ida-bali",
    "meta": {
        "created": "2017-03-02T07:19:37.233Z",
        "modified": "2017-03-02T07:24:12.024Z"
    },
    "name": "Catherine.Simmons",
    "refs": {
        "accounts": {
            "id": [
                "2c9084ee5a8de328015a8de370110083"
            ],
            "type": "account"
        },
        "entitlements": {
            "id": [
                "2c9084ee5a8de328015a8de449060e54",
                "2c9084ee5a8de328015a8de449060e55"
            ],
            "type": "entitlement"
        },
        "manager": {
            "id": [
                "2c9084ee5a8de022015a8de0c52b031d"
            ],
            "type": "identity"
        }
    },
    "type": "identity"
}
```

As another example of identity management data that may be obtained from an identity management system, the following is one example of a JSON object that may relate to an entitlement:

```
{
    "integration_id": "bd992e37-bbe7-45ae-bbbf-c97a59194cbc",
    "refs": {
        "application": {
            "id": [
                "2c948083616ca13a01616ca1d4aa0301"
            ],
            "type": "application"
        }
    },
```

```
"meta": {
   "created": "2018-02-06T19:40:08.005Z",
   "modified": "2018-02-06T19:40:08.018Z"
},
"name": "Domain Administrators",
"attributes": {
   "description": "Domain Administrators group on Active Directory",
   "attribute": "memberOf",
   "aggregated": true,
   "requestable": true,
   "type": "group",
   "value": "cn=Domain Administrators,dc=domain,dc=local"
},
"id": "2c948083616ca13a01616ca1f1c50377",
"type": "entitlement",
"customer_id": "3a60b474-4f43-4523-83d1-eb0fd571828f"
}
```

As another example of identity management data that may be obtained from an identity management system, the following is one example of a JSON object that may relate to a role:

```
{
   "id": "id",
   "name": "name",
   "description":
   "description",
   "modified": "2018-09-
07T17:49:33.667Z", "created":
   "2018-09-07T17:49:33.667Z",
   "enabled": true,
   "requestable": true,
   "tags": [
   {
         "id": "2c9084ee5a8ad545345345a8de370110083"
         "name" : "SOD-SOX",
             "type": "TAG"
      },
   {
         "id": "2c9084ee5a8ad545345345a8de370122093"
         "name" : "PrivilegedAccess",
             "type": "TAG"
      },
   ]
   "accessProfiles":
   [
     {
              "id": "accessProfileId",
         "name": "accessProfileName"
     }
   ],
   "accessProfileCount":
   1, "owner": {
   "name": "displayName",
   "id": "ownerId"
   },
   "synced": "2018-09-07T17:49:33.667Z"
   }
```

At step 220 an identity graph may be generated from the identity management data obtained from the enterprise. Specifically, each of the identities and entitlements from the most recent snapshot of identity management data may be obtained and a node of the graph created for each identity and entitlement. An edge is constructed between every pair of identity nodes (e.g., identities) that shares at least one entitlement (e.g., an edge connects two identity nodes if and only if they have at least one entitlement in common). An edge may also be constructed between every pair of entitlement nodes (e.g., entitlements) that shares at least one identity (e.g., an edge connects two entitlement nodes if and only if they have at least one identity in common).

Each edge of the graph joining identity nodes or entitlement nodes may be associated with a similarity weight representing a degree of similarity between the identities or entitlements of the respective nodes joined by that edge. For identity nodes, the similarity weight of an edge joining the two identity nodes may be generated based on the number of entitlements shared between the two joined nodes. As but one example, the similarity weight could be based on a count of the similarity (e.g., overlap or intersection of entitlements) between the two identities divided by the union of entitlements. Similarly, for identity nodes, the similarity weight of an edge joining the two entitlement nodes may be generated based on the number of identities shared between the two joined nodes. As but one example, the similarity weight could be based on a count of the similarity (e.g., overlap or intersection of identities) between the two entitlements divided by the union of identities. For instance the similarity could be defined as the ratio between a number of identities having both entitlements joined by the edge to the number of identities that have either one (e.g., including both) of the two entitlements.

In one embodiment, the edges are weighted via a proper similarity function (e.g., Jaccard similarity). In one embodiment, a dissimilarity measure, of entitlement or identity binary vectors, d, may be chosen, then the induced similarity, $1-d(x,y)$, may be used to assign a similarity weight to the edge joining the nodes, x,y. Other methods for determining a similarity weight between two nodes are possible and are fully contemplated herein. Moreover, it will be noted here that while a similarity weight may be utilized on edges between both identity nodes and entitlement nodes, the similarity weight type, determination and value may be determined differently based upon the respective type of node(s) being joined that weighted edge.

In one specific, embodiment, a symmetric matrix for identities (e.g., an identity adjacency matrix) may be determined with each of the identities along each axis of the matrix. The diagonal of the matrix may be all 0s while the rest of values are the similarity weights determined between the two (identity) nodes on the axes corresponding to the value. In this manner, this symmetric matrix may be provided to a graph constructor which translates the identities on the axes and the similarity values of the matrix into graph store commands to construct the identity graph. Similarly, a symmetric matrix for entitlements (e.g., an entitlement adjacency matrix) may be determined with each of the entitlements along each axis of the matrix. The diagonal of the matrix may be all 0s while the rest of values are the similarity weights determined between the two (entitlement) nodes on the axes corresponding to the value. In this manner, this symmetric matrix may be provided to a graph constructor which translates the entitlement on the axes and the similarity values of the matrix into graph store commands to construct the identity graph.

Accordingly, the identity management data may be faithfully represented by a graph, with k types of entities (nodes/vertices, e.g., identity-id, title, location, entitlement, etc.) and stored in a graph data store. It will be noted that graph data store may be stored in any suitable format and according to any suitable storage, including, for example, a graph store such a Neo4j, a triple store, a relational database, etc. Access and queries to this graph data store may thus be accomplished using an associated access or query language (e.g., such as Cypher in the case where the Neo4j graph store is utilized).

Once the identity graph is generated, the graph may then be pruned at step 230. Here, the identity graph may be pruned to remove weak edges (e.g., those edges whose similarity weight may fall below a pruning threshold). The pruning of the graph is associated with the locality aspect of identity governance, where an identity's access entitlements should not be directly impacted, if at all, by another identity with strongly dissimilar entitlement pattern (e.g., a weak connecting edge) or that determined should be based on strong commonality or popularity of entitlements within an identity grouping. Accordingly, the removal of such edges may not dramatically alter the global topology of the identity graph. An initial pruning threshold may be initially set or determined (e.g., as 50% similarity or the like) and may be substantially optimized or otherwise adjusted at a later point. As another example, a histogram of similarity weights may be constructed and a similarity weight corresponding to a gap in the similarity weights of the histogram may be chosen as an initial pruning threshold. Again, the pruning of edges between identity nodes and entitlements nodes may be accomplished in the same, or a different manner. For example, the pruning threshold utilized to prune edges between identity nodes may be different than a pruning threshold utilized to prune edges between entitlement nodes.

The pruned identity graph can then be used to cluster the identities or entitlements into peer groups of identities or peer groups of entitlements at step 240. Within this graph approach, a representation of a peer group of identities could be represented by a maximal clique, where every identity is strongly connected (e.g., similar) to every other identity within the identity peer group, and consequently, members of the clique all share a relatively large, and hence dominant, common core of entitlements. A representation of an entitlement peer group could be represented by a maximal clique, where every entitlement is strongly connected (e.g., similar) to every other entitlement within the peer group, and consequently, members of the clique all share a relatively large, and hence dominant, common core of identities. The problem of finding all maximal cliques of a graph may, however, be a memory and computationally intensive problem. Most clique related problems in graph theory are hard and some of them are even NP-complete, requiring exponential time to finish as graphs with exponentially many maximal cliques may exist.

Accordingly, in one embodiment a community-detection algorithm may be utilized for peer grouping the identities or entitlements of the identity graph to speed the determination of the peer groups, reduce computational overhead and conserve memory, among other advantages. A plethora of applicable and performant community-detection and graph clustering algorithms may be utilized according to certain embodiments. Some of these algorithms are specifically targeted to large graphs, which can be loosely described as graphs with at least tens or hundreds (or more) of thousands of nodes and millions of edges. Such graph community-detection algorithms may include, for example, Louvain, Leiden, Fast-greedy, Label Propagation or Stochastic Block Modeling. Other graph community detection algorithms may be utilized and are fully contemplated herein.

In certain embodiments, a clustering result may be optimized through the use of a feedback loop, as discussed below. As such, in one embodiment it may be desirable to utilize a community-detection algorithm for determination of the peer groups that may provide allow a straightforward determination of a peer group assessment metric for a quality assessment of determined peer groups or the identity graph. Accordingly, a community-detection algorithm that may be based on, or allow a determination of, a graph based metric (e.g., modularity, evolving topology, connected components, centrality measures (e.g., betweenness, closeness, community overlap measures such as NMI or Omega indices)) that may be used as a peer group assessment metric may be utilized.

Specifically, in one embodiment, the Louvain algorithm may be utilized as a community-detection algorithm and modularity may be used as a peer assessment metric. The Louvain algorithm may not only be a scalable algorithm that can handle, and be efficient on, large graphs; but additionally the Louvain algorithm may be based on modularity or be modularity optimized. Modularity is a scalar that can be determined for a graph or groups or subgraphs thereof. This modularity reflects a likelihood of the clusters generated (e.g., by the algorithm) to not have been generated by random chance. A high modularity value, (e.g., positive and away from 0) may indicate that the clustering result is unlikely to be a product of chance. This modularity can thus be used as a peer group assessment metric.

Moreover, in addition to the application of a peer group assessment metric to optimize the peer groups or identity graphs determined using such community-detection algorithms, an identity management system may employ alerts based on these peer group assessment metrics. For example, an alert to a user may be based on an alert threshold (e.g., if the peer group assessment metric drops below or above a certain threshold) or if any changes over a certain threshold occur with respect to the peer group assessment metric. For example, setting an empirical low threshold for modularity, with combined user alerts, could serve as a warning for deteriorating quality of peer groups or the identity graph. This could be due to input data has been corrupted at some point in pipeline, or in other cases, that the access entitlement process for the particular enterprise is extremely lacking due discipline. Regardless of the underlying cause, such an early warning system may be valuable to stop the propagation of questionable data quality in the peer group assessment and determination process and more generally to identity management goals within the enterprise.

In many cases, the community-detection or other clustering algorithm utilized in an embodiment may fall under the umbrella of what are usually termed unsupervised machine-learning. Results of these types of unsupervised learning algorithms may leave some room for interpretation, and do not, necessarily or inherently, provide outputs that are optimized when the domain or context in which they are being applied are taken into account. Consequently, to mitigate some of these issues and to optimize the use of the peer groups and identity graphs in an identity governance context, embodiments of identity management systems employing such peer groups of identities or entitlements using an identity graph may allow some degree of user configuration, where at a least a portion of the user configuration may be applied in the graph determination, peer-grouping or optimization of such peer group determination.

This configurability may allow the user of an identity management system to, for example, impose some constraints or set up certain configuration parameters for the community-detection (or other peer grouping) algorithm in order to enhance the clustering results for a particular use-case or application. A few non-exhaustive examples of user configuration are thus presented. A user may have a strongly defined concept of what constitutes a 'peer'. This may entail that the user's specification of what constitutes peer may be used to derive a pruning threshold with statistical methods (e.g., rather than relying on modularity).

As another example of configurability, a user may elect to opt for a hierarchical clustering output, or that peer groups should have certain average size, which may entail to allowing for several consecutive iterations of the community-detection algorithm to be performed (as will be explained in more detail herein). A user may also elect to run the peer grouping per certain portions of the identities or entitlements, versus running it for all identities or entitlements. The filtered population of identities or entitlements may be specified in terms of geographic location, business role, business unit, etc. Similarly, a user may elect to filter the outputs of the community-detection algorithm in terms of certain identity or entitlement attributes, e.g., identity role, identity title, identity location, etc. The results might then be quantitatively and qualitatively contrasted against existing governance policies to measure, assess and certify compliance with these policies.

Generally then, a user may elect to utilize the peer grouping feature in combination with other tools of identity governance, in order to gain more insight into the quality of identity governance policy enforcement within the business. This entails that peer grouping should be configurable and flexible enough to allow it to be paired with other (e.g., third-party) identity management tools. Accordingly, certain restrictions may be imposed on the identity graph's or peer group's size, format, level of detail, etc.

In any event, once the peer groups of identities or entitlements of the pruned identity graph are used to cluster the identities into peer groups of identities at step 240 the determined peer groups can then be stored (e.g., separately or in the identity graph itself) and used by the identity management system. For example, each peer group (e.g., or identities or entitlements) may be assigned a peer group identifier and the peer group identifier associated with each identity assigned to the peer group by storing the peer group identifier in association with the node in the graph representing that identity or entitlement.

As an example of use a visual representation of the graph, the identities, entitlements or the peer groups in the identity graph may be presented to a user of the identity management to assist in compliance or certification assessments or evaluation of the identities and entitlements as currently used by the enterprise. In principle, strictly enforced pre-existing governance policies should ensure that identities with strongly similar access privileges are strongly similar (e.g., are in the same peer group). The presentation of such peer groups may thus, for example, allow an auditor or compliance assessor to quantitatively and qualitatively assess the effectiveness of any applicable pre-existing polices, or lack thereof, and how strictly they are enforced.

During such collection, graph determination and peer grouping steps, in certain embodiments, a number of efficiencies may be implemented to speed the collection process, reduce the amount data that must be stored and to reduce the computer processing overhead and computing cycles associated with such data collection, graph determination and peer grouping of such data. Specifically, in one embodiment, a delta change assessment may be performed when identity management data is collected or peer groups are determined in a current time period. More specifically, if identity management data was collected in a previous time period, or a previous peer grouping has been performed on identities or entitlements of a previously created identity graph, an assessment can be made (e.g., by a data querying script or process) of the difference (or delta) between the set of identities or entitlements corresponding to the most recent previous snapshot and the set of identities or entitlements obtained in the current time period. This assessment may comprise a determination of how many changes to the identities, associated entitlements or other attributes have occurred between the time of the previous snapshot and the current snapshot (e.g., the most recently identity management data collected in the current time period).

An assessment may also be made of the difference between the peer groups determined from the most recent previous snapshot and the peer groups obtained in the current time period. This assessment may comprise a determination of how many identities or entitlements are associated with different peer groups (e.g., relative to the peer grouping of identities or entitlements determined from the previous most recent snapshot), changes to the identities or entitlements or how many new identities are associated with an established (or new) peer group.

If there are no determined changes, or the changes are below some threshold number, or are few, local, or insignificant to a large majority of existing peer groups, then no action is needed other than updating the affected identities or entitlements in the data of the previous snapshot or the identity graph. New entries in the entries comprising the current snapshot of identities or entitlements may be created for any newly identified identities or entitlements. Additionally, nodes in the graph corresponding to new identities or entitlements can be appended to an appropriate peer group based on how similar this new identity to existing peer groups, (e.g., assign the new identity the peer group of the same department/title).

If the differences (e.g., number of changes, new identities, different peer group assignments, etc.) are non-trivial, affecting a multitude of identities across peer groups, then a new peer grouping process may occur on the newly refreshed data. In such case, a detection algorithm may be used to evolve, and persist, previously determined peer groups into their recent counterparts. This can be done by monitoring certain 'marker' identities, e.g., influencers, or identities with high centrality values and/or high degree of connections, in both versions of peer groups. Utilizing a majority vote approach, it can be determined how previous peer groups evolve into newer ones. Expected updated versions of the previous peer group, include splitting, merging, growth, shrinkage. Newer split peer groups may, for example inherit the 'old' peer group identifiers.

Embodiments of such a delta detection and updating mechanisms may have the further advantage of allowing the quality and stability of each peer group to be monitored by an identity management system via tracking the peer groups or identity graph, the changes thereto, or their evolution over time. By actively monitoring and assessing the degree of these changes between two or more consecutive versions of a peer group or identity graph, deteriorating quality issues may be detected as they arise or manifest in the identity graph or peer groups determined therefrom. Similarly, using the identity graphs, peer groups or peer group assessment metrics determined therefrom, a graph evolution model may be built in certain embodiments, (e.g., based on epidemiology susceptible, infected and recovered type models). Comparing the observed evolution of identities, entitlements or peer groups versus theoretical predictions may provide another tool to warn users of an identity management system against rapid or extreme changes that may negatively impact the quality of peer groups or identity management more generally.

Again, once the peer groups of identities or entitlements are determined from the pruned identity graph and stored (at step 240), a peer group assessment metric may be determined based on the identity graph or the determined peer groups at step 250. As discussed, this peer group assessment metric may be determined separately based on the peer groups or identity graph determined, or may be metric utilized by a community-detection algorithm, such that the peer group assessment metric may be determined as part of the peer group determination process. In certain embodiments then, the application of a community-detection algorithm may result in such a peer group assessment metric (e.g., modularity, evolving topology, connected components, centrality measures e.g., betweenness, closeness, community overlap measures (e.g., NMI, Omega indices)) that may be used as a peer group assessment metric may be utilized.

For example, as discussed above the Louvain algorithm may be a graph-based modularity optimized community-detection algorithm. Thus, a modularity associated with the determined peer groups may result from the determination of the peer group using the Louvain algorithm. Modularity is a scalar that can be determined for a graph or groups or subgraphs thereof and reflects a likelihood of the clusters generated (e.g., by the algorithm) to not have been generated by random chance. A high modularity value, (e.g., positive and away from 0) may indicate that the clustering result is unlikely to be a product of chance. This modularity can be used as a peer group assessment metric in one embodiment.

Accordingly, in certain embodiments, the clustering of identities or entitlements into peer groups may be optimized based on this peer group assessment metric. Specifically, a feedback loop may be utilized to determine the optimal pruning threshold. The optimization loop may serve to substantially increase or maximize the quality of the graph clustering, with respect to certain proper metrics (e.g., graph modularity or other peer group assessment metric). Additional domain-specific, per enterprise, criteria may be utilized in this step in certain embodiments in order to render clustering results that accurately reflect certain requirements to better serve a particular enterprise or use of the peer groups or identity graph.

For instance, in one embodiment if the peer group assessment metric is above (or below) a quality threshold at step 260 the determination of peer groups of identities or entitlements for the obtained in the current snapshot may end at step 262. The determined peer groups of identities or entitlements can then be stored (e.g., separately or in the identity graph) and used by the identity management system.

However, if the peer group assessment metric is below (or above) a quality threshold at step 260 a feedback loop may be instituted whereby the pruning threshold is adjusted by some amount at step 270 (up or down) and the originally determined identity graph is again pruned based on the adjusted pruning threshold (or the previously pruned identity graph may be further pruned) at step 230. The adjustment of the pruning threshold may be based on a wide variety of criteria in various embodiments and may be adjust be a fixed or differing amount in every iteration through the feedback loop. Additionally, in some embodiments, various machine learning techniques (e.g., unsupervised machine learning techniques such as k-means, method of moments, neural networks, etc.) may be used to determine an amount to adjust the pruning threshold or a value for the adjusted pruning threshold). This newly pruned identity graph can then be clustered into new peer groups of identities or entitlements at step 240 and a peer group assessment metric determined at step 250 based on the newly pruned identity graph or the newly determined peer groups.

If this new peer assessment metric is now above (or below) the quality threshold at step 260 the feedback loop may be stopped and the determination of peer groups of identities or entitlements for the data obtained in the current snapshot may end at step 262. These peer groups of identities or entitlements can then be stored (e.g., separately or in the identity graph) and used by the identity management system.

Otherwise, the feedback loop may continue by again adjusting the pruning threshold further at step 270 (e.g., further up or further down relative to the previous iteration of the feedback loop), re-pruning the identity graph based on the adjusted pruning threshold at step 230, clustering this newly pruned graph at step 240, determining another peer group assessment metric at step 250 and comparing this metric to the quality threshold at step 260. In this manner, the feedback loop of adjustment of the pruning threshold, re-pruning the graph and re-clustering the identity graph into peer groups may be repeated until the peer group assessment metric reaches a desired threshold. Moreover, by tailoring the peer group assessment metric and quality threshold to include or reflect domain or enterprise specific criteria (e.g., which may be specified by a user of the identity management system), the clustering results (e.g., the peer groups resulting from the clustering) may more accurately reflect particular requirements or the needs of a particular enterprise or be better tailored to a particular use.

Once the feedback loop is ended (step 262) the determined peer groups of identities or entitlements can then be stored (e.g., separately or in the identity graph) and used by the identity management system. For example, a visual representation of the graph may be presented to a user of the identity management to assist in compliance or certification assessments or evaluation of the identities and entitlements as currently used by the enterprise.

It will be noted here as well, that while the peer grouping of both identities or entitlements may be determined in embodiments, the peer grouping may be accomplished in the same or different manners for identities and entitlements in different embodiments. For example, the community detection, optimization, feedback loop or quality assessment metric (e.g., steps 230, 240, 250, 260 and 270) may all be performed the same or differently when clustering the identity or entitlements of the entitlement graph. More generally, then, the pruning and clustering of the identity nodes of the identity graph may be performed separately from the pruning and clustering of the entitlement nodes of the identity graph. In certain embodiments, for example, the pruning and clustering (e.g., steps 230, 240, 250, 260 and 270) of the identity nodes of the identity graph may be performed as a separate process from the pruning and clustering (e.g., steps 230, 240, 250, 260 and 270) of the entitlement nodes of the identity graph. Accordingly, the identity graph may be comprised of at least two subgraphs, the identities subgraph comprising at least the identity nodes and edges between these identity nodes and the entitlement subgraph comprising at least the entitlement nodes and edges between those entitlement nodes.

It may now be helpful to look at such visual depictions and presentations of identity graphs or interfaces that may be created or presented based on such identity graphs. It will be apparent that these depictions and interfaces are but example of depictions and interfaces that may presented or utilized, and that almost any type of presentation, depiction or interface based on the identities, entitlements, peer groups or other associated data discussed may be utilized in association with the embodiments of identity management systems disclosed herein.

As discussed, embodiments of the identity management systems as disclosed may create, maintain or utilize identity graphs. These identity graphs may include a graph comprised of nodes and edges, where the nodes may include identity management nodes representing, for example, an identity, entitlement or peer group, and the edges may include relationships between these identity management nodes. The relationships represented by the edges of the identity graph may be assigned weights or scores indicating a degree of similarity between the nodes related by a relationship, including, for example, the similarity between two nodes representing an identity or two nodes representing an entitlement, as discussed. Additionally, the relationships may be directional, such that they may be traversed only in a single direction, or have different weightings depending on the direction in which the relationship is traversed or the nodes related. Embodiments of such an identity graph can thus be searched (or navigated) to determine data associated with one or more nodes. Moreover, the similarity between, for example, the identities or entitlements may be determined using the weights of the relationships in the identity graph.

Specifically, in certain embodiments, a property graph may be thought of as a graph comprising a number of interrelated nodes. These nodes may include nodes that may have labels defining the type of the node (e.g., the type of "thing" or entity that the node represents, such as an identity, entitlement or peer group) and properties that define the attributes or data of that node. For example, the labels of the nodes of an identity graph may include "Identity", "Entitlement" or "PeerGroup". Properties of a node may include, "id", "company", "dept", "title", "location", "source" "size", "clique", "mean_similarity", or the like.

The nodes of the property graph may be interrelated using relationships that form the edges of the graph. A relationship may connect two nodes in a directional manner. These relationships may also have a label that defines the type of relationship and properties that define the attributes or data of that relationship. These properties may include an identification of the nodes related by the relationship, an identification of the directionality of the relationship or a weight or degree of affinity for the relationship between the two nodes. For example, the labels of the relationships of an identity graph may include "Similarity" or "SIM", "Has_Entitlement" or "HAS_ENT", "Belongs_To_PeerGroup" or "BELONGS_TO_PG", or the like.

Figure 3A:
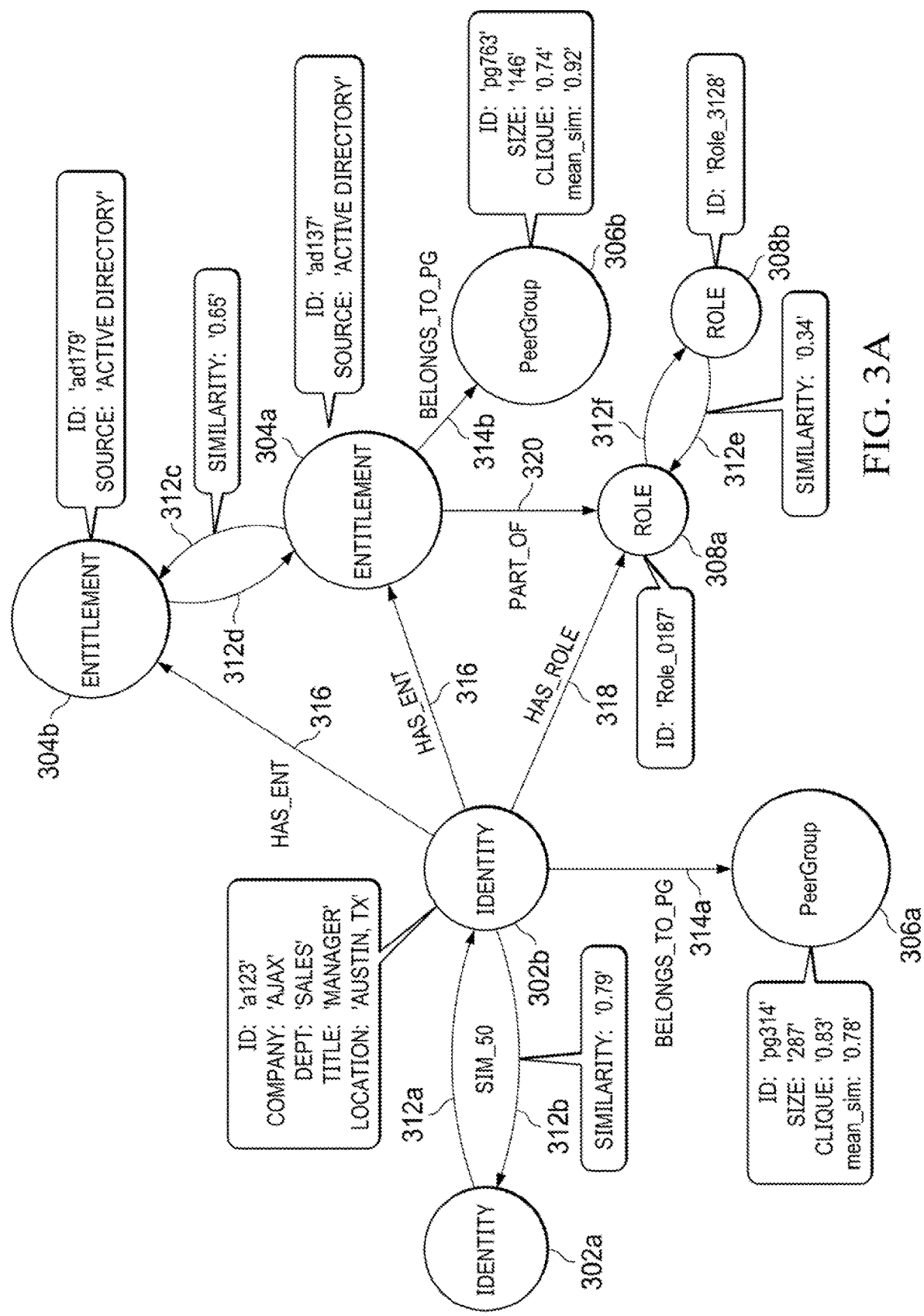
FIGS. 3A, 3B, 3C, 3D and 3E depict example visual representations of identity graphs.

Referring then to FIG. 3A, a graphical depiction of a portion of an example identity graph 300 is depicted. Here, nodes are represented by circles and relationships are represented by the directional arrows between the nodes. Such an identity graph 300 may represent identities, entitlements or peer groups, their association, and the degree of similarity between identities represented by the nodes. Thus, for example, the identity nodes 302a, 302b have the label "Identity" indicating they are identity nodes. Identity node 302b is shown as being associated with a set of properties that define the attributes or data of that identity node 302b, including here that the "id" of identity node 302b is "a123", the "company" of identity node 302b is "Ajax", the "dept" of identity node 302b is "Sales", the "title" of identity node 302b is "Manager", and the "location" of identity node 302b is "Austin, Tex.".

These identity nodes 302 of the identity graph 300 are joined by edges formed by directed relationships 312a, 312b. Directed relationship 312a may represent that the identity of identity node 302a is similar to (represented by the labeled "SIM" relationship 312a) the identity represented by identity node 302b. Similarly, directed relationship 312b may represent that the identity of identity node 302b is similar to (represented by the labeled "SIM" relationship 312b) the identity represented by identity node 302a. Here, relationship 312b has been assigned a similarity weight of 0.79. Notice that while these relationships 312a, 312b are depicted as individual directional relationships, such a similar relationship may be a single bidirectional relationship assigned a single similarity weight.

Entitlement nodes 304a, 304b have the label "Entitlement" indicating that they are entitlement nodes. Entitlement node 304a is shown as being associated with a set of properties that define the attributes or data of that entitlement node 304a, including here that the "id" of entitlement node 304 is "ad137", and the "source" of entitlement node 304a is "Active Directory". Entitlement node 304b is shown as being associated with a set of properties that define the attributes or data of that entitlement node 304b, including here that the "id" of entitlement node 304b is "ad179", and the "source" of entitlement node 304b is "Active Directory".

These entitlement nodes 304 of the identity graph 300 are joined by edges formed by directed relationships 312c, 312d. Directed relationship 312c may represent that the entitlement node 304a is similar to (represented by the labeled "SIM" relationship 312c) the entitlement represented by entitlement node 304b. Similarly, directed relationship 312d may represent that the entitlement of entitlement node 304b is similar to (represented by the labeled "SIM" relationship 312d) the entitlement represented by entitlement node 304a. Here, relationship 312c has been assigned a similarity weight of 0.65. Notice that while these relationships 312c, 312d are depicted as individual directional relationships, such a similar relationship may be a single bidirectional relationship assigned a single similarity weight.

Identity node 302b and entitlement nodes 304a, 304b of the identity graph 300 are joined by edges formed by directed relationships 316. Directed relationships 316 may represent that the identity of identity node 302b has (represented by the labeled "HAS_ENT" relationships 316) the entitlements represented by entitlement nodes 304a, 304b.

Peer group node 306a has the label "PeerGroup" indicating that it is a peer group node. Peer group node 306a is shown as being associated with a set of properties that define the attributes or data of that peer group node 306a, including here that the "id" of peer group node 306a is "pg314", the "size" of peer group node 306a is "287", the "clique" of peer group node 306a is "0.83" and the "mean_sim" or mean similarity value of peer group node 306a is "0.78". Here, the "clique" attribute may refer to a cluster density metric for that peer group represented by that peer group node. The cluster density metric may be defined, for example, defined as the ratio between the number of actual edges within a graph cluster to the maximum possible number of edges with the same number of nodes within the cluster. The latter number is known, in terms of the number of nodes N, and may equal $N*(N-1)/2$.

Identity node 302b and peer group node 306a of the identity graph 300 are joined by an edge formed by directed relationship 314a. Directed relationship 314a may represent that the identity of identity node 302b belongs to (represented by the labeled "BELONGS_TO_PG" relationship 314a) the peer group represented by peer group node 306a.

Peer group node 306b has the label "PeerGroup" indicating that it is a peer group node. Peer group node 306b is shown as being associated with a set of properties that define the attributes or data of that peer group node 306b, including here that the "id" of peer group node 306b is "pg763", the "size" of peer group node 306b is "146", the "clique" of peer group node 306b is "0.74" and the "mean_sim" or mean similarity value of peer group node 306b is "0.92". Entitlement node 304a and peer group node 306b of the identity graph 300 are joined by an edge formed by directed relationship 314b. Directed relationship 314b may represent that the identity of entitlement node 304a belongs to (represented by the labeled "BELONGS_TO_PG" relationship 314b) the peer group represented by peer group node 306b.

Role nodes 308a, 308b have the label "Role" indicating that they are Role nodes. Role node 308a is shown as being associated with a set of properties that define the attributes or data of that Role node 308a, including here that the "id" of entitlement node 308a is "Role_0187". Role node 308b is shown as being associated with a set of properties that define the attributes or data of that role node 308b, including here that the "id" of role node 308b is "Role_3128". Directed relationship 318 may represent that the identity of identity node 302b has (represented by the labeled "HAS_ROLE" relationship 318) the role represented by role node 308a. Directed relationship 320 may represent that the entitlement of entitlement node 304a is a part of or included in (represented by the labeled "PART_OF" relationship 320) the role represented by role node 308a.

These role nodes 308 of the identity graph 300 are joined by edges formed by directed relationships 312e, 312f. Directed relationship 312e may represent that the role represented by role node 304a is similar to the role represented by role node 304b. Similarly, directed relationship 312f may represent that the role represented by role node 308b is similar to the role represented by role node 308a. Here, relationship 312e has been assigned a similarity weight of 0.34. Again, notice that while these relationships 312e, 312f are depicted as individual directional relationships, such a similar relationship may be a single bidirectional relationship assigned a single similarity weight.

Figure 3B:
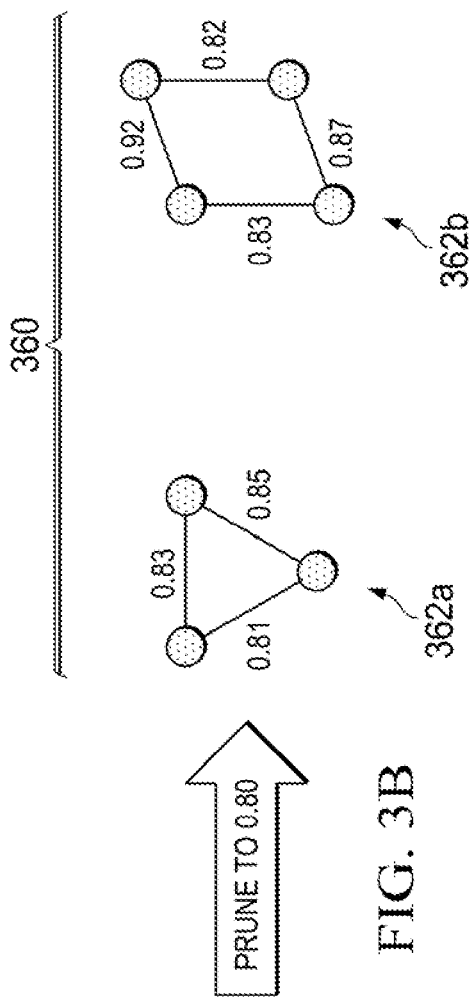

FIG. 3B is a graphical depiction of an entitlement graph and the subgraphs or clusters that may result from different pruning thresholds. In particular, entitlement graph 350 may be an initial cluster of entitlement nodes with edges having similarity weights (e.g., which may be determined as discussed) where the entitlement graph has been pruned initially and clustered according to a 0.5 pruning threshold for the similarity weight. Entitlement graph 360 is a result of pruning the entitlement graph 350 according to a higher pruning threshold of 0.8 and clustering. Here, two subgraphs 362a, 362b may result from such a pruning.

Figure 3C:
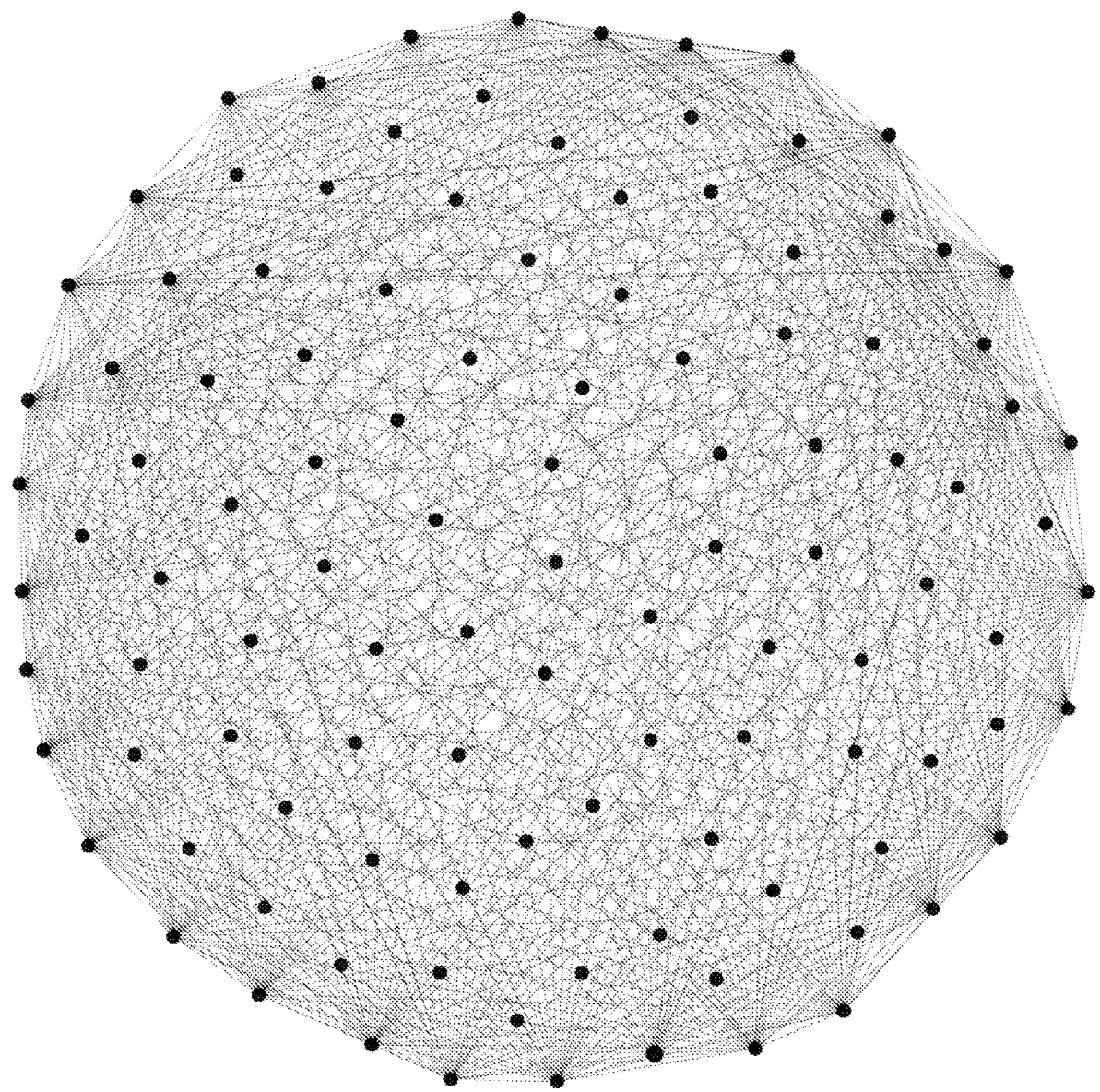
Figure 3D:
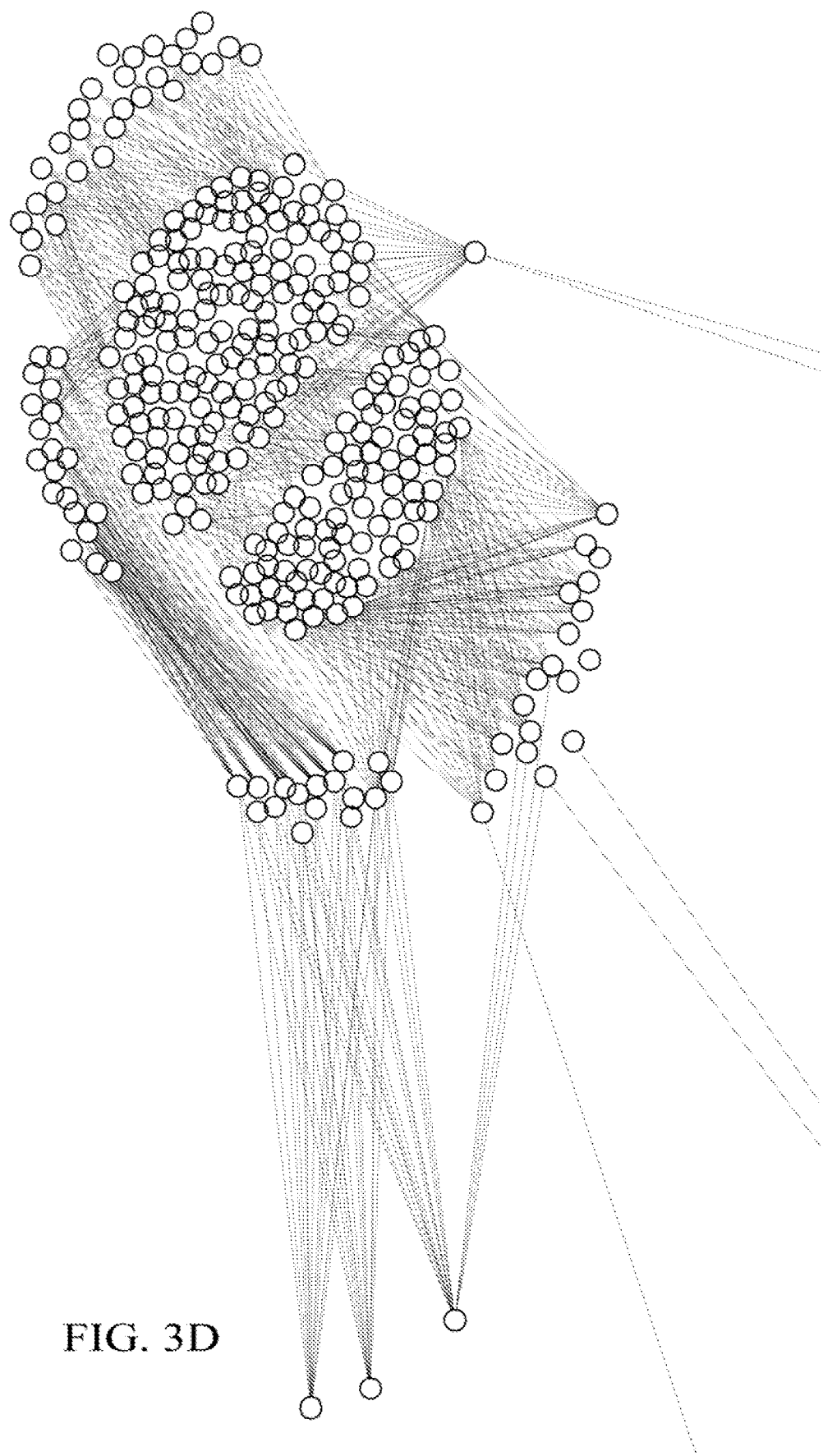
Figure 3E:
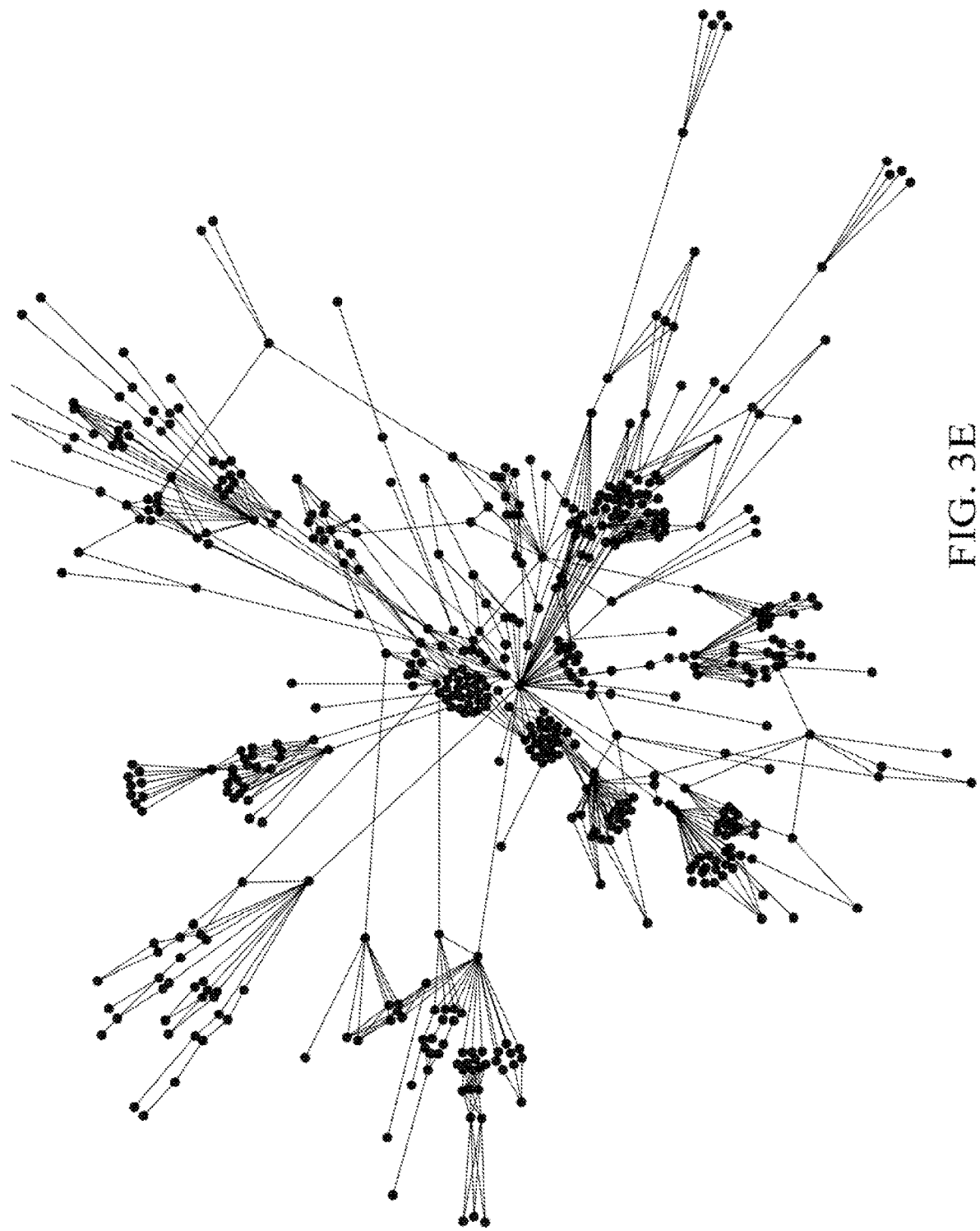

Now referring to FIGS. 3C, 3D and 3E, example representations of peer groupings within identity graphs are depicted. Here, each identity node of an identity graph is represented by a circle and each edge is represented by a line joining the nodes. In these visual depictions, the closer the nodes the higher the similarity value between the nodes. Such visual depictions when presented to a user may allow a user to better perceive the number of identities utilized by an enterprise, the relationships between those identities, the distribution of entitlements with respect to those identities or other information related to the identities or entitlements that may be utilized in identity governance and management, including for example, compliance assessment or auditing.

Figure 4:
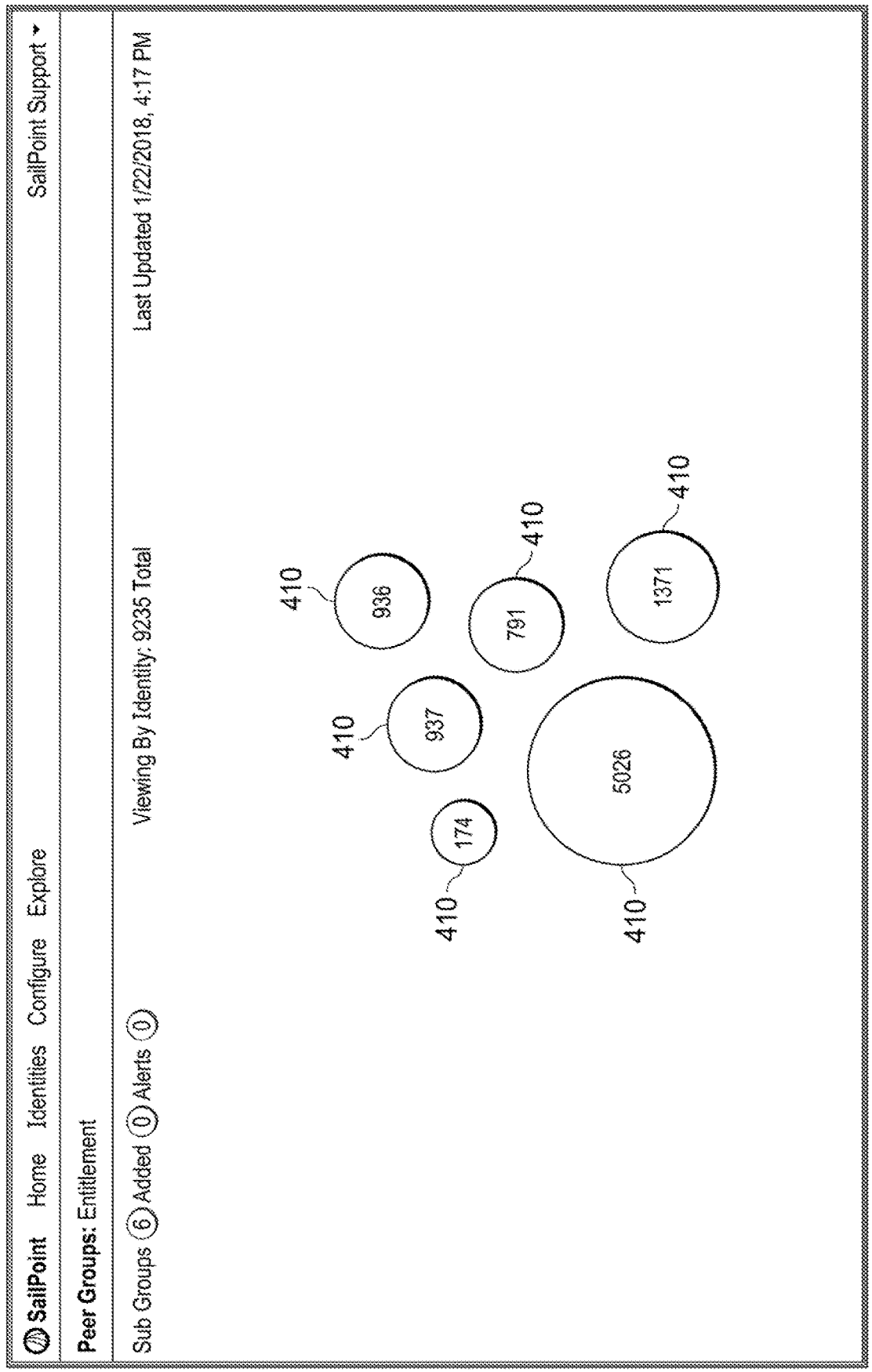
FIGS. 4-7 depict interfaces that may be utilized by embodiments of an identity management system.

FIG. 4 depicts an embodiment of an interface that may be utilized by an identity management system to visually present data regarding the peer groups determined for identities within an enterprise. In this example, the enterprise has 9235 associated identities, and the interface depicts that there are 6 peer groups of those identities that have been determined based on the entitlements associated with the identities. Each of the depicted circles 410 within the interface represents one of the peer groups and displays the number of identities associated with each of those peer groups. Moreover, the size and location of each circle 410 may depict the relative size of the peer groups of the identities and the number of entitlements shared between those peer groups, or identities within those peer groups.

Figure 5:
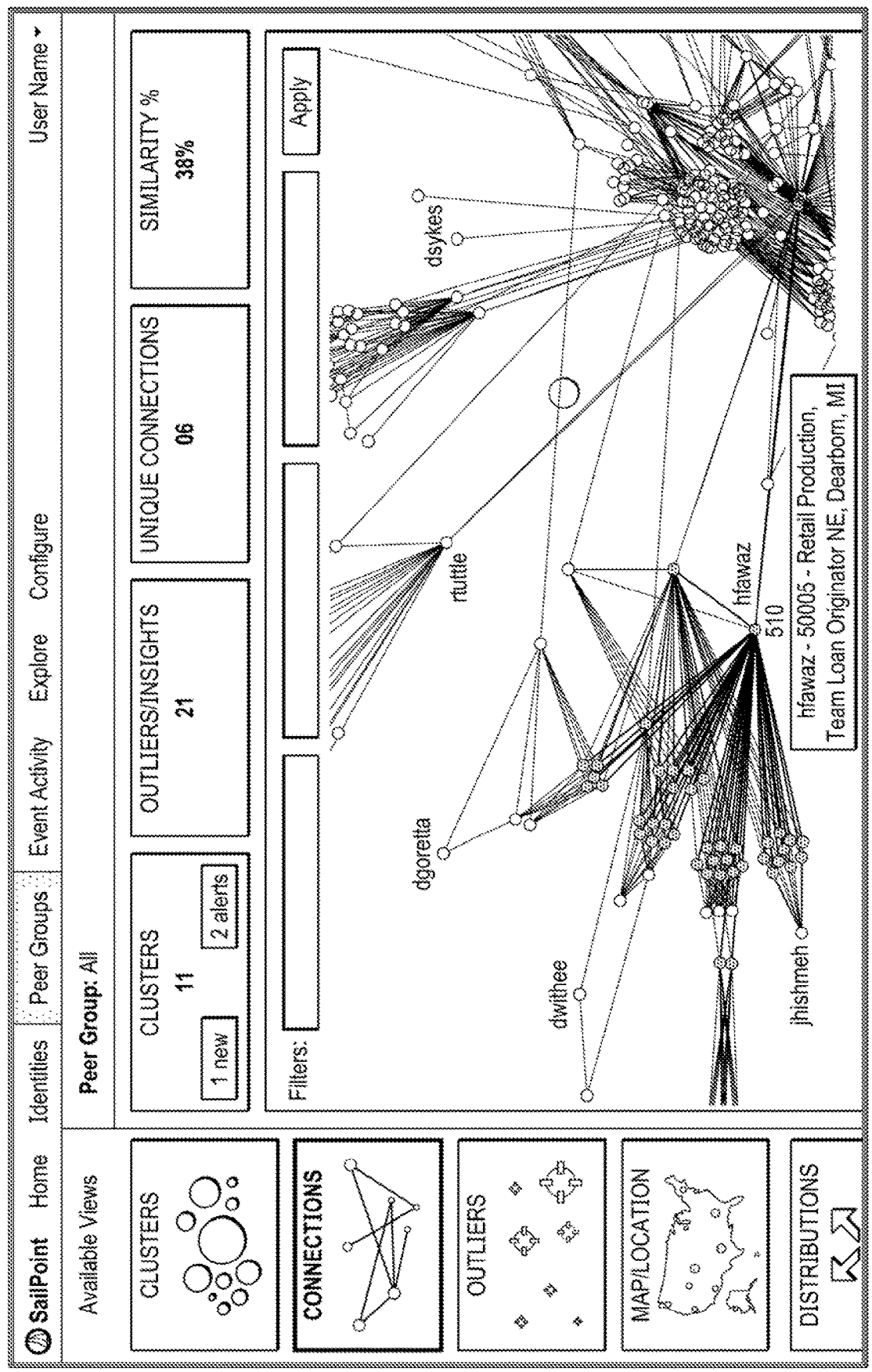

FIG. 5 depicts an embodiment of interface that may be utilized by an identity management system to visually present data regarding the peer groups determined for identities within an enterprise. Here, the interface may present a visual representation of the identity graph as discussed above where each identity node is represented by a circle and each edge is represented by a line joining the nodes, where the closer the nodes the higher the similarity value between the nodes. The interface may also present information regarding the number of peer groups (clusters) determined for the identity graph being presented (in this example 11).

The interface, or a portion thereof, may allow the user to navigate around the identity graph and "drill down" to obtain information on a represented node or entitlement. In the depicted example, the user has hovered above a node 510 of the identity graph and information about that identity is presented through the interface to the user. By looking at such an identity graph a user may be able to discern, for example, which identities which may be "highly contagious" or represent other identity management risks or compliance issues. An identity may be "highly contagious" or otherwise represent an identity governance risk, for example, if that identity has a number or type of entitlements such that if those identities are replicated without identity governance oversight (e.g., assigned to other users) it may cause identity governance issues such as unintended entitlement bloom.

Figure 6:
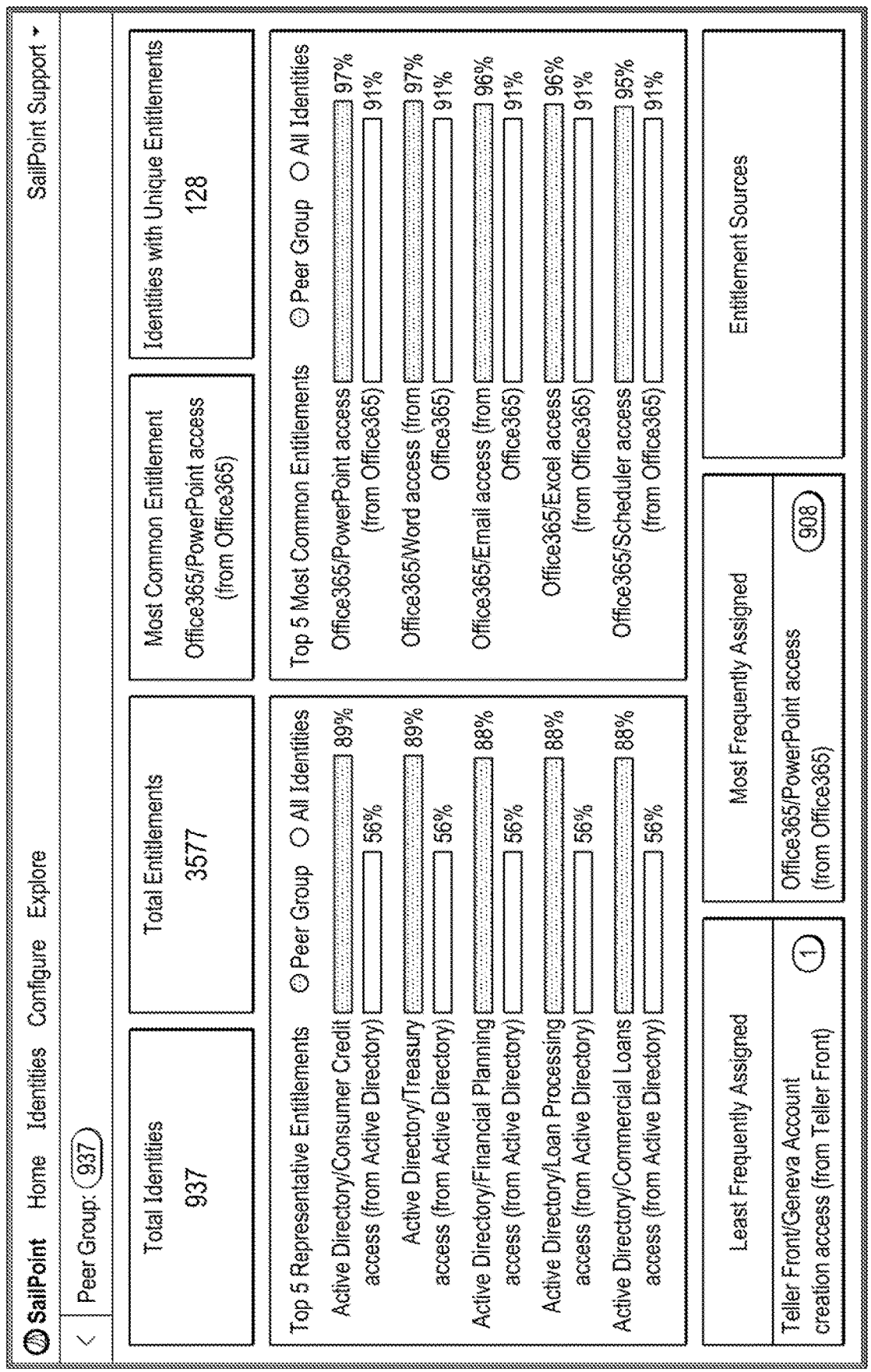

FIG. 6 depicts an embodiment of another interface that may be utilized by an identity management system to visually present data regarding the peer groups determined for identities within an enterprise. In this example, the interface can present data regarding a particular peer group determined for an identity graph, showing, for example, the number of identities within that peer group, what the entitlements are within that peer group, what identities share those entitlements, or why those identities have been grouped together. The interface may also present a wide variety of other data regarding that peer group or identities or entitlements within that (or other) peer groups, including for example, how that peer group, identities within that peer group or other entitlements relate to each other or other determined peer groups, identities or entitlements of the enterprise. Thus, a user viewing such an interface may be able to ascertain reasons why the identities have been grouped and explore for outliers and see entitlements that these identities have in common with each other, as well as how different they are from the rest of the identities and entitlements of an enterprise. Moreover, the user may also "drill down" for more details to discover which identities included and the entitlements assigned.

Figure 7:
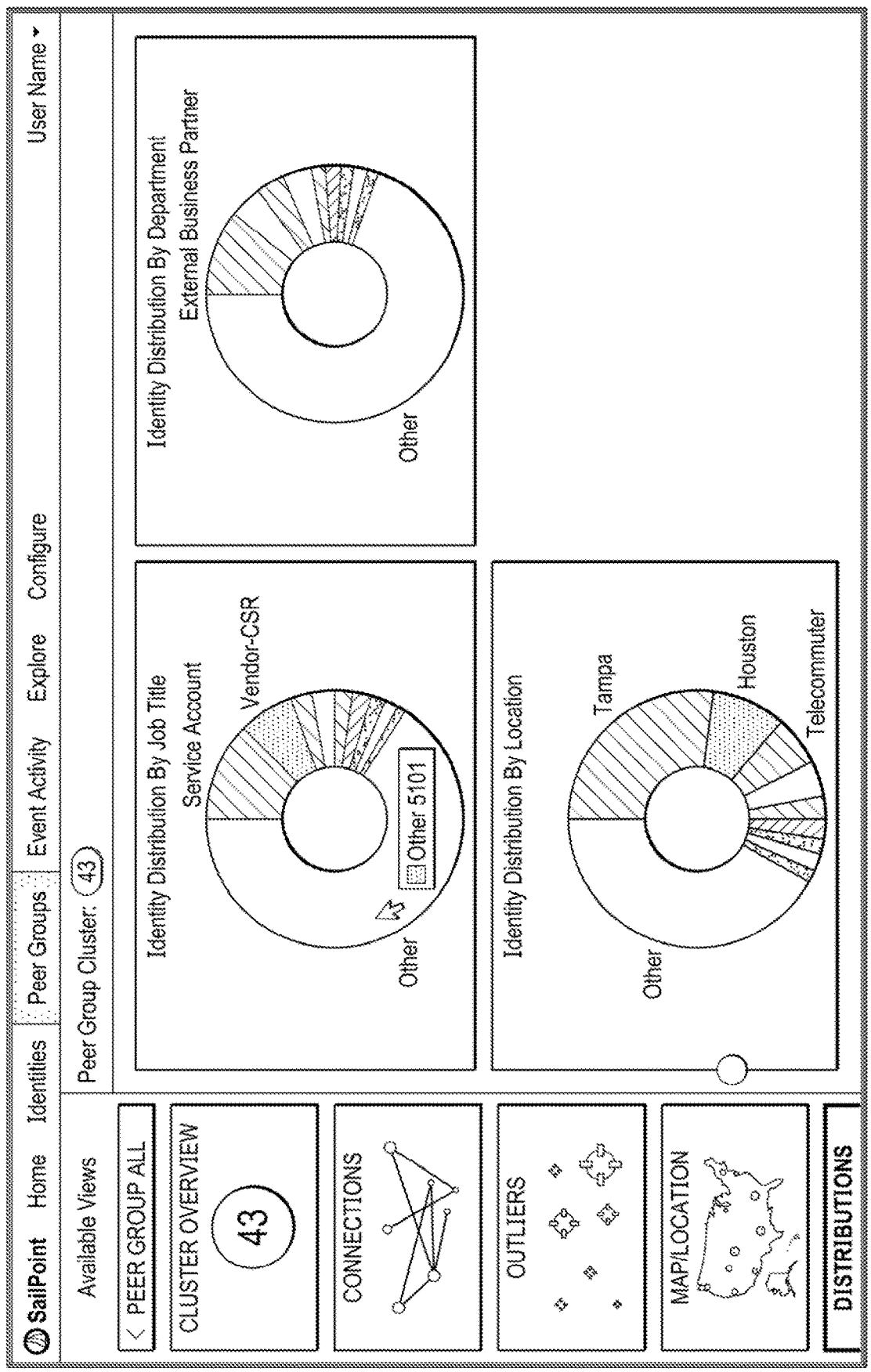

FIG. 7 depicts an embodiment of still another interface that may be utilized by an identity management system to visually present data regarding the peer groups determined for identities within an enterprise. In this example, the interface can present data regarding a particular peer group (e.g., peer group 43) determined for an identity graph, showing, for example, distributions of identities within the peer group, such as the identities of the peer group's correlation with departments, location or job title.

It will now be recalled from the discussions above, that what is desired in the context of identity governance solutions as discussed herein, are identity management solutions that allow for bottom-up role mining. While frequent pattern mining may be utilized to accomplish such role mining, such pattern mining may be combinatorial in nature and may not scale in a manner that allows for any sort of efficient implementation of role mining in real-time or other contexts where a large number of identities and entitlements may be involved.

The use of an identity graph for such role mining may, however, allow role mining that is scalable and efficient, where the role mining can be based on the nature of these identity graphs as disclosed, whereby popular or dominant entitlement patterns may be manifested as peer groups, densely connected components, cliques or pseudo cliques of identity nodes due to the dominant entitlement pattern which identity nodes within such a group may have as a result of the nature of the identity graph. Likewise, within an entitlement subgraph, a dominant or popular entitlement pattern may be manifested as a peer-group, densely connected component, clique, or pseudo-clique of entitlement nodes due to the fact that the pattern of entitlements may be shared by a sizeable set of identities as a result of the nature of the identity graph. Accordingly, the nature of an identity graph may allow the flexibility to pursue role mining on either subgraph, the identities subgraph or the entitlement subgraph (or both, or some combination, of these graphs).

Embodiments of identity management systems as disclosed may thus provide role mining based on an identity graph determined by the identity management system. In particular, embodiments as disclosed may utilize the peer grouping of an identity graph (or peer grouping of portions or subgraphs thereof) to identify roles from peer groups or the like (e.g., peer groups or other densely connected components or clusters such as cliques or pseudo-cliques).

According to embodiments, therefore, an identity graph may be constructed. A portion of the identity graph may then be determined, where this portion may include the entire identity graph, the entire entitlement subgraph, the entire identities subgraph, a portion of the entitlement subgraph or a portion of the identities subgraph. Peer groups of identities or entitlements of the portion of the identity graph can then be determined. From these peer groups a set of roles may be determined. Specifically, a set of entitlements may be determined from a peer group (e.g., of identities or entitlements), where the determined set of entitlements may represent a determined role. These roles (e.g., an identifier for the determined role and associated entitlements) may then be stored by the identity management system for presentation to a user or other uses.

In one embodiment, the entire entitlement subgraph of the identity graph may be peer grouped substantially as discussed above, and each peer group of entitlements used as a determined role. In other words, according to these types of embodiments, the set of entitlements for each determined peer group of entitlements may represent a determined role. In certain other embodiments, these peer groups of entitlements may themselves be separated into densely connected components, cliques, or pseudo-cliques (if any exist) and the set of entitlements extracted from each of these densely connected components, cliques, or pseudo-cliques used to define the determined roles.

While the peer groups of entitlements may be utilized to perform role determination in some embodiments, it may also be observed that in many cases it is highly likely that peer groups of identities may themselves be associated with a role. This likelihood arises at because the peer grouping of identities may be based on the similarity (as represented by the edges of the identity graph) between those identities, where the similarity is, in turn, based on the number of shared entitlements. Accordingly, in certain embodiments, a set of entitlements may be extracted from each peer group of identities as determined for an identity graph (or identities subgraph), and the set of entitlements extracted from each of these identity peer groups used to define the determined roles.

To extract the set of entitlements from an identity peer group, an entitlement extraction threshold may be utilized such that an entitlement will be extracted from the identity peer group if this entitlement extraction threshold is exceeded with respect to that entitlement. This entitlement extraction threshold may be based on, for example, a threshold number, ratio or percentage of identities of the identity peer group that have that entitlement. By utilizing the identity peer groups to extract the set of entitlements for the determination of roles, in certain embodiments, the creation of the entitlement subgraph or the peer grouping of the entitlement subgraph may be avoided, substantially improving the performance of identity management systems by reducing the time, memory or processor cycles required to perform such role mining.

It will be noted here that some enterprises may have on the order of millions or more of entitlements or identities. Thus, the construction of the identity or entitlement graphs and the peer grouping of the complete set of identities or entitlements may prove prohibitive, especially in the context of real-time implementations of identity management systems and interfaces. Accordingly, other embodiments may further improve the computing performance of identity management systems by scoping the identities or entitlements to confine the graph construction, peer grouping or role determination used to determine the roles. Specifically, in one embodiment, a scoping attribute may be obtained or otherwise determined. This attribute may, for example, be provided by a user and relate to an attribute of an identity such as a title, location, department, peer group of an identity, or other data that may be obtained or associated with an identity (e.g., in association with the identity in identity management data obtained from an identity management system or in an identity graph).

Accordingly, in embodiments where an identity graph has been constructed, an identity graph may exist (e.g., have been created at a previous point) and the scoping attribute may be used to determine a subgraph of the existing identity graph to prune or to peer group in order that roles may then be determined from this subgraph. Here, a scoped identities subgraph or scoped entitlement subgraph of the identity or entitlement graphs, respectively, may be determined from the identity graph based on the scoping attribute. Specifically, in one embodiment a scoped entitlement subgraph associated with a scoping attribute may be determined from an identity graph by querying the identity graph based on the identity attribute to find the entitlement nodes and edges associated with the scoping attribute. Such querying may involve, for example, querying the identity graph to determine the identity nodes of the graph associated with the scoping attribute and determining the entitlement nodes and edges along any path of the identity graph originating with each of those scoped identity nodes. Similarly, a scoped identity subgraph associated with a scoping attribute may be determined from an identity graph by querying the identity graph based on the identity attribute to find the scoped identity nodes and edges associated with the scoping attribute. Such querying may involve, for example, querying the identity graph to determine the identity nodes of the graph associated with the scoping attribute and determining the identity nodes and edges along any path of the identity graph originating with each of those scoped identity nodes.

The pruning and peer grouping of the identities subgraph of the scoped identity subgraph or the entitlements of the scoped entitlement subgraph can then be accomplished substantially as discussed to determine peer-groups of the scoped identities or peer groups of the scoped entitlements. The peer groups of identities or entitlements can then be used for role mining. For example, a set of entitlements may be extracted from each peer group of identities as determined for the scoped identities subgraph of the identity graph, and the set of entitlements extracted from each of these identity peer groups used to define the determined roles. Similarly, the scoped entitlement subgraph of the identity graph may be peer grouped substantially as discussed above, and each peer group of entitlements used as a determined role.

In certain embodiments, such as when no identity graph has been previously constructed, the scoping attribute may be used in the construction of an identity graph. In these types of embodiments, the identity management data of obtained from the identity management (e.g., a most recent snapshot of the identity management data) may be searched based on the scoping attribute to determine the identities of the identity management data associated with that scoping attribute (e.g., identities having that title, location, department, etc.) and the entitlements associated with those determined identities. Once this scoped set of identities and entitlements is determined, an identity graph may be generated from the scoped set of identities and entitlements substantially as discussed above, where a node of the graph is created for each scoped identity and entitlement, and weighted edges are constructed between every pair of identity nodes that shares at least one entitlement and between every pair of entitlement nodes that shares at least one identity. The pruning and peer grouping of the identities subgraph or the entitlements subgraph of the scoped identity graph can then be accomplished substantially as discussed to determine peer-groups of the scoped identities or peer groups of the scoped entitlements. The peer groups of identities or entitlements can then be used for role mining.

For example, a set of entitlements may be extracted from each peer group of identities as determined for the identities subgraph of the scoped identity graph, and the set of entitlements extracted from each of these identity peer groups used to define the determined roles. Similarly, the entitlement subgraph of the scoped identity graph may be peer grouped substantially as discussed above, and each peer group of entitlements used as a determined role. It will be noticed here, that in instances where it is desired to only utilize a entitlement subgraph or an identity subgraph for role mining, only an identities subgraph or an entitlements subgraph may be created from the scoped set of identities or entitlements, and this subgraph pruned and clustered as described to yield the desired identity peer groups or entitlement peer groups to utilize for such role mining.

Figure 8:
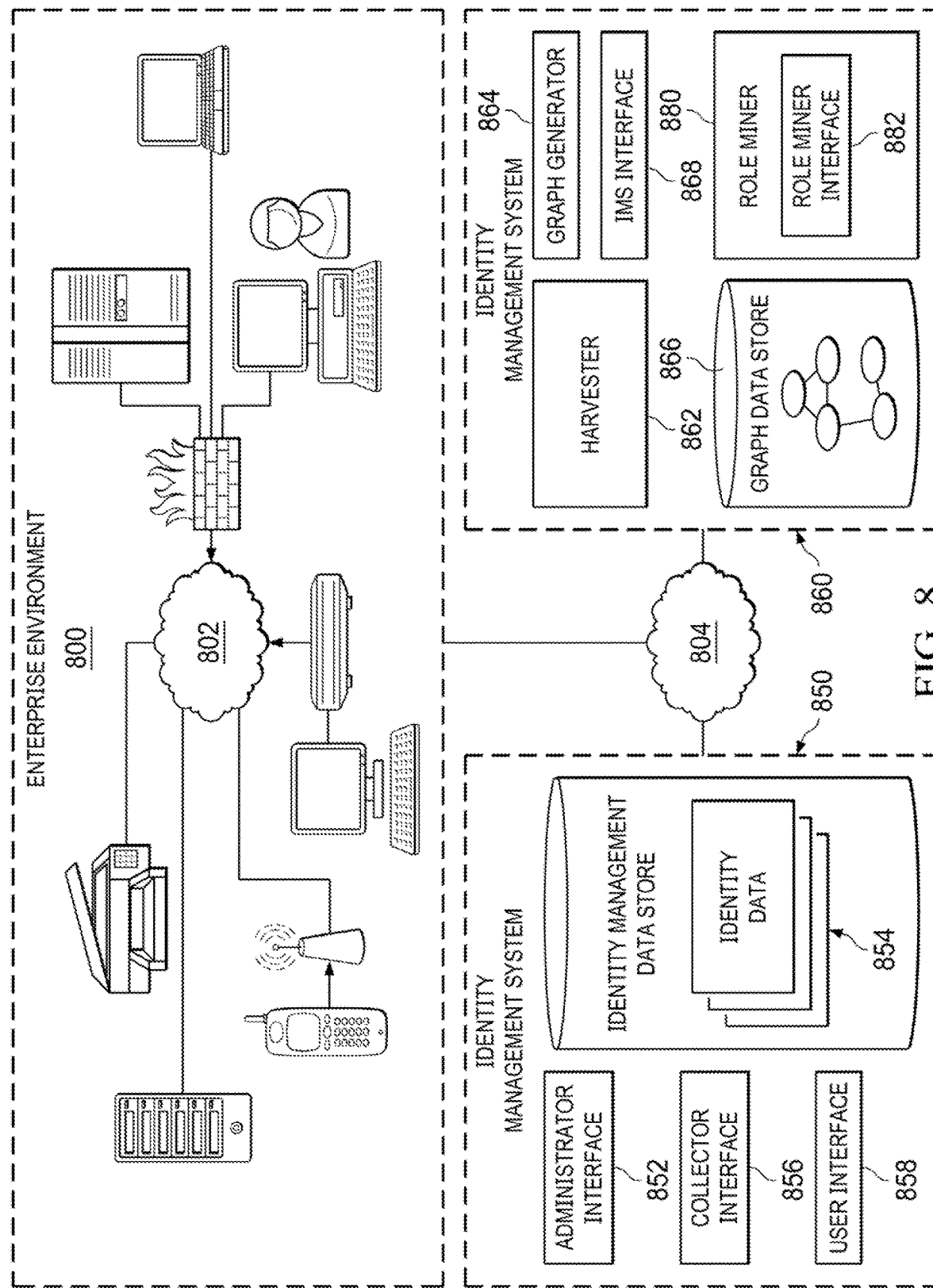
FIG. 8 is a block diagram of a distributed networked computer environment including one embodiment of an identity management system.

Referring to FIG. 8, a distributed networked computer environment including an identity management system with one embodiment of a role miner is depicted. As discussed above, the networked computer environment may include an enterprise computing environment 800 including a number of computing devices or applications that may be coupled over a computer network 802 or combination of computer networks. Enterprise environment 800 may thus include a number of resources, various resource groups and users associated with an enterprise. Users may have various roles, job functions, responsibilities, etc. to perform within various processes or tasks associated with enterprise environment 800.

Users may access resources of the enterprise environment 800 to perform functions associated with their jobs, obtain information about enterprise 800 and its products, services, and resources, enter or manipulate information regarding the same, monitor activity in enterprise 800, order supplies and services for enterprise 800, manage inventory, generate financial analyses and reports, or generally to perform any task, activity or process related to the enterprise 800. Thus, to accomplish their responsibilities, users may have entitlements to access resources of the enterprise environment 800. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 800 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to for other reasons. Access risks can also arise from roles in enterprise environment 800 which may shift, change, evolve, etc. leaving entitlements non optimally distributed among various users.

To assist in managing the entitlements assigned to various users and more generally in managing and assessing access risks in enterprise environment 800, an identity management system 850 may be employed. Such an identity management system 850 may allow an administrative or other type of user to define one or more identities and one or more entitlements and associate these identities with entitlements using, for example, an administrator interface 852. Moreover, an identity management system 850 may allow such a user to define one or more roles for the enterprise, where these defined enterprise roles are defined as collections of access entitlements or access profiles and may be assigned to identities through the identity management system 850 based on specific rules of the enterprise in terms of the identity's attributes, their expected responsibilities within the organization, or other criteria. These enterprise roles as defined by the user through the identity management system 850 may thus define an ideal or 'golden' state of the roles of an enterprise.

Examples of such identity management systems are Sailpoint's IdentityIQ and IdentityNow products. Note here, that while the identity management system 850 has been depicted in the diagram as separate and distinct from the enterprise environment 800 and coupled to enterprise environment 800 over a computer network 804 (which may be the same as, or different than, network 802), it will be realized that such an identity management system 850 may be deployed as part of the enterprise environment 800, remotely from the enterprise environment, as a cloud based application or set of services, or in another configuration.

The identity management system 850 may thus store identity management data 854. The identity management data 854 stored may include a set of entries, each entry corresponding to and including an identity (e.g., alphanumerical identifiers for identities) as defined and managed by the identity management system, a list or vector of entitlements (e.g., alphanumeric identifiers for entitlements) assigned to that identity by the identity management system, a list or vector of enterprise roles assigned to that identity, and a timestamp at which the identity management data was collected from the identity management system. Other data could also be associated with each identity, including data that may be provided from other systems such as a title, location or department associated with the identity. The set of entries may also include entries corresponding to entitlements and roles, where each entry for a role may include the role identifier (e.g., alphanumerical identifier or name for the role) and a list or vector of the entitlements associated with each role. Other data could also be associated with each role, such as a title, location or department associated with the role.

Accordingly, the collectors 856 of the identity management system 850 may obtain or collect event data from various systems within the enterprise environment 800 and process the event data to associate the event data with the identities defined in the identity management data 854 to evaluate or analyze these events or other data in an identity management context. As part of a robust identity management system, it is desirable to analyze the identity management data 854 associated with an enterprise 800. Accordingly, an identity management system 860 may include a harvester 862 and a graph generator 864. The harvester 862 may obtain identity management data 854 from one or more identity management systems 850 associated with enterprise 800. Graph generator 864 may allow an identity graph or subgraphs thereof to be generated from the obtained identity management data 854 and stored in graph data store 866. Interfaces 868 of the identity management system 860 or interface 858 may use a graph in the graph data store 866 or associated peer groups to present one or more interfaces which may be used for risk assessment, including the presentation of roles mined from such graphs.

Additionally, a user may interact with the identity management system 850 through a user interface 858 to access or manipulate data on identities, entitlements, events, roles or generally perform identity management with respect to enterprise environment 800. As but one example, as the roles, entitlements and identities of an enterprise evolve they may stray in substantial and detrimental ways from an ideal state, or other identity governance desires, of the enterprise. Users of an identity management system may thus wish to determine a current data-driven assessment of the current role structure for their enterprise.

By determining a current snapshot of the roles mined from an actual state of their identity governance structure, the 'golden' enterprise roles as defined by the users of the enterprise may be compared with the mined roles to reduce discrepancies therebetween, including for example, the identification of new roles, the evolution of the enterprise defined roles to match the evaluation of the actual role structure (e.g., the mined roles), or the performance housekeeping on the assignment of entitlements or roles within the enterprise to more particularly tailor the actual role structure to the ideal role structure. Additionally, by viewing the mined roles extraneous, singleton or outlier entitlements that have been deprecated or are in need of certification may be identified.

Accordingly, it is desirable for identity management solutions to offer a role mining capability whereby collections of entitlements may be ascertained from the identity management data associated with enterprise. Embodiments of identity management system 850 may thus provide a role mining tool through the user interface 858. In this manner, a user may be presented with the ability to perform role mining through the user interface 858 (or interface 868), along with an optional attribute or criteria to scope the mining of the roles. One or more interfaces with the results of the role mining can then be determined and presented to the user through the role mining tool of user interface 858.

To provide such a role mining tool, identity management system 860 may include role miner 880. Role miner 880 may include an interface 882. When a request for role mining is received from the user through the user interface 858, a request to perform role mining can be submitted to the role miner 880 from the identity management system 850 (e.g., or user interface 858 or other component of identity management system 850) through the interface 882, where the request may include zero or more scoping attributes that may have been provided by the user through the user interface. The request may include other criteria or attributes, such as a pruning threshold to utilize when creating an identity graph or subgraph or a role size which may be used to determine which graphs or subgraphs to utilize when performing role extraction. Note here, that while the identity management system 850 has been depicted in the diagram as separate and distinct from the identity management system 860 and coupled to identity management system 860 over a computer network 804, it will be realized that such an identity management system 850 and identity management system 860 may be deployed as part of the same identity management system or different identity management system, as a cloud based application or set of services, or in another configuration entirely.

As such, when a request for role mining and the zero or more associate scoping (or other) attributes are received through the role minter interface 882, the role miner 880 may perform role mining as discussed. In particular, in one embodiment, the role miner may determine if there is an identity graph in graph data store 866, or if the identity graph currently in graph data store 866 was created within some previous time window (e.g., last hour, last twenty four hours, last week, etc.). If there is an identity graph available (e.g., if one exists in the graph data store 866 or was created within the time window), the role miner 880 can determine if a scoring attribute was received with the role mining request. If no scoring attribute was received, the available identity graph may be used for role mining. If, however, a scoring attribute was received and an identity graph is available, the existing identity graph can be scoped based on the received scoring attribute and the type of role mining to be performed. As discussed, the role miner 880 may perform role mining based on an identities subgraph, an entitlement subgraph, or some combination according to various embodiments. The type of role mining to be performed may, for example, be configured by an administrator of the identity management system 860 or may be specified by a user in a request for role mining using the role mining interface 858.

Accordingly, in embodiments where an identity graph has been constructed, an identity graph may exist (e.g., have been created at a previous point) in the graph data store 866 and the scoping attribute may be used to determine a subgraph of the existing identity graph to use as a role mining graph. Peer groups may be determined from that role mining graph in order that roles may be then be determined from this subgraph. Here, a scoped identities subgraph or scoped entitlement subgraph of the identity graph may be determined from the identity graph based on the scoping attribute and the type of role mining to be performed.

Specifically, in one embodiment a scoped entitlement subgraph associated with a scoping attribute may be determined from an identity graph by querying the identity graph in the graph data store 866 based on the scoping attribute to find the entitlement nodes and edges associated with the scoping attribute. Such querying may involve, for example, querying the identity graph to determine the identity nodes of the graph associated with the scoping attribute and determining the entitlement nodes and edges along any path of the identity graph originating with each of those scoped identity nodes.

Similarly, a scoped identity subgraph associated with a scoping attribute may be determined from an identity graph in the graph data store 866 by querying the identity graph based on the identity attribute to find the scoped identity nodes and edges associated with the scoping attribute. Such querying may involve, for example, querying the identity graph to determine the identity nodes of the graph associated with the scoping attribute and determining the identity nodes and edges along any path of the identity graph originating with each of those scoped identity nodes.

Once a graph to utilize for role mining is determined (e.g., the entire available identity graph, the scoped identities subgraph, the scoped entitlement subgraph or some combination), the peer groups of this role mining graph may be determined. In some cases, in instances where an identity graph is available the identity graph may also have been previously pruned and peer grouped. Thus, the peer groups associated with the role mining graph to use for role mining may be determined by accessing the peer groups previously determined for the identity graph that are associated with the nodes of the role mining graph. For example, if identity peer groups are to be utilized for role mining, the identity peer groups associated with the identity nodes of the role mining graph may be determined from the previously determined entitlement peer groups for the identity graph. Likewise, if entitlement peer groups are to be utilized for role mining, the entitlement peer groups associated with the entitlement nodes of the role mining graph may be determined from the previously determined entitlement peer groups for the identity graph.

If however, peer groups have not been determined for the available identity graph, the role mining graph (e.g., the entire available identity graph, the scoped identities subgraph, the scoped entitlement subgraph or some combination) may be peer grouped as discussed above based on the type of role mining to be performed. For example, the pruning and peer grouping of a role mining graph comprising a scoped identities subgraph or a scoped entitlement subgraph can be accomplished substantially as discussed to determine identity peer-groups of the scoped identities or entitlement peer groups of the scoped entitlements.

These peer groups of identities or entitlements can then be used by the role miner for role mining. For example, a set of entitlements may be extracted from each peer group of identities determined for a role mining graph (e.g., a scoped identities subgraph of the identity graph), and the set of entitlements extracted from each of these identity peer groups used to define the determined roles. To extract the set of entitlements from an identity peer group, an entitlement extraction threshold may be utilized such that an entitlement will be extracted from the identity peer group if this entitlement extraction threshold is exceeded with respect to that entitlement. This entitlement extraction threshold may be based on, for example, a threshold number, ratio or percentage of identities of the identity peer group that have that entitlement. Similarly, in cases where the role mining graph is a scoped entitlement subgraph of the identity graph, the entitlements of the role mining graph may be peer grouped substantially as discussed above, and each peer group of entitlements used as a determined role.

In instances where the role miner 880 receives a request for role mining and zero or more associated scoping attributes and there is no identity graph currently in graph data store 866 (or the graph in the graph data store 866 was created outside of some previous time window), a role mining graph may be determined from the identity management data 854 and the type of role mining to be performed.

In particular, according to certain embodiments the role miner 880 can determine if a scoping attribute was received with the received request. If there is no scoping attribute, identity management data 854 may be obtained and an identity graph (or identities subgraph or entitlements subgraph) constructed as previously discussed. The type of graph constructed for use as a role mining graph may be dependent on the type of role mining to be performed as discussed.

However, if a scoping attribute was received, the identity management data 854 obtained from the identity management system 850 (e.g., a most recent snapshot of the identity management data) may be scoped based on the attribute by searching the identity management data 854 based on the scoping attribute to determine the identities of the identity management data 854 associated with that scoping attribute (e.g., identities having that title, location, department, etc.) and the entitlements associated with those determined identities determined.

Once this scoped set of identities and entitlements is determined, a role mining graph (e.g., an identity graph, identities subgraph or entitlements subgraph) may be generated from the scoped set of identities and entitlements substantially as discussed above, where a node of the graph is created for each scoped identity and entitlement, and weighted edges are constructed between every pair of identity nodes that shares at least one entitlement and between every pair of entitlement nodes that shares at least one identity.

The pruning and peer grouping of the role mining graph constructed from the scoped identity management data (e.g., the identity graph, entitlement subgraph, identities subgraph) can then be accomplished substantially as discussed to determine peer-groups of the scoped identities or peer groups of the scoped entitlements. The determined peer groups of identities or entitlements can then be used for role mining depending on the type of role mining to be accomplished. If a pruning threshold has been provided by a user this pruning threshold may be utilized in pruning the role mining graph. Additionally, if a role size has been provided this may be utilized during role mining such that role will only be extracted from subgraphs of the role mining graph that have a number of nodes exceeding the role size.

Once the role miner 880 has determined the set of entitlements comprising each of the mined roles, these mined roles may be presented to the user through interface 858 of the identity management system 850. These roles may, for example, be assigned an identifier by the role miner 880 (e.g., an assigned alphanumerical identifier or a semantic identifier that may be determined, for example, from identities or entitlements associated with the role). The roles may then be presented graphically in an interface 858 with which the user may interact to determine additional or different data about the presented roles.

Figure 9:
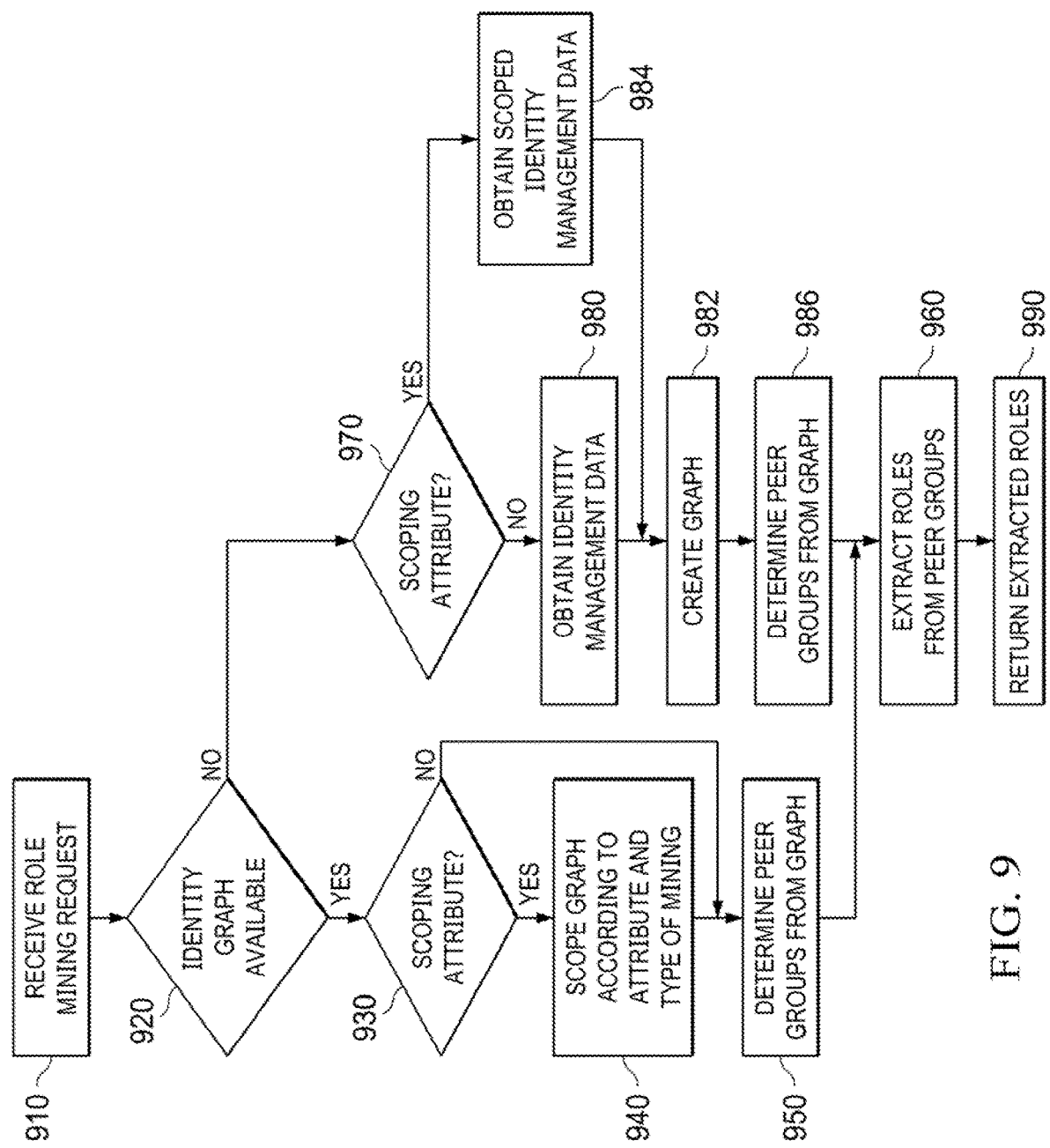
FIG. 9 is a flow diagram of one embodiment of a method for role mining.

FIG. 9 depicts one embodiment of a method for role mining that may be used in embodiments of an identity management system such as those disclosed herein. Initially, at step 910 a request to perform role mining can be received, where the request may include zero or more scoping attributes (e.g., that may have been provided by the user or otherwise determined). At step 920 it can be determined if an identity graph is available. This determination may involve determining if an identity graph has been previously created or is a previously create identity graph was created within some previous time window (e.g., last hour, last twenty four hours, last week, etc.).

If there is an identity graph available (Yes branch of step 920), it can then be determined at step 930 determine if a scoping attribute was received with the role mining request. If no scoring attribute was received (No branch of step 930), the available identity graph may be used for role mining. If, however, a scoring attribute was received and an identity graph is available (Yes branch of step 930), the existing identity graph can be scoped at step 940 based on the received scoring attribute and the type of role mining to be performed. As discussed, the role mining may be performed based on an identities subgraph, an entitlement subgraph, or some combination according to various embodiments.

Accordingly, in embodiments where an identity graph has been constructed, an identity graph may exist (e.g., have been created at a previous point) and the scoping attribute may be used to determine a subgraph of the existing identity graph to use as a role mining graph. Peer groups may be determined from that role mining graph in order that roles may be then be determined from this subgraph. Here, at step 940, a scoped identities subgraph or scoped entitlement subgraph of the identity graph may be determined from the identity graph based on the scoping attribute and the type of role mining to be performed.

Specifically, in one embodiment a scoped entitlement subgraph associated with a scoping attribute may be determined from an identity graph by querying a previously created identity graph based on the scoping attribute to find the entitlement nodes and edges associated with the scoping attribute. Similarly, a scoped identity subgraph associated with a scoping attribute may be determined from a previously created identity graph by querying the identity graph based on the identity attribute to find the scoped identity nodes and edges associated with the scoping attribute.

Once a graph to utilize for role mining at is determined at step 940, the peer groups of this role mining graph may be determined at step 950. In many cases, in instances where an identity graph is available the identity graph may also have been previously pruned and peer grouped. Thus, the peer groups associated with the role mining graph to use for role mining may be determined by accessing the peer groups previously determined for the identity graph that are associated with the nodes of the role mining graph. If however, peer groups have not been determined for the available identity graph, the role mining graph (e.g., the entire available identity graph, the scoped identities subgraph, the scoped entitlement subgraph or some combination) may be peer grouped as discussed above based on the type of role mining to be performed. For example, the pruning and peer grouping of a role mining graph comprising a scoped identities subgraph or a scoped entitlement subgraph can be accomplished substantially as discussed to determine identity peer-groups of the scoped identities or entitlement peer groups of the scoped entitlements.

These peer groups of identities or entitlements can then be used by for role mining at step 960 by extracting the roles from these peer groups. For example, a set of entitlements may be extracted from each peer group of identities determined for a role mining graph and the set of entitlements extracted from each of these identity peer groups used to define the determined roles. Similarly, in cases where the role mining graph is a scoped entitlement subgraph of the identity graph, the entitlements of the role mining graph may be peer grouped substantially as discussed above, and each peer group of entitlements used as a determined role.

Returning to step 920, in instances where a request for role mining and zero or more associated scoping attributes is received and there is no available identity graph (No branch of step 920) a role mining graph may be determined from the identity management data and the type of role mining to be performed.

In particular, at step 970 it can be determined if a scoping attribute was received with the received request. If there is no scoping attribute (NO branch of step 970), identity management data may be obtained at step 980 and a role mining graph (e.g., identity graph, identities subgraph or entitlements subgraph) constructed as previously discussed at step 982. The type of graph constructed for use as a role mining graph may be dependent on the type of role mining to be performed.

However, if a scoping attribute was received (Yes branch of step 970), scoped identity management data may be obtained at step 984 based on the attribute by searching the identity management data based on the scoping attribute to determine the identities of the identity management data associated with that scoping attribute (e.g., identities having that title, location, department, etc.) and the entitlements associated with those determined identities determined.

Once this scoped set of identities and entitlements is determined, a role mining graph (e.g., an identity graph, identities subgraph or entitlements subgraph) may be generated from the scoped set of identities and entitlements at step 982, whereby a node of the graph is created for each scoped identity and entitlement, and weighted edges are constructed between every pair of identity nodes that shares at least one entitlement and between every pair of entitlement nodes that shares at least one identity.

The pruning and peer grouping of the role mining graph constructed from the obtained identity management data (e.g., the identity graph, entitlement subgraph, identities subgraph) can then be accomplished at step 986 substantially as discussed to determine peer-groups of the identities or peer groups of the entitlements of the determined role mining graph. The determined peer groups of identities or entitlements can then be used for role mining depending on the type of role mining to be accomplished at step 960.

Once the roles have been determined (e.g., the set of entitlements comprising each of the mined roles), these mined roles may be presented to the user through interface of the identity management system at step 990. These roles may, for example, be assigned an identifier and presented graphically in an interface with which the user may interact to determine additional or different data about the presented roles.

Figure 10:
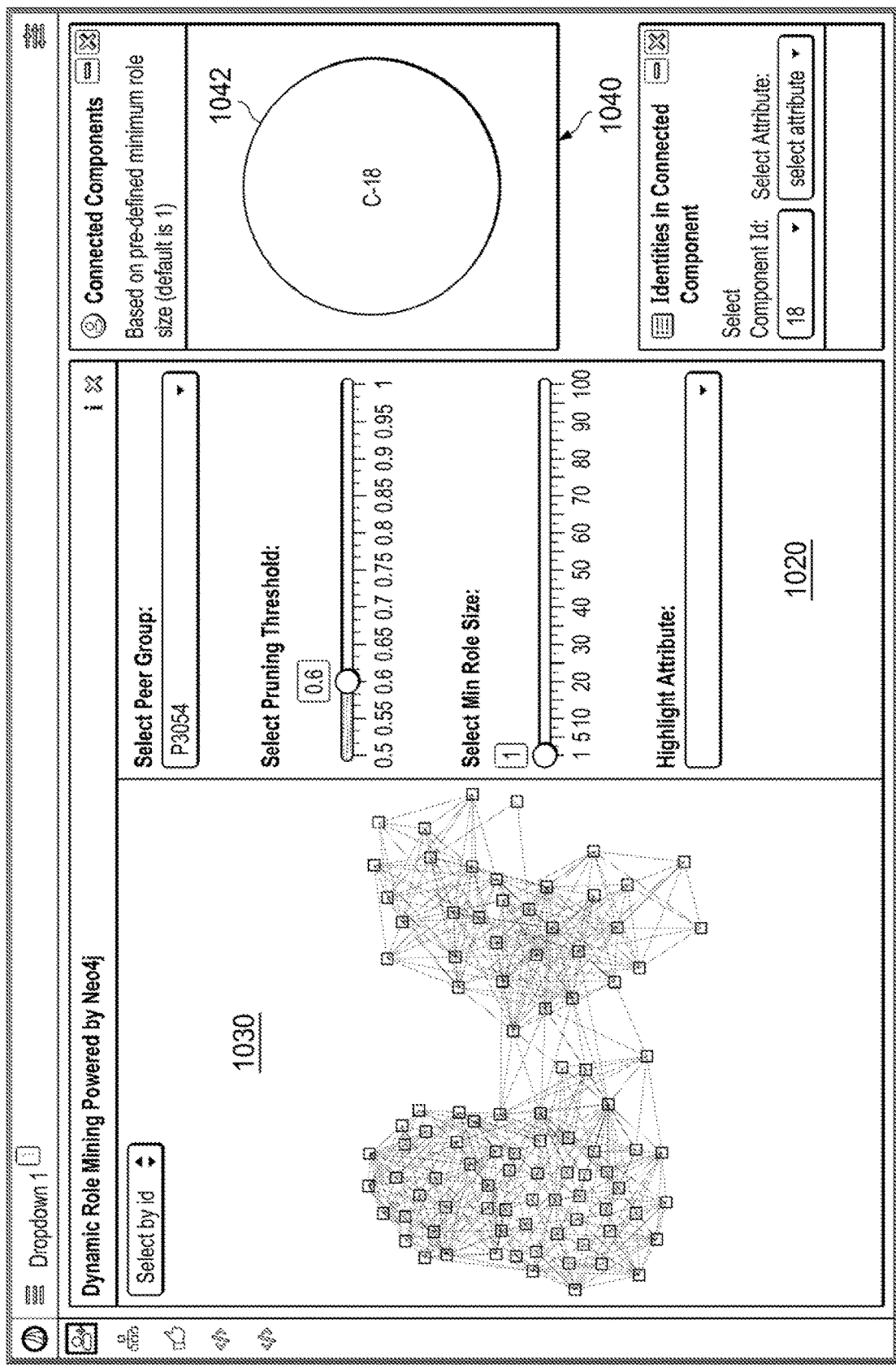
FIGS. 10-14 depict interfaces that may be utilized by embodiments of an identity management system.
Figure 11:
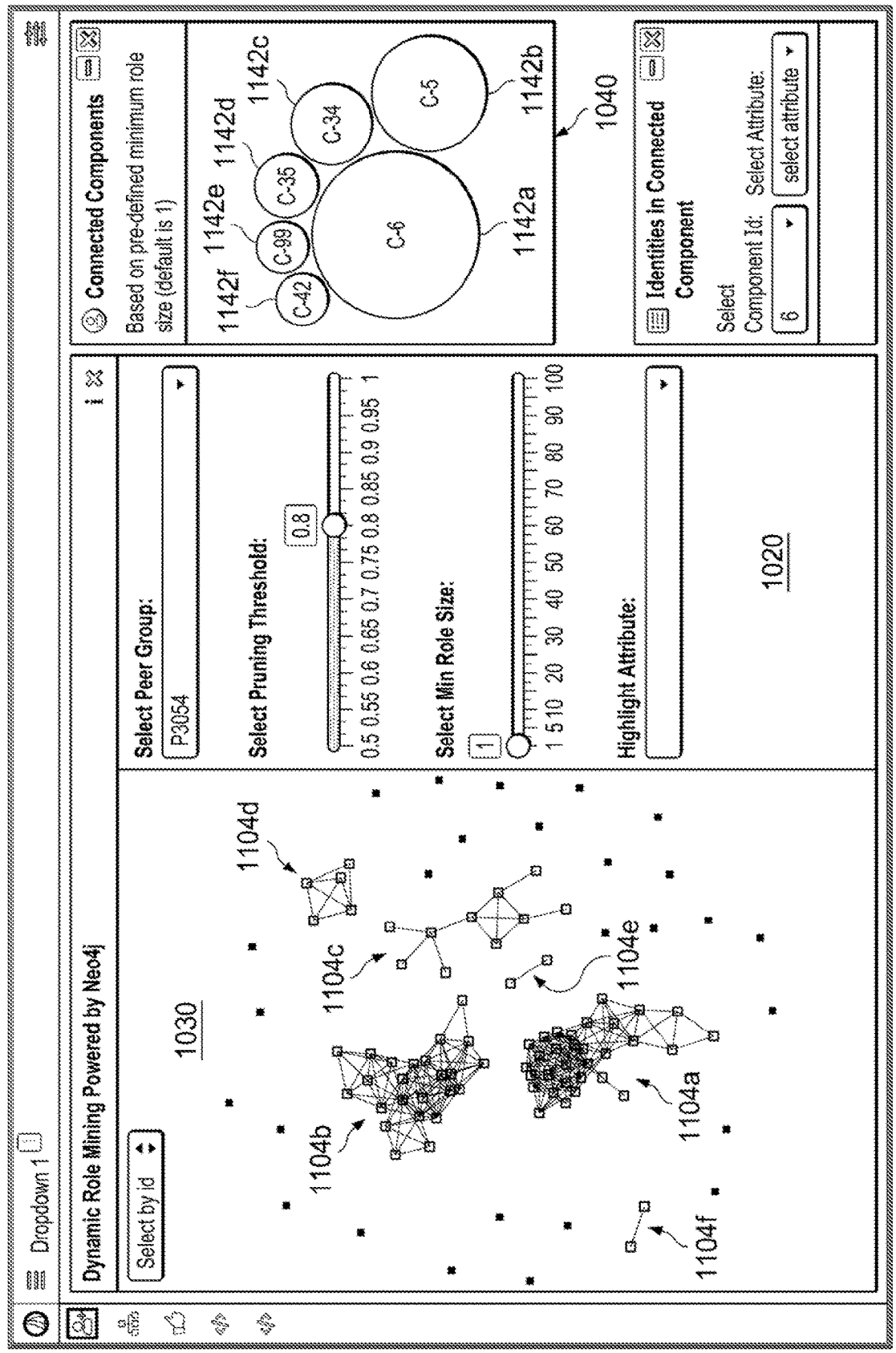
Figure 12:
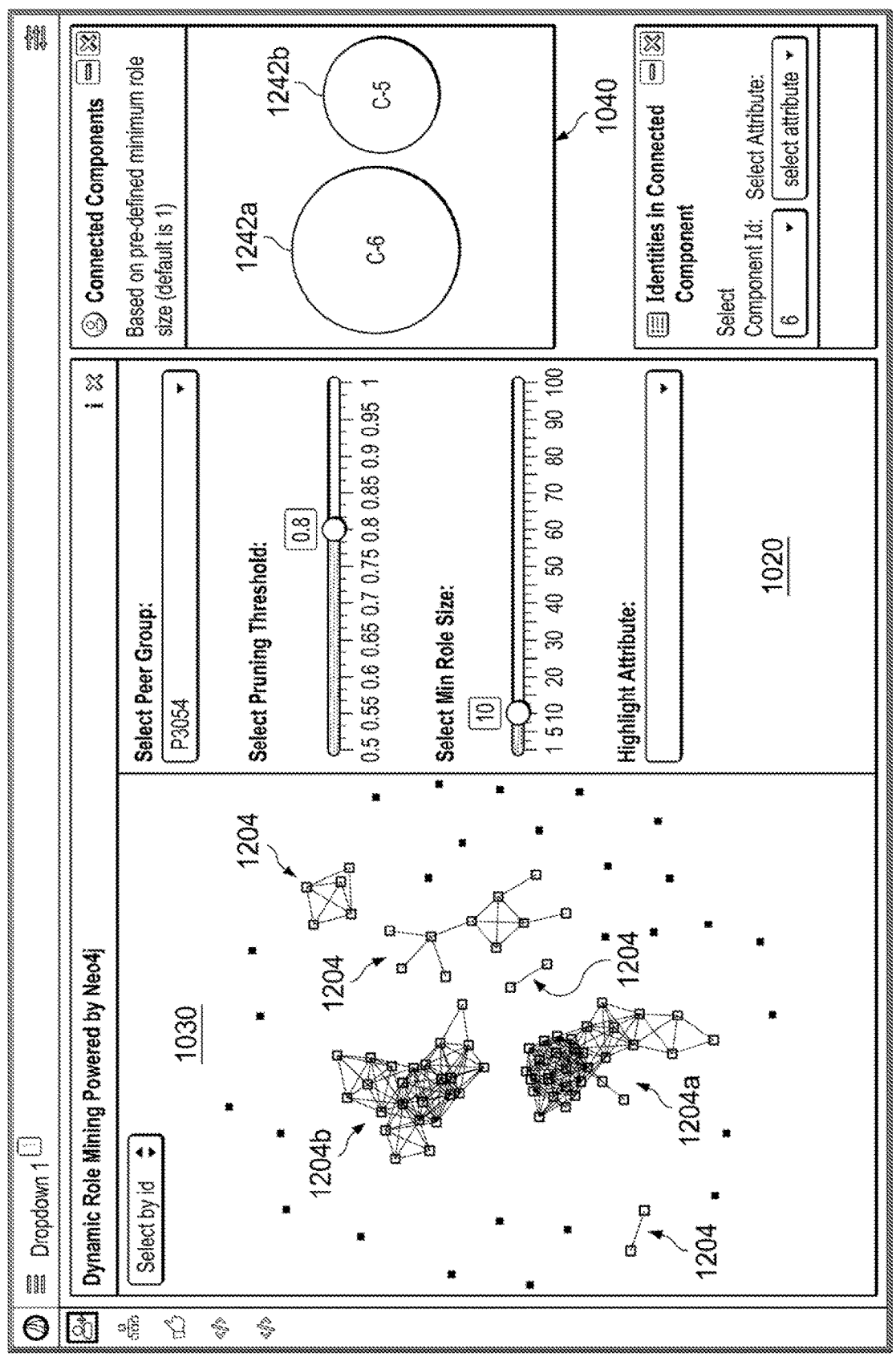

FIGS. 10-12 depict embodiments of these types of interfaces that may be utilized by embodiments of an identity management system as disclosed herein. Looking first at FIG. 10, one embodiment of an interface for an identity management system that may be utilized in association with role mining is depicted. Here, the interface 1010 may include an area 1020 that allows specification of a scoping attribute or other criteria associated with role mining. In the depicted example, the area 1020 may allow a user selection of an identity peer group, a pruning threshold to be used and a minimum role size. A graph display area 1030 may display the graphs or subgraphs of identity nodes and similarity relationships resulting from application of the attributes selected by the user in area 1020.

Specifically, in one embodiment, when a user selects a particular peer group in area 1020 the identity graph or identity management data maintained by the identity management system may be scoped based on the peer group selected by the user. An identities graph may be created by the identity management system using the identities of the selected peer group and edges between the identity nodes based on shared entitlements as described. The edges of this identities graph can then be pruned according to the user selected pruning threshold in area 1020 and the pruned graph displayed in graph display area 1030.

Area 1040 can display a view of roles (here referred to as components) mined from the graph created and displayed in graph display area 1030. In one embodiment, once the identities graph is created, the identity management system may perform role mining on the identities graph as discussed above. In particular, according to one embodiment, the identity management system will determine each distinct subgraph of the determined identities graph, and for those subgraphs, determine which, if any, of those subgraphs includes a number of nodes greater than the minimum role size defined by the user in area 1020. The roles can then be mined from any of these determined subgraphs.

Area 1040 will then display an indicator for each of the subgraphs of the graph displayed in graph 1030 from which a role was mined. In one embodiment, the role may be assigned an identifier and an icon (e.g., circle) representing the role may be displayed along with the identifier for the role in area 1040. The size of the icon may, for example, be reflective of the number of nodes or size of the subgraph from which the associated role was mined.

In this example, a user has selected a peer group "P3054" and defined a pruning threshold of "0.6" and a minimum role size of 1 in area 1020. Thus, an identities graph may be generated by the identity management system using the identities associated with the peer group "P3054" using a pruning threshold of 0.6 for the edges. This identities graph is displayed in graph display area 1030. Moreover, here there is only subgraph of the identities graph and it has a greater number of identity nodes than the minimum role size of 1 specified by the user. Thus, the identities management system may perform role mining on this identities graph, assign the identifier "C-18" to the mined role and display an icon 1042 in area labeled with the role identifier ("C-18") with a size reflective of the number of nodes of the identity graph represented in graph display area 1030 from which the role was mined.

Moving to FIG. 11, here, the user has selected the same peer group "P3054" and defined a pruning threshold of "0.8" and a minimum role size of 1 in area 1020. Thus, an identities graph may be generated by the identity management system using the identities associated with the peer group "P3054" using a pruning threshold of 0.8 for the edges. This identities graph is displayed in graph display area 1030. Here, however, as the edges have been pruned according to a higher pruning threshold (e.g., 0.8) there are 6 subgraphs 1104 of the identities graph that have a greater number of identity nodes than the minimum role size of 1 specified by the user. Thus, the identities management system may perform role mining on each of these subgraphs 1104, assign identities to each of the mined roles and display an associated icon 1142 with the assigned label in area 1040, where the icon 1142 may have a size reflective of the number of nodes in the associated subgraph. Here, for example, icon 1142a may be associated with subgraph 1104a, icon 1142b associated with subgraph 1104b, icon 1142c associated with subgraph 1104c, etc.

Continuing with the same example, in FIG. 12 the user has selected the same peer group "P3054" and defined a pruning threshold of "0.8." However, here the user has defined a minimum role size of 10 in area 1020. Thus, an identities graph may be generated by the identity management system using the identities associated with the peer group "P3054" using a pruning threshold of 0.8 for the edges. This identities graph is displayed in graph display area 1030. Here, as in FIG. 11, there are 6 subgraphs 1204. However, as the user has defined a minimum role size of 10 in the example depicted in FIG. 12, the identities management system may only perform role mining on each of these subgraphs 1204a, 1204b that have more than 10 identity nodes. The identity management system can then assign identities to each of the mined roles and display an associated icon 1242 with the assigned label in area 1040, where the icon 1242 may have a size reflective of the number of nodes in the associated subgraph. Here, for example, icon 1242b may be associated with subgraph 1204a and icon 1242b associated with subgraph 1204b.

Figure 13:
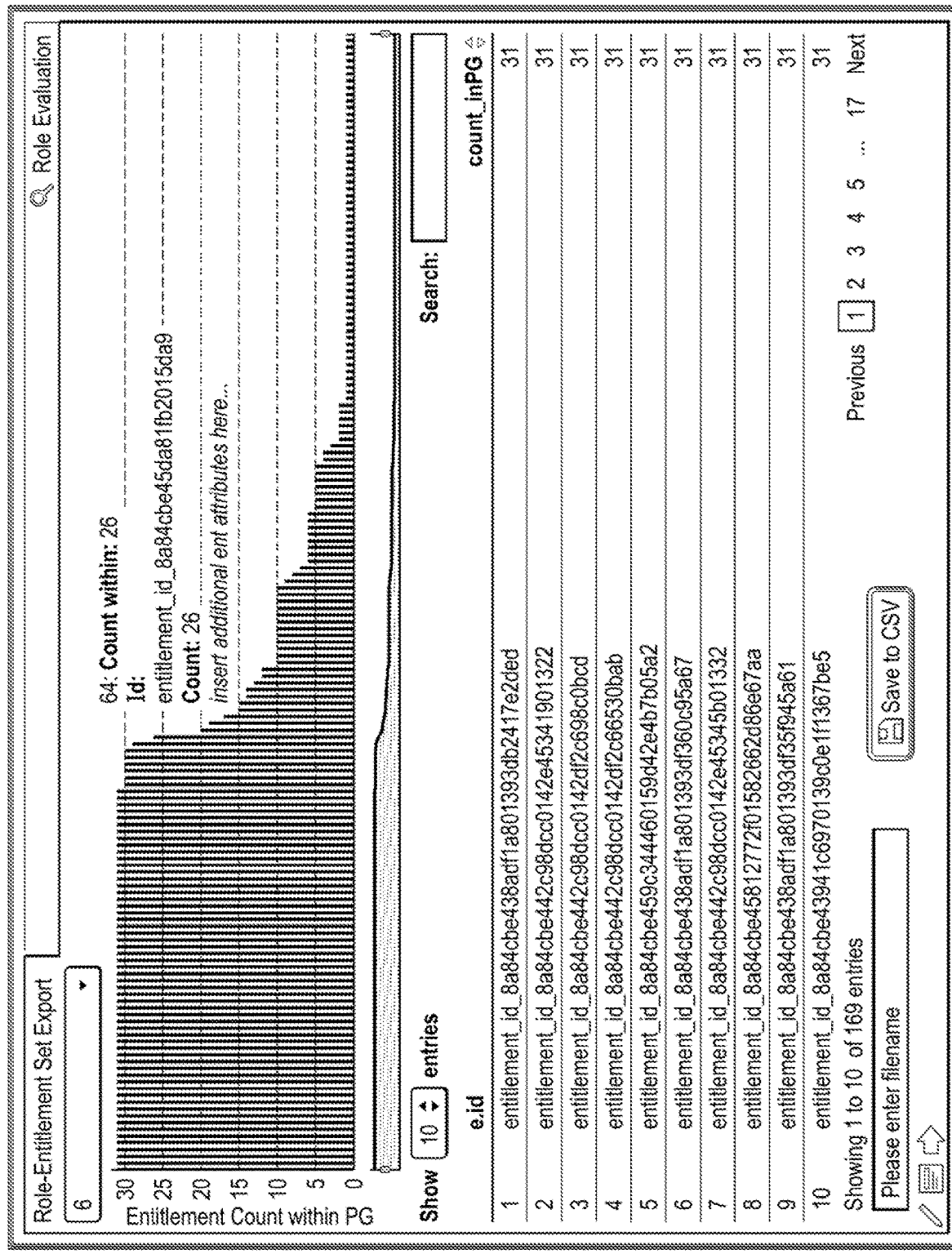

FIG. 13 depicts an embodiment of an interface that may be utilized by an identity management system to display a distribution of entitlements within a particular role. Specifically, in the depicted embodiment, when a user selects a particular role (e.g., within an interface presented by the identity management system), the user may be presented with an interface such as that in FIG. 13 whereby a list of entitlements of the role and the distribution of those entitlements may be presented to a user in both a textual manner and through a visual depiction, such as a histogram or the like.

Figure 14:
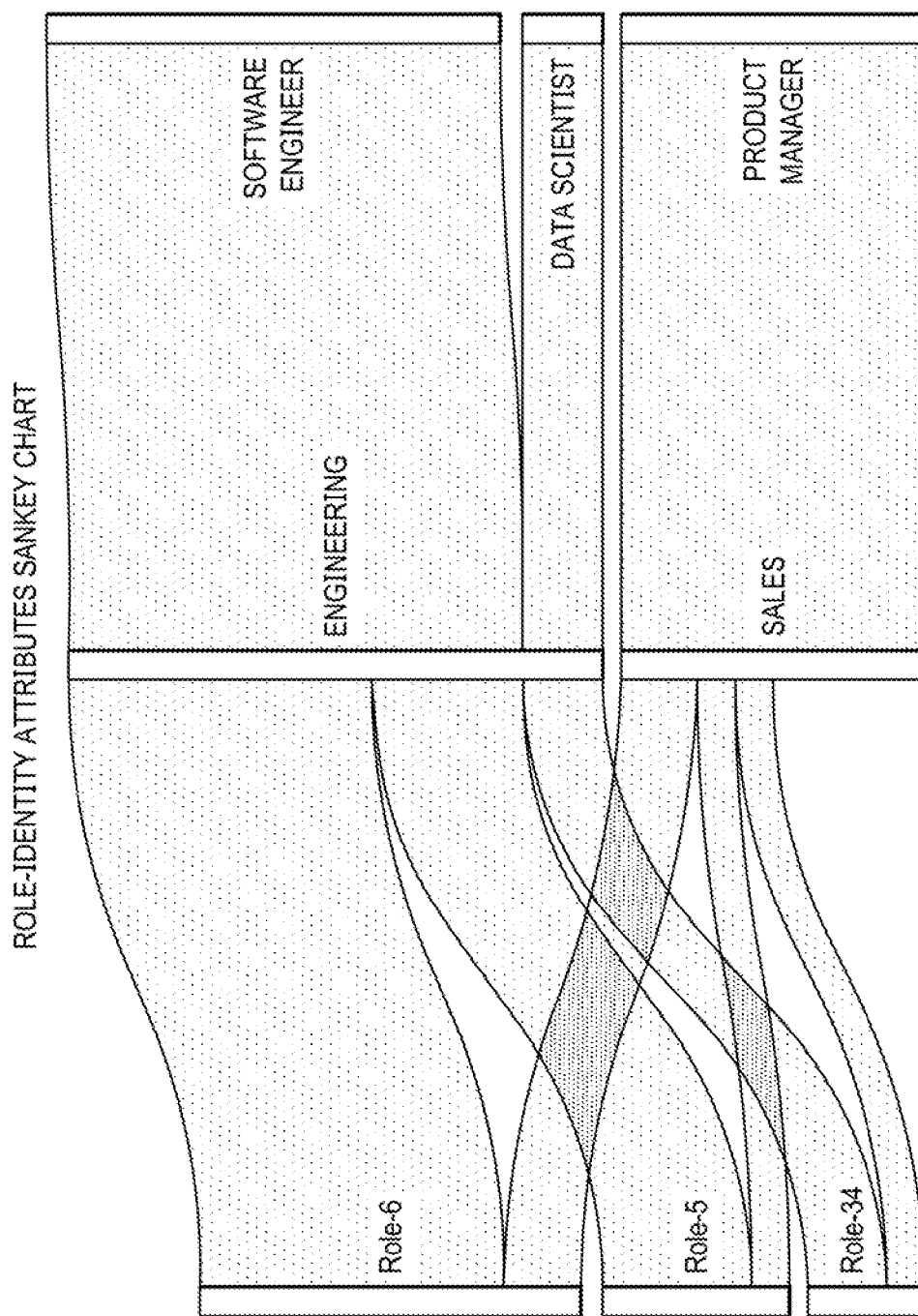

FIG. 14 depicts another embodiment of an interface that may be utilized by an identity management system to display data regarding determined roles. Here, the interface may be a Sankey chart showing which roles (e.g., Role 6, Role 5 and Role 34) include certain attributes (e.g., Engineering, Sales, Software Engineer, Data Scientist and Product Manager).

As can be seen then, according to embodiments of an identity management system, an identity graph may include nodes representing roles, where those roles may be defined based on identity management data obtained from an enterprise, roles defined by a user associated with an enterprise (e.g., using a role definition interface) or determined from role mining, or from another source altogether. It is thus desirable for identity management systems to offer role assessment capabilities whereby roles comprising collections of entitlements may be ascertained from the identity management data associated with enterprise and an assessment metric (also refer to as a score) for a set of these roles may be determined, where the metric is a reflection, for example, of the quality or health (used herein interchangeably) of the structure of the set of roles.

Accordingly, to ameliorate or address these issues, among other ends, embodiments of the identity management systems disclosed herein may utilize a network graph approach to improve identity governance, including the assessment of roles associated with the identity management data of an enterprise. Specifically, embodiments of identity management systems as disclosed may provide role assessment based on a network graph that includes roles of an enterprise. Embodiments may thus generate a network identity (property) graph that includes nodes for identities, entitlements, roles or other identity management artifacts of an enterprise. Such a network identity graph may be, or may include, a role graph having nodes representing roles associated with the enterprise and edges representing similarities between the roles (e.g., represented by the nodes). These edges may comprise a similarity weight determined, based on, for example, shared entitlements between the roles or by concurrent identities (e.g., a number of identities that share those roles).

Specifically, in many instances, in the context of an enterprise there may be what are referred to as multi-dimensional roles. A multi-dimensional role may be instances of similar roles that may vary slightly according to some criteria. For example, if an enterprise has many different locations, a role in one location may be very similar to a role in another location. Thus, administrators or others concerned with identify governance within an enterprise, or compliance of an enterprise with identity management goals or requirements, may desire to validate or otherwise assess the role structure of an enterprise (or portions thereof) to determine the quality or health of these roles. By assessing the health of the roles structure, such metrics may be useful for compliance purposes or to assist in optimizing the role structure or more generally streamlining role management for the enterprise.

Moreover, by identifying roles that may be strongly similar or otherwise closely aligned, efficiencies with respect to management of these roles may be achieved. For example, in some cases, roles that have similar sets of entitlements may be consolidated (e.g., merged) or some of the roles eliminated. As another alternative, roles that share a similar group of identities (e.g., where the same set of identities share a set of roles) may be bundled together and an overarching role (referred to as a portfolio role) may be defined such that the bundle of similar roles may be managed as a group using the portfolio role. Thus, using embodiments, the actual scope of identities (e.g., a user population) for which roles can be consolidated to reduce use of resources in role management for that specific population and defining or assigning roles for that population. More generally, then, by reducing the number of roles or the interactions with these roles, the number of both computing resources and man hours required for such identity governance may be reduced, along with the commensurate cost to the enterprise of such identity management.

In one embodiment, for example, a role graph may be an access role graph that is a role graph modeled in terms of entitlement (e.g., access) similarities between all the roles. The edges of the access role graph represent an access similarity relationship between two roles (e.g., nodes representing the roles) joined by the edge of the graph. A weight may be computed for the access similarity relationship based on the entitlements shared between the two roles and the number of entitlements the roles include. Roles with similar entitlements or access patterns may thus cluster close together on the access graph. Embodiments of these access role graphs may give high-level of abstractions on the overall access model of an enterprise while accurately reflecting the global role (access) structure. As such, these access role graphs may be useful, for example, as a "role provisioning Quality Assessment" tool indicating overall well-being of an enterprises role structure, in recommending consolidation of redundant roles, or verifying how new roles may fit in the current access model.

As another embodiment, for example, a role graph may be an concurrency graph that is modeled in terms of concurrent identities shared between roles. The edges of the concurrency graph represent an concurrency similarity relationship between two roles (e.g., nodes representing the roles) joined by the edge of the graph. A weight may be computed for the concurrency similarity relationship based on the number of identities which share those roles and the number of identities that have those roles. Roles with high concurrency with one another cluster closer together on the concurrency graph. Moreover, the concurrency graph may be filtered based on the number of supporting identities (e.g., the number of identities that include both roles). This support (also referred to as the concurrent or concurrency count) thus determines the significance of the computed concurrency weights, by allowing the concurrency graph to filter out highly concurrent roles that share only few identities, thus rendering more meaningful representation of the concurrency graph. As such, these concurrency graphs may be useful as a "role-profiling assistant" identifying concurrent patterns of peer access, simplifying business rules, or surfacing potential profiles for new joiners. These concurrency graphs may also allow users to dive deeper and profile roles within units of an enterprise when applied with scoping of the concurrency graph.

Moreover, according to embodiments, various metrics may be determined for assessing the quality or health of the role structure of an enterprise based on an access role graph or a concurrency role graph. Specifically, optimal (e.g., ideal) network or graph topologies for access and concurrency graphs can be inferred. Graph based metrics may thus provide a starting point to standardize quality scoring for role structures and access models. In one embodiment, a combination of graph based metrics may be utilized to measure a role graph structure with respect to an ideal graph topology optimized for the enterprise. Such a scoring system allows personalization taking into account the trade-off between compliance-driven and enablement-driven governance strategies. Thus role data, including for example, visual depictions of role graphs for the enterprise or quality assessment scores may be presented to a user through embodiments of the identity management systems as depicted herein.

Figure 15:
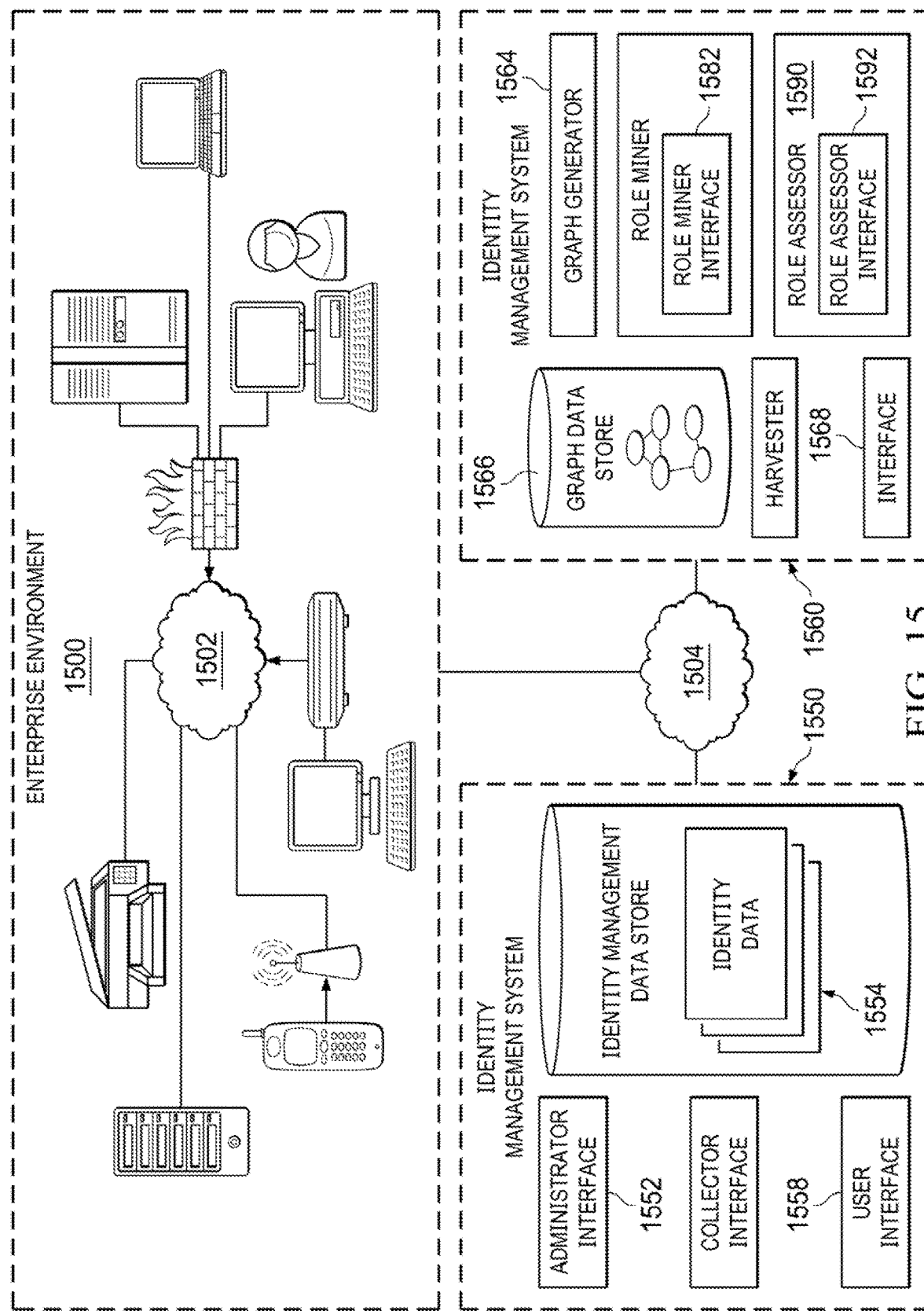
FIG. 15 is a block diagram of a distributed networked computer environment including one embodiment of an identity management system.

Turning to FIG. 15 then, a distributed networked computer environment including an identity management system with one embodiment of a role assessor is depicted. As discussed above, the networked computer environment may include an enterprise computing environment 1500 including a number of computing devices or applications that may be coupled over a computer network 1502 or combination of computer networks. Enterprise environment 1500 may thus include a number of resources, various resource groups and users associated with an enterprise. Users may have various roles, job functions, responsibilities, etc. to perform within various processes or tasks associated with enterprise environment 1500.

To assist in managing the entitlements assigned to various users and more generally in managing and assessing access risks in enterprise environment 1500, an identity management system 1550 may be employed. Such an identity management system 1550 may allow an administrative or other type of user to define one or more identities and one or more entitlements and associate these identities with entitlements using, for example, an administrator interface 1552. Moreover, an identity management system 1550 may allow such a user to define one or more roles for the enterprise, where these defined roles are defined as collections of access entitlements or access profiles and may be assigned to identities through the identity management system 1550 based on specific rules of the enterprise in terms of the identity's attributes, their expected responsibilities within the organization, or other criteria. Identity management system 1550 or 1560 may also allow roles to be mined and defined in this manner. Identity management system 1550 may, in many respect, function similarly to other embodiments of identity management systems disclosed herein and such similar functionality will not be described further for the sake of conciseness.

The identity management system 1550 may thus store identity management data 1554. The identity management data 1554 stored may include a set of entries, each entry corresponding to and including an identity (e.g., alphanumerical identifiers for identities) as defined and managed by the identity management system, a list or vector of entitlements (e.g., alphanumeric identifiers for entitlements) assigned to that identity by the identity management system, a list or vector of enterprise roles assigned to that identity, and a timestamp at which the identity management data was collected from the identity management system. The set of entries may also include entries corresponding to entitlements and roles, where each entry for a role may include the role identifier (e.g., alphanumerical identifier or name for the role) and a list or vector of the entitlements associated with each role. Other data could also be associated with each role, such as a title, location or department associated with the role.

Accordingly, graph generator 1564 may obtain identity management data 1554 from one or more identity management systems 1550 associated with enterprise 1500. Graph generator 1564 may allow an identity graph or subgraphs thereof to be generated from the obtained identity management data 1554 and stored in graph data store 1566. In one embodiment, as part of a generated identity graph, or as separate graphs, graph generator may generate one or more role graphs.

Again, these role graphs may be subgraphs of an identity graph, or may be separately generated and stored, by the graph generator 1564. In one embodiment, for example, graph generator 1564 may generate an access role graph that is a role graph modeled in terms of entitlement (e.g., access) similarities between all the roles. The edges of the access role graph represent an access similarity relationship between two roles (e.g., nodes representing the roles) joined by the edge of the access role graph. Thus, in one embodiment, an access role graph may be generated from identity management data obtained from the enterprise. This access role graph may be, for example, be generated as part of an identity graph and may be generated in association with such an identity graph by graph generator 1564 (and may thus be a subgraph of such an identity graph).

Specifically, in generating such an identity graph, each of the roles from the most recently obtained identity management data may be determined and a node of the graph created for each role. An edge is constructed between each role node (node representing a role) and each entitlement node representing an entitlement included in that node, where that edge may represent a relationship that indicates the role includes that entitlement. An edge of the identity graph may also be constructed between each identity node (node representing an identity) and each role node representing a role that has been assigned to that identity, where that edge may represent a relationship that indicates the identity has that role.

There may also be an edge constructed between role nodes that represents a relationship (referred to as an access similarity) between the roles represented by the nodes based on the number of entitlements shared by the roles represented by those nodes (e.g., where each of the role nodes has an edge in the graph to the same entitlement node representing that each role includes the entitlement represented by the entitlement node). A weight may be computed for the access similarity relationship based on the entitlements shared between the two roles and the number of entitlements each of the roles include.

Such a weight for an access similarity relationship may be generated to represent a degree of similarity between the roles of the respective nodes joined by that edge based on the number of shared entitlements. In one embodiment, for example, using a proper similarity function (e.g., Jaccard similarity). In one embodiment, the Jaccard similarity for an access relationship between two role nodes may be determined by the Intersection (entitlements of the two roles represented by the role nodes)/Union (entitlements of the two roles represented by the role nodes). In this manner then, a generated identity graph may include an access role graph that is a role graph modeled in terms of entitlement (e.g., access) similarities between the roles.

Similarly, there may be an edge constructed between role nodes that represents a relationship (referred to as a concurrent similarity) between the roles represented by the nodes based on the number of identities that shared by the roles (e.g., concurrent identities) represented by those nodes (e.g., where each of the role nodes has an edge in the graph to the same identity node representing that the identity includes that role). A weight may be computed for the concurrent similarity relationship based on the identities shared between the two roles and the number of identities having each of the roles.

Such a weight for a concurrent similarity relationship may be generated to represent a degree of similarity between the roles of the respective nodes joined by that edge based on the number of shared identities. For example, a weight for a concurrent similarity relationship may be generated using a proper similarity function (e.g., Jaccard similarity). Is some embodiments, the concurrence similarity may not be scalar, but may be an ordered pair including both the weight, as a Jaccard similarity in terms of identities within either role, and the support, which is the size of the overlapping population between the two roles. This may be important as making and inferring decisions based only on weights may not be impactful due to low support.

In one embodiment, the Jaccard similarity for a concurrent similarity relationship between two role nodes may be determined as the Intersection (identities having both roles)/Union (identities that have either of the roles). In this manner then, a generated identity graph may include a concurrency role graph that is a role graph that modeled in terms of concurrent identities shared between roles. It will thus be noted that a generated identity graph may include a role graph (e.g., as a subgraph of the identity graph), where that role graph may include one of, or both of, an access role graph and a concurrency role graph.

As noted, a user may interact with the identity management system 1550 through a user interface 1558 to access or manipulate data on identities, entitlements, events, roles or generally perform identity management with respect to enterprise environment 1500. As but one example, as the roles, entitlements and identities of an enterprise evolve they may stray in substantial and detrimental ways from an ideal state, or other identity governance desires, of the enterprise. Users of an identity management system may thus wish to determine a current data-driven assessment of the current role structure for their enterprise.

Specifically, in many instances, in the context of an enterprise 1500 there may be what are referred to as multi-dimensional roles. A multi-dimensional role may be instances of similar roles that may vary slightly according to some criteria. For example, if an enterprise has many different locations, a role in one location (e.g., a software developer role in Austin, Tex.) may be very similar to a role in another location (a role for a software developer in San Jose, Calif.). In other words, a software developer in either location may require access to a substantially similar set of entitlements, however, since the creators of such roles (which may be, for example, in those two different locations) may have no visibility or access into the roles structure of the enterprise generally, two (or more) different roles may be created, despite the fact that these roles may be substantially similar (e.g., comprise similar entitlements) or, in certain cases, may even be the same. Thus, administrators or others concerned with identify governance within an enterprise, or compliance of an enterprise with identity management goals or requirements, may desire to validate or otherwise assess the role structure of an enterprise (or portions thereof) to ascertain, or determine the quality or health of the roles of an enterprise.

Likewise, by identifying roles that may be strongly similar or otherwise closely aligned, efficiencies with respect to management of these roles may be achieved. For example, in some cases, roles that have similar sets of entitlements may be consolidated (e.g., merged) or some of the roles eliminated. As another alternative, roles that share a similar group of identities (e.g., where the same set of identities share a set of roles) may be bundled together and an overarching role (referred to as a portfolio role) may be defined such that the bundle of similar roles may be manage as a group using the portfolio role. Thus, using embodiments, the actual scope of identities (e.g., a user population) for which roles can be consolidated to reduce use of resources in role management for that specific population and defining or assigning roles for that population. More generally, then, by reducing the number of roles or the interactions with these roles, the number of both computing resources and man hours required for such identity governance may be reduced, along with the commensurate cost to the enterprise of such identity management.

Accordingly, is desirable for identity management solutions to offer role assessment capabilities whereby roles comprising collections of entitlements may be ascertained from the identity management data associated with enterprise 1500. Embodiments of identity management system 1550 may thus provide a role validation tool through the user interface 1558 or interface 1568. In this manner, a user may be presented with the ability to perform role validation through the user interface 1558 (or interface 1568), along with an optional attribute or criteria to scope the set of roles for validation. One or more interfaces with the results of the role validation can then be determined and presented to the user through the role validation tool of user interface 1558 (or interface 1568). Such interfaces may include an assessment metric (also refer to as a score) for the set of these roles, where the metric is a reflection, for example, of the quality or health of the structure of the set of roles. By assessing the health of the roles structure, such metrics may be useful for compliance purposes or to assist in optimizing the role structure or more generally streamlining role management for the enterprise.

To provide such a role validation or assessment tool, identity management system 1560 may include role assessor 1590. Role assessor 1590 may include an interface 1592. Interfaces 1568 of the identity management system 1560 or interface 1558 may present one or more interfaces which may be used to access risk assessment, including the validation of roles based on an identity graph in the graph data store 1566 or subgraphs thereof. When a request for role assessment is received from the user through the user interface 1558 (or interface 1568), a request to perform role assessment can be submitted to the role assessor 1590 from the identity management system 1550 (e.g., or user interface 1558 or other component of identity management system 1550) through the interface 1592, where the request may include, for example, an identification of a type of role graph to use (e.g., an access role graph or a concurrency role graph) and zero or more other criteria or attributes to utilize when determining a graph or subgraph to utilize when performing role assessment. These criteria may include, for example, zero or more scoping attributes that may have been provided by the user through the user interface or zero or more thresholds (e.g., a pruning threshold or concurrency count (support) threshold or the like) that may have been provided by the user through the user interface. Note here, that while the identity management system 1550 has been depicted in the diagram as separate and distinct from the identity management system 1560 and coupled to identity management system 1560 over a computer network 1504, it will be realized that such an identity management system 1550 and identity management system 1560 may be deployed as part of the same identity management system or different identity management system, as a cloud based application or set of services, or in another configuration entirely.

As such, when a request for role validation and the zero or more associate scoping (or other) attributes are received through the role assessor interface 1592, the role assessor 1590 may perform role assessment and generate a health metric as discussed. In particular, in one embodiment, the role assessor 1590 may determine a role graph to utilize for role validation based on the identification of the type of role graph to utilize received in the request along with the zero or more scoping attributes received in the request. Specifically, the role assessor 1590 may query or otherwise access the graph data store 1566 to obtain the specified type of role graph As an example, if an access role graph is specified in the request the role assessor 1590 may query the graph data store 1566 to obtain the access role graph comprising roles nodes and access similarity relationships between those role nodes (e.g., and which may include the entitlement nodes or identity nodes and edges associated with those role nodes or access similarity relationships). If there are any scoping attributes, the set of role nodes of the obtained access role graph may be further scoped by those scoping attributes such that the access role graph only includes role nodes having (or not having) such attributes). For example, it may be desired to scope the role nodes for only roles associated with certain locations or departments such that the access role graph for which role assessment is performed only includes role nodes from those locations or departments.

Specifically, in one embodiment a scoped access role (sub)graph associated with a scoping attribute may be determined from an identity graph by querying the identity graph in the graph data store 1566 based on the scoping attribute to find the role (or other) nodes and edges associated with the scoping attribute. Such querying may involve, for example, querying the identity graph to determine the role nodes of the graph associated with the scoping attribute and determining the entitlement and identity nodes and edges along any path of the identity graph originating with each of those scoped role nodes.

Similarly, if a concurrency role graph is specified in the request the role assessor 1590 may query the graph data store 1566 to obtain the concurrency role graph comprising roles nodes and concurrent similarity relationships between those role nodes (e.g., and which may include the entitlement nodes or identity nodes and edges associated with those role nodes or concurrent similarity relationships). If there are any scoping attributes, the set of role nodes of the obtained concurrent role graph may be further scoped by those scoping attributes such that the concurrent role graph only includes role nodes having (or not having) such attributes).

It will be realized, that in some embodiments, even if one type of role graph or the other has been specified in a request received from the user it may be useful to obtain both types of role graphs (e.g., both access and concurrent role graphs) at the time the graph data store 1566 is queried, as both types of role graphs may be utilized in some embodiments to compute a health metric for the set of (e.g., scoped roles). Moreover, it may also be a relatively similar query to obtain both types of role graphs in the same query as each type of role graph may include the same or similar role nodes and may differ only in a type of relationship (e.g., access similarity or concurrent similarity) between those role nodes.

Once the role graph to utilize for role validation has been obtained (e.g., concurrent role graph, access role graph or both), the obtained role graph may be pruned according to any pruning threshold received. This pruning may remove any edges between roles associated with the requested role graph type whose similarity weight may fall below the pruning threshold. Specifically, in certain embodiments, if an access role graph has been specified in the request all access similarity relationships between role nodes whose similarity weight falls below the pruning threshold may be removed from the obtained role graph during pruning, while if a concurrency role graph has been specified all concurrent similarity relationships whose similarity weight falls below the pruning threshold may be removed from obtained role graph during pruning. Thus, by pruning an access role graph all access similarity relationship edges whose weight falls below the pruning threshold may be removed from the role graph while by pruning a concurrency role graph any concurrent similarity relationship edges whose weight falls below the pruning threshold may be removed from the role graph.

Additionally, when pruning a concurrency role graph and concurrent similarity relationship edges whose support falls below any give support threshold (also known as a concurrent or concurrency threshold) may also be removed. As discussed, this support may be defined as the intersection of identities that are shared between two roles and thus that is used to define the weight of a concurrent similarity relationship between two role nodes. However, highly concurrent roles may only share a few identities, and thus are particularly representative of particular (e.g., risky) significance. Thus, by filtering out (e.g., highly) concurrent roles that share only a few identities, the resulting concurrency role graph may be made more meaningful or representative of roles of interest.

Once the role graph to utilize has been obtained, it can be presented to the user through the user interface 1558 or interface 1568 in response to the originally received request. Additionally, one or more health metrics reflective of the quality of the role structure of access models of the enterprise (or the portions of the enterprise represented in the obtained role graph) may be determined and presented to the user as well. One metric may be related to a population coverage. Specifically, a metric may be determined based on the relative or absolute number of identities associated with each role (or roles not originally assigned to the identity, or identities not assigned to the role, at the time of creation of the role or identity). Roles with too large of a coverage of identities may indicate poor access management.

In some embodiments, metrics used in graph theory may provide a starting point to standardize quality scoring for these role structures and access models. In one embodiment, when generating a score based on an access role graph, a difference between a theoretically best graph structure for role structure within an enterprise may be used as a baseline to generate such metrics. For example, it may be understood that the more cliques in an access role graph, the harder it may be for an enterprise to manage its role structure.

Figure 16:
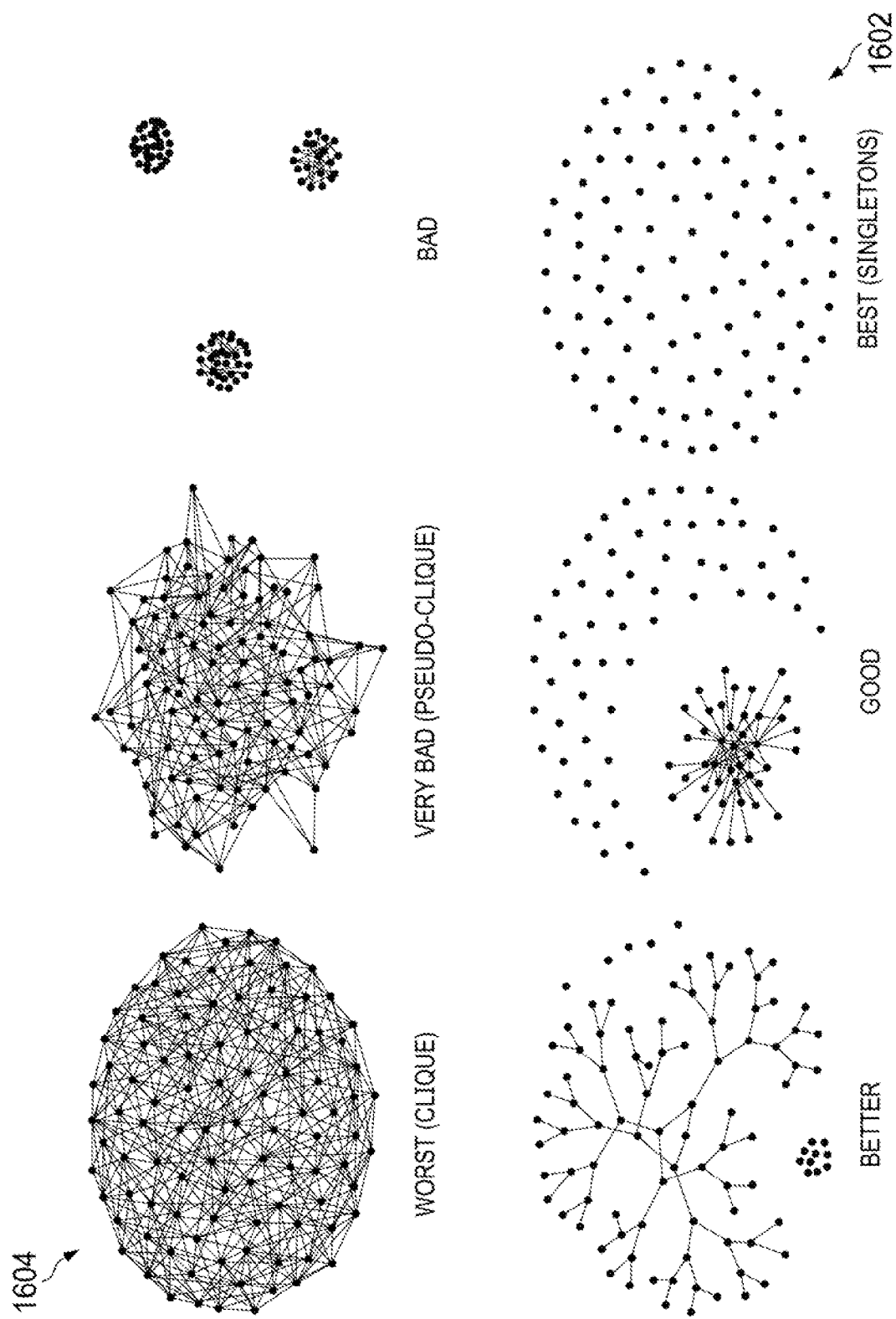
FIG. 16 depict example visual representations of role graphs.

To illustrate, brief reference is made to FIG. 16, wherein a set of example access role graphs are presented. It will be noted that a theoretically worse access role graph for a role structure may be thought of as a clique as represented in graph 1604, where every role is related (e.g., by an access similarity relationship) to every other role such that in a role graph representing such a structure there would be order $n^2$ edges in the graph 1604. Conversely, a theoretically best access role graph for a role structure may be thought of as a set of unrelated role nodes (e.g., all singletons) as represented in graph 1602, where every role is unrelated (e.g., by an access similarity relationship) to every other role such that in an access role graph representing such a structure there would be 0 edges in the graph 1602.

Returning to FIG. 15, thus, a score may be determined using an access role graph based on the number of edges in the determine access role graph relative to either 0 edges or $n^2$ edges. In this manner, the metric determined would be reflective of the access role structure in relation to a theoretically perfect (or worse) access role structure. Such a metric may be referred to as an access (density) ratio.

This access (density) ratio may be a scaling metric that measures the deviation from an optimal structure of an access role graphs; ranging between the worst-case access "containing high magnitude of clique (pseudo-clique) structures" (e.g. clique with similarity >70%) to the best-case access "approaching an edgeless (graph) structure" (e.g., how far off of achieving optimal structure above certain pruning threshold, like 70%). This access ratio may thus be determined based on an order (e.g., O) of the number of edges vs number of (role) nodes scaling along $O(n)$ vs $O(n^2)$ across entire access role graph Similarly, for a concurrency role graph, a concurrency (density) ratio may be determined as a health metric. Such a concurrency (density) ratio may be a scaling that measures the deviation from optimal structure of concurrency graphs taking into account the support (intersection of identities); ranging between worst-case (e.g. a clique or a dense enough graph) to best-case "edgeless singletons." The determination of such a metric may be substantially similar to the determination of an access ratio as discussed. However, in some cases to determine such a concurrency ratio the edges (e.g., concurrent similarity edges) may be filtered or weighted by a support threshold (e.g., both in cases where they are, or are not, pruned in the determination of the concurrency graph).

Other metrics, or combinations or metrics, may be determined without loss of generality. For example, a combination of an access ratio and concurrency ratio may be determined where these ratios may be weighted, balanced, mixed, averaged or combined in some other manner to determine one or more scores reflecting overall well-being (health) of access governance. Thus, a determined metric may be presented in association with a role graph (an access role graph or concurrency role graph, or both) through the user interface 1558 or interface 1568 in response to the originally received request, where the presented metric may have been determined based on the presented role graph.

Users associated with an enterprise could thus utilize such a role validation or access awareness interface to evaluate and validate their existing role structure to explore hierarchical relationships between existing roles; profile, re-provision, or label (e.g., tag) highly similar existing roles, consolidate and label existing roles that are heavily concurrent within certain populations, or evaluate the health of an entire (or portion of) a role structure based on the scoring system or visual depiction of a role graph.

Similarly, users involved in active access modeling or governance process (e.g., using role mining capabilities) could utilize the role validation or access awareness interface for decisions related to prioritizing roles based on the novelty with respect to existing roles, provisioning newly discovered roles with significantly high contrast to existing roles, merging, profiling, or labeling highly similar existing roles, enhancing access interpretability and enabling detection of potential risk based on security policies or, validating the impact of provisioned roles under a current role structure.

In one embodiment, such an interface may allow a user to effectively evaluate the effect of the removal of one or more roles from, or addition of one or more roles to, their existing role structure. Specifically, a role validation tool presented through the user interface 1558 or interface 1568 may allow a user to add (or remove) a specific role from a set of roles (e.g., roles associated with a presented role graph and health metric). The role assessor 1590 can then determine or update the role graph (e.g., the access role graph or concurrency role graph, or both) based on the addition (or removal) of this role and determine an update health metric based on the updated role graph. This updated graph and updated role health metric may be presented to the user through the interface 1558 or interface 1568. Such an updated role graph and health metric may be presented, for example, alongside the originally presented role graph and health metric so a user may ascertain the effect of the addition (or removal) of that role both visually through the difference in the graph structures presented, and quantitatively through the difference in the health scores presented.

Moreover, such an interface may allow present a user with recommendations (e.g., a risk amelioration recommendation) regarding modifications to an existing role structure. For example, role assessor 1590 may perform clustering on a determined role graph (e.g., a concurrency role graph) to cluster the role nodes of such a role graph. Such clustering may be accomplished as discussed elsewhere herein. Cliques or pseudo-cliques of roles determined from such clustering may then be determined and presented to users through the interface 1558 or 1568 for the user to consider consolidation of such roles. In the case of clustering of a concurrency role graph, it may be recommended to define a portfolio role that includes all the roles of an identified clique or pseudo-clique such that the portfolio role may be assigned to the identities that have been granted the roles comprising that clique or pseudo-clique. In that way, roles that share a similar group of identities (e.g., where the same set of identities share a set of roles) may be bundled together and an overarching role (referred to as a portfolio role) may be defined such that the bundle of similar roles may be manage as a group using the portfolio role. Thus, using embodiments, the actual scope of identities (e.g., a user population) for which roles can be consolidated to reduce use of resources in role management for that specific population and defining or assigning roles for that population. More generally, then, by reducing the number of roles or the interactions with these roles, the number of both computing resources and man hours required for such identity governance may be reduced, along with the commensurate cost to the enterprise of such identity management.

Figure 17:
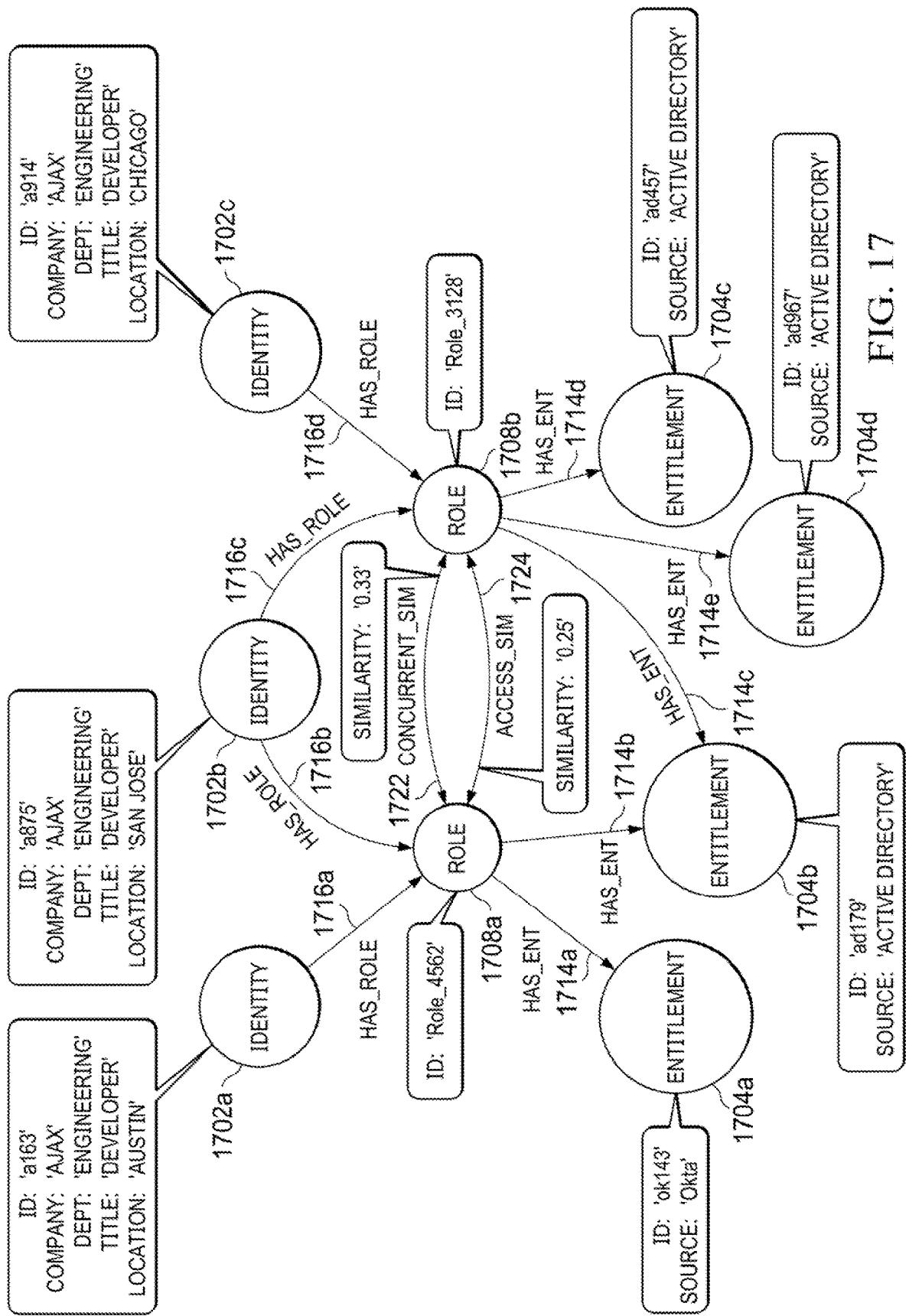
FIG. 17 depicts an example representation of a role graph.

It may be helpful to an understanding of embodiments to briefly discuss an example role graph. Looking then at FIG. 17, a graphical depiction of an example identity graph (or portion thereof) that includes an example role graph (or portion thereof) is depicted. Here, nodes are represented by circles and relationships are represented by the directional arrows between the nodes. Such a role graph may represent roles, identities or entitlements, their association, and the degree of access similarity or concurrent similarity (or both) between roles represented by the role nodes. Thus, for example, role nodes 1708a, 1708b have the label "Role" indicating they are role nodes. Role nodes 1708a, 1708b are associated with a set of properties that define the attributes or data of that role node 1708a, 1708b, including here that the "id" of role node 1708a is "Role_4562" and the "id" of role node 1708b is "Role_3128".

Similarly identity nodes 1702a, 1702b, 1702c have the label "Identity" indicating they are identity nodes. Identity nodes 1702a, 1702b, 1702c are associated with a set of properties that define the attributes or data of that identity node. For example, identity node 1702a is shown as being associated with a set of properties that define the attributes or data of that identity node 1702a, including here that the "id" of identity node 1702a is "a123", the "company" of identity node 1702a is "Ajax", the "dept" of identity node 1702a is "Engineering", the "title" of identity node 1702a is "Developer, and the "location" of identity node 1702a is "Austin".

Entitlement nodes 1704a, 1704b, 1704c, 1704d have the label "Entitlement" indicating that they are entitlement nodes. Entitlement nodes 1704a, 1704b, 1704c, 1704d are associated with a set of properties that define the attributes or data of that entitlement node. For example, entitlement node 1704b is shown as being associated with a set of properties that define the attributes or data of that entitlement node 1704b, including here that the "id" of entitlement node 1704b is "ad179", and the "source" of entitlement node 1704b is "Active Directory". Entitlement node 1704a is shown as being associated with a set of properties that define the attributes or data of that entitlement node 1704a, including here that the "id" of entitlement node 1704a is "ok143", and the "source" of entitlement node 1704a is "Okta".

Identity nodes 1702 and role nodes 1708 of the identity graph can be joined by edges formed by directed relationships 1716. Directed relationships 1716 may represent that the identity of identity node 1702 has (represented by the labeled "HAS_ROLE" relationships 1716) the role represented by the role nodes 1708. For example, HAS_ROLE relationship 1716a represents that the identity represented by identity node 1702a has been assigned the role represented by role node 1708a. Similarly, HAS_ROLE relationship 1716b represents that the identity represented by identity node 1702b has been assigned the role represented by role node 1708a, HAS_ROLE relationship 1716c represents that the identity represented by identity node 1702b has been assigned the role represented by role node 1708b, and HAS_ROLE relationship 1716d represents that the identity represented by identity node 1702c has been assigned the role represented by role node 1708b.

Entitlement nodes 1704 and role nodes 1708 of the identity graph can be joined by edges formed by directed relationships 1714. Directed relationships 1714 may represent that the role of a role node 1708 includes (represented by the labeled "HAS_ENT" relationships 1714) the entitlement of the related entitlement node 1704. For example, HAS_ENT relationship 1714a represents that the role represented by role node 1708a includes the entitlement represented by entitlement node 1704a. Similarly, HAS_ENT relationship 1714b represents that the role represented by role node 1708a includes the entitlement represented by entitlement node 1704b, HAS_ENT relationship 1714c represents that the role represented by role node 1708b includes the entitlement represented by entitlement node 1704b, HAS_ENT relationship 1714d represents that the role represented by role node 1708b includes the entitlement represented by entitlement node 1704c and HAS_ENT relationship 1714e represents that the role represented by role node 1708b includes the entitlement represented by entitlement node 1704d.

The role nodes 1708 of the identity graph may be joined by edges formed by concurrent similarity relationships 1722. Concurrent similarity relationships 1722 may represent that the role of one role node 1708 is similar to (represented by the labeled "CONCURRENT_SIM" relationship 1722) the role of the related role node 1708 based on shared identities which have that role. A weight may be computed for the concurrent similarity relationship 1722 the number of identities nodes 1702 which share those roles (e.g., which have HAS_ROLE relationships 1716 with both roles nodes 1708) and the number of identities that have those roles (e.g., the number of identity nodes 1702 that have HAS_ROLE relationships 1716 with either of the roles nodes 1708). In one embodiment, concurrent similarity relationship 1722 between role nodes 1708a, 1708b may be determined as the Intersection (number of identities nodes 1702 having roles 1708)/Union (number of identities nodes 1702 having either of the roles 1708). For example, here, CONCURRENT_SIM relationship 1722 may have a weight of 0.33 assigned to it.

The role nodes 1708 of the identity graph may also be joined by edges formed by access similarity relationships 1724. Access similarity relationships 1724 may represent that the role of one role node 1708 is similar to (represented by the labeled "ACCESS_SIM" relationship 1724) the role of the related role node 1708 based on entitlements that those roles share. A weight may be computed for the access similarity relationship 1724 based on the number of entitlement nodes 1704 shared by those roles 1708 (e.g., which have a HAS_ENT relationships 1714 with both roles nodes 1708) and the number of entitlements that those roles have (e.g., the number of entailment nodes 1704 with which either of those role nodes 1708 has a HASENT relationships 1714). In one embodiment, access similarity relationship 1724 between role nodes 1708a, 1708b may be determined as the Intersection (number of entitlement nodes 1704 having relationships with both roles nodes 1708)/Union (number of entitlement nodes 1704 having relationships with either roles node 1708). For example, here, ACCESS_SIM relationship 1724 may have a weight of 0.25 assigned to it. Note that both these types of similarity relationships 1722, 1724 may be a single bidirectional relationship assigned a single similarity weight or may be bidirectional relationships that may be weighted differently based on different criteria.

As can be seen then, an identity graph may include a role graph that includes both an access role graph modeled in terms of entitlement (e.g., access) similarities between roles and a concurrency graph that is modeled in terms of identities shared between roles. In the access role graph, certain edges (e.g., ACCESS_SIM relationships 1724) represent an access similarity relationship between two roles (e.g., nodes representing the roles) joined by that edge of the graph, where the access similarity relationship may have a weight based on the entitlements shared between the roles and the number of entitlements the roles include. In the concurrency role graph, the edges (e.g., CONCURRENT_SIM relationships 1722) represent a concurrent similarity modeled in terms of shared identities shared between the roles. A weight may be computed for the concurrent similarity relationship based on the number of identities which share those roles and the number of identities that have those roles.

Figure 18:
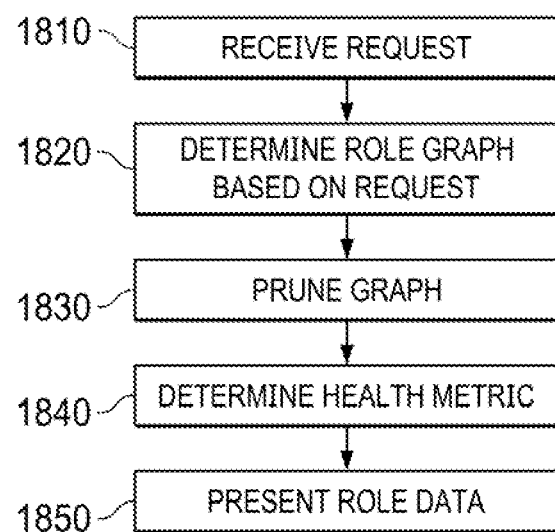
FIG. 18 is a flow diagram of one embodiment of a method for role assessment.

With examples of such an access role graph or concurrency role graph in mind, reference is now made to FIG. 18 where a flow diagram of one embodiment of a method for performing role assessment is depicted. Embodiments of such a method may be performed, for example by an identity management system or a role assessor of such an identity management system. Initially, a request to perform role assessment may be received (STEP 1810). The request may include, for example, an identification of a type of role graph to use (e.g., an access role graph or a concurrency role graph) and zero or more other criteria or attributes to utilize when determining a graph or subgraph to utilize when performing role assessment. These criteria may include, for example, zero or more scoping attributes that may have been provided by the user through the user interface or zero or more thresholds (e.g., a pruning threshold or count (support) threshold or the like) that may have been provided by the user through the user interface.

In particular, in one embodiment, a role graph to utilize for role validation may be determined based on the identification of the type of role graph to utilize received in the request along with the zero or more scoping attributes received in the request (STEP 1820). Specifically, the graph may be queried to obtain the specified type of role graph.

As an example, if an access role graph is specified in the request the graph may be queried to obtain the access role graph comprising roles nodes and access similarity relationships between those role nodes (e.g., and which may include the entitlement nodes or identity nodes and edges associated with those role nodes or access similarity relationships). If there are any scoping attributes, the set of role nodes of the obtained access role graph may be further scoped by those scoping attributes such that the access role graph only includes role nodes having (or not having) such attributes). For example, it may be desired to scope the role nodes for only roles associated with certain locations or departments such that the access role graph for which role assessment is performed only includes role nodes from those locations or departments.

Specifically, in one embodiment a scoped access role (sub)graph associated with a scoping attribute may be determined from an identity graph by querying the identity graph based on the scoping attribute to find the role (or other) nodes and edges associated with the scoping attribute. Such querying may involve, for example, querying the identity graph to determine the role nodes of the graph associated with the scoping attribute and determining the entitlement and identity nodes and edges along any path of the identity graph originating with each of those scoped role nodes.

Similarly, if a concurrency role graph is specified in the request the graph may be queried to obtain the concurrency role graph comprising roles nodes and concurrent similarity relationships between those role nodes (e.g., and which may include the entitlement nodes or identity nodes and edges associated with those role nodes or concurrent similarity relationships). If there are any scoping attributes, the set of role nodes of the obtained concurrent role graph may be further scoped by those scoping attributes such that the concurrent role graph only includes role nodes having (or not having) such attributes). In some embodiments, even if one type of role graph or the other has been specified in a request received from the user it may be useful to obtain both types of role graphs (e.g., both access and concurrent role graphs) at the time the graph is queried, as both types of role graphs may be utilized in some embodiments to compute a health metric for the set of (e.g., scoped roles).

Once the role graph to utilize for role validation has been obtained (e.g., concurrent role graph, access role graph or both), the obtained role graph may be pruned according to any pruning threshold received (STEP 1830). This pruning may remove any edges associated with the requested role graph type whose similarity weight may fall below the pruning threshold. Specifically, in certain embodiments, if an access role graph has been specified in the request all access similarity relationships between role nodes whose similarity weight falls below the pruning threshold may be removed from the obtained role graph during pruning, while if a concurrency role graph has been specified all concurrent similarity relationships whose similarity weight falls below the pruning threshold may be removed from obtained role graph during pruning.

Additionally, when pruning a concurrency role graph and concurrent similarity relationship edges whose support falls below any give support threshold may also be removed. As discussed, this support may be defined as the intersection of identities that are shared between two roles and thus that is used to define the weight of a concurrent similarity relationship between two role nodes. However, that highly concurrent roles may only share a few identities, and thus are particularly representative or of particular (e.g., risky) significance. Thus, by filtering out (e.g., highly) concurrent roles that share only a few identities, the resulting concurrency role graph may be made more meaningful or representative of roles of interest.

Once the role graph to utilize has been obtained, it can be used to present role data (e.g., including the role graph) to the user through a user interface in response to the originally received request (STEP 1850). Additionally, in some embodiments, one or more health metrics reflective of the quality of the role structure of access models of the enterprise (or the portions of the enterprise redefected in the obtained role graph) may be determined (STEP 1840) and presented to the user as part of the represented ole data (STEP 1850). Such health metrics, may for example, be determined on the structure of the role graph. One such health metric may be related to a population coverage. Specifically, a metric may be determined based on the relative or absolute number of identities associated with each role (or roles not originally assigned to the identity, or identities not assigned to the role, at the time of creation of the role or identity). Roles with too large of a coverage of identities may indicate poor access management.

In one embodiment, when generating a score based on an access role graph, a difference between a theoretically best graph structure for role structure within an enterprise may be used as a baseline to generate such metrics. For example, it may be understood that the more cliques in an access role graph, the harder it may be for an enterprise to manage its role structure. Thus, a score may be determined using an access role graph based on the number of edges in the determine access role graph relative to either 0 edges or $n^2$ edges. In this manner, the metric determined would be reflective of the access role structure in relation to a theoretically perfect (or worse) access role structure. Such a metric may be referred to as an access (density) ratio. Similarly, for a concurrency role graph, a concurrency (density) ratio may be determined as a health metric. Such a concurrency (density) ratio may be a scaling that measures the deviation from optimal structure of concurrency graphs taking into account the support (intersection of identities); ranging between worst-case (e.g. a clique or a dense enough graph) to best-case "edgeless singletons." In some cases to determine such a concurrency ratio, the edges (e.g., concurrent similarity edges) may be filtered or weighted by a support threshold (e.g., both in cases where they are, or are not, pruned in the determination of the concurrency graph).

Other metrics, or combinations or metrics, may be determined without loss of generality. For example, a combination of an access ratio and concurrency ratio may be determined where these ratios may be weighted, balanced, mixed, averaged or combined in some other manner to determine one or more scores reflecting overall well-being (health) of access governance. Thus, a determined metric may be presented in association with a role graph through the user interface in response to the originally received request, where the presented metric may have been determined based on the presented role graph (STEP 1850).

Users associated with an enterprise could thus utilize such a role validation or access awareness interface to evaluate and validate their existing role structure to explore hierarchical relationships between existing roles; profile, re-provision, or label (e.g., tag) highly similar existing roles, consolidate and label existing roles that are heavily concurrent within certain populations, or evaluate the health of an entire (or portion of) a role structure based on the scoring system or visual depiction of a role graph.

Similarly, users involved in active access modeling or governance process (e.g., using role mining capabilities) could utilize the role validation or access awareness interface for decisions related to prioritizing roles based on the novelty with respect to existing roles, provisioning newly discovered roles with significantly high contrast to existing roles, merging, profiling, or labeling highly similar existing roles, enhancing access interpretability and enabling detection of potential risk based on security policies or validating the impact of provisioned roles under a current role structure.

In one embodiment, such an interface may allow a user to effectively evaluate the effect of the removal of one or more roles from, or addition of one or more roles to, their existing role structure. Specifically, a role validation interface presented through the user interface may allow a user to add (or remove) a specific role from a set of roles (e.g., roles associated with a presented role graph and health metric). The role graph (e.g., the access role graph or concurrency role graph, or both) may be updated based on the addition (or removal) of this role and determine an updated health metric based on the updated role graph. This updated graph and updated role health metric may be presented to the user through the interface. Such an updated role graph and health metric may be presented, for example, alongside the originally presented role graph and health metric so a user may ascertain the effect of the addition (or removal) of that role both visually through the difference in the graph structures presented, and quantitatively through the difference in the health scores presented.

Moreover, such an interface may present a user with recommendations regarding modifications to an existing role structure. For example, it may be recommended to define a portfolio role that includes a set of roles within a presented graph such that the portfolio role may be assigned to the identities that have been granted the roles comprising a presented set of roles. In that way, roles that share a similar group of identities (e.g., where the same set of identities share a set of roles) may be bundled together and an overarching role (referred to as a portfolio role) may be defined such that the bundle of similar roles may be managed as a group using the portfolio role. Thus, using embodiments, the actual scope of identities (e.g., a user population) for which roles can be consolidated to reduce use of resources in role management for that specific population and defining or assigning roles for that population. More generally, then, by reducing the number of roles or the interactions with these roles, the number of both computing resources and man hours required for such identity governance may be reduced, along with the commensurate cost to the enterprise of such identity management.

Figure 19A:
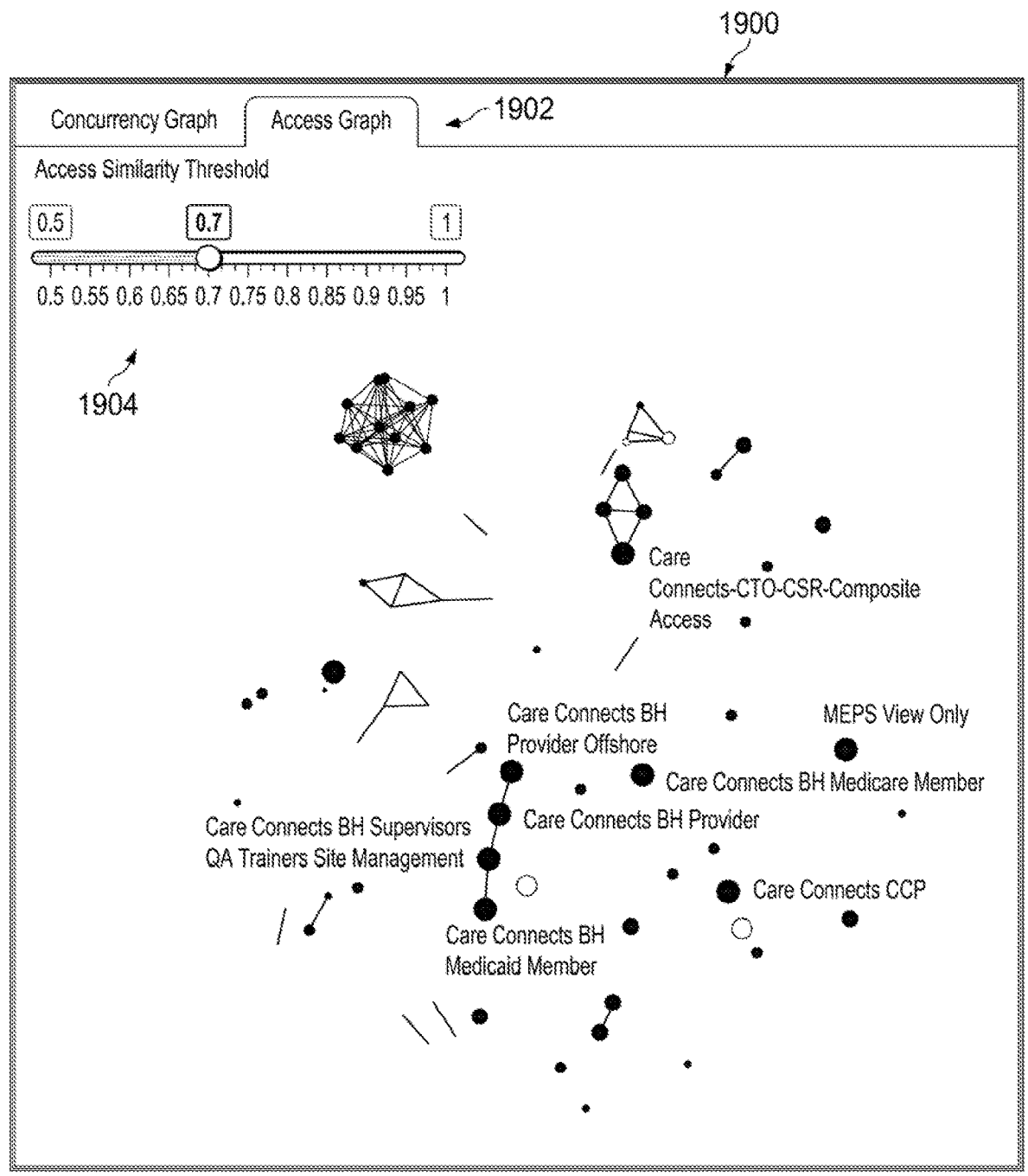
FIGS. 19A, 19B, 19C and 19D depict interfaces that may be utilized by embodiments of an identity management system.
Figure 19B:
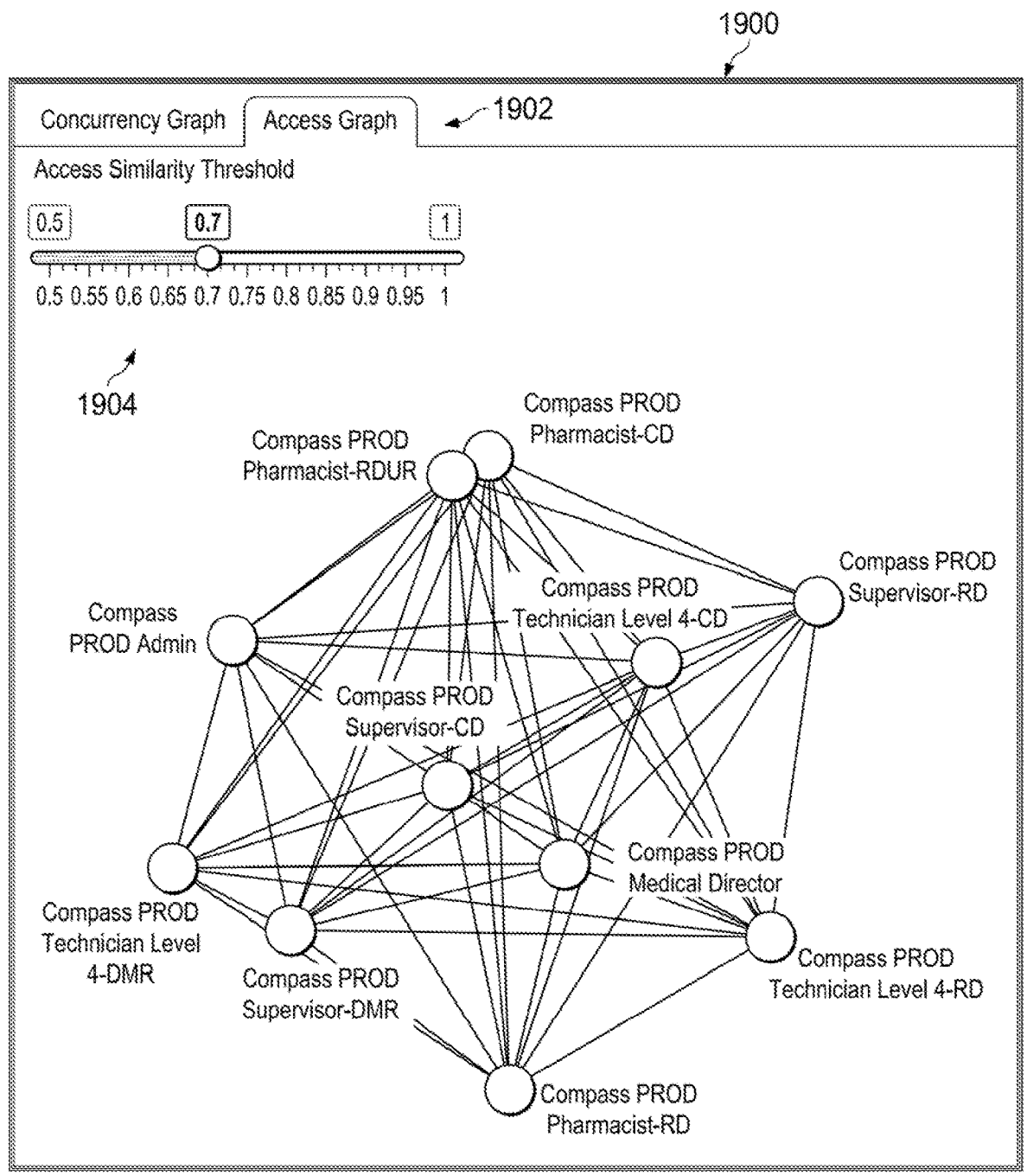

Certain example interfaces that may be used for roles assessment in embodiments of an identity management system are depicted in FIGS. 19A, 19B, 19C and 19D. Looking first at FIG. 19A, one embodiment of an interface for role assessment is presented. The user may utilize interface 1900 to role graph selection portion 1902 of the interface to select whether a concurrency role graph or an access role graph is desired (here two tabs associated with each type of role graph). In the example depicted, the user has selected an access role graph for role assessment. The user may also be presented with a threshold selection portion 1904 of the interface (in this case a slider bar), where the user may select a pruning threshold to utilize for pruning the (e.g., similarity relationships) of the role graph to be determined and presented in the interface 1900. In this case, as the role graph will be an access role graph, the threshold selection portion presents a threshold selection portion 1904 for an access similarity relationship similarity threshold. An access role graph generated based on the user's selection may then be presented in the interface 1900 where the points presented represent the role nodes of the graph and the edges represent the access similarity relationships between those roles (e.g., where the weights on those access similarity relationships are all at or above the selected pruning threshold). Other visual indicators may also be used with respect to the presented graph. For example, the size of a point for a role node may reflect the number of identities having that role. FIG. 19B depicts another embodiment of an interface for role assessment where an access role graph is being presented.

Figure 19C:
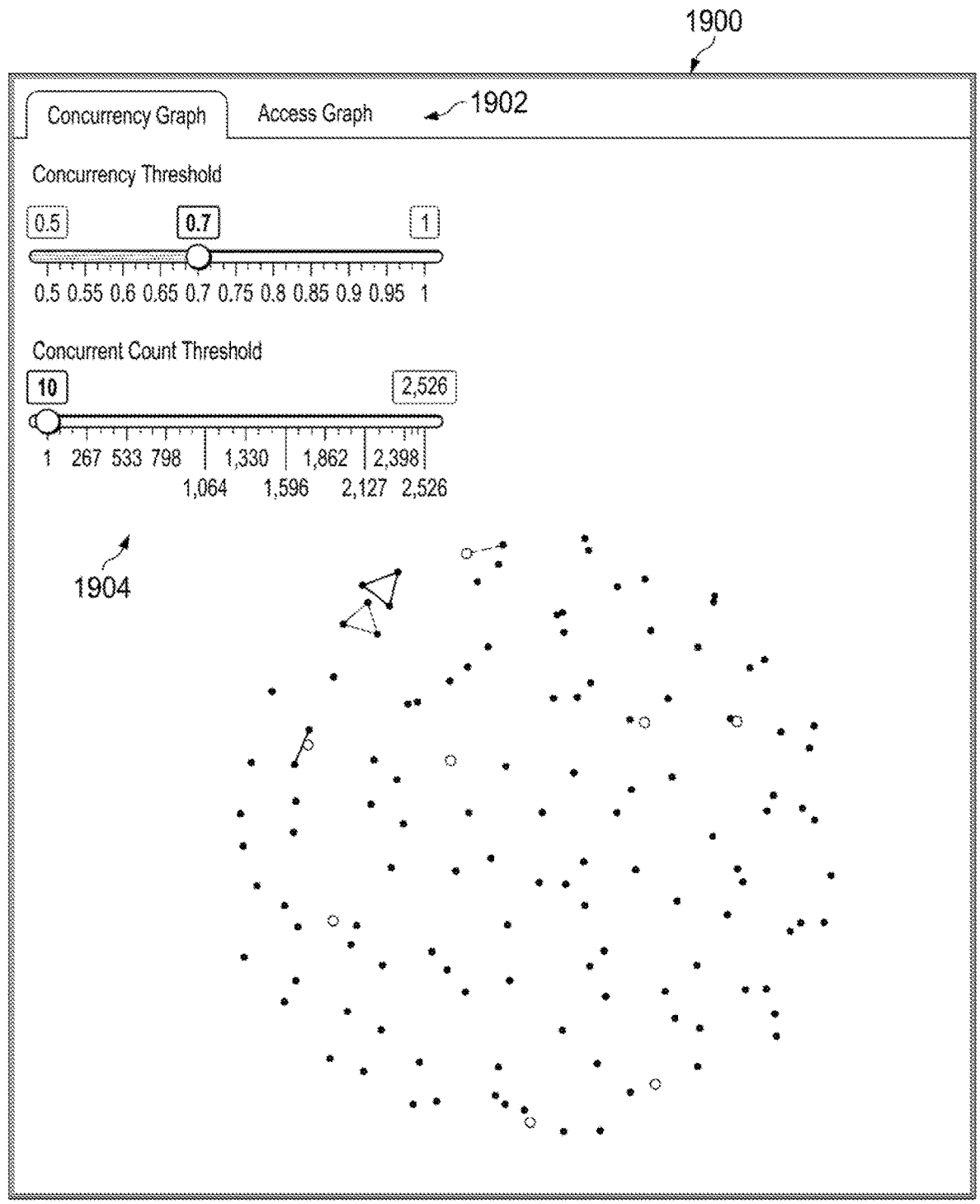
Figure 19D:
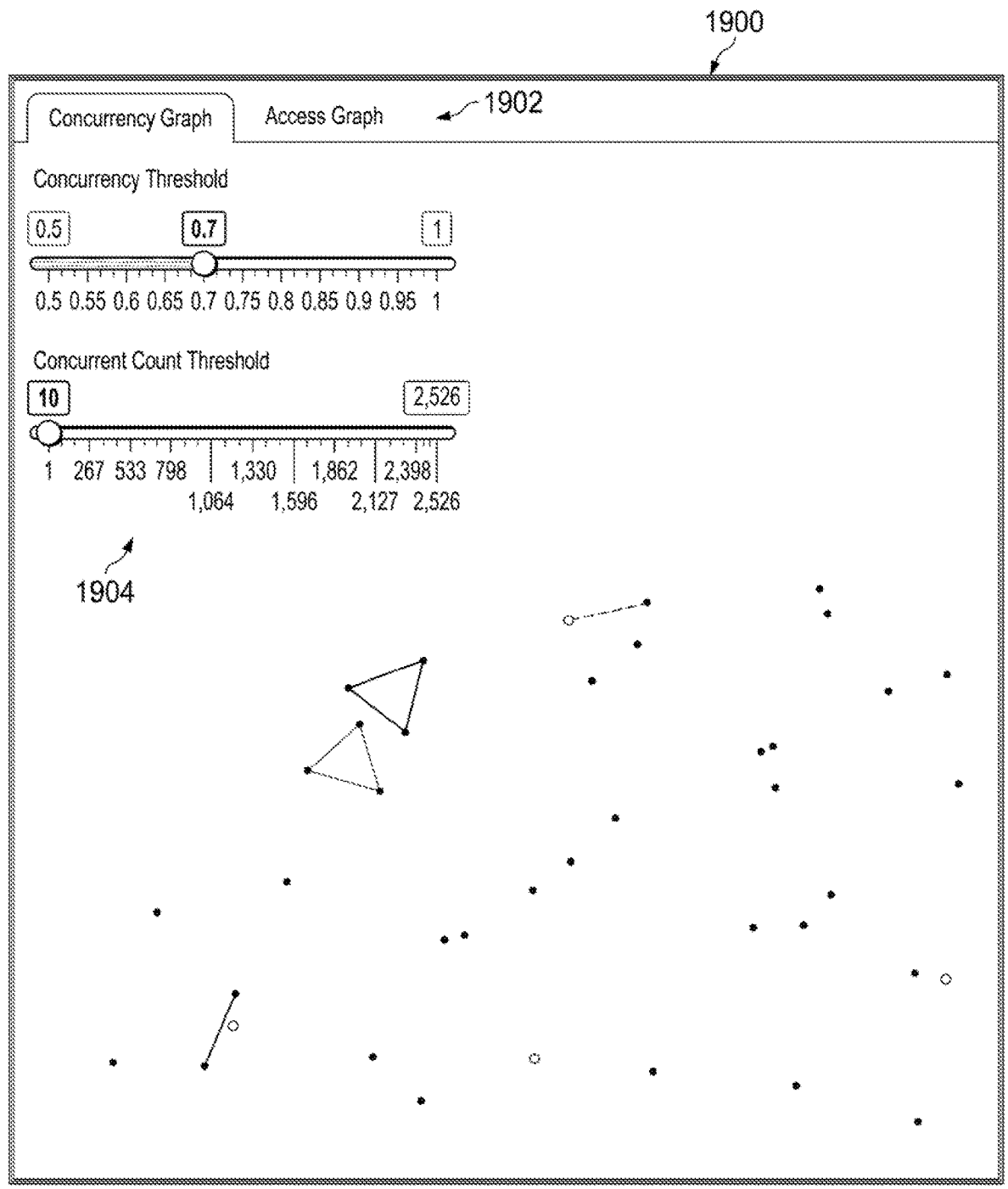

Turning now to FIG. 19C, one embodiment of an interface for role assessment is presented where the user has utilized role graph selection portion 1902 interface 1900 to select that a concurrency role graph is desired. Now, threshold selection portion 1904 of the interface 1900 may present selection mechanisms for a concurrency similarity relationship similarity threshold and a concurrent count (support) threshold. A concurrency role graph generated based on the user's selection may then be presented in the interface 1900 where the points presented represent the role nodes of the graph and the edges represent the concurrency similarity relationships between those roles (e.g., where the weights on those concurrency similarity relationships are all at or above the selected pruning threshold and have at least the selected concurrent count). Other visual indicators may also be used with respect to the presented graph. For example, the thickness of an edge may reflect the number of identities shared between the two roles (e.g., thicker lines indicate more identities shared between the roles). FIG. 19D depicts another embodiment of an interface for role assessment where a concurrency role graph is being presented.

Risk in such an identity management context may include things such as policy violations, rampant and uncontrolled approval of access, the inflation or dispersal of entitlements, poor management of restricted access, overly dominant or generic roles or other types of risk. As can be seen then, embodiments using identity graphs as discussed, may be especially useful in assessing risk and in compliance with security policies or the like. The graph based identity management systems as disclosed herein, allows improved graph-based approaches to detection of risks, including risks associated with identities of an enterprise. By representing the identities' equivalence (or similarity) structure as modeled by an identity graph, embodiments of an identity management system may capitalize on the identity graph's reflection of the relevant homophilic aspects of access entitlements. As a result, the graph clustering as discussed may produce peer groups of strongly similar identities, which facilitates the detection of 'abnormal' identities as outliers. Abnormalities in a peer group are typically viewed as indicators for risk as they are most likely the result of lapses in the entitlement assignment process or certification campaigns.

To illustrate more specifically, identifying risk items may be one of the first step towards developing effective risk management procedures to deal with vulnerabilities as soon as they arise. Defining, identifying, and assessing risk is, however, a highly non-trivial task. This is due to risk being not well-defined across different industries or even departments within a particular industry or enterprise. Moreover, assessing and quantifying risk may require considerable domain-specific and nuanced expertise, which makes it an extremely challenging task for current methods to approximate.

Consider the case of Jane D., a senior analyst at Acme Corp for 10 or more years. During this time, Jane has collaborated with countless teams on joint projects. Throughout the years, she had accumulated hundreds of access entitlements. As a result, her entitlement peers are VP-level executives. This may present a risk to Acme Corp. The issue here is that Jane, albeit perhaps a highly active & effective employee, does not receive any of the security training or oversight that a VP-level individual typically goes through. Moreover, if any of Jane's accounts is compromised, the damage might be hard to contain. This situation is an example of an access 'anomaly'. Identifying all these anomalies and recommending a proper action, e.g. triggering special certification event, revoking unutilized access, role assessment, etc. will improve security by mitigating the risks from these anomalous identities.

The graph based identity management systems as disclosed herein allows improved graph-based approach to detection of risks, including risks associated with identities, entitlements, roles, or other artifacts, of an enterprise. This is at least because identity governance is predicated on the principle that strongly similar identities should be awarded similar access. In other words a person's access profile should not be too much different from their peers. Consequently, identities whose access patterns are dramatically and unjustifiably different from their peers may be considered or identified as a source of risk.

Moreover, a peer group (of identities, entitlements, or roles) is a social structure. Therefore, graph representations of identities, entitlements or other identity management artifacts with a proper choice of similarity measure, creates a faithful and tangible model of the similarity structure of those artifacts with respect to an enterprise. Thus, an identity graph (e.g., when pruned to a high degree of similarity) may approximate the hierarchical structure of an organization, and robust, efficient graph clustering algorithms yield peer groups within the graph of high quality. Graphs also lend themselves to visual presentations that allows communication of deeper, identity-level insights and deliver them directly to the user via an intuitive interface. Additionally, several graph analytics tools can be utilized to detect outlier entities (identities, entitlements, or roles) and can be implemented as queries directly on a graph database, expediting & simplifying (by unifying) a production implementation and improving scalability of those implementations.

To that end, among others, attention is now directed to the embodiments artificial intelligence based identity governance systems including such outlier detection for risk management. Embodiments may perform outlier detection based on an identity management data, including one or more property graphs or peer groups determined from that property graph to determine identity management artifacts with 'abnormal' patterns when compared to other related identity management artifacts (e.g., identities, entitlements or roles associated with a similar department, physical location, peer group, etc.). At least two possible modes of analysis may be used by an identity management system in performing outlier detection to identify access risk through the identification of anomalies using the identity graph or multiple versions thereof.

The first type of identification of anomalies may takes place with respect to a particular snapshot of identity management data, or a single identity graph from a particular snapshot. This is referred to as identification of a static anomaly or a static analysis. However, the identity graph (or different versions thereof) as maintained by an identity management system can be thought of as a dynamically evolving structure reflecting the evolving nature of the identity management artifacts being modeled within an enterprise. More generally, the identity attribute and entitlement data get harvested, updated and stored regularly as time-stamped snapshots as discussed above. This may trigger an update process for the identity graph. Consequently, a second type of identification of access risk manifests as a result of the dynamic changes occurring due to the dynamic evolving nature of the identity graph (e.g., and identity management data, including event data). This type of analysis may be referred to as dynamic analysis.

Accordingly, while embodiments of an identity management system may employ static risk assessment, embodiments of an identity management system may also employ dynamic risk assessment in certain embodiments for outlier detection to detect risk based on an identity graph and data reflecting usage of entitlements over time, or from two or more graphs generated by the identity management systems from data reflecting two or more different points in time. In such dynamic risk assessment, identities with 'abnormal' dynamic patterns (e.g., usage patterns, varied attributes or entitlements) may be identified using the two or more graphs or identity management data related to events in association with those identity graphs.

Figure 20:
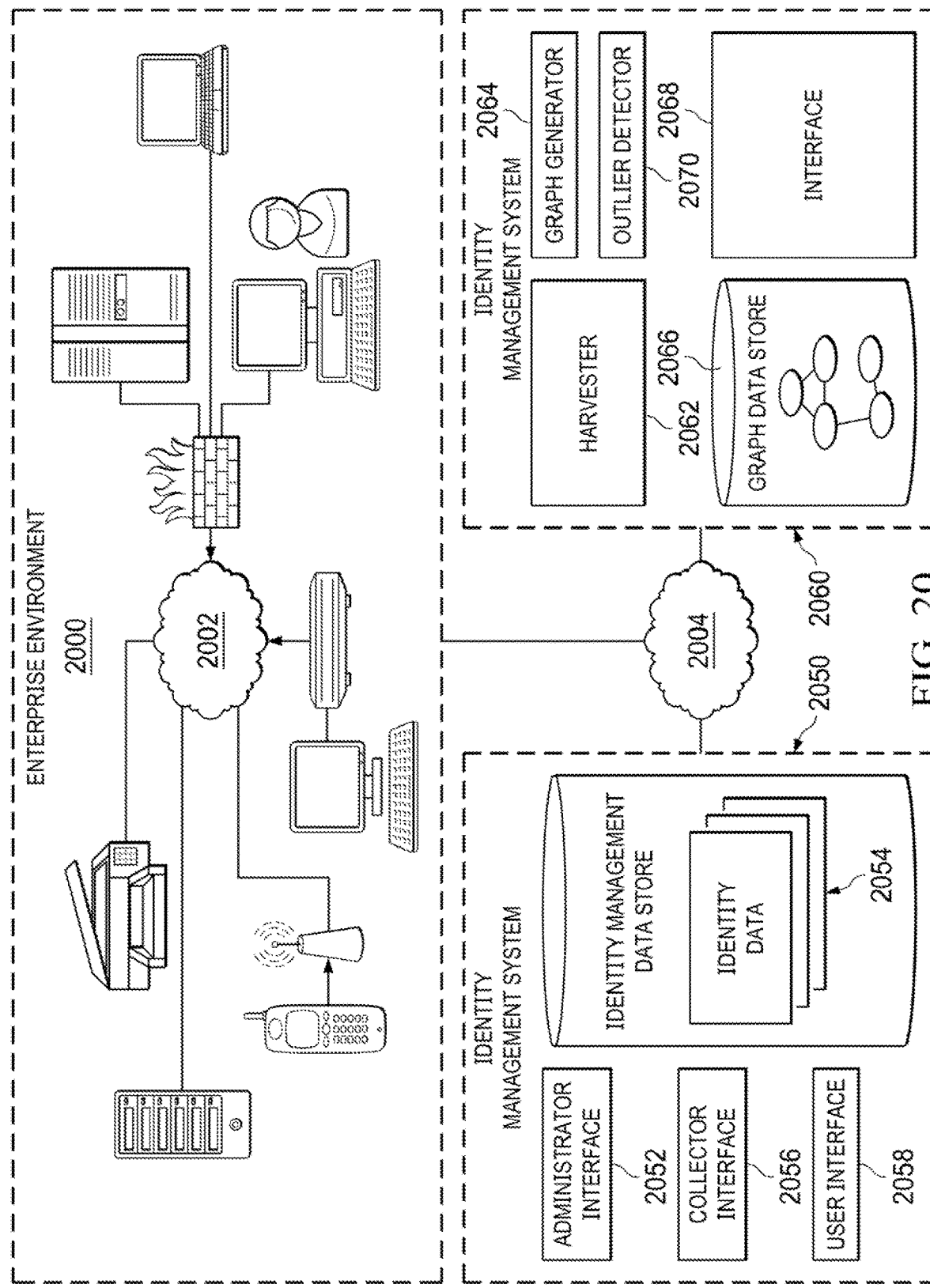
FIG. 20 is a block diagram of a distributed networked computer environment including one embodiment of an identity management system.

Referring to FIG. 20, a distributed networked computer environment including an identity management system with one embodiment of outlier detector is depicted. As discussed above, the networked computer environment may include an enterprise computing environment 2000 including a number of computing devices or applications that may be coupled over a computer network 2002 or combination of computer networks. Enterprise environment 2000 may thus include a number of resources, various resource groups and users associated with an enterprise. Users may have various roles, job functions, responsibilities, etc. to perform within various processes or tasks associated with enterprise environment 2000.

Users may access resources of the enterprise environment 2000 to perform functions associated with their jobs, obtain information about enterprise environment 2000 and its products, services, and resources, enter or manipulate information regarding the same, monitor activity in the enterprise, order supplies and services for enterprise environment 2000, manage inventory, generate financial analyses and reports, or generally to perform any task, activity or process related to the enterprise. Thus, to accomplish their responsibilities, users may have entitlements to access resources of the enterprise environment 2000. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise environment 2000 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; or for other reasons. Access risks can also arise from roles in enterprise environment 2000 which may shift, change, evolve, etc. leaving entitlements non optimally distributed among various users.

To assist in managing the entitlements assigned to various users and more generally in managing and assessing access risks in enterprise environment 2000, an identity management system 2050 may be employed. Such an identity management system 2050 may allow an administrative or other type of user to define one or more identities, entitlements, roles, etc. and associate these identities with entitlements or roles or perform other identity governance tasks using, for example, an administrator interface 2052. Examples of such identity management systems are Sailpoint's IdentityIQ and IdentityNow products. Note here, that while the identity management system 2050 has been depicted in the diagram as separate and distinct from the enterprise environment 2000 and coupled to enterprise environment 2000 over a computer network 2004 (which may the same as, or different than, network 2002), it will be realized that such an identity management system 2050 may be deployed as part of the enterprise environment 2000, remotely from the enterprise environment, as a cloud based application or set of services, or in another configuration.

The identity management system 2050 may thus store identity management data 2054. The identity management data 2054 stored may include a set entries, each entry corresponding to and including an identity management artifact (e.g., alphanumerical identifiers for identities, entitlements, roles, etc.) as defined and managed by the identity management system, a list or vector of entitlements, roles, etc. (e.g., alphanumeric identifiers for entitlements or roles) assigned to that identity by the identity management system, and a time stamp at which the identity management data was collected from the identity management system. Other data could also be associated with each identity or identity management artifact including data that may be provided from other systems (e.g., including identity management system 2060) such as a title, location or department or usage data associated with the identity or other identity management artifacts. Other types of data may include, for example, data determined when analyzing the identity management artifacts or when generating a graph representing such identity management artifacts. This type of data may include, for example, data representing a similarity between identity management artifacts such as similarities determined between identities, entitlements or roles. This data may be determined at a particular interval, or during generation of a graph (as detailed above) and may be stored, for example, as a matrix of similarities determined between each identity, entitlement or role.

Accordingly, the collectors 2056 of the identity management system 2050 may obtain or collect event data from various systems within the enterprise environment 2000 and process the event data to associate the event data with the identities defined in the identity management data 2054 to evaluate or analyze these events or other data in an identity management context. Data obtained by harvester 2062 may include usage or other event data obtained from systems within the enterprise environment. The usage or user activity data may include data obtained or reported from a third party source or application. Such usage data may include login data for accounts and the usage of various entitlements associated with those accounts. Splunk is one such example of an application from which such usage data may be obtained.

As part of a robust identity management system, it is desirable to analyze the identity management data 2054 associated with an enterprise 2000. An identity management system 2060 may include a harvester 2062 and a graph generator 2064. The harvester 2062 may obtain identity management data 2054 from one or more identity management systems 2050 associated with enterprise 2000. Graph generator 2064 may generate one or more property graphs including, for example, one or more identity graphs (e.g., including peer grouped identities), one or more entitlement graphs (e.g., including peer grouped entitlements) or role graphs (e.g., including peer grouped roles) from the obtained identity management data 2054 and store the property graph in graph data store 2066. These graphs may be stored or versioned such that one or more previously generated graphs may be stored in graph data store 2066 or can be generated from a graph currently stored in graph data store 2066. An interface 2068 of the identity management system 2060 may use an identity graph in the graph data store 2066 or associated peer groups to present one or more interfaces which may be used for risk assessment, as has been discussed.

Additionally, a user may interact with the identity management system 2050 through a user interface 2058 to access or manipulate data on identities, entitlements, events or generally perform identity management with respect to enterprise environment 2000. Including viewing of representations of the graph stored in the graph data store 2066 or requesting and viewing analysis of such graphs.

As discussed previously, it is desired in identity governance solutions to provide high quality risk assessment. Accordingly, embodiments of an identity management system 2060 may capitalize on the data obtained about identity management artifacts or the graph determined and stored in graph data store 2066 (e.g., and associated peer groups of such graphs) to facilitate the detection of 'abnormal' identities or other artifacts as outliers.

In particular, outlier detector 2070 may serve to analyze identity management data 2054 or a graph or graphs stored in the graph data store 2066 along with peer groups of the nodes of that graph (e.g., peer groups of identities, entitlements or roles) to determine various types of outliers or other anomalies within identity management data obtained or created by the identity management systems 2050, 2060. Such analysis may include analysis of the identity management data 2054 using techniques such as spectral clustering or matrix factorization or may include the use of graph based algorithms or analysis of the property graph stored in the graph data store 2066 such that these anomalies and associated representations of the graph (or data thereof) and associated identity management artifacts may be presented through the user interface 2068 of the identity management system 2060 as "high risk" (or some other indicator) to allow a user to proactively discover and prioritize vulnerabilities of access management systems.

The high risk outlier may include for example identity outliers, entitlement outliers or role outliers. Identity outlier may include identities with extremely low similarity with other identities, identities with no or few roles, identities with an extremely high or low number of entitlements, or identities associated with a structural anomaly within a property graph. Entitlement outliers may be those with extremely low similarity to other entitlements or those that are not associated with a role (or few roles) or are frequently assigned or approved but are not heavily utilized. Role outliers may include roles that are strongly similar to other roles, are highly fragmented or nested or are highly generic. Other types of outliers may also be realized and determined by embodiments as disclosed herein.

At the same time, it may enable decision support for the users with respect to proper actions to take with respect to such identified high risk identity management artifacts, including the use of autonomous, intelligent decision-support agents to provide advice or recommendations on proper actions. For example, for identities with extremely low similarity with other identities, a recommendation for certification or role mining may be provided. A recommendation for identities associated with a structural anomaly within a property graph may be to label or track that identity. Entitlement outliers may be recommended for certification or deprecation or, in the case of out of role entitlement may be recommended for assignment to a closest role. In the case of role outliers, it may be recommended to consolidate roles that are too similar to other roles, to validate highly fragmented roles, or to perform role mining if generic or dominant roles are discovered. Other recommendations may also be realized and utilized by embodiments as disclosed herein.

Such outliers and associated recommendations may, for example, be presented as part of a recommendation for decision support as described in U.S. patent application Ser. No. 16/286,289, entitled "A System and Method for Intelligent Agents for Decision Support in Network Identity Graph Based Identity Management Artificial Intelligence Systems", filed on Feb. 26, 2019 or as part of other interfaces such as those described in U.S. patent application Ser. No.

16/288,850, entitled "System and Method for Role Mining In Identity Management Artificial Intelligence Systems Using Cluster Based Analysis of Network Identity Graphs", filed on Feb. 28, 2019, both of which are incorporated herein by reference in their entirety for all purposes.

As discussed above, generally, identity attribute and entitlement data, along with other identity management data, gets harvested, updated and stored regularly as time-stamped snapshots as discussed above. This may trigger an update process for the property graph stored in graph data store 2066. The property graph (or different versions thereof) as maintained by an identity management system 2060 can thus be thought of as a dynamically evolving structure. Consequently, at least two possible modes of analysis may be used by outlier detector 2070 to identify outliers that may present access risk through the identification of anomalies using the property graph, or multiple versions thereof. The first type of identification of anomalies may take place within a particular snapshot or a single property graph from a particular snapshot. This is referred to as identification of a static anomaly or a static analysis. A second type of identification of access risk manifests as a result of the dynamic changes occurring due to the dynamic evolving nature of the identity management data and associated property graph (e.g., and identity management data, including event data). This type of analysis may be referred to as dynamic analysis.

Turning first to static analysis of identity management data in an identity management system; in general, and as pointed out previously, the use of property graphs by embodiments by outlier detector 2070 may allow the identification of noise or other patterns in peer groups. Such an ability may thus enable the identification of abnormal identities as they are represented by graph nodes with an abnormal configuration. In one embodiment, therefore outlier detector 2070 may employ static risk assessment using a property graph stored in graph data store 2066. In such static risk assessment, outlier detector 2070 may utilize a property graph, or peer groups determined from that property graph, to determine the identities (or other artifacts) with the most 'abnormal' entitlement patterns when compared to other related identities (e.g., identities in a similar department, physical location, peer group, etc.). The ability to perform such static assessment may be facilitated by the storage of the property graph in a graph data store 2066 that utilizes Neo4J or another graph database that may be utilized as graph data store 2066, as such data stores may be queried more easily and accomplished more quickly and with less overhead. The criteria used to determine whether an identity or other artifact is abnormal may be a wide variety of criteria in different embodiments, including, for example, degree of connectivity or in-betweenness of a node in the graph representing that identity, or other criteria.

Figure 21A:
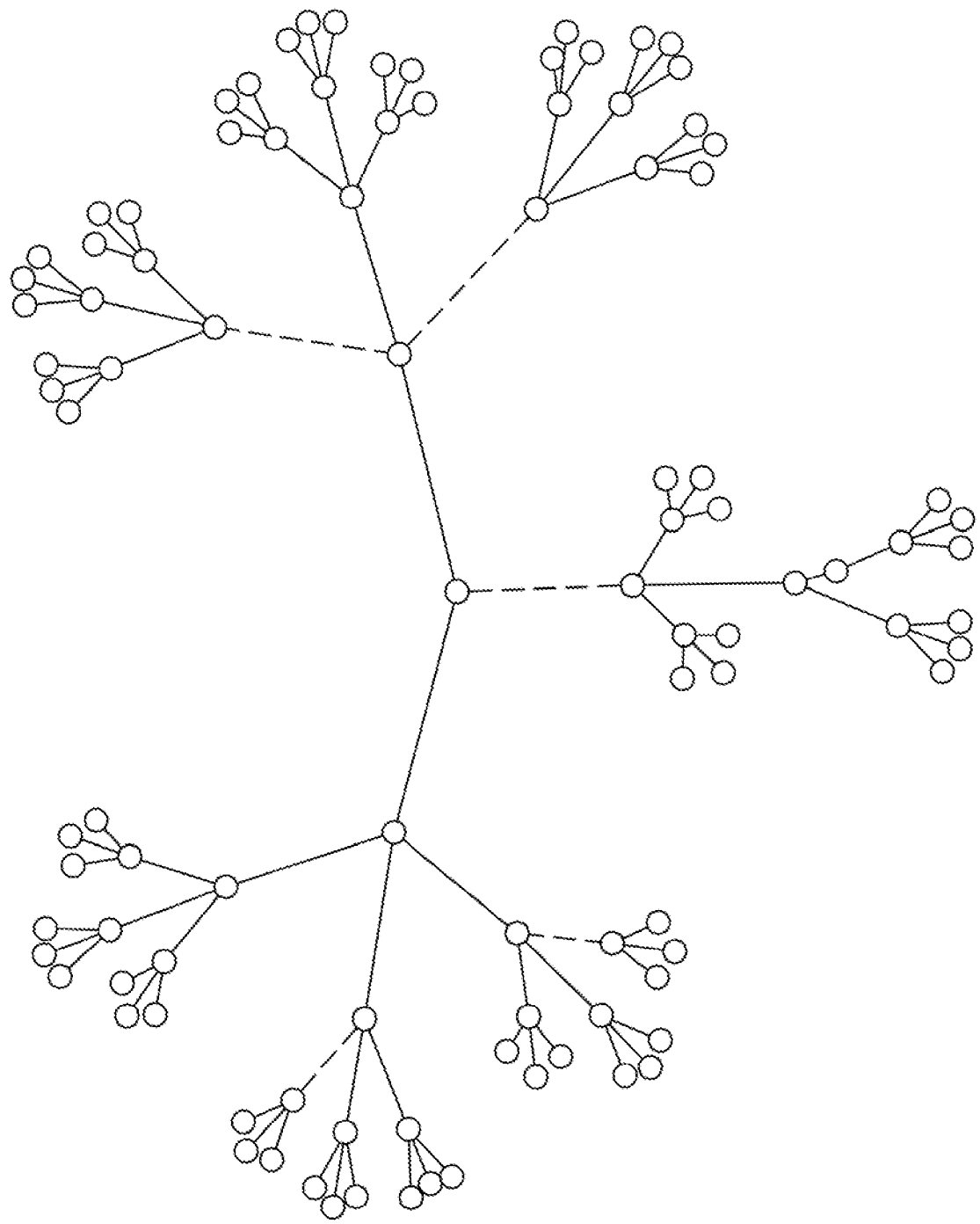
FIGS. 21A, 21B, 21C and 21D depict example visual representations of graphs.
Figure 21B:
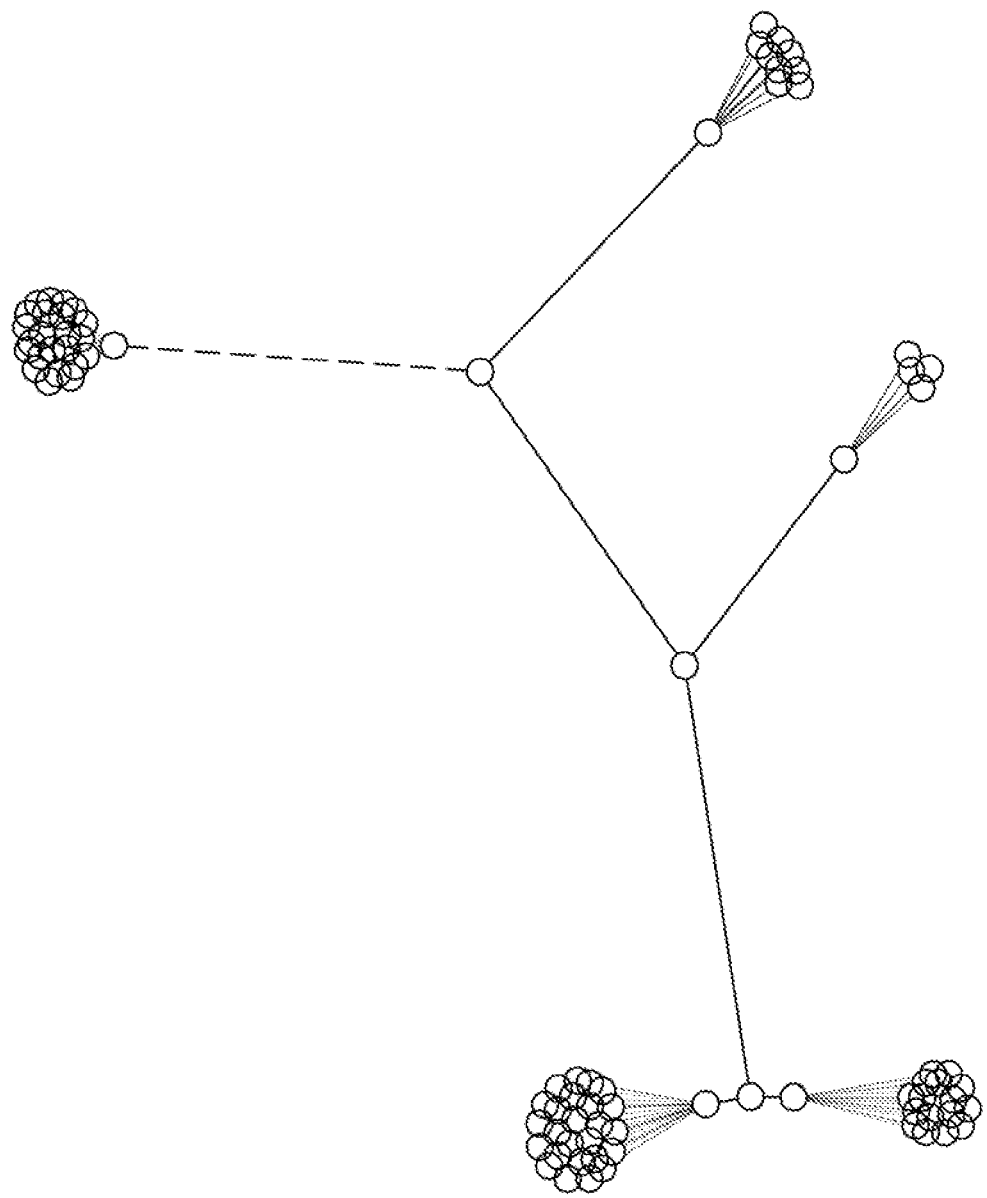

Turning first to static analysis of identity management data by outlier detector 2070; in general, and as pointed out previously, the use of identity graphs by embodiments of identity management system 2060 may allow the identification of noise or other patterns in peer groups. Such an ability may thus enable the identification of abnormal identities as they are represented by graph nodes with an abnormal configuration. Looking briefly at FIGS. 21A, 21B, 21C and 21D example representations of peer groupings within identity graphs are depicted. FIGS. 21A and 21B depict examples of normal peer groupings, while FIGS. 21C and 21D depict examples of abnormalities in peer grouping.

Figure 21D:
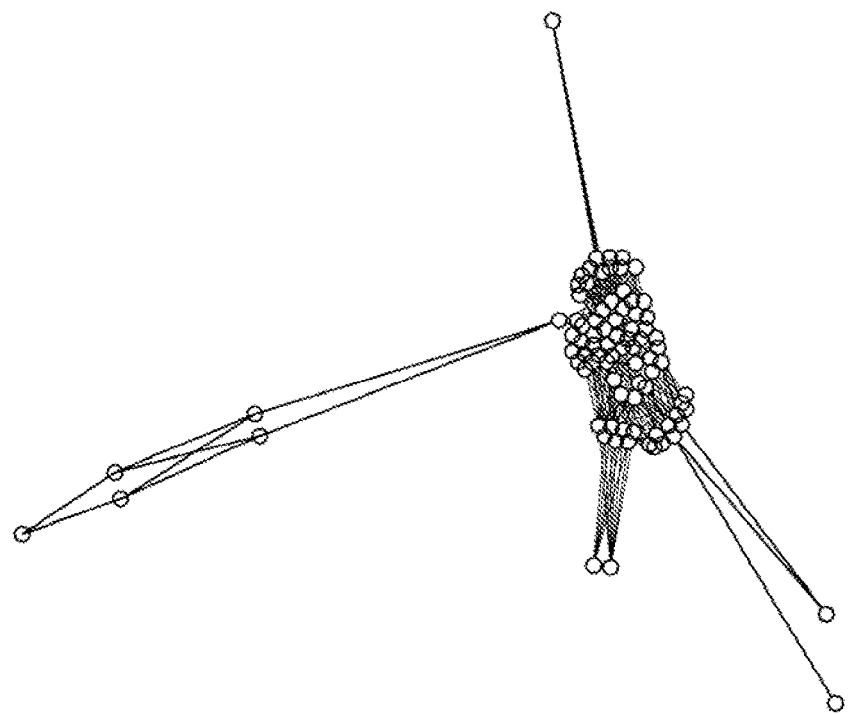
Figure 21C:
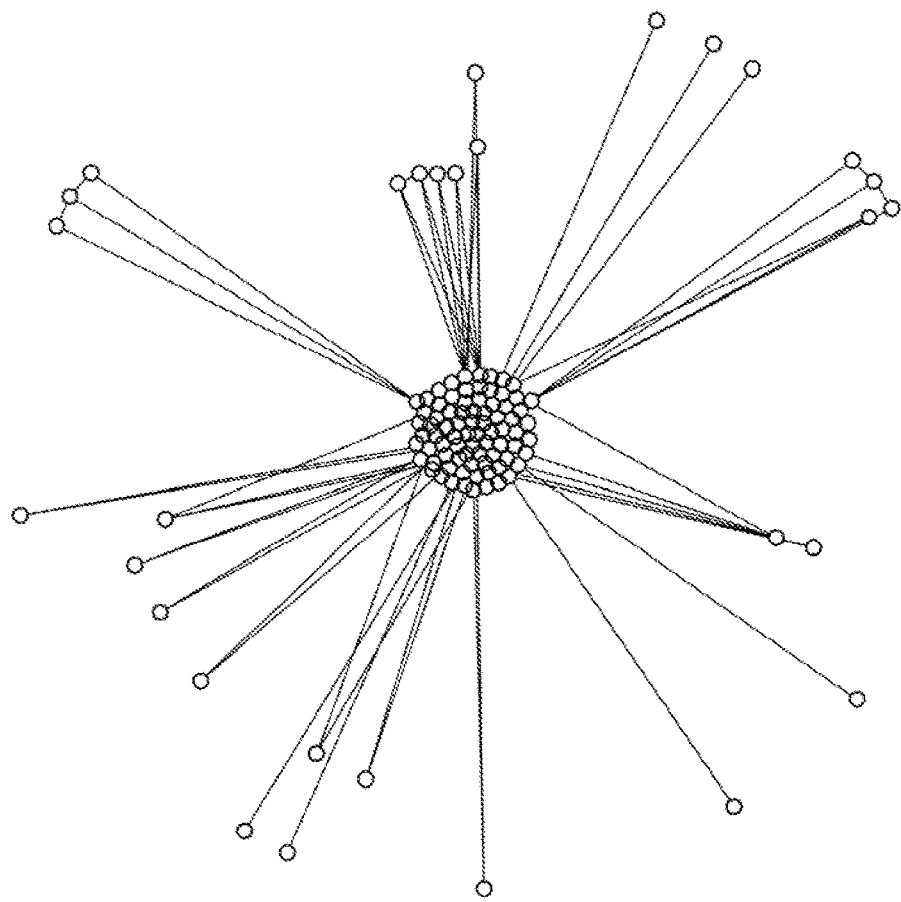

As be seen from FIGS. 21C and 21D the identities represented by several peripheral nodes are not as strongly connected to the rest of the nodes within the peer group. Overall, it can be anticipated that an optimized peer group, for the purposes of access entitlement, should be relatively homogeneous and coherent in terms of its graph topology or structure, as can be seen by contrasting these examples with the examples of FIGS. 21A and 21B.

Accordingly, embodiments of identity management systems 2060 may query a property graph to identify the certain types of nodes of the property graph (e.g., representing particular identity management artifacts) such that associated access risk may be presented to a user of the identity management system through an interface. One type of node that may be determined by outlier detector 2070 may be what is referred to as extreme identity. This may be an identity with an extremely high (e.g., over or equal to some upper entitlement threshold) or an extremely low (e.g., below or equal to some lower entitlement threshold) number of entitlements. To determine such identity nodes, the outlier detector 2070 may perform a query on the identity nodes of the graph of the graph data store base on an upper entitlement threshold or lower entitlement threshold. Outlier detector 2070 may also access the identity graph to implement an outlier detection such as Tukey's criterion, to identify identities of the identity graph with unusually high (or low) number of entitlements in a peer group. It may also be realized that in certain embodiments such a determination may be made utilizing identity management data 2054 that is not represented in a graph structure or other identity management data, as long as such identity management data includes an association between such identities and entitlements.

Another example of static risk assessment that may be performed by outlier detector 2070 is to determine identities or other artifacts (e.g., entitlements or roles) which are represented by isolated nodes in the property graph (which may be referred to as 'singletons). This isolation may indicate that all their connections' strength falls below the pruning threshold (e.g., used when the property graph is created by graph generator 2064) or are otherwise weak and, in turn, that (in the case of identities) their entitlements or entitlement patterns are rare or unique. In other words, somewhat opposite to the cluttering approach used in generating a graph, a singleton identity may have a low similarity to other identities either globally across the property graph or within a subset of identity nodes, such as identities within a department or location, identities with a particular title, etc. These identities may pose a higher risk from identity governance perspective and should be reported to a user through the interface 2068 of the identity management system 2060 for proper action (e.g., a targeted certification campaign). In a similar manner, using the entitlement graph, outlier detector 2070 may determine a singleton entitlement. These singleton entitlements may be entitlements of the property graph that are weakly, or not at all, concurrently assigned with other entitlements as part of a role or a common access pattern.

Thus, to determine a singleton identity (or entitlement the similarity (e.g., a Jaccard similarity or the like) between each of the artifact of interest (e.g., identity, entitlement or role) and every other type of the same type of artifact (e.g., identity or entitlement) may be determined. This may, for example, be determined when constructing a property graph (e.g., before pruning the graph) and stored as part of identity management data 2054, or may be determined based on identity management data to, for example in the case of identities, create a matrix with a row for each identity and a column for each identity such that value for a particular entry in the matrix the values are the computed similarity between the identities of the corresponding row and column. Such a similarity may be computed at a particular time interval such as nightly or weekly and used to determine such singleton artifacts separately from the generation of a graph (and even in the absence of such a property graph), or in conjunction with, the generation of a graph for those identity management artifacts. Thus, to determine a singleton artifact, a set (e.g., one, all, a number with the lowest similarity, etc.) of artifacts (e.g., identity or entitlement) whose similarity to all others of the same type of artifact falls below a certain singleton threshold (which may be different for different types of artifacts or artifacts with different criteria such a location, title, department, etc.) may be identified as a singleton.

FIG. 22 displays data associated with a peer grouped identity graph represented on each row. Specifically, table of FIG. 22 shows the break-down of the singleton identities with the weakest similarity connections for an example enterprise. The top most row of the table show a group of singleton identities with temporary service accounts (e.g., "Service Account", typically granted for temporary root access to Unix & Linux systems) which are still active and should be identified as singletons or outliers by an identity management system. The second row shows a group of singleton identities that are external contractors and that should be identified as singletons or outliers by an identity management system. Such external contractors may be singleton identities as a result, for example, of lack of role structure or assignment for individual contractors.

Another type of outlier that can be determined by the outlier detector 2070 is what is referred to as an out-of-role outliers. For example, out-of-role outliers sometime arise as part of the singleton outlier population. An out-of-role identity may be, for example, an identified identity that lacks a specific role assigned to it, or has a highly fragmented role assignment. An out-of-role entitlement may be an identified entitlement in the graph that is not part of any role. While not every access entitlement may be part of a role, (e.g. representing generic entitlements such as email, messaging, etc.), the out-of-role entitlements may be non-generic entitlements that are not part of any role in certain cases.

Embodiments of identity management systems may also query a property graph to identify identities with outlier entitlement patterns: these are the identities with uncommon or rare entitlement patterns relative to their 'peers' (e.g., within their peer groups, departments, pre-defined identity groups with same roles, titles, or the like). Identities with fragmented entitlement patterns may be those identities within a certain peer group, that have relatively weaker similarities due to their (e.g., unique or rare) entitlement combinations. In some cases that could be as a result of, for example, a fragmentation of entitlement patterns (e.g., possessing entitlements that are not part of common roles within the peer group).

Figure 23:
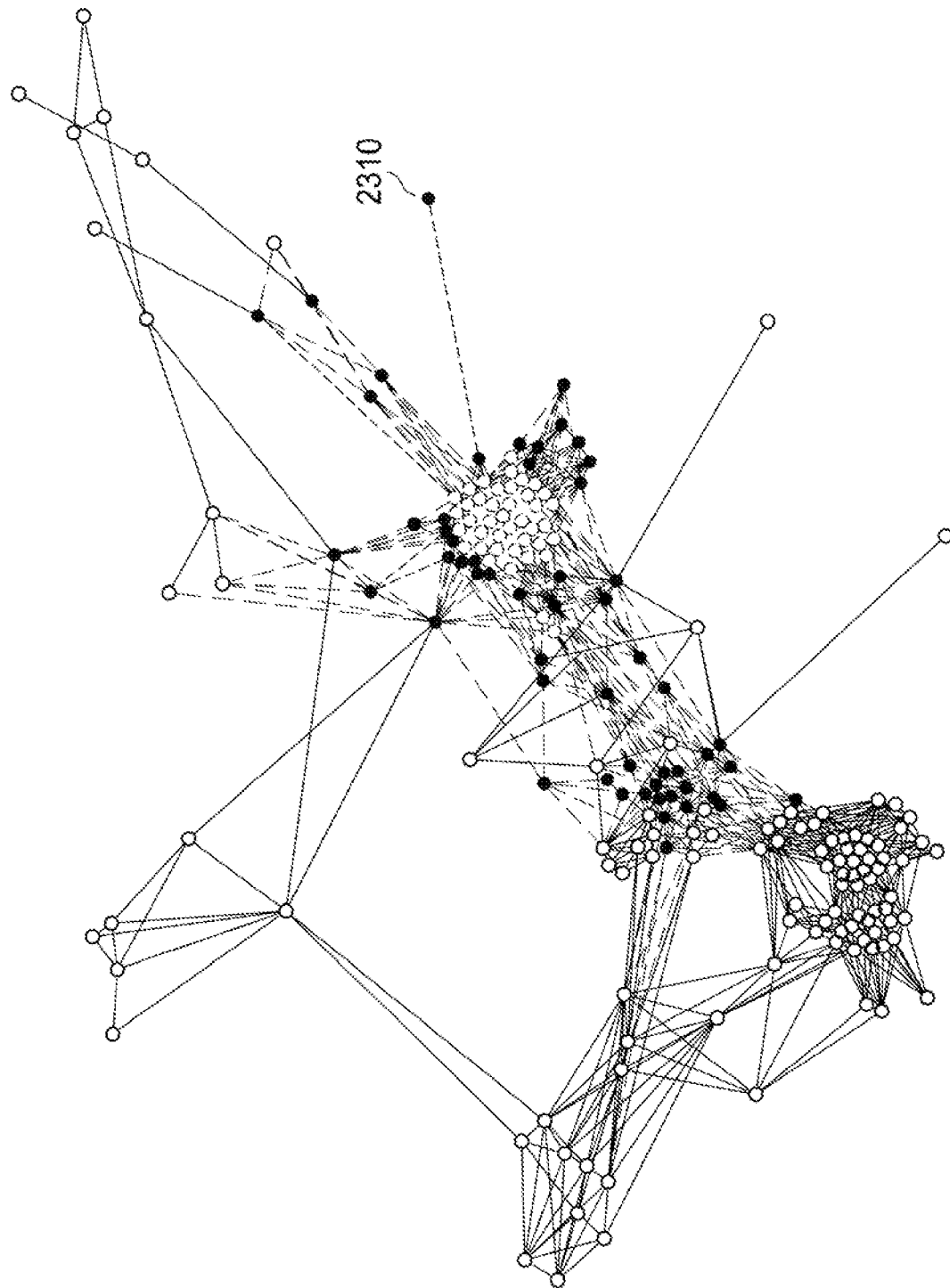
FIGS. 23-27 depicts example visual representations of a graph.
Figure 24:
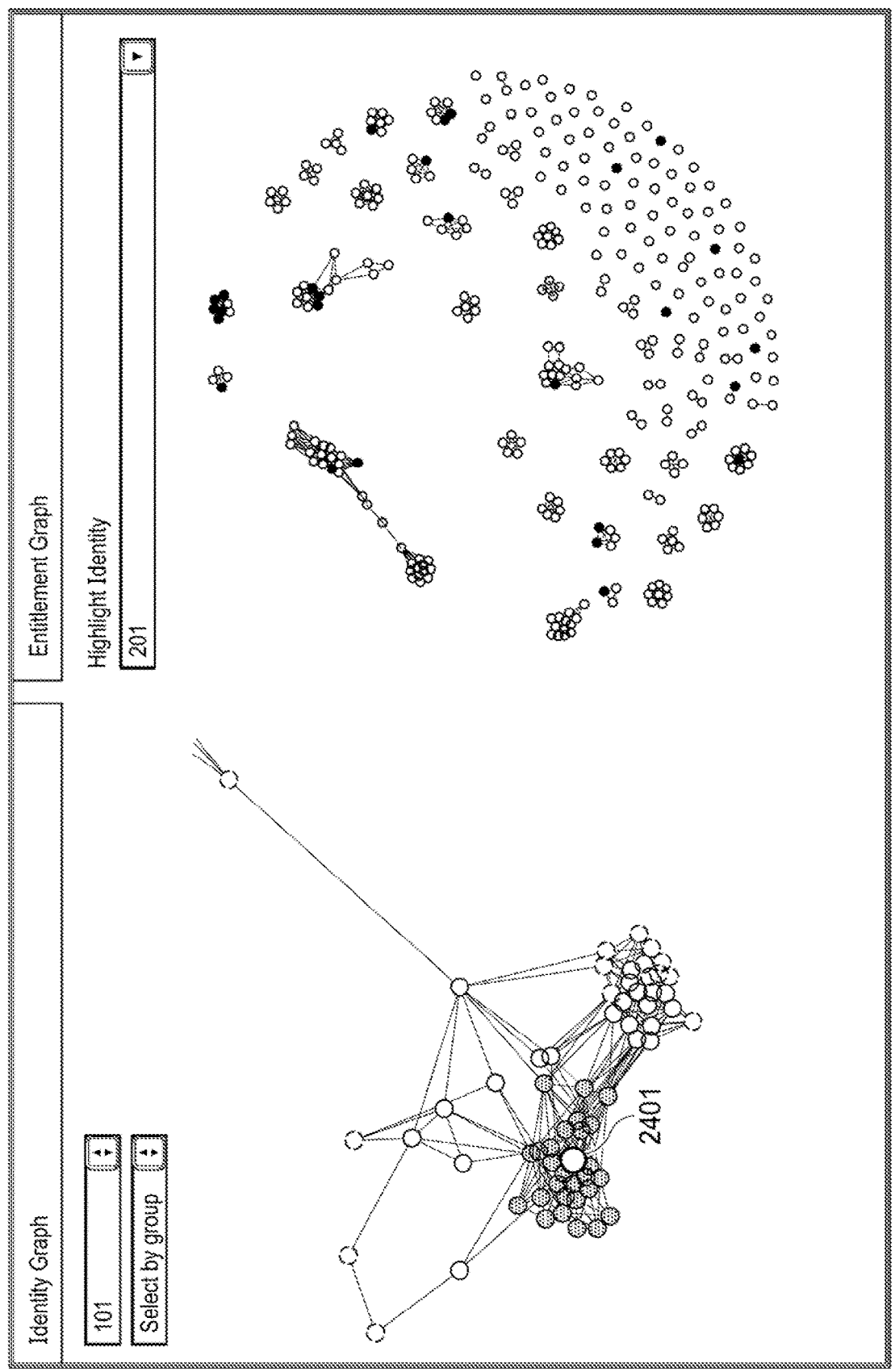

For example, FIG. 23 depicts an identity node 2310 with an outlier entitlement pattern, while FIG. 24 shows identity 2401 on the left side contrasted with that identity's (identity 2401) entitlement combination on the right side of the figure. Clustered entitlements on the right side of the figure correspond to typical roles within this particular peer group. Identities such as one like identity 2401 show highly fragmented entitlement patterns. Fragmented entitlements for an identity of a peer group could be an indicator for atypical access entitlements. Such identities may therefor pose risk as the source of discrepancy between these entitlement patterns could be due to deprecated, unauthorized, recently uncertified, or missing entitlements. Recommending a proper action (e.g., re-certifying entitlements or recommending to add missing entitlements) may cause the outlier identity to be assimilated in the clique, and thus, minimize the number of uncommon entitlement patterns, and as a result, minimize and mitigate risk to the enterprise.

Within a given peer group of the identity graph, a clique represents a group of identities with strongly similar entitlement combinations. Therefore, cliques (as well as pseudo-cliques—dense communities with almost as many edges as a clique) may represent or include the most prevalent entitlement patterns within a peer group. A 'stray' identity that is closely connected to a clique or a pseudo-clique but is not part of it indicates that the identity's entitlement pattern is slightly different from the prevalent pattern within the clique and can be identified as an identity with an outlier entitlement pattern.

Thus, to find a set of entitlements for a peer group, an identity management system can find one or more cliques within a peer group determined for the identities of the identity graph. These cliques may be determined, for example, using the igraph function in the R library of Python. For each clique then, an entitlement pattern may be determined. This entitlement pattern may be, for example, a set of entitlements common to the clique or which are shared by a large number of identities of the clique. The entitlements of identity nodes meeting a certain criteria (e.g., below a threshold for connectivity or the like) may then be compared with the entitlement pattern determined for the clique to determine a similarity between the entitlements of that identity node and the entitlement pattern of the clique. If the similarity of entitlements is below a threshold this identity node may be identified by the identity management system as an identity with an outlier entitlement pattern.

Figure 25:
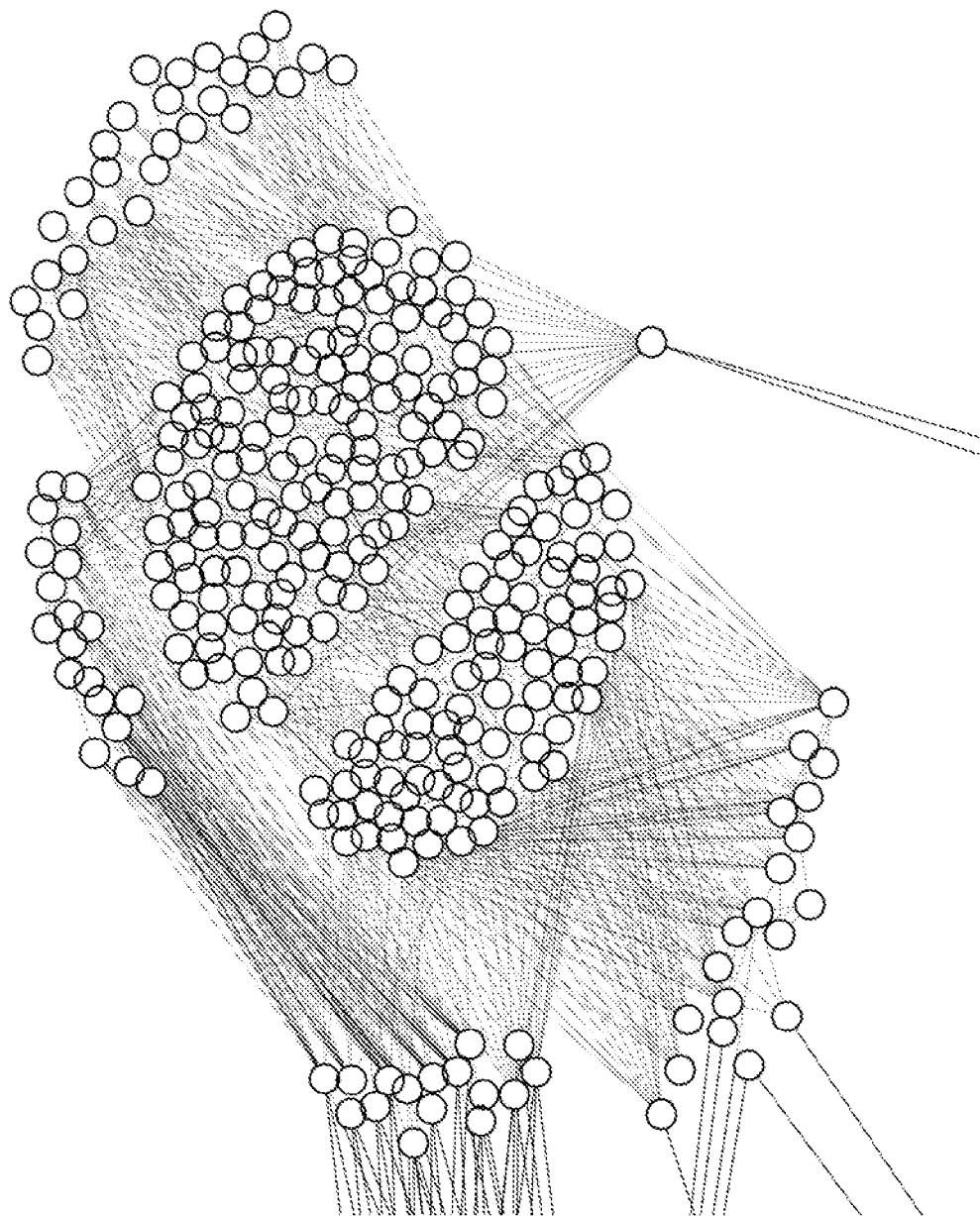

The occurrence of outlier entitlement patterns may also occur on a larger scale when, within a peer group, one or more cliques (or pseudo cliques) overlap, as shown in FIG. 25. As can be seen, overlapping identities may have connections to two or more cliques. This can be explained when two (or more) prevalent entitlement patterns (e.g., roles) have a significant overlap. Depending on the situation, a proper action in such case would be to merge the cliques by unifying the prevalent pattern (role) onto the overlapping cliques or resolve the overlap and separate the entitlement patterns (roles). In one embodiment, a graph algorithm (e.g., k-clique percolation) could be utilized by embodiments of an identity management system to resolve this situation to either unify the existing roles, or to separate them. In another embodiment, the identity management system may be configured with enterprise specific rules such that the identity management system may recommend one action over another. These rules may depend on several factors, such as for example, acceptable peer group size, how critical to the job functions the separation-of-duty implied by separation of roles is, or other criteria.

Figure 26:
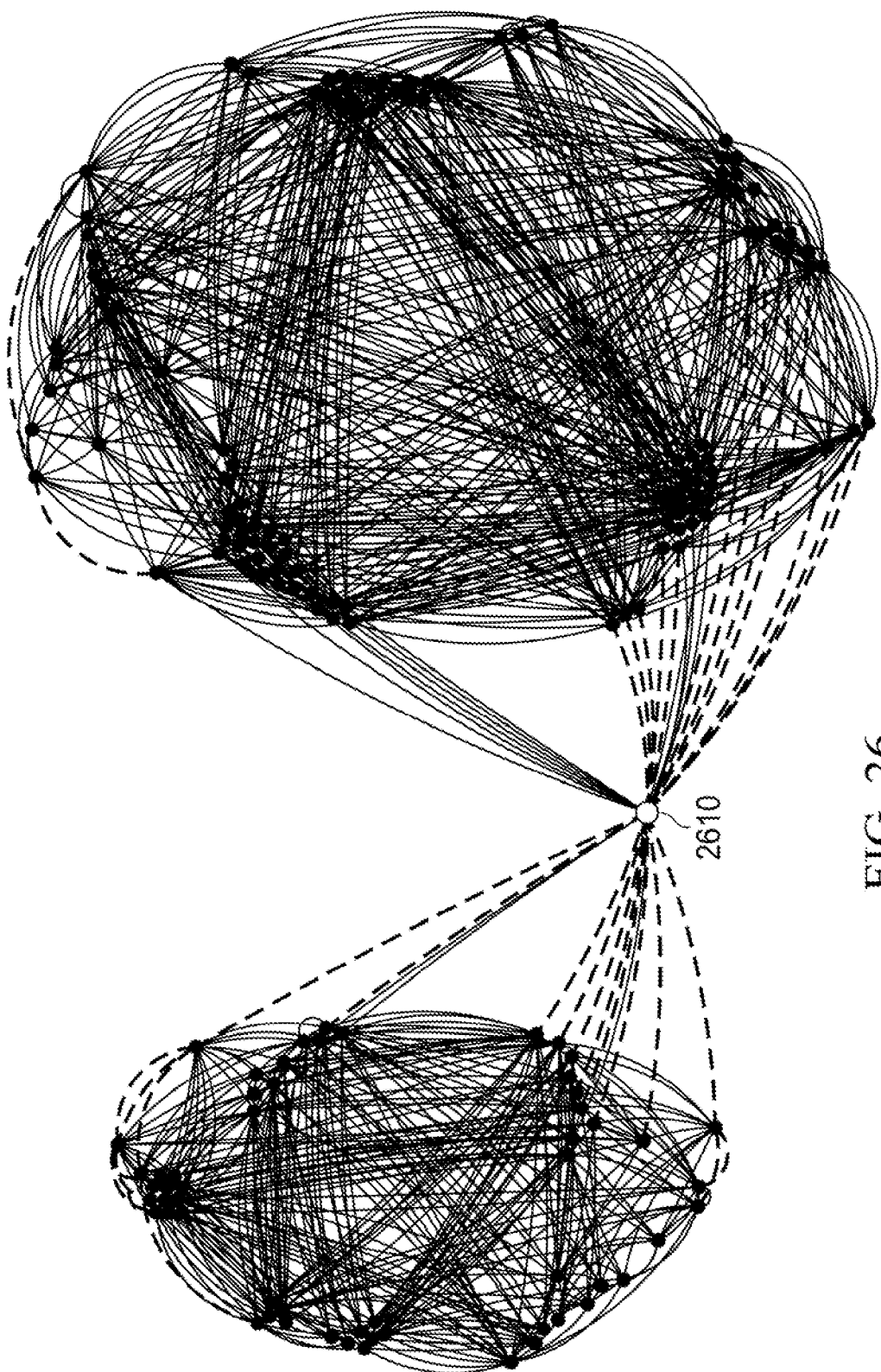
Figure 27:
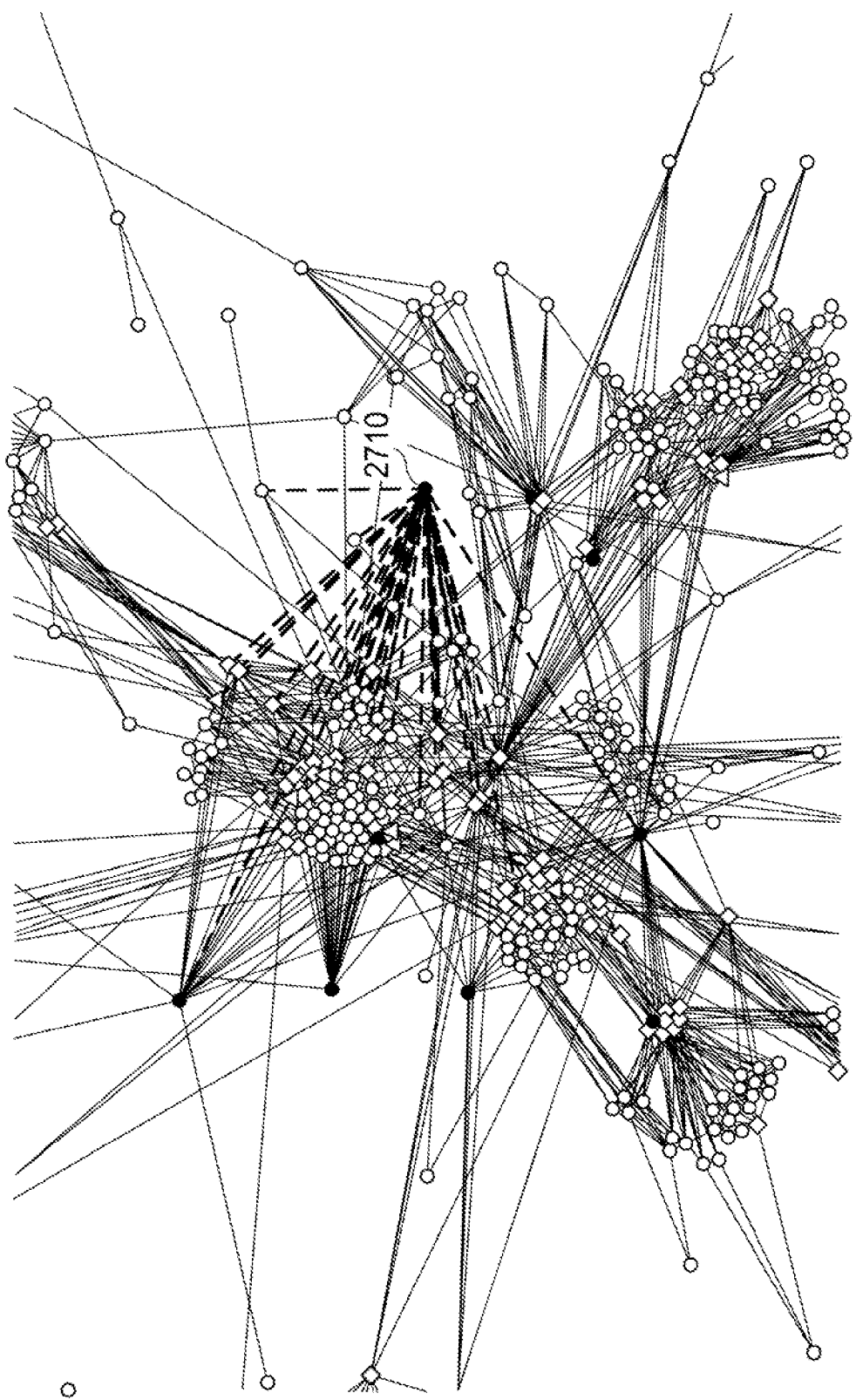

Another type of outlier that may be identified by an outlier detector 2070 is a structural outlier. Identities that are structural outliers may be identities whose representative nodes have special or non-typical configuration in the identity graph. For example, 'bridge' nodes, or nodes with high degree (e.g., or connectivity or number of edges) and in-betweenness values, which could potentially be an indication for exerting a strong influence on their peers. This may have unintended consequences, by facilitating the spread of highly privileged or expensive (e.g., per-user licensed software) entitlements. Specifically, these structural outliers may be identities whose entitlements, and hence the configuration of their strong similarity connections, put them in special locations on the graph where they may unjustifiably serve as major influencers, e.g., causing rapid and uncontrollable spread of privileged access, expensive software licenses, etc. Referring back to FIG. 5, identity node 510 is an example of such a bridge identity or structural outlier. Other examples of such outlier are depicted in FIGS. 26 and 27 which depict respectively, structural outlier identity node 2610 and structural outlier identity node 2710.

To determine such structural outliers then, outlier detector 2070 may access the property graph stored in the graph data store 2066 and run a centrality measure for each (or a subset such as those related to particular locations, departments, etc.) identity nodes of the property graph to obtain in. Such a centrality measure may be generated by, for example a betweenness centrality measure, an Eigenvector centrality measure, a Katz centrality measure, a degree centrality measure, or almost any other centrality measure desired. Each identity node with a centrality measure over (or under) some threshold may be deemed a structural outlier, or the identity nodes may be ranked by the centrality measure and a top number of them selected as structural outliers. In some embodiments, different measures of centrality may be used in tandem or combined to generate a centrality measure for a node. For example, a betweenness measure may be utilized to determine nodes which serve as bridge nodes within the property graph, however to reduce the noise generated by such betweenness measures, a connectivity measure such as degree centrality may be used with the betweenness measure to determine a centrality measure for nodes when determining identity nodes that are structural outliers.

Outlier detector 2070 may also use data harvested by harvester 2062 in association with the graph in the graph data store 2066 to identify outliers. For example, the data obtained by harvester 2062 may include usage or other event data obtained from systems within the enterprise environment. This usage or event data for the identity management artifacts represented in the graph may be used to determine entitlements (or roles) that are popular (e.g., are assigned to over some threshold number of identities) but are rarely actually utilized (e.g., below some minimum threshold of events or access).

As another example, by leveraging various graph algorithms, such as centrality measures as discussed, outlier detector 2070 may be able to determine an effective (e.g., empirical) role hierarchy from a property graph including a role graph. This determined role hierarchy could be compared with an organizational structure for the enterprise (e.g., globally or locally per location, title, etc.) to determine and highlight discrepancies to a user as potentially risky through the user interface 2062.

Thus, outlier detector 2070 may also analyze a role graph generated by graph generator 2064 to identify outlier roles. These outlier roles may include roles that are too similar (e.g., above some threshold similarly level to one another). Roles that exhibit high similarities (e.g. higher than a preset or preconfigured high threshold, e.g. 85%, 95%) may warrant a role consolidation recommendation through the user interface 2068 as such roles are almost exactly identical aside from a small portion of their entitlements. Consolidating these roles will help optimize the number of managed roles and make it easier for administrators and role owners to provision and maintain their access models.

Similarly, outlier detector 2070 may also identify outliers that are generic roles from a role graph. Outliers identified by the outlier detector 2070 may also include fragmented or nested roles. The outlier detector 2070 can query the role graph to determine roles having a number of entitlements below some entitlement threshold. Alternatively, the outlier detector 2070 may not utilize a property graph and may determine such generic roles from identity management data 2054. These generic roles (e.g., with too few entitlements) have the potential to spread to a large group of identities and may be identified as risky to a user through the user interface 2068. While fragmenting roles into groups of smaller (per number of entitlements) roles can be desirable, in certain cases this fragmentation process may result in roles becoming too generic with too few entitlements (as discussed above). In such case, the generic role and the immediate hierarchy above it should be exposed to user as potentially risky through the user interface 2062 (e.g., with recommendations to remove the identified generic roles).

While embodiments of an identity management system may employ static risk assessment, embodiments of an identity management system may also employ dynamic risk assessment in certain embodiments to detect risk based on an identity graph and data reflecting usage of entitlements over time, or from two or more graphs generated by the identity management systems from data reflecting two or more different points in time. In such dynamic risk assessment, identities with 'abnormal' dynamic patterns (e.g., usage patterns, varied attributes or entitlements) may be identified using the two or more graphs or identity management data related to event in association with those identity graphs. For instance, analyzing the event log data of an enterprise's applications, which can be obtained from identity management systems a 'normal' usage baseline may be established by modeling an aggregated (e.g., averaged, median, etc.) signal for a unit (e.g., department, peer group, etc.). Identities whose usage patterns substantially deviate from this baseline may be identified as outliers and flagged as 'abnormal' or risky identities. Events of interest may include, but not limited to, login attempts, password change, time-stamped ip-inferred user location, application access, time-stamped file access and data transfer, or the like.

Accordingly, embodiments of an identity management system may identify identities with anomalous usage patterns using the property graph. These are identities who utilize their privileged access in manners that are considerably different from the rest of their peer identities (e.g., in a peer group, department, or pre-defined business unit). Such usage patterns may in fact be indicative of serious vulnerabilities. To identify such identities, a model for entitlement usage for a peer group may be created. These models may pertain to one or more individual or aggregated usage signals per each peer group. These usage signals may include, but not limited to, login events, password changes, file or application access, session's time & duration, etc. Event data associated with each of one or more usage signals can thus be obtained by identity management system from one or more systems in enterprise. A predictive model can then be generated from the events corresponding to the usage signals of interest. This predictive model for the aggregated signal may serve as a baseline usage indicator for that peer group. Identities whose usage patterns considerably deviate from the corresponding baseline model may then be flagged by the identity management system as potential risks and recommended by the identity management system to a user for further proper action.

As another example of dynamic risk assessment that may be undertaken by an identity management system, identities with recent substantial attribute changes may be identified. By comparing identity nodes (or other types of nodes) in an identity (or other) graph created at a first time to those identity nodes in an identity graph created at a second time, identity nodes that changed in some manner (e.g., changed peer group, location, title, department, number of entitlements, etc.) may be identified and presented by the identity management system to a user as a potential risk.

It may now be realized from the discussions above, that in the context of identity governance solutions as discussed herein an improved decision support agent may be desired where that agent can be used to recommend approval or denial for an access request (e.g., an identity entitlement pair), and where that agent that may be applied easily and substantially in real-time in bulk to a large number of these access requests without loss of accuracy or efficacy.

To that end, among others, attention is now directed to the embodiments of intelligent decision support agents and artificial intelligence based identity governance systems including such agents. Embodiments of these types of intelligent agents may allow atomic (single) or multiple access requests to be submitted and will provide an approval or denial recommendation for each access request. To provide an approval or denial recommendation, the intelligent agent may utilize a classifier, such as a machine learning classifier or the like. The classifier can be trained on historical certification data, in other words, historical data on whether past access requests have been approved or denied.

In particular, in certain embodiments, the intelligent agent may enhance the obtained historical certification data by determining data for features (e.g., predictors) which represent relevant signals to the approval or denial decision. Some of these features may include primary features that may be determined based on the historical certification data and associated identity governance data. Other features may be determined from the result of intensive artificial intelligence based data analysis performed by the artificial intelligence based identity governance system. These features may be associated with, for example, a network graph utilized to peer group the identities of the distributed networked enterprise computing environment.

This enhanced data can then be used to train and deploy the classifier. When an access request is submitted to the intelligent agent, the data enhancer may be used to determine equivalent features associated with the submitted access request. The intelligent agent can then apply the trained classifier to the submitted access request (with the associated features) to obtain an approval or denial recommendation and return such a recommendation to a user.

In some cases, to obtain an accurate and useful classifier, a relatively large training dataset (e.g. thousands of historical access requests and associated approval or denials) with a high signal-to-noise ratio (e.g. with sizeable and identifiable patterns that are highly correlated with the value of the approval or denial decision) may be desired. Accordingly, there may be instances where an insufficient amount of training data has been obtained by the intelligent agent or the classifier is not otherwise trained or fully utilizable. It may still be desired, however, to provide an approval or denial recommendation when an access request is submitted to the intelligent agent.

It will now be recalled from the discussions above, that what is desired in the context of identity governance solutions as discussed herein, is an improved decision support agent that can be used to recommend approval or denial for an access request (e.g., an identity entitlement pair) that may be applied easily and substantially in real-time in bulk to a large number of these access requests without loss of accuracy or efficacy. Embodiments of artificial intelligence identity management system as disclosed herein may thus utilize embodiments of intelligent decision support agents. Embodiments of these types of intelligent agents may allow atomic (single) or multiple access requests to be submitted and will provide an approval or denial recommendation for each access request. To provide an approval or denial recommendation, the intelligent agent may utilize a classifier, such as a machine learning classifier or the like. The classifier can be trained on historical certification data, in other words, historical data on whether past access requests have been approved or denied.

In particular, in certain embodiments, the intelligent agent may enhance the obtained historical certification data by determining data for features or predictors which represent relevant signals to the approval or denial decision. Some of these features may include primary features that may be determined based on the historical certification data and associated identity governance data. Other features may be composite features generated, synthesized or otherwise determined from the result of intensive artificial intelligence based data analysis performed by the artificial intelligence based identity governance system. These features may be associated with, for example, an identity graph utilized to peer group the identities of the distributed networked enterprise computing environment.

This enhanced data can then be used to train and deploy the classifier. When an access request is submitted to the intelligent agent, the data enhancer may be used to determine values for those features (e.g., the features used to train the classifier) associated with the submitted access request. The intelligent agent can then apply the trained classifier to the submitted access request (with the associated features) to obtain an approval or denial recommendation and return such a recommendation to a user.

Figure 28:
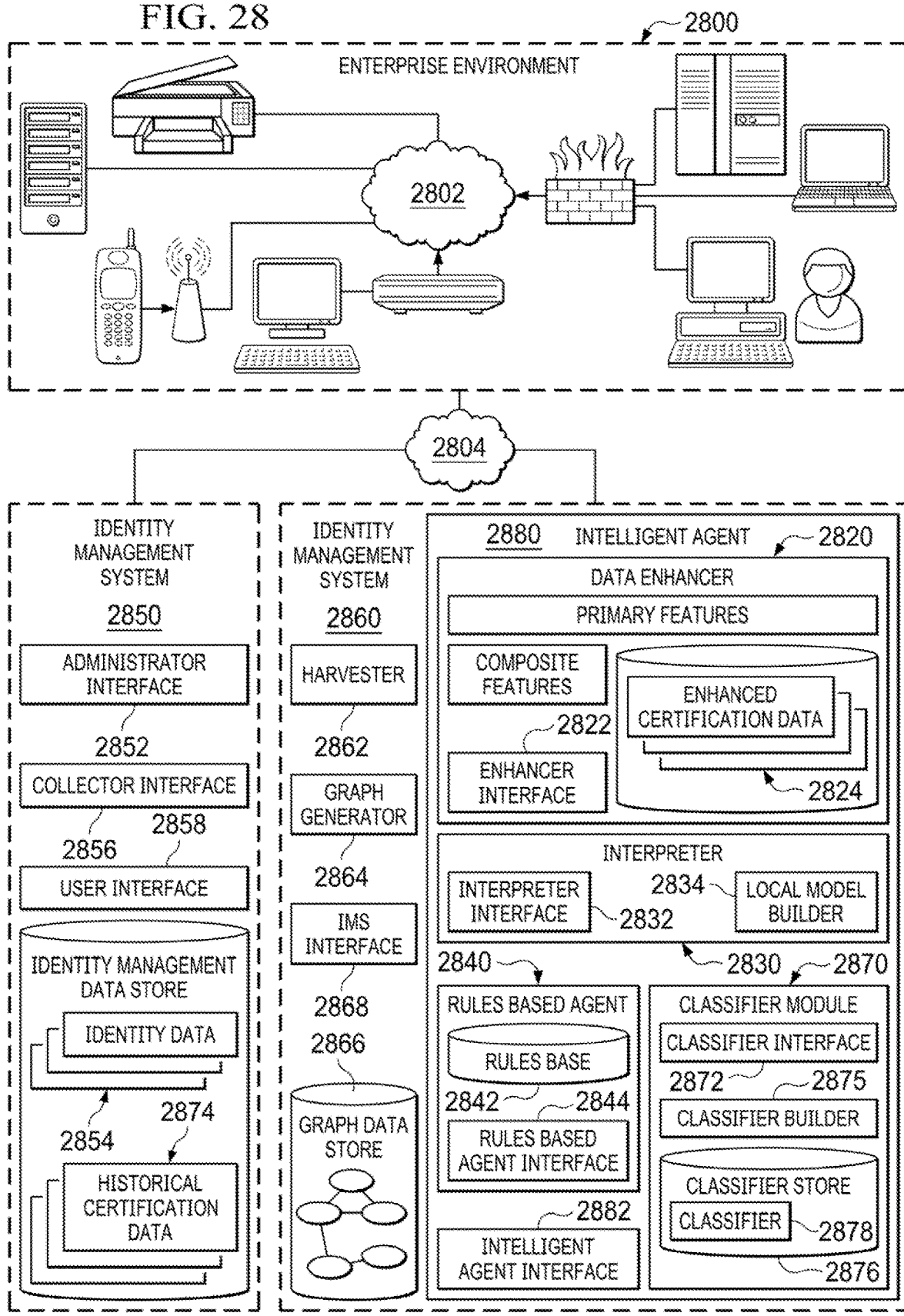
FIG. 28 is a block diagram of a distributed networked computer environment including one embodiment of an identity management system with an intelligent agent.

Referring to FIG. 28, a distributed networked computer environment including an identity management system with one embodiment of an intelligent agent is depicted. As discussed above, the networked computer environment may include an enterprise computing environment 2800 including a number of computing devices or applications that may be coupled over a computer network 2802 or combination of computer networks. Enterprise environment 2800 may thus include a number of resources, various resource groups and users associated with an enterprise. Users may have various roles, job functions, responsibilities, etc. to perform within various processes or tasks associated with enterprise environment 2800.

Users may access resources of the enterprise environment 2800 to perform functions associated with their jobs, obtain information about enterprise 2800 and its products, services, and resources, enter or manipulate information regarding the same, monitor activity in enterprise 2800, order supplies and services for enterprise 2800, manage inventory, generate financial analyses and reports, or generally to perform any task, activity or process related to the enterprise 2800. Thus, to accomplish their responsibilities, users may have entitlements to access resources of the enterprise environment 2800. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 2800 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; or for other reasons. Access risks can also arise from roles in enterprise environment 2800 which may shift, change, evolve, etc. leaving entitlements non optimally distributed among various users.

To assist in managing the entitlements assigned to various users and more generally in managing and assessing access risks in enterprise environment 2800, an identity management system 2850 may be employed. Such an identity management system 2850 may allow an administrative or other type of user to define one or more identities and one or more entitlements and associate these identities with entitlements using, for example, an administrator interface 2852. Examples of such identity management systems are Sailpoint's IdentityIQ and IdentityNow products. Note here, that while the identity management system 2850 has been depicted in the diagram as separate and distinct from the enterprise environment 2800 and coupled to enterprise environment 2800 over a computer network 2804 (which may the same as, or different than, network 2802), it will be realized that such an identity management system 2850 may be deployed as part of the enterprise environment 2800, remotely from the enterprise environment, as a cloud based application or set of services, or in another configuration.

An identity may thus be almost physical or virtual thing (e.g., entity), place, person or other item that an enterprise would like to define. An entitlement may be the ability to perform or access a function within the distributed networked enterprise computer environment 2800, including, for example, accessing computing systems, applications, file systems, particular data or data items, networks, subnetworks or network locations, etc. Each of these identities may therefore be assigned zero or more entitlements with respect to the distributed networked computer environments.

The identity management system 2850 may thus store identity management data 2854. The identity management data 2854 stored may include a set entries, each entry corresponding to and including an identity (e.g., alphanumerical identifiers for identities) as defined and managed by the identity management system, a list or vector of entitlements (e.g., alphanumeric identifiers for entitlements) assigned to that identity by the identity management system, and a time stamp at which the identity management data was collected from the identity management system. Other data could also be associated with each identity, including data that may be provided from other systems such as a title, location or department associated with the identity.

Collectors 2856 of the identity management system 2850 may thus request or otherwise obtain data from various touchpoint systems within enterprise environment 2800. These touchpoint systems may include, for example Active Directory systems, Java Database Connectors within the enterprise 2800, Microsoft SQL servers, Azure Active Directory servers, OpenLDAP servers, Oracle Databases, SalesForce applications, ServiceNow applications, SAP applications or Google GSuite.

Accordingly, the collectors 2856 of the identity management system 2850 may obtain or collect event data from various systems within the enterprise environment 2800 and process the event data to associate the event data with the identities defined in the identity management data 2854 to evaluate or analyze these events or other data in an identity management context. As part of a robust identity management system, it is desirable to analyze the identity management data 2854 associated with an enterprise 2800. Accordingly, an identity management system 2860 may include a harvester 2862 and a graph generator 2864. The harvester 2862 may obtain identity management data 2854 from one or more identity management systems 2850 associated with enterprise 2800. Graph generator 2864 may generate a peer grouped identity graph from the obtained identity management data 2854 and store the identity graph in graph data store 2866. An interface 2868 of the identity management system 2860 may use the identity graph in the graph data store 2866 or associated peer groups to present one or more interfaces which may be used for risk assessment, as has been discussed.

Additionally, a user may interact with the identity management system 2850 through a user interface 2858 to access or manipulate data on identities, entitlements, events or generally perform identity management with respect to enterprise environment 2800. As but one example, enterprises are often required by regulatory agencies or for other reasons, to conduct what is known as a certification campaign. Typically, during a certification campaign, a manager or an access entitlement owner is required to certify tens if not hundreds or thousands of identities for most, if not all, the access entitlements held by these identities. In other words, the manager or an access entitlement owner may be presented with a identity and an associated entitlement (i.e., an access request) and asked to approve or deny the assignment of the entitlement to the identity. Similarly, a manager or an access entitlement owner may be asked to evaluate access requests to approve or deny a particular entitlement to an identity.

These access requests (e.g., an identity and entitlement pair) may thus be presented to a user (e.g., a manager or an access entitlement owner) of the identity management system 2850 through the user interface 2858. The user interface 2858 can be used by the user to approve or deny the access request. If the access request is approved, the entitlement may be associated with the identity in the identity data 2854. Moreover, the identity management system 2850 can maintain a set of historical certification data 2874 associated with past certification campaigns or access requests. The historical certification data 2874 may include a set of access requests (e.g., entitlement and identity pairs), where each access request may be associated with an approval or denial decision (e.g., whether the access request was approved or denied by the user through the interface 2858) and a time (e.g., timestamp) when the approval or denial of the access request (or campaign) occurred.

As discussed previously, it is desired in identity governance solutions to provide a decision support agent that can be used to recommend approval or denial for an access request (e.g., an identity and entitlement pair) that may be applied easily and substantially in real-time in bulk to a large number of these access requests without loss of accuracy or efficacy. Accordingly, embodiments of identity management system 2850 may provide a decision support tool through the user interface 2858. In this manner, when a user is presented with one or more access requests through the user interface 2858 (e.g., during a certification campaign or the like), the user may indicate through the user interface 2858 that a recommendation is desired. An approval or denial recommendation can then be determined and presented to the user through the decision support tool of user interface 2858.

To provide such a decision support recommendation tool, identity management system 2860 may include intelligent agent 2880. Intelligent agent 2880 may include an interface 2882. When a request for a recommendation for one or more access requests is received from the user through the user interface 2858, a request to determine a recommendation for each of those access requests can be submitted to the intelligent agent from the identity management system 2850 (e.g., or user interface 2858 or other component of identity management system 2850) through the interface 2882, where the request may include the access requests (e.g., identity and entitlement pair). The intelligent agent 2880 can accurately determine recommendations for approval or denial on a case-by-case basis, but at the same time may be adapted to apply these decisions in bulk. Note here, that while the identity management system 2850 has been depicted in the diagram as separate and distinct from the identity management system 2860 and coupled to identity management system 2860 over a computer network 2804, it will be realized that such an identity management system 2850 and identity management system 2860 may be deployed as part of the same identity management system or different identity management system, as a cloud based application or set of services, or in another configuration entirely.

To determine an approval or denial recommendation for one or more access requests, intelligent agent 2880 may include classifier module 2870. Classifier module 2870 may, in turn, include a classifier builder 2875 for training a classifier 2878 based on a set of features associated with historical certification data. This classifier 2878 may include a machine-learning classifier (or model) trained on the features that is adapted to detect existing patterns in the data and 'learn' the underlying rules to enable it to make an accurate recommendation on an access request.

As such, when a request for recommendations for one or more access requests are received through the intelligent agent interface 2882, the intelligent agents 2880 may submit these access requests to the classifier module 2870 in a request for a recommendation through the classifier interface 2872. The classifier module 2870 can then determine a set of features for each access request corresponding to the features used to train classifier 2878 (e.g., which may stored in a data store 2876). For each access request, the access request and associated features can then be submitted to (or used to query) the classifier 2878. The classifier 2878 will then return an approval or denial decision for that access request. The approval or denial recommendation for each access request can then be returned through the classifier interface 2872 to the intelligence agent 2880 which returns the approval or denial recommendation for each access request to the initial request from the identity management system 2850 where these approval or denial recommendations can be returned through the decision support tool of the user interface 2858.

To create embodiments of such a classifier 2878, it may need to be trained on a dataset comprised of 'features' or 'predictors' which represent relevant signals to an approve/deny decision. Thus, the training data used the classifier builder 2875 may be a set of historical certification data, comprising a set of access request (e.g., identity and entitlement pairs) along with a set of features associated with that access request and the historical approval or denial decision for that access request. This historical certification data may, for example, be represented as set of rows in a table, each row corresponding to a historical access request decision and including values for the associated set of features as is depicted above. As may be realized, a careful feature selection and generation process may be utilized to make sure a consistent and highly relevant data set is produced. An accurate classifier may require a sufficiently large training dataset with a high signal-to-noise ratio, (e.g., with sizeable and identifiable patterns that are highly correlated with the value of the 'label', i.e. the approve/deny decision). Given that such dataset relies on prior historical certification and/or access request events, great care has to be exercised to make sure that the values of any of the predictor columns are correctly synced with the corresponding decision.

To determine values for features that may be utilized in training classifier 2878 (and in submitting access requests to classifier 2878 for an approval or denial recommendation) intelligent agent 2880 may also include data enhancer 2820. Accordingly, when classifier builder 2875 is training classifier 2874 it may request enhanced certification data 2824 from the data enhancer 2820 through the enhancer interface 2822. The data enhancer 2820 can retrieve the historical certification data 2874 from the identity management system 2850, and enhance this historical certification data 2874 with one or more determined, generated or synthesize features (collectively determined composite features) not present in the original historical certification data 2874. The resulting enhanced certification data 2824 may thus include primary features—existing data that is harvested from the enterprise in association with historical certifications and stored in historical certification data 2874, and composite features—data for features of an access request that can be determined by the data enhancer 2820. These composite features may include features determined based on the identity graph as stored in graph data store 2866 as discussed above.

Data enhancer 2820 can thus obtain historical certification data from the identity management system 2860. This data may include a set of access requests (e.g., entitlement identity pairs, where each entitlement or identity may be identified by a corresponding alphanumeric identifier) along with a historical approval or denial decision for that access request, a time stamp indicating when the approval or denial decision took place. The data enhancer 2820 can reference identity data 2854 to determine additional data associated with the identity and entitlement of each access request, including for example, a title, location, group or department associated with the identity, an identification of whether an entitlement is a privileged entitlement, or other data associated with the identity or entitlement. These features may, in turn, be used to determine values for other primary features.

In one embodiment, a primary features that may be determined for a given access request (e.g., an identity entitlement pair) may include the historical (e.g. over last 3, 6, 12 months or another time period) popularity or density of the given entitlement within the identity's department, group of common titles, location, or peer group as discussed above. Specifically, identity data 2854 (or the identity graph) may be evaluated to determine all identities associated with some grouping associated with the identity of the access request. For example, all identities in that identity's department or location may be determined. As another example, the property graph may be queried to determine a peer grouping of the identity graph associated with the identity of the access request and all identities of that peer group determined. For all the identities for the given grouping (e.g., department, location, peer group, etc.), the percentage or other metric of identities within that group that have the entitlement of the access request can then be determined and associated with the access request as a value for that primary feature.

A primary feature that may be determined for a given access request may also include the trending (e.g. over the last 3, 6, 12 months or another time period) percentages of approvals or denials of the entitlement of the access request within the identity's department, group of common titles, location, or peer group as discussed above. Here, identity data 2854 (or the identity graph) may be evaluated to determine all identities associated with some grouping associated with the identity of the access request. For example, all identities in that identity's department or location may be determined. As another example, the identity graph may be queried to determine a peer grouping of the identity graph associated with the identity of the access request and all identities of that peer group determined. For all the identities for the given grouping (e.g., department, location, peer group, etc.), the historical certification data 2874 can be evaluated to determine any (historical) access requests for those identities that have approved or denied within the given time period (e.g., based on the time stamps associated with the access requests of the historical certification data 2874). From this set of access requests in the historical certification data 2874 the approval or denial data (e.g., decision) associated with each of these historical access requests for the grouping of identities may be used to determine the percentage of approval or denials and this percentage associated with the given access request as a value for that primary feature.

Other examples of primary feature that may be determined and associated with an access request are flags for specific attribute values or recent changes (e.g. is an identity have no historical certification data 2874, how many times within a historical time period has the identity of the access request been certified for same entitlement, have any attributes or properties of the identity of the access request changed within a historical time period, have any attributes or properties of the identity of the access request changed within a historical time period (e.g. any recent entitlement privilege level changes). Other primary features that may associated with a given access request in the context of identity management may also be utilized and are fully contemplated herein.

In addition to the values for primary features for the set of access requests of the historical certification data 2874, data enhancer 2820 may also determine value for composite features for the historical access request. In one embodiment, one or more of these composite features may be determined based on the identity graph created by the identity management system 2860. It will be noted here that the identities and entitlements of an enterprise may be quite fluid. Thus, the identity graph (which may be updated on a regular basis by the identity management system 2860) may be quite fluid as well. As such, for those composite features for an access request determined from the identity graph it may be desired to determine such composite features using an identity graph from a contemporaneous time period (e.g., within a certain time threshold) of the access request. Accordingly, historical version of the identity graph may be stored in the graph data store 2866. These historical versions of the identity graph may be separate property graphs or a property graph property may include past versions of the property graph by, for example, maintaining nodes or associated time stamps for when those nodes were created or changed. In this manner, when determining a composite feature for an access request, the time stamp associated with that access request in the historical certification data 2874 may be determined, and a version (e.g., current or past version) of the identity graph may be obtained by querying the identity graph or identity graph store 2866 with the time stamp associated with the access request to determine the version of the identity graph closest in time to the time stamp of the access request. This version of the identity graph may then be utilized when determining values for identity graph based composite features for that access request.

Specifically, in one embodiment, for an access request (e.g., an identity entitlement pair) these composite features determined by data enhancer 2820 may include a shortest distance (e.g., as defined as the minimum number of edges from the given identity to the given entitlement in the identity graph stored in the graph data store 2866). The property graph can thus be queried based on the identity of the access request to find the shortest distance to the node representing the entitlement of the access request. The shortest distance as determined from the property graph, in terms of the length of the shortest path(s) from the identity node to the entitlement node, may be associated with the given access request as a value for that composite feature. If there are no feasible paths from identity to the entitlement, or if the returned response is greater than a pre-determined threshold, for querying performance purposes, then the value for this feature may default to infinity or null.

Another composite feature for an access request may be the historical (e.g. over last 3, 6, 12 months or another time period) popularity or density of the given entitlement within the group of immediate peers to the given identity in the identity graph. A peer may be defined as identities with similarity relationship having a score over a certain threshold (e.g. with similarity weights 0.80 or higher). Thus, for this feature, the property graph may be queried with the identity of the access relationship to determine all identities having a similarity relationship to the given identity above the threshold. For all the determined peer identities, the percentage or other metric of identities within that group that have the entitlement of the access request can then be determined and associated with the access request as a value for this composite feature.

Similarly, a composite feature that may be determined for a given access request may also include the trending (e.g. over the last 3, 6, 12 months or another time period) percentages of approvals or denials of the entitlement of the access request within the group of immediate peers to the given identity in the identity graph. Here, the property graph may be queried with the identity of the access relationship to determine all identities having a similarity relationship to the given identity above the threshold. For all the identities that are immediate peers to the given identity, the historical certification data 2874 can be evaluated to determine any (historical) access requests for those identities that have approved or denied within the given time period (e.g., based on the time stamps associated with the access requests of the historical certification data 2874). From this set of access requests in the historical certification data 2874, the approval or denial data (e.g., decision) associated with each of these historical access requests for the grouping of identities may be used to determine the percentage of approval or denials, and this percentage associated with the given access request as a value for the composite feature.

Other types of composite features, including those that are identity graph based may also be used. For example, certain flags for identity graph related attribute values or recent changes may be determined for an access request and included as values for composite features. These flags may indicate a value for a composite feature representing if the node representing the identity of the access request a singleton (no strong similarity to anyone) in the identity graph.

Another flag for another composite feature may pertain to any recent identity graph changes associated with the identity or entitlement of the access request. Such as, if the identity has changed peer groups within a certain historical time period, if the entitlement of the access request had a change in associations (e.g., is associated with different roles) or if the entitlement of the access request a singleton or an outlier in the identity graph. Other composite features that may associated with a given access request in the context of identity management, including those that may be determined from an identity graph as discussed herein may also be utilized and are fully contemplated.

The below table list one example of historical certification data, where a row corresponds to an access request having an entitlement and identity pairs, along with data determined for a set of values for features and an approval or denial decision (here labeled as "response" where a value of "1" indicates approval and "0" indicated denial).

the modeling complexity for the next iteration. This iterative refinement can then be repeated. The training process may stop when a certain criterion is satisfied. In one embodiment, the stopping criteria is reached as certain errors are minimized. The resulting classifier 2878 can then be evaluated, utilizing several performance metrics, (e.g., Area Under Curve of Receiver Operating Characteristic or Precision/Recall curves, minimum per-class accuracy, F1, F2, FN scores, Sensitivity/Specificity, etc.) A proper threshold may then be selected to maximize performance on the hold-out testing set.

Classifier builder 2875 can then test the trained classifier's 2878 accuracy and performance on the hold-out dataset. The classifier 2878 may be deployed only if it satisfies certain minimum performance criteria in order to maintain certain performance metrics and trigger warnings or retraining in cases where these metrics are not satisfied. If such criteria are met the classifier 2878 may be deployed or otherwise

| identity_id | entitlement_id | certEnt12Mon | approval Title 12Mon | approval Location 12Mon | density Department 12Mon | density Title 12Mon | density Location 12Mon | response |
|---|---|---|---|---|---|---|---|---|
| 8a84cb6f60017 61501600fd1b ba01008 | 8a84cb706488adf a01648bcc960b5 90e | −1 | −1 | −1 | −1 | −1 | −1 | 1 |
| 8a84cb6f600F7 61501600f1d1d 9a81175 | 8a84cbe4479b22 e60147a7abea0a 1ed9 | −1 | −1 | −1 | 4 | −1 | −1 | 0 |
| 8a84cb6f60017 61501600fd1e 1f511ce | 8a84cb70612fffd 401614f1ba5c755 d5 | −1 | −1 | −1 | −1 | −1 | −1 | 1 |
| 8a84cb6f60017 61501600fd20 3291387 | 8a84cb70600f785 e01600fd58fd200 e6 | −1 | −1 | −1 | 3.09 | 3.85 | 2.18 | 0 |
| 8a84cb6f60017 61501600fd25 38b17c0 | 8a84cb7060e567 c10160e820782e 4505 | −1 | −1 | −1 | 4.12 | 2.78 | 4.09 | 1 |

The enhanced certification data 2824 determined and stored by the data enhancer 2824 may thus include a set of (historical) access requests and associated time stamps, a decision associated with each access request (e.g., approval or denial) and for each access request values for a set of primary and composite features as discussed. Classifier builder 2875 may utilize this enhanced certification data 2824 to train the classifier 2878. In one embodiment, for example, the classifier 2878 may be an eXtreme Gradient (XG) Boost model implemented in the H$_2$O machine learning platform. It will be apparent, however, that other classifiers may be utilized in association with embodiments herein, and similarly built on the features as disclosed herein without loss of generality.

Classifier builder 2875 may thus execute as a triggered or scheduled service that queries the enhanced certification data 2824 to form a data set of enhanced certification data 2824 corresponding to the enterprise 2800 and train the classifier 2878 accordingly. Specifically, in one embodiment the classifier builder 2875 may train an XGBoost classifier 2878 by randomly splitting the enhanced certification data 2824 into three parts or sets: training, validation, and testing, such that 80-90% of the data may be in the training set, 5% may be in the validation set and 15-5% of the data may be in the testing set. The classifier builder 2878 may run the training process iteratively by observing patterns in data and making estimated decisions. The classifier builder 2875 then utilizes the validation set to measure accuracy during training and make adjustments (if needed) to correct and improve stored for use by the classifier module 2878 when a request for an approval or denial recommendations for an access request is received, as will now be discussed in more detail. In one embodiment, the classifier 2878 may be deployed as a Java ARchive (JAR) file with a REpresentational State Transfer (REST) interface.

As may be recalled, embodiments of identity management system 2850 may provide a decision support tool through the user interface 2858. In this manner, when a user is presented with one or more access requests through the user interface 2858 (e.g., during a certification campaign or the like), the user may indicate through the user interface 2858 that a recommendation is desired. An approval or denial recommendation can then be determined by the intelligent agent 2880 and presented to the user through the decision support tool of user interface 2858. Such a recommendation may also be determined in advance of presenting the access request to the user for approval or denial such that a recommendation may be presented to the user (e.g., initially) in association with the access request for approval or denial.

A request for recommendations for one or more access requests may thus be received (e.g., from the identity management system 2850 or user interface 2858) through the intelligent agent interface 2882. As may be understood, the training of classifier 2878 may require a certain threshold amount of historical certification data or a certain amount of training time to achieve a desired performance metric. An embodiment of an intelligent agents 2880 as disclosed may therefore also include a rules based agent 2840. This rules based 2840 may include a set of access request evaluation rules 2842 one or more of which may be applied to an access request to determine an approval or denial recommendation and return such a recommendation to a user. The rules 2842 applied by the rules based agent to determine such a recommendation may be based on criteria that may be determined with respect to, or utilizing, the identity graph stored in the graph store 2866. The rules based agent 2840 may use a single rule or a combination of rules to determine an approval or denial recommendation for a submitted access request. In one embodiment, for example, a score may be determined based on a number of rules the access request does (or does not) meet and this score compared to a threshold to determine an approval or denial recommendation for an access request.

For example, a rule employed by a rules based agent 2840 may be based on a shortest distance as determined from the property graph, in terms of the length of the shortest path(s) from the identity node to the entitlement node or the number of "hops" or edges in a path between the entitlement and the identity of an access request in the identity graph. If there are no feasible paths from identity to the entitlement, or if the returned response is greater than a pre-determined threshold, for querying performance purposes, then the value for this feature may default to infinity or null. This shortest distance of number of hops may be compared to a threshold to determine if an approval or denial recommendation should be provided by the rules based agent 2840. As another example of an identity graph based rule, an approval recommendation may be determined for an access request by the rules based agent 2840 if the entitlement of the access request is associated with any one of a number of (e.g., the 10 closest) peers of the identity of the access request as determined from the identity graph.

Other rules may be used by rules based agent 2840 in association with the identity graph based rules or as standalone rules. For example, another rule may determine if an approval or denial should be recommended for an access request based on whether a certain risk level or type of risk is associated with the entitlement of an access request, or if the entitlement of the access request has ever been approved or certified for the identity of the access request. Other rules that may be used by the rules based agent to determine an approval or denial recommendation for an access request may be based on if any other identity with the same department, location, or job title as the identity of the access requests has the entitlement of the submitted access request or if a threshold percentage of the identities of the same department, location, or job title as the identity of the access requests have the entitlement of the submitted access request. Other types of identity graph based rules, other types of rules, or combinations thereof may be employed by embodiments of rules based agent 2840 and are fully contemplated herein.

Thus, when a request for an approval or denial recommendation for an access request is received by an intelligent agent 2800, the intelligent agent 2880 may determine if a classifier 2878 has been trained or deployed. If no classifier has been trained or deployed, a rules based agent 2840 may be utilized. Such a rules based agent 2840 may be used, for instance for enterprises 2800 that lack high quality governance data to train the classifier 2878. Such a rules based agent 2840 may be utilized, for instance, for a limited time period to help establish a baseline data set for certification data that a future classifier module 2870 could use for training.

In some embodiment therefore, the intelligent agent 2880 may apply the data enhancer 2820 to determine features (e.g., primary or composite features) associated with the submitted access request. The intelligent agent can then request a recommendation for the access request through the rules based agent interface 2844. When the request and associated access request are received by the rules based agent 2840, the rules based agent 2840 may apply the rules 2842 to the submitted access request (with the associated features in embodiments where such features are determined) to obtain an approval or denial recommendation and return such a recommendation. This recommendation can then be returned by the intelligent agent 2880 and eventually to the user through the user interface 2858. A user's response (e.g., the user's actual approval or denial of the access request) can then be recorded. In this manner, not only are embodiments of intelligent agents and artificial intelligence based identity management systems able to provide a recommendation for an access request (even in those cases where a classifier cannot yet be sufficiently utilized), but additionally, the availability of high quality historical access request data (that may subsequently be used to train a classifier) may be enhanced.

If, however, a classifier 2878 has been trained or deployed, the intelligent agents 2880 may submit these access requests to the classifier module 2870 in a request for a recommendation through the classifier interface 2872. In one embodiment, the intelligent agent 2880 may enhance the data of each received access request with values for at least some of the set of features used to train classifier 2878 by requesting this enhanced data from the data enhancer 2820 through the data enhancer interface 2822. The data enhancer 2820 may thus determine values for the set of features for each of these access requests in a manner substantially equivalently to the manner in which values for those features were determined for historical access requests when determining enhanced certification data 2824. The access requests and the corresponding values for the features for each access request can then be submitted to the classifier module 2870 through the classifier interface 2872 in a request from an approval or denial recommendation.

The classifier module 2870 can then 'score' each submitted access request using classifier 2878 with an approval or denial decision. In particular, the classifier 2870 may evaluate the values for the features associated with each access request according to the model to generate a probability of approval (or denial) and compare this probability against a recommendation threshold determined during training. Based on whether the probability is above or below (or equal) to the recommendation threshold, the recommendation for an access request may be determined to be an approval or a denial recommendation. These recommendations will be returned to the identity management system 2850 and to the user through the user interface 2858. A user's response (e.g., the user's actual approval or denial of the access request) can then be recorded. The availability of high quality historical access request data may thus be enhanced. Moreover, using such historical certification data, the classifier's 2878 performance against actual human decisions may be evaluated. This evaluation can be used for further fine-tuning of future classifier 2878, as well as to identify inaccurate human decisions.

In some cases, then, as a user may be presented with a recommendation for each access request with little surrounding context as to how the recommendation for a particular access request was derived or what factors influenced the determination of the recommendation, it may be desirable to offer the user some degree of insight into the recommendation, such as the features that influenced the determination of that recommendation. Accordingly, when recommendations are returned to the identity management system 2850 and to the user through the user interface 2858, the user interface 2858 may offer an interface to allow a user to obtain additional information on one or more of the provided recommendations (e.g., referred to as an interpretation). Such an interpretation may be utilized by a user to probe a particular recommendation and be provided with the top or most influential features for that particular recommendation. This capability, in turn, may will help the user to relate to the recommendation issued by the classifier and incite confidence in the classifier's results. Consequently, by providing such an interpretation, a user may gain confidence in the recommendations provided and the identity management system itself. Additionally, these recommendations may aid in the compliance with certain auditing policies or regulatory requirements.

In some embodiments when the user requests such interpretations for one or more access requests, these access requests may be submitted to the intelligent agent 2880 through the intelligent agent interface 2882 in a request for an interpretation for those access requests. To determine an interpretation for these access requests, intelligent agent may include interpreter 2830. In some embodiments, interpreter 2830 may utilize a principle referred to as 'Interpretability of Models' whereby the interpreter 2830 may be utilized as an independent process from the classifier's 2878 training. This interpreter 2830 can be queried to provide explanations in terms of how much and what type (positive or negative) of influence did the features have over the classifier modules 2870 decision.

The access requests for which an interpretation is desired can be submitted to the interpreter 2830 by the intelligent agent 2880 through the interpreter interface 2832. For each of these access requests (e.g., identity and entitlement pair), the local model builder 2834 may build a localized model for that access request by querying the classifier 2878 (e.g., through classifier interface 2872) in a "neighborhood" of that access request to build a local generalized linear model for that access request out of what may be a highly non-linear classifier 2878. This querying may be accomplished by determining values for a set of features associated with the access request (e.g., one or more of the same features used to train the classifier) and varying one or more of these values within a tolerance for a plurality of requests to the classifier module 2870 to determine approval or denial recommendations for values for the set of features that are close, but not the same as, the values for those features associated with the access request itself.

In one embodiment, the local builder 2834 may be, for example, based on Local Interpretable Model-Agnostic Explanations (LIME). Embodiments of such a localized model may, for example, be a logistic regression model or the like with a set of coefficients for a corresponding set of features. While such an approximation may be valid within a small neighborhood of the access request, the coefficients of the approximate (e.g., linear) model may be utilized to provide the most influential features. A feature corresponding to a coefficient of the localized model with a large magnitude may indicates a strong influence, while the sign of the coefficient will indicate whether the effect of the corresponding feature was in the positive (approval) or negative (denial). Based on the magnitude or signs of the coefficients associated with each feature of the localized model for the access request a top number (e.g., top 2, top 5, etc.) of influential features (e.g., positive or negative) may be determined.

The top set of features that resulted in an approval or denial decision for the access request may then be returned by the interpreter 2830 and the intelligent agent 2880 such that the top features can be displayed to the user through the user interface 2858. In one embodiments, these features may be displayed along with their absolute or relative magnitude, in for example a histogram or other graphical presentation. Alternatively, an English language explanation associated with one or more of the determined features may be determined and presented in the interface. For example, the interpreter 2830 may have an explanation mapping table that associates features or combinations of features with corresponding English language explanations. When the top features are determined, one or more of the top features may be used to determine a corresponding English language explanation from the explanation table and this explanation displayed through the user interface 2858.

Figure 29:
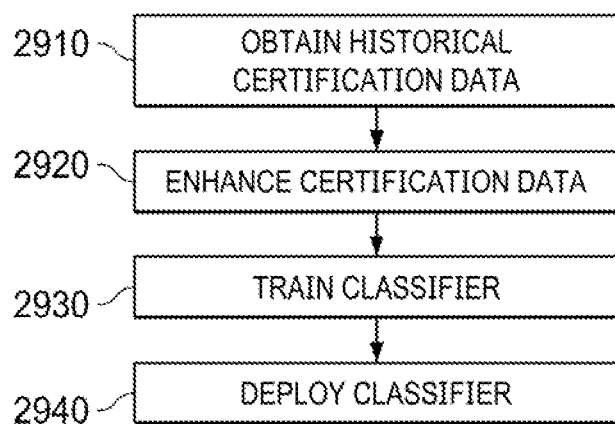
FIG. 29 is a flow diagram of one embodiment of a method for building a classifier for an intelligent agent.

Moving to FIG. 29, one embodiment of a method for building a classifier is disclosed. Embodiments of such a method may be employed, for example, by the classifier builder in an intelligent agent. Initially at step 2910 historical certification data may obtained. This historical transaction data may include historical data on whether past access requests have been approved or denied. Specifically, a user may interact with an identity management system through a user interface to access or manipulate data on identities, entitlements, events or generally perform identity management with respect to enterprise environment. These interactions may include approving or denying access requests (e.g., atomically or during a certification campaign) In other words, the manager or an access entitlement owner may be presented with a identity and an associated entitlement (i.e., an access request) and asked to approve or deny the assignment of the entitlement to the identity. Similarly, a manager or an access entitlement owner may be asked to evaluate access requests to approve or deny a particular entitlement to an identity.

These access requests (e.g., parametrized or labeled using identity and entitlement pairs) may thus be presented to a user (e.g., a manager or an access entitlement owner) of the identity management system. The user interface can be used by the user to approve or deny the access request. The identity management system can maintain the set of historical certification data associated with past certification campaigns or access requests. The historical certification data may include a set of access requests (e.g., entitlement and identity pairs), where each access request may be associated with an approval or denial decision (e.g., whether the access request was approved or denied by the user through the interface) and a time (e.g., time stamp) when the approval or denial of the access request (or campaign) occurred. This historical certification data may, for example, be represented as set of rows in a table, each row corresponding to a historical access request decision and including values for the associated set of features.

At step 2920, this historical certification data may be enhanced. Specifically, the historical certification data may be enhanced with one or more determined, generated or synthesize features (collectively determined composite features) not present in the original historical certification data. The values for these features for an access request may, for example, be included in row of the table of historical certification data corresponding to that access request to create a set of enhanced certification data. This enhanced certification data for an access request may thus include primary features—existing data that is harvested from the enterprise in association with historical certifications and stored in the historical certification data, and composite features—data for features of an access request that can subsequently be determined. These composite features may include features determined based on the identity graph as stored in the graph data store as discussed above.

The obtained historical certification data may include a set of access requests (e.g., entitlement identity pairs, where each entitlement or identity may be identified by a corresponding alphanumeric identifier) along with a historical approval or denial decision for that access request, a time stamp indicating when the approval or denial decision took place. This historical certification data can be enhanced using identity data from the identity management system to determine additional data associated with the identity and entitlement of each access request, including for example, a title, location, group or department associated with the identity, an identification of whether an entitlement is a privileged entitlement, or other data associated with the identity or entitlement. These features may, in turn, be used to determine values for other primary features as have been discussed herein.

In addition to the values for primary features for the set of access requests of the historical certification data, the historical certification data may also be enhanced by determining values for composite features for the historical access requests as has been discussed. In one embodiment, one or more of these composite features may be determined based on an identity graph created by the identity management system. The enhanced certification data determined may thus include a set of (historical) access requests and associated time stamps, a decision associated with each access request (e.g., approval or denial) and for each access request, values for a set of primary and composite features.

Using this enhanced certification data, the classifier may be trained at step 2930 and deployed at step 2940. In one embodiment, for example, the classifier may be an eXtreme Gradient (XG) Boost model implemented in the H$_2$O machine learning platform. It will be apparent, however, that other classifiers may be utilized in association with embodiments herein, and similarly built on the features as disclosed herein without loss of generality.

The training and deployment of a classifier may be done on a triggered or scheduled basis whereby the current enhanced certification data is obtained and the classifier updated based on the current enhance historical certification data. Specifically, in one embodiment an XGBoost classifier may be trained by randomly splitting the enhanced certification data into three parts or sets: training, validation, and testing, such that 80-90% of the data may be in the training set, 5% may be in the validation set and 15-5% of the data may be in the testing set. The training process may run iteratively by observing patterns in data and making estimated decisions. The validation set can be used to measure accuracy during training and make adjustments (if needed) to correct and improve the modeling complexity for the next iteration. This iterative refinement can then be repeated. The training process may stop when a certain criterion is satisfied. In one embodiment, the stopping criteria is reached as certain errors are minimized.

The resulting classifier can then be evaluated, utilizing several performance metrics, and a proper threshold may then be selected to maximize performance on the hold-out testing set. The classifier may be deployed only if it satisfies certain minimum performance criteria. If such criteria are met the classifier may be deployed or otherwise stored for use when a request for an approval or denial recommendations for an access request is received. In one embodiment, the classifier may be deployed as a JAR file with a REST interface.

Figure 30:
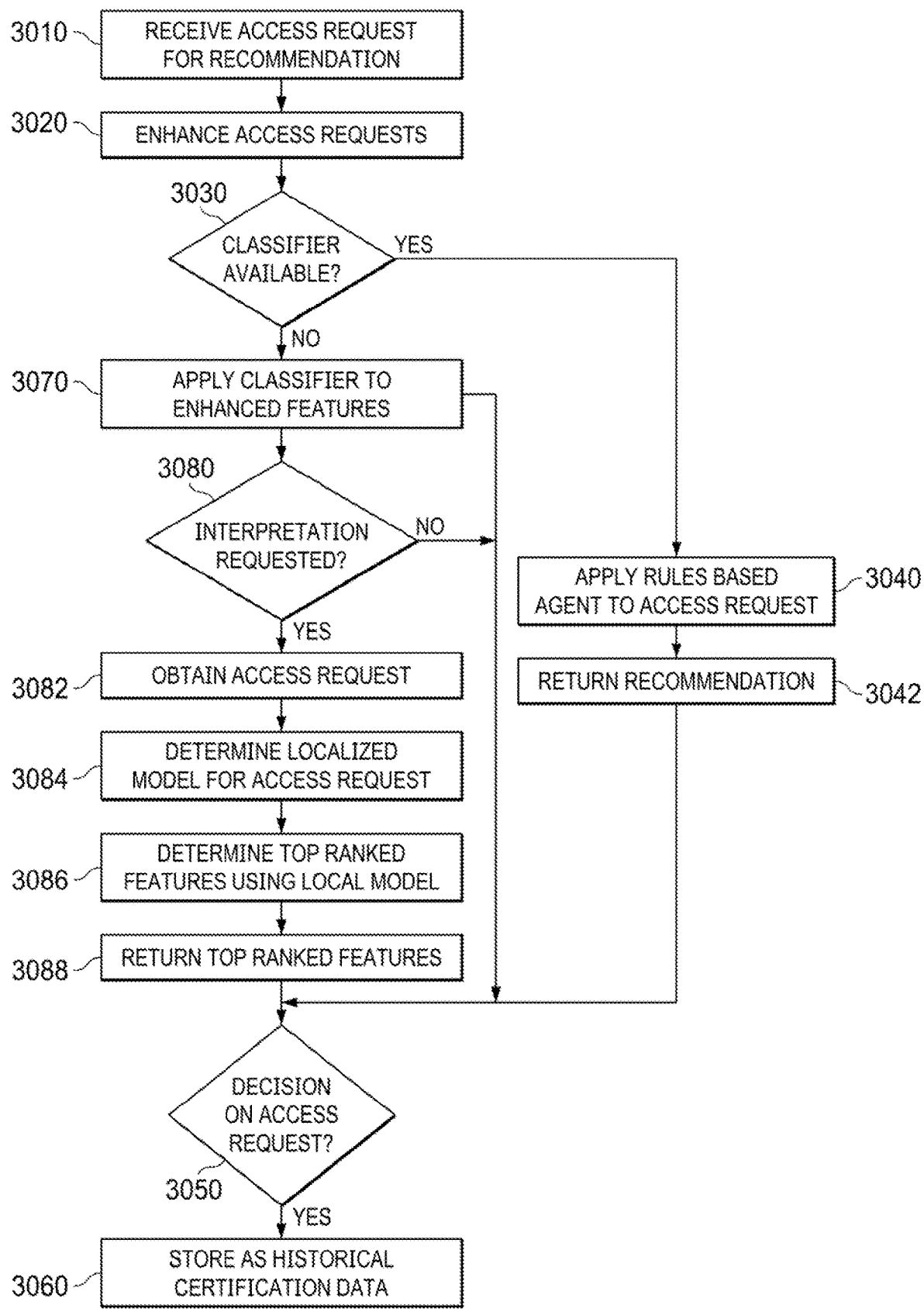
FIG. 30 is a flow diagram of one embodiment of a method for determining a recommendation for an access request in an identity management system.

FIG. 30 depicts an embodiment of a method that may be employed by an intelligent agent of an identity management system to determine a recommendation for an access request. At step 3010 the access request may be received. As discussed previously, it is desired in identity governance solutions to provide a decision support agent that can be used to recommend approval or denial for an access request (e.g., an identity and entitlement pair) that may be applied easily and substantially in real-time in bulk to a large number of these access requests without loss of accuracy or efficacy. Accordingly, embodiments of an identity management system may provide a decision support tool through a user interface. In this manner, when a user is presented with one or more access requests through the user interface (e.g., during a certification campaign or the like), the user may indicate through the user interface that a recommendation is desired. An approval or denial recommendation can then be determined and presented to the user through the decision support tool or user interface. Such a recommendation may also be determined in advance of presenting the access request to the user for approval or denial such that a recommendation may be presented to the user (e.g., initially) in association with the access request for approval or denial.

When an access request for which a recommendation is to be determined is received, this data of the access request may be enhanced at step 3020 by determining, for that access request, values for the same features used to train the classifier. The determination of the values for these features for the access request may be accomplished in substantially the same manner as the determination of those features for historical access requests as discussed previously herein.

At step 3030, it can then be determined if a classifier is available. If no classifier has been trained or deployed (NO branch of step 3030), a rules based agent may be used to generate a recommendation for the access request at step 3040. Such a rules based agent may be used, for instance, for enterprises that lack high quality governance data to train the classifier. A rules based agent may be utilized, for example, for a limited time period to help establish a baseline data set for certification data that could be used in the future for training a classifier.

In some embodiment therefore, if the rules based agent is to be applied, the values for at least some of the features (e.g., primary or composite features) associated with the submitted access request may be determined such that the rules based agent may apply recommendation rules of the rules based agent to the submitted access request to obtain an approval or denial recommendation and return such a recommendation. This recommendation can then be returned to the user at step 3042 through the user interface.

A user's response (e.g., the user's decision regarding actual approval or denial of the access request) can then be recorded at step 3060 if it is received at step 3050 (YES branch of step 3050). In this manner, not only are embodiments of artificial intelligence based identity management systems able to provide a recommendation for an access request (even in those cases where a classifier cannot yet be sufficiently utilized), but additionally, the availability of high quality historical access request data (that may subsequently be used to train a classifier) may be enhanced.

Returning to step 3030, if a classifier has been deployed by the identity management system (YES branch of step 3030), the classifier can be applied to an access request (with the associated features) to obtain an approval or denial recommendation at step 3070. In one embodiment, the data of the access request may be enhanced with values for at least some of the set of features used to train classifier in a manner substantially equivalent to the manner in which values for those features were determined for historical access requests when determining enhanced certification data. The access requests and the corresponding values for the features for each access request can then be submitted to the classifier through the classifier interface in a request from an approval or denial recommendation.

The below table list one example of historical certification data, where a row corresponds to an access request for a recommendation having an entitlement and identity pair, along with data determined for a set of values for features. Note here that the "response" column for an approval or denial decision is unpopulated. When such data is submitted to a classifier, the classifier may evaluate the access request based on the associated data (e.g., the feature data in the row) and populate the "response" column with a value of "1" indicating an approval recommendation or a "0" indicating a denial recommendation.

was derived or what factors influenced the determination of the recommendation, it may be desirable to offer the user some degree of insight into the recommendation, such as the features that influenced the determination of that recommendation. Accordingly, when recommendations are returned through the user interface, the user interface may allow a user to obtain additional information on one or more of the provided recommendations (e.g., referred to as an interpretation).

When the user requests such interpretations for the access requests, the access requests may be obtained at step 3082 and a localized model built for that access request at step 3084 by querying the classifier of the identity management system in a "neighborhood" of that access request to build a generalized local linear model for that access request. This querying may be accomplished by determining values for a set of features associated with the access request (e.g., one or more of the same features used to train the classifier) and varying one or more of these values within a tolerance for a plurality of requests to the classifier to determine approval or denial recommendations for values for the set of features that are close, but not the same as, the values for those features associated with the access request itself.

| identity_id | entitlement_id | certEnt12Mon | approval Title 12Mon | approval Location 12Mon | density Department 12Mon | density Title 12Mon | density Location 12Mon | response |
|---|---|---|---|---|---|---|---|---|
| 8a84cb6f5eb61 2d0015ebffe11 cc6e96 | 8a84cbe43e388 0d5013ea099ba 2f48ec | −1 | −1 | −1 | −1 | −1 | −1 | |
| 8a84cb6f5ec09 147015ec0e38 bdb0190 | 8a84cbe43e388 0d5013e9f9a0e 8872e7 | −1 | −1 | −1 | −1 | .45 | −1 | |
| 8a84cb6f5ec09 147015ec1ffb8 7a1812 | 8a84cbe43e388 0d5013ea00b84 924987 | −1 | −1 | −1 | .53 | .3 | .42 | |
| 8a84cb6f5f0d0 e1e015f2b464 1b54231 | 8a84cbe444c91 272014594f222 e02cd1 | −1 | −1 | −1 | .61 | .45 | .63 | |

The classifier can then 'score' the submitted access request with an approval or denial decision. In particular, the classifier may evaluate the values for the features associated with each access request according to the model to generate a probability of approval (or denial) and compare this probability against a recommendation threshold determined during training. Based on whether the probability is above or below (or equal) to the recommendation threshold, the recommendation for an access request may be determined to be an approval or a denial recommendation. This recommendation can then be returned to the user at step 3042 through the user interface. A user's response (e.g., the user's decision regarding actual approval or denial of the access request) can then be recorded at step 3060 if it is received at step 3050 (YES branch of step 3050). The availability of high quality historical access request data may thus be enhanced. Moreover, using such historical certification data, the classifier's performance against actual human decisions may be evaluated and used for further fine-tuning of future versions of the classifier as well as to identify inaccurate human decisions.

Additionally, in some embodiments the user may request an interpretation of a recommendation provided for a particular access request (YES branch of step 3080). In some cases, then, as a user may be presented with a recommendation for each access request with little surrounding context as to how the recommendation for a particular access request In one embodiment, the localized model may be based on LIME. Embodiments of such a localized model may be, for example, a logistic regression model or the like with a set of coefficients for a corresponding set of features. While such an approximation may be valid within a small neighborhood of the access request, the coefficients of the approximate (e.g., linear) model may be utilized to provide the most influential features. A feature corresponding to a coefficient of the localized model with a large magnitude may indicates a strong influence, while the sign of the coefficient will indicate whether the effect of the corresponding feature was in the positive (approval) or negative (denial). Based on the magnitude or signs of the coefficients associated with each feature of the localized model for the access request a top number (e.g., top 2, top 5, etc.) of influential features (e.g., positive or negative) may be determined.

The top set of features that resulted in an approval or denial decision for the access request may thus be determined based on the coefficients of the localized model at step 3086 and displayed to the user through the user interface. In one embodiments, these features may be displayed along with their absolute or relative magnitude, in for example a histogram or other graphical presentation. Alternatively, an English language explanation associated with one or more of the determined features may be determined and presented in the interface.

Figure 31:
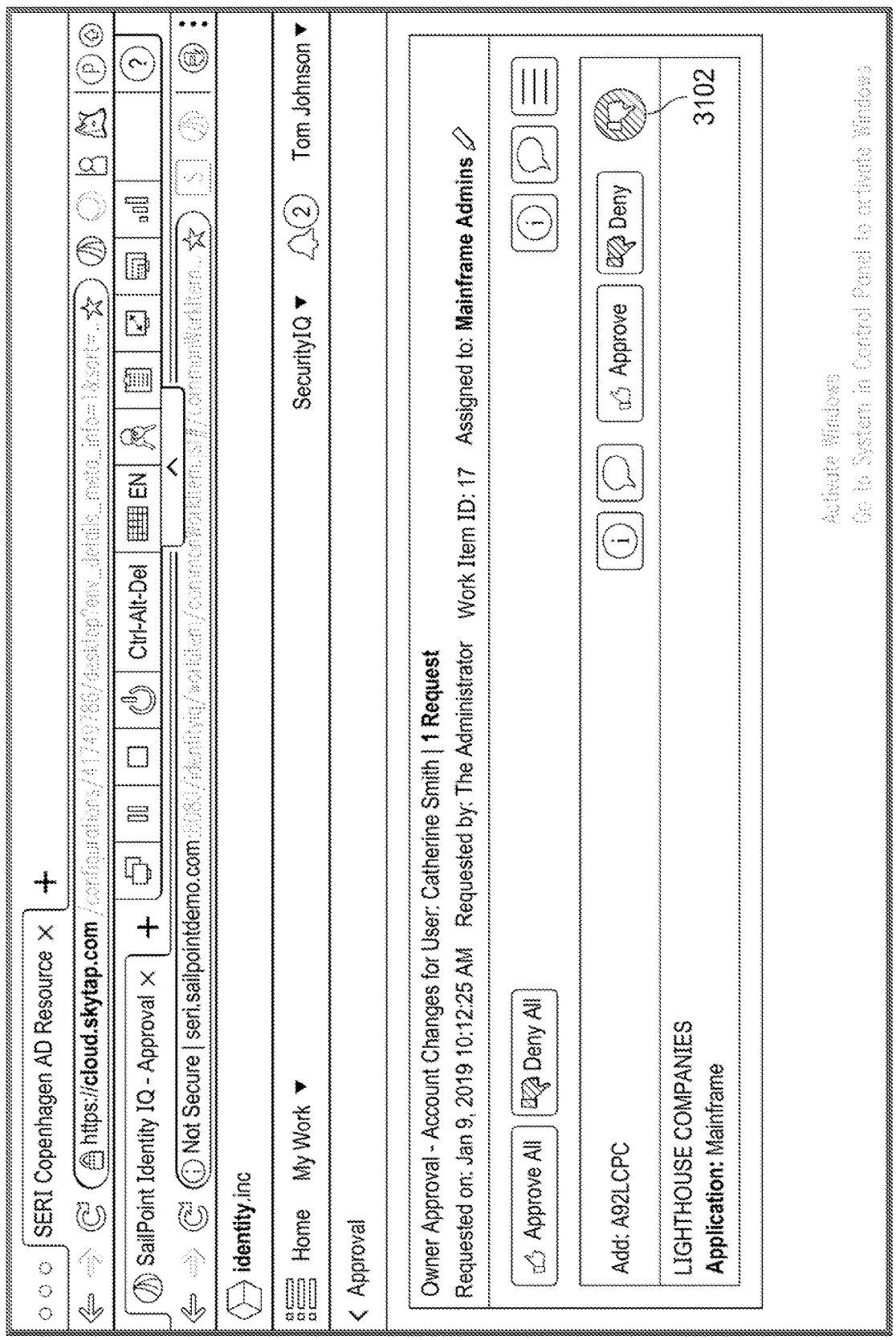
FIGS. 31 and 32 depict interfaces that may be utilized by embodiments of an identity management system.
Figure 32:
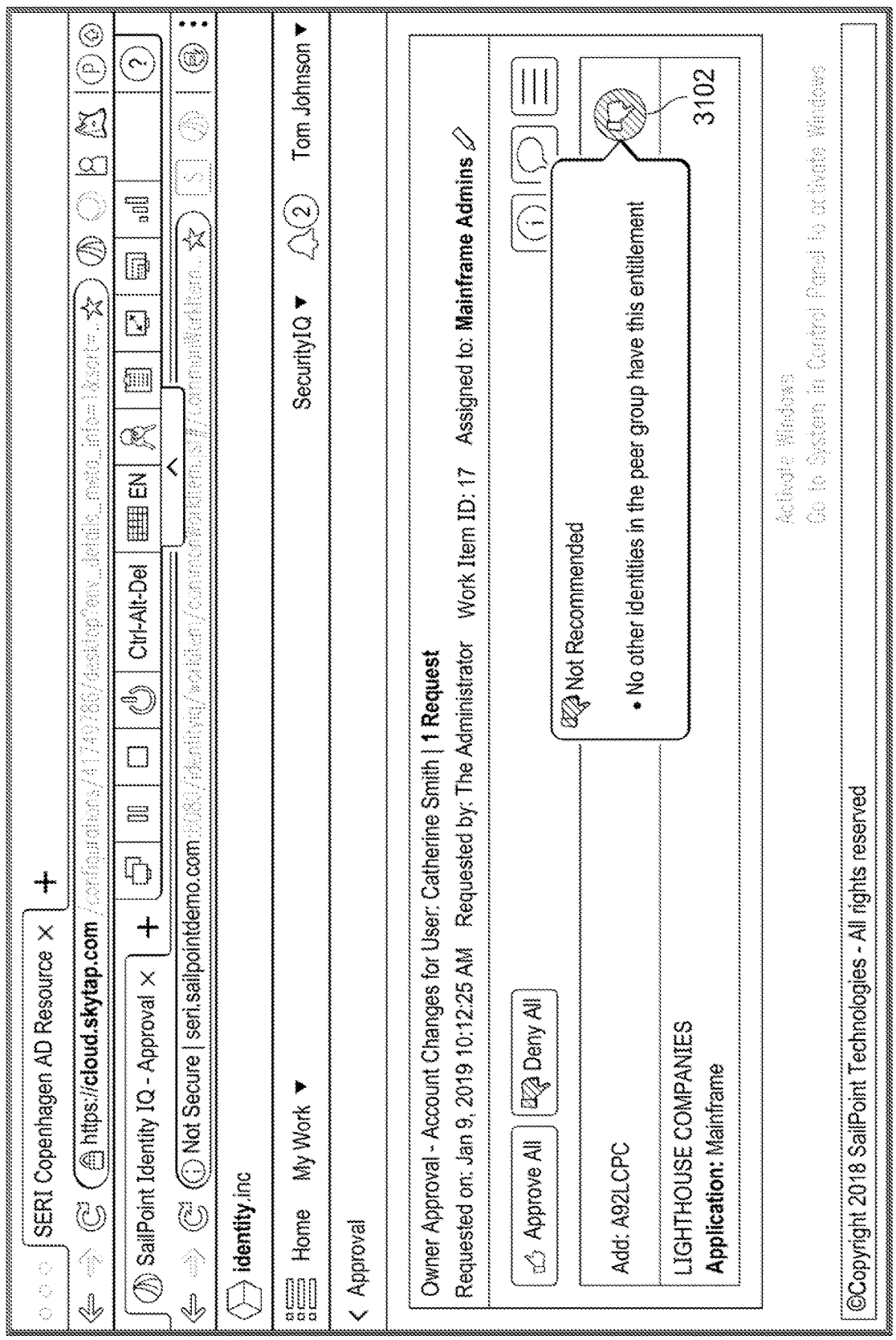

FIGS. 31 and 32 depict embodiments of these types of interfaces that may be utilized by embodiments of an identity management system as disclosed herein. Looking first at FIG. 31, one embodiment of an interface for an identity management system that presents an access request for approval or denial to a user is depicted. In this example, a user "Joseph Thompson" is being presented with an access request for approval or denial. The identity for that access request being presented is "Catherine Simmons" and the entitlement for the access request is the entitlement "A92LCPC" associated with the "Mainframe" application. Additionally, here, the user has been presented with an icon 3102 (e.g., a thumbs down icon) representing a denial recommendation for the presented access request.

Continuing with the same example, FIG. 32 depicts the interface when the user "hovers" his cursor over the icon 3102 representing the denial recommendation. In the depicted embodiment, a pop up box may appear with an English language explanation of the interpretation of the "Not Recommended" denial recommendation. This English language explanation denotes that "No other identities in the peer group have this entitlement." This explanation may have been determined based on, for example, a feature determined for the access request (e.g., "Catherine Simmons" and "A92LCPC") associated with a density of the entitlement of the access request within a peer group of the identity graph associated with the identity of the access request.

As may be realized from the above discussion, identity management systems may have many different components that generate different outputs, including data, recommendations, actions, alerts, actions, notifications, etc. (collectively referred to as signals). Thus, in many cases, use of these identity management systems and the implementation of identity governance tasks may rely on an (e.g., human) user's ability to prioritize and implement such signals. Between the rapid evolution of an enterprise's identity management data and the large volume of signals generated by components of an identity management system (which may increase or be driven at least in part by the evolution of such identity management data), the burden on human users may grow quite large, overwhelming even the most knowledgeable or savvy of such users. These users may thus have difficulty prioritizing such signals and lack any significant degree of knowledge about the signals and how to achieve desired progress toward minimization of security risk or more generally increasing the overall "health" of their identity management ecosystem based on such signals.

It is thus desirable for identity management systems to offer tools to assist in the assessment of identity management signals to evaluate or provide actions or recommendations from the identity management system such that a coherent or prioritized list of actions and recommendations can be provided to a user to assist in ameliorating identity governance issues and proactively address potential issues that could negatively impact security across an enterprise.

To those ends, among others, embodiments of identity management systems that include an identity governance management agent (IGMA) are disclosed. Embodiments of such identity management systems may include a number of components that produce a number of signals at regular time intervals (or irregular time intervals, or when activated, etc.). Each of these components may send a number of (e.g., input) signals to the IGMA for an enterprise on a regular basis based on identity management data of an enterprise. These input signals may include data such as data generated from the modeling or analysis of identity management data of the enterprise using, for example network identity graphs. These signals may also include identity management recommendations or actions or other types of signals Thus, these input signals may include static or dynamic activity or usage data, role validation and management data, health scores for role structures, or data on certification requests and approval or denial of such requests, among other data. From these input signals the IGMA may also derive one or more additional input signals, where those derived input signals may include input signals that are reflective of a dynamic change in one or more input signals over a time period.

Thus, embodiments of an IGMA employed in an identity management system can aggregate and coordinate the input signals from these multiple components to prioritize and rank the signals, including alerts, recommended actions or notifications or to trigger or automate actions. Moreover, embodiments of the IGMA may perform an overall analysis or assessment of the identity management health of the enterprise based on the input signals associated with an enterprise based on artificial intelligence techniques. The signals, including recommended actions or notifications can then be ranked according to, for example, which of the actions will have a most significant or beneficial impact on the overall identity management health of that enterprise. Such a qualitative assessment may be achieved according to certain embodiments through the use or optimization of a global objective or loss function.

Figure 33:
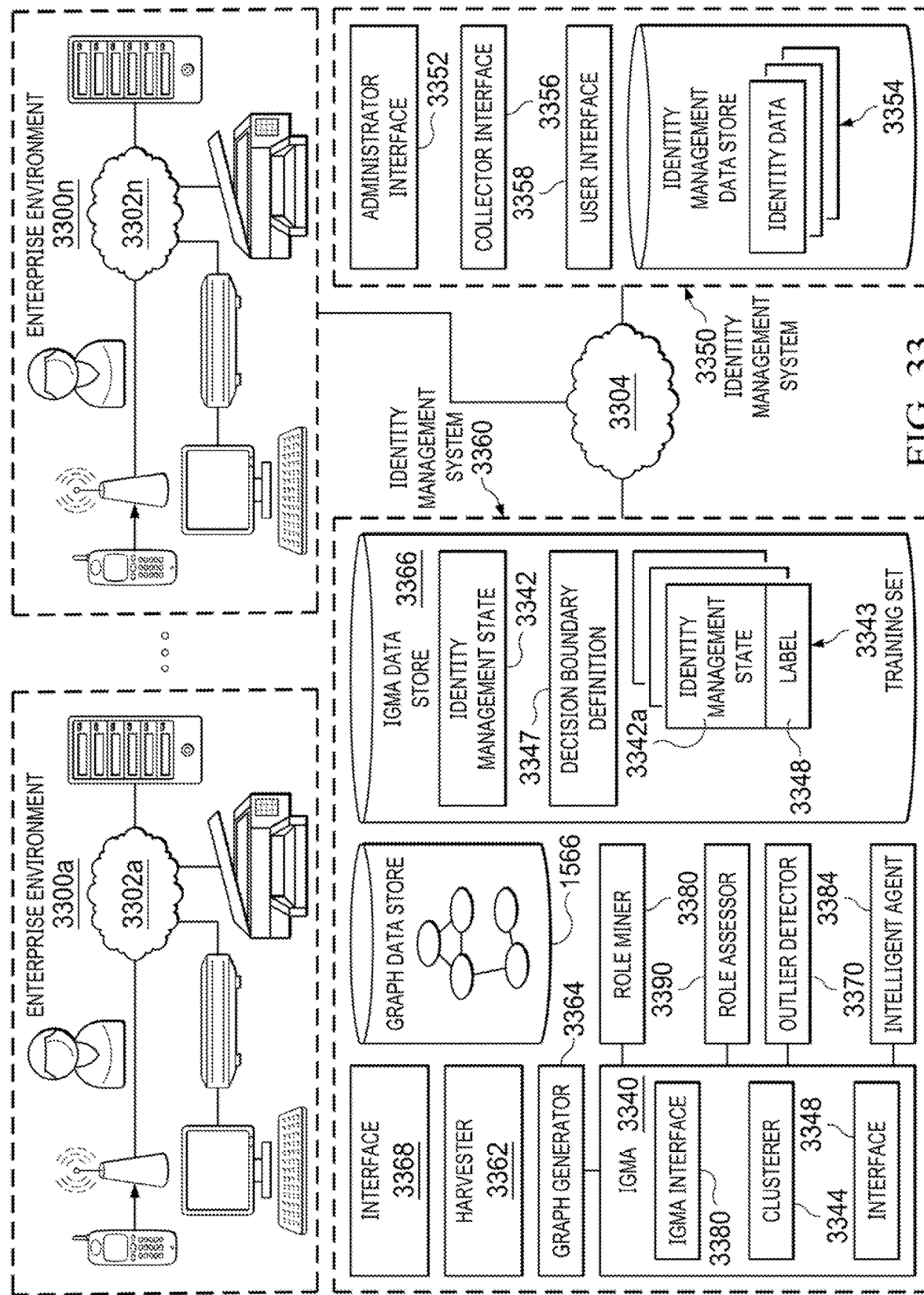
FIG. 33 is a block diagram of a distributed networked computer environment including one embodiment of an identity management system with an identity governance management agent.

Referring then to FIG. 33, a distributed networked computer environment including an identity management system with one embodiment of an identity governance management agent (IGMA) is depicted. As discussed above, the networked computer environment may include one or more enterprise computing environments 3300a, 3300n including a number of computing devices or applications that may be coupled over a computer network 3302 or combination of computer networks. Enterprise environment 3300 may thus include a number of resources, various resource groups and users associated with an enterprise. Users may have various roles, job functions, responsibilities, etc. to perform within various processes or tasks associated with enterprise environment 3300.

To assist managing or assessing access risks in enterprise environment 3300, an identity management system 3350 may be employed. Such an identity management system 3350 may allow an administrative or other type of user to define one or more identities, entitlements or other identity management artifacts and associate these identity management artifacts using, for example, an administrator interface 3352. Examples of such identity management systems are Sailpoint's IdentityIQ and IdentityNow products. Note here, that identity management system 3350 (and identity management system 3360 which will be discussed later and which may be part of, or distinct from, identity management system 3350) may be deployed in a multi-tenant environment (e.g., may be utilized in association with multiple enterprise environments 3300a, 3300n, etc.). Thus, identity management system 3350 may perform the activities and functionality described in association with multiple enterprise environments 3300. Additionally, however, it will be realized that while the identity management system 3350 has been depicted in the diagram as being utilized for multiple enterprise environments 3300, such an identity management system 3350 may be deployed as part of (e.g., internally to) an enterprise environment 3300, remotely from the enterprise environment, as a cloud based application or set of services, or in another configuration.

As such, identity management system 3350 may thus store identity management data 3354, where this identity management data 3354 may be associated with one or more enterprise environments 3300. The identity management data 3354 stored may include a set entries, each entry corresponding to identity management artifacts for each enterprise 3300. For example and including an identity (e.g., alphanumerical identifiers for identities) as defined and managed by the identity management system, a list or vector of entitlements (e.g., alphanumeric identifiers for entitlements) assigned to that identity by the identity management system, and a time stamp at which the identity management data was collected from the identity management system. Other data could also be associated with each identity, including data that may be provided from other systems such as a title, location or department associated with the identity.

Collectors 3356 of the identity management system 3350 may thus request or otherwise obtain data from various touchpoint systems within (e.g., each) enterprise environment 3300. These touchpoint systems may include, for example Active Directory systems, Java Database Connectors within the enterprise 3300, Microsoft SQL servers, Azure Active Directory servers, OpenLDAP servers, Oracle Databases, SalesForce applications, ServiceNow applications, SAP applications or Google GSuite.

Accordingly, the collectors 3356 of the identity management system 3350 may obtain or collect event data from various systems within the enterprise environment 3300 and process the event data to associate the event data with the identities defined in the identity management data 3354 to evaluate or analyze these events or other data in an identity management context. Additionally, a user may interact with the identity management system 3350 through a user interface 3358 to access or manipulate data on identity management artifacts, events or generally perform identity management with respect to an enterprise environment 3300.

As part of a robust identity management system, it is desirable to analyze the identity management data 3354 associated with an enterprise 3300. Accordingly, an identity management system 3360 may include a harvester 3362 and a graph generator 3364. The harvester 3362 may obtain identity management data 3354 from one or more identity management systems 3350 associated with enterprise 3300. Graph generator 3364 may generate an identity graph from the obtained identity management data 3354 and store the identity graph in graph data store 3366. An interface 3368 of the identity management system 3360 may use the identity graph in the graph data store 3366 or associated peer groups to present one or more interfaces which may be used for risk assessment, as has been discussed.

These graphs and the identity management data 3354 may thus be used to perform a number of identity management tasks or analysis which may result in various data, recommendations, alerts, or other signals being produced. Thus, identity management system 3360 may have many different components that generate different outputs, including data, recommendations, actions, alerts, actions, notifications, etc. (collectively referred to as signals). For example, as discussed embodiments of an identity management system 3360 may include components such as role miner 3380, role assessor 3390, outlier detector 3370 or intelligent agent 3384 (including for example, an access recommender), which may operate substantially as described herein. To illustrate in more detail, in certain embodiments, these components may include a peer group analysis component (e.g., graph generator 3364), a role mining or access modeling component (e.g., role miner 3380), a role validation component (e.g., role assessor 3390), an access recommender component (e.g., intelligent agent 3384) or an outlier and anomaly detection component (e.g., outlier detector 3370), among others. These components may be supported or utilize a network identity graph (e.g., in graph data store 1566) representing an enterprise's identity management artifacts.

For example, according to certain embodiments, a peer group analysis component (e.g., graph generator 3364) may run a community detection algorithm on the identity graph and may allow on-demand queries of the identity graph. A role mining and access component 3380 may provide the output of a community detection algorithm of a scoped population of the identity graph. Specifically, roles may be validated and prioritized based on particular graph-analytic properties that translate from domain expertise, such as a density of clusters (e.g., percentage of strong similarity relationships with respect to all possible relationships in a clique), cluster diameters (max degrees of separation within the cluster), or other graph related data.

A role validation component 3390 may utilize graph analysis to validate new roles as new nodes on a role graph. Roles that are extremely similar to each other may be recommended for a consolidation action. New potential roles that are too similar to existing ones may be deprioritized accordingly. Roles that are highly dissimilar to all existing roles are identified as outliers, recommended for certification, or another action taken. Role validation can be performed locally to particular scoped populations as well. Another component may include an access recommender component (e.g., of intelligent agent 3384). Such a component may provide a recommender system for access items (entitlements, roles, etc.). Such recommendations may be coupled or prioritized. A machine interpretation may also be provided to explain the outputs of such a component, for example, in terms of aggregated historical data as well as particular relevant network graph features. Other components may be utilized and are fully contemplated herein.

These components may each raise a variety of signals to a user of the identity management system 3360 (e.g., through an administrative interface 3368 of the identity management system 3360). Thus, in many cases, use of these identity management systems and the implementation of identity governance tasks may rely on an (e.g., human) user's ability to prioritize and implement such signals. Between the rapid evolution of an enterprise's identity management data and the large volume of signals generated by components of an identity management system 3360 (which may increase or be driven at least in part by the evolution of such identity management data), the burden on human users may grow quite large, overwhelming even the most knowledgeable or savvy of such users. These users may thus have difficulty prioritizing such signals and lack any significant degree of knowledge about the signals and how to achieve desired progress toward minimization of security risk or more generally increasing the overall "health" of their identity management ecosystem based on such signals.

It is thus desirable for identity management system 3360 to offer tools to assist in the assessment of identity management signals to evaluate or provide actions or recommendations from the identity management system 3360 such that a coherent or prioritized list of actions and recommendations can be provided to a user to assist in ameliorating identity governance issues and proactively address potential issues that could negatively impact security across an enterprise. Accordingly, identity management system 3360 may include IGMA 3340. Embodiments of IGMA 3340 employed in identity management system 3360 can aggregate and coordinate the input signals from these multiple components 3380, 3390, 3370, 3384 to prioritize and rank the signals, including alerts, recommended actions or notifications or to trigger or automate actions. Moreover, embodiments of the IGMA 3340 may perform an overall analysis or assessment of the identity management health of an enterprise 3300 based on the input signals associated with an enterprise 3300 based on artificial intelligence techniques. The signals, including recommended actions or notifications can then be ranked according to, for example, which of the actions will have a most significant or beneficial impact on the overall identity management health of that enterprise. Such a qualitative assessment may be achieved according to certain embodiments through the use or optimization of a global objective or loss function.

More specifically, each of the multiple components 3380, 3390, 3370, 3384 may provide input signals to the IGMA 3340 for a particular enterprise 3300 at some point in time or over some time interval. According to embodiments, IGMA 3340 may determine a set of values for a feature space for each enterprise 3300 on which data is collected based on the received input signals and store the values for the set of features for the feature space as an identity management state for the enterprise 3300. This determination of values for the features of this feature space may be determined (e.g., regularly) at some time interval (e.g., at a point in time or over a time interval). The features of this feature space may include the signals (or a subset thereof) received from components 3380, 3390, 3370, 3384 of the identity management system 3360 over the time interval. The features of the feature space may also include event (e.g., usage) data associated with the enterprise 3300, including what (e.g., identity management) actions were taken over that time interval.

The features may also include features that may be derived, or determined, from such received input signals received from the components 3380, 3390, 3370, 3384 of the identity management system 3360 over the time interval. A set of values for the feature space may thus be associated with the time interval, such that the set of values for the feature space received or determined over that time interval may comprise the identity management state for an enterprise 3300 at a particular point in time (or over that interval). Specifically, the data points (e.g., values) corresponding to, or derived from, the input signals from the components of the identity management system 3360 may each comprise values for a feature, the set of which form a (e.g., multidimensional) feature space.

The IGMA 3340 may thus store an identity management state 3342 for enterprise 3300 for multiple point in time (or over multiple time intervals). Thus, in some embodiments, the features of a feature space may include one or more dynamic features that are reflective of a dynamic change in one or more input signals across multiple identity management states. Such dynamic features may be determined, for example, by obtaining one or more identity management states 3342 for the enterprise 3300 for one or more past points in time (or past time intervals) as stored in the IGMA data store 3366 and determine values for these dynamic features at the time that values for a current identity management state 3342 for an enterprise 3300 are determined. For example, dynamic features may include such features as, the stability or consistency in size of peer groups, a feature related to a number of outliers over two or more time intervals, usage patterns or activities over two or more time intervals, or other comparisons of the features between two or more time intervals. It will be noted that the time interval over which values for such features are determined may be the same as, or different, than the team interval at which such identity management snapshots are determined. Moreover, it will be noted that there may be distinct features for the same statistic, measure, usage or other data, where each of the distinct features may comprise the same statistic, measure, usage or other data determined over a different time interval (e.g., daily, weekly, monthly, etc.).

For example, graph generator 3364 may provide a set of input signals to the IGMA 3340 associated with a particular enterprise 3300 that may comprise features of the feature set of an identity management state, including, for example: features related to how many cliques or peer groups there are in an identity graph associated with enterprise 3300 at that point in time, how dense such cliques or peer groups are, how dense roles in the identity graph are, how many roles there are in the graph, distributions of such similarity weights in the graph, a modularity of the identity graph (or portions thereof), or other statistics about distribution or size of such identity graphs.

A role miner 3380 or role assessor 3390 component may provide a set of input signals to the IGMA 3340 associated with a particular enterprise 3300 that may comprise features of the feature set of an identity management state, including, for example: features related to a health score based on role similarity or role concurrency, statistics regarding how fragmented the role structure is in the identity graph, the nesting of the role structures in the identity graph, statistics regarding access model coverage such as how many or a percentage of identities without roles, or other statistics about the distribution or size of role in the identity graph.

An intelligent agent 3384 component may provide a set of input signals to the IGMA 3340 associated with a particular enterprise 3300 that may comprise features of the feature set of an identity management state, including, for example: features related to a number of access requests or number of access requests that are approved or denied, the time or time frame to approve or deny access request, the usage of granted entitlements or other statistics about access requests in the enterprise 3300.

An outlier detector 3370 component may provide a set of input signals to the IGMA 3340 associated with a particular enterprise 3300 that may comprise features of the feature set of an identity management state, including, for example: features related to identity management artifacts with 'abnormal' patterns when compared to other related identity management artifacts, static anomalies, number of anomalies detected in a particular time interval dynamic risk assessment statistics, the time frame in which the enterprise 3300 is ameliorating outliers or anomalies, or other statistics about outliers that may be detected or determined (e.g., based on an identity graph).

Accordingly, the IGMA 3340 may maintain a set of identity management states for each enterprise 3300, where each identity management state 3342 for an enterprise may comprise a value for each of a set of static or dynamic features and corresponding to a particular point in time or time interval. Accordingly, at some time interval (e.g., which may be the same or a different time interval than the interval at which the identity management states 3342 are determined), the IGMA 3340 may prioritize and rank the features for an identity management state 3342 associated with an enterprise 3300 (e.g., the signals, including alerts, recommended actions or notifications associated with a most recent identity management state 3342 of the enterprise 3300) or to trigger or automate actions. Moreover, embodiments of the IGMA 3340 may perform an overall analysis or assessment of the identity management health of the enterprise 3300 based on the identity management state 3300 (e.g., one or a set of most recent identity management states associated with the enterprise 3300). The signals (e.g., a feature associated with an identity management state 3342), including recommended actions or notifications can then be ranked for the enterprise according to, for example, which of the actions will have a most significant or beneficial impact on the overall identity management health of that enterprise 3300. Such a qualitative assessment may be achieved according to certain embodiments through the use or optimization of a global objective or loss function.

Embodiments of such a function may be defined heuristically as a set of rules (e.g., based on knowledge of the identity management domain or enterprise knowledge). Other embodiments may utilize regression models based on data points derived from or corresponding to input signals. In a particular embodiment, clustering may be performed by clusterer 3344 to define a global objective or loss function for use by the IGMA 3340. Specifically, the data points (e.g., values) corresponding to, or derived from, the input signals from the components of the identity management system 3360 for an enterprise at a time interval may each comprise values for a feature, the set of which form a (e.g., multi-dimensional) feature space (the identity management state 3342 of an enterprise) as discussed. Clusterer 3344 may thus determine a training set 3343 including identity management states 3342 for use in defining such a global objective or loss function.

In one embodiment, then, clusterer 3344 may determine an set of example feature spaces (e.g., identity management states 3342a) for labeling. For example, in some embodiments, identity management system 3360 may be a multi-tenant system servicing as an identity management system 3360 in association with multiple enterprises 3300a, 3300n. Thus, an example feature space may comprise randomly selected identity management states 3342 (or a curated set of identity management states 3342) from the identity management states 3342 determined by IGMA 3340 over past time intervals. An example training set 3343 may also be determined based on other methodology, for example, manual generation of example values for the features of the identity management states 3342a, computer generated values for the set of features comprising the feature space identity management states 3342a, sampling of values for the feature space comprising the feature space identity management states 3342a, or another methodology. These example identity management states 3342a can then form a portion of the training set 3343.

Each of these determined example identity management states 3342a (e.g., feature spaces comprising values for a set of features) may then be assigned a label. Specifically, in one embodiment, clusterer 3344 may provide an interface by which a user may access the example identity management states 3342a and assign a label 3348 to each example identity management state 3342a represented by the values for the set of features. For example, feature sets may be provided through this interface to a domain expert or other type of user that may provide a label 3348 for at least some of the example identity governance states 3342a based on the values of the associated feature spaces. Such a label may indicate the health of an identity management state of an enterprise as represented by the values of the associated labeled feature space of the identity management state. This may be a binary label such as good/bad, acceptable/unacceptable, secure/unsecure, healthy/unhealthy, or may be another type of label.

Once at least some of the example identity management states 3342a of the training set 3343 are labeled, these example identity management states 3342a may be clustered by clusterer 3343 based on the assigned label 3348. Specifically, clustering can be performed on each of the set of example identity management states 3342a represented by each of the labeled feature spaces. In cases where labels 3348 are provided (e.g., by domain experts or other users) for only a subset of the example identity management states, 3342a a bootstrapping process may occur whereby the initially labeled identity management states 3342a may be clustered, and based on this initial clustering the remainder of the example identity management states 3342a may be assigned clusters and labels accordingly. In this manner, similar identity management states 3342a may be identified or clustered across all of the example identity management states 3342a represented by their corresponding example feature spaces. This clustering may be k-means clustering or almost any suitable clustering algorithm desired. Based on the resulting clusters of the example label identity management states a decision boundary may be determined wherein the decision boundary comprises a corresponding functional definition 3347 for such a decision boundary. This decision boundary definition 3347 may represent, for example, a boundary between "acceptable" or "good" identity management states of an enterprise and "unacceptable" or "bad" identity management states of an enterprise.

Figure 34:
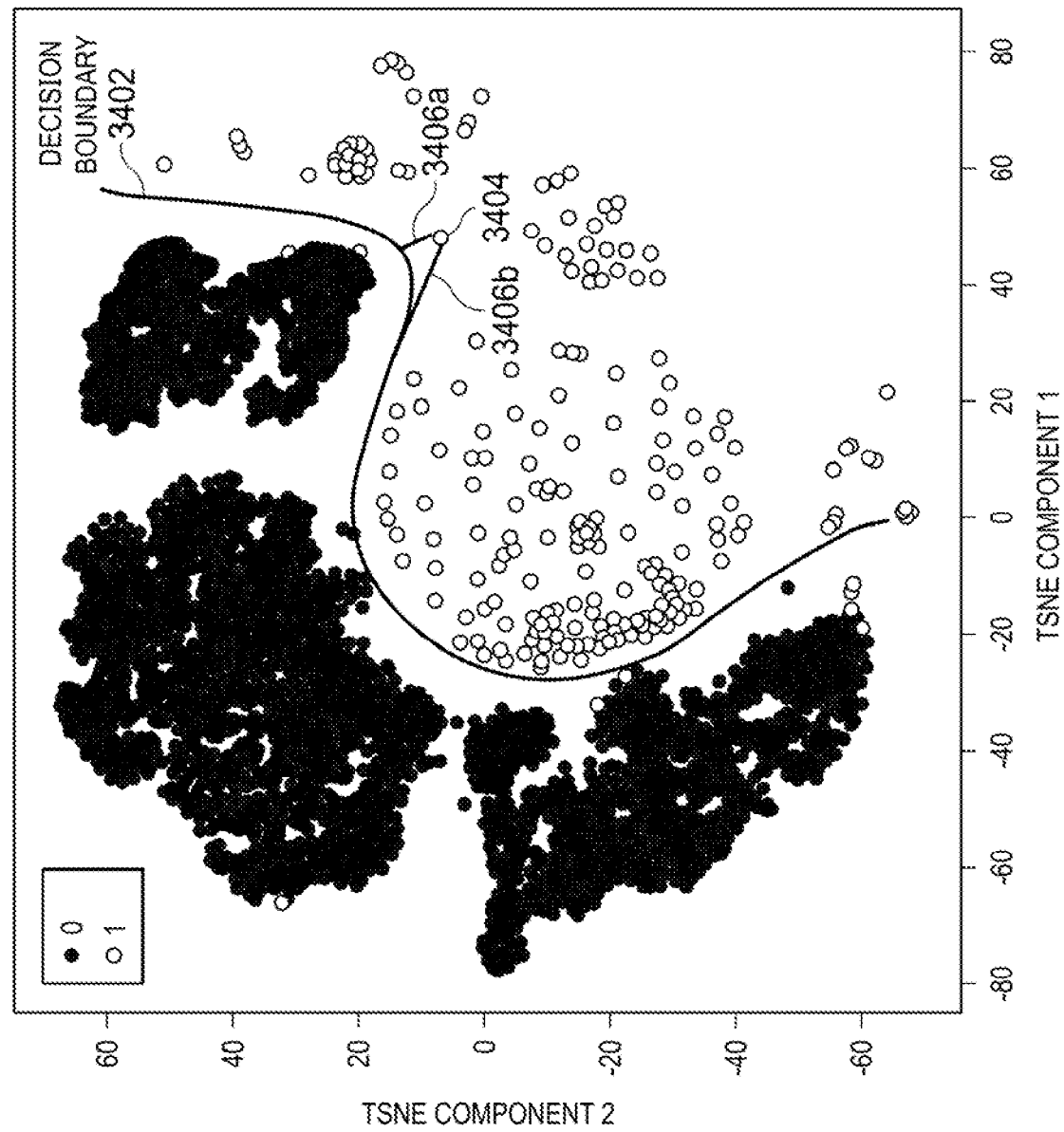
FIG. 34 is a visual depiction of the clustering of identity management states and an associated decision boundary.

Referring briefly to FIG. 34 then, a visual depiction of the results of a clustering of identity management states and a correspondingly determined decision boundary is depicted. Here, for example, each plotted point represents an identity management state for a particular enterprise at a particular point in time (or over a time interval). Thus, each plotted point represents a multi-dimensional feature space with associated values. At least some of these identity management states represented by the points of the depicted plot are example identity management states that have been assigned a label (e.g., "acceptable" or "good" (represented in the FIGURE by points assigned the label "1"), or "unacceptable" or "bad" (represented in the FIGURE by points assigned the label "0"). The example identity management states (again here represented by plotted points) are clustered (e.g., according to a clustering algorithm such as k-means or another suitable clustering algorithm). Based on the clustering of the identity management states a decision boundary 3402 may be determined (e.g., a functional definition for such a decision boundary). This decision boundary 3402 thus represents, for example, a boundary between clusters of "acceptable" or "good" identity management states and clusters of "unacceptable" or "bad" identity management states.

Returning to FIG. 33, a user associated with a particular enterprise 3300 may access the identity management system 3360 (e.g., through interface 3368 or through IGMA interface 3348) to access an interface regarding the health of the identity management state of the enterprise or to access an administrator interface to present alerts, recommendations or otherwise surface identity management data to the user. In one embodiment such an interface may present a scalar value (or other type of value) or other indication (e.g., color based indication, iconic indication, etc.) of the health of the identity management state of the enterprise (e.g., based on a determined scalar value).

To determine such a scalar value (or other indication), IGMA 3340 may obtain the identity management state 3342 for the enterprise 3300 (e.g., the values for the feature space for the identity management state 3342 of that particular enterprise) associated with a most recent time interval or point in time (or associated with another time period where a user desires to ascertain the health of the identity management state of the enterprise 3300). The location of this obtained identity management state 3342 of the enterprise 3300 relative to the decision boundary can then be determined using the functional definition of the decision boundary 3347. Specifically, in certain embodiments, such a functional definition of the decision boundary 3347 may be utilized by the IGMA 3340 to determine the scalar value representing the health of the identity management state 3342 for the enterprise 3330 based on, for example, a nearest (or other) distance measure from the location of the identity management state 3342 of the enterprise to a closest (or other) point on the determined decision boundary as defined by the definition 3347 of the decision boundary. The scalar value determined for the obtained identity management state 3342 of the enterprise 3300 can then be determined based on this distance, along with any other indication of the health of the identity management state 3342 of the enterprise 3300 is desired to present to the user through the interface.

The state or location of an identity management state 3342 for an enterprise 3300 relative to the decision boundary or other clusters (or the scalar value determined therefrom) may also allow IGMA 3340 to determine or rank input signals (e.g., collected as input signals from the components of the identity management system 3360). Specifically, components 3380, 3390, 3370, 3384 of identity management system 3360 may produce signals (such a s trigger alerts, notifications, or other signals) quite frequently (e.g., hourly, daily, etc.). However, given the number of components in some identity management systems coupled with the frequency of such signaling may lead to such signals being treated as noise or being otherwise disregarded by their intended recipient (e.g., an administrator or the identity governance user) who may view such signals through, for example, a dashboard or other interface of an identity management system. By utilizing IGMA 3340 to prioritize, or rank, input signals based on their effect on an identity management state 3342 of an enterprise 3300, the IGMA 3340 may be able to surface such signals from different components to a user based on this prioritization or ranking. This capability also means that an IGMA 3340 may collect or accumulate such signals over a period of time (e.g., where that period of time may be greater than a frequency at which one or more of the components providing such input signals generates such signals). At the end of this period of time (or at some regular intervals or when a user checks through an interface of the identity management system), the IGMA 3340 may surface a set of signals based on the ranking of such signals (e.g., as determined from the decision boundary) to a user or other entity.

In particular, once the identity management state 3342 of the enterprise 3300 is located relative to the decision boundary (or the scalar value determined therefrom), the IGMA 3340 can determine which of the (change of) values of the data points of the obtained identity management state 3342 for the enterprise 3300 would have a highest or greatest influence on moving the location of the identity management state of the enterprise closer to, or across, the decision boundary (e.g., at the closest point of the identity management state to the decision boundary) as defined by the functional definition of the decision boundary 3347. In other words, the IGMA 3340 may determine which of the signals received as an input signal, or otherwise determined, may have the greatest influence on the identity management state 3342, or would result in, or effect, the largest of amount of movement or change of the (e.g., position of the) identity management state 3342 toward the decision boundary (e.g., closer to an "acceptable" or "good" identity governance state). The IGMA 3340 can then rank or prioritize these signals for presentation to a user through the interface.

For example, with brief reference back to FIG. 34, suppose that point 3404 represents an identity management state of an enterprise at a particular moment in time. A scalar value may be determined from a distance of the point 3304 representing the identity management state of the enterprise to a closest (or other) point on the determined decision boundary 3402 as defined by the distance 3406a. Moreover, the IGMA can determine which of the (change of) values of the data points of the obtained identity management state for the enterprise represented by point 3404 would have a highest or greatest influence on moving the location of the identity management state of the enterprise closer to, or across, the decision boundary 3402. In other words, the IGMA 3340 may determine which of the signals received as an input signal, or otherwise determined, may have the greatest influence on the identity management state represented by point 3404 would result in, or effect, the largest of amount of movement or change of the (e.g., position of the) identity management state toward the decision boundary 3402 (e.g., closer to an "acceptable" or "good" identity governance state). It will be noted that this change of value or values may move the identity management state represented by point 3404 along the shortest distance (e.g., represented by path 3406a) to the decision boundary 3402, or may move the point 3404 to the decision boundary 3402 along another path (e.g., represented by path 3406b) which may be a longer path for certain reasons, such as this path may be associated with a smaller change in certain values, or an alert that has been issued by a component of the identity management system or other data of the identity management state, or for another reason altogether.

Figure 35:
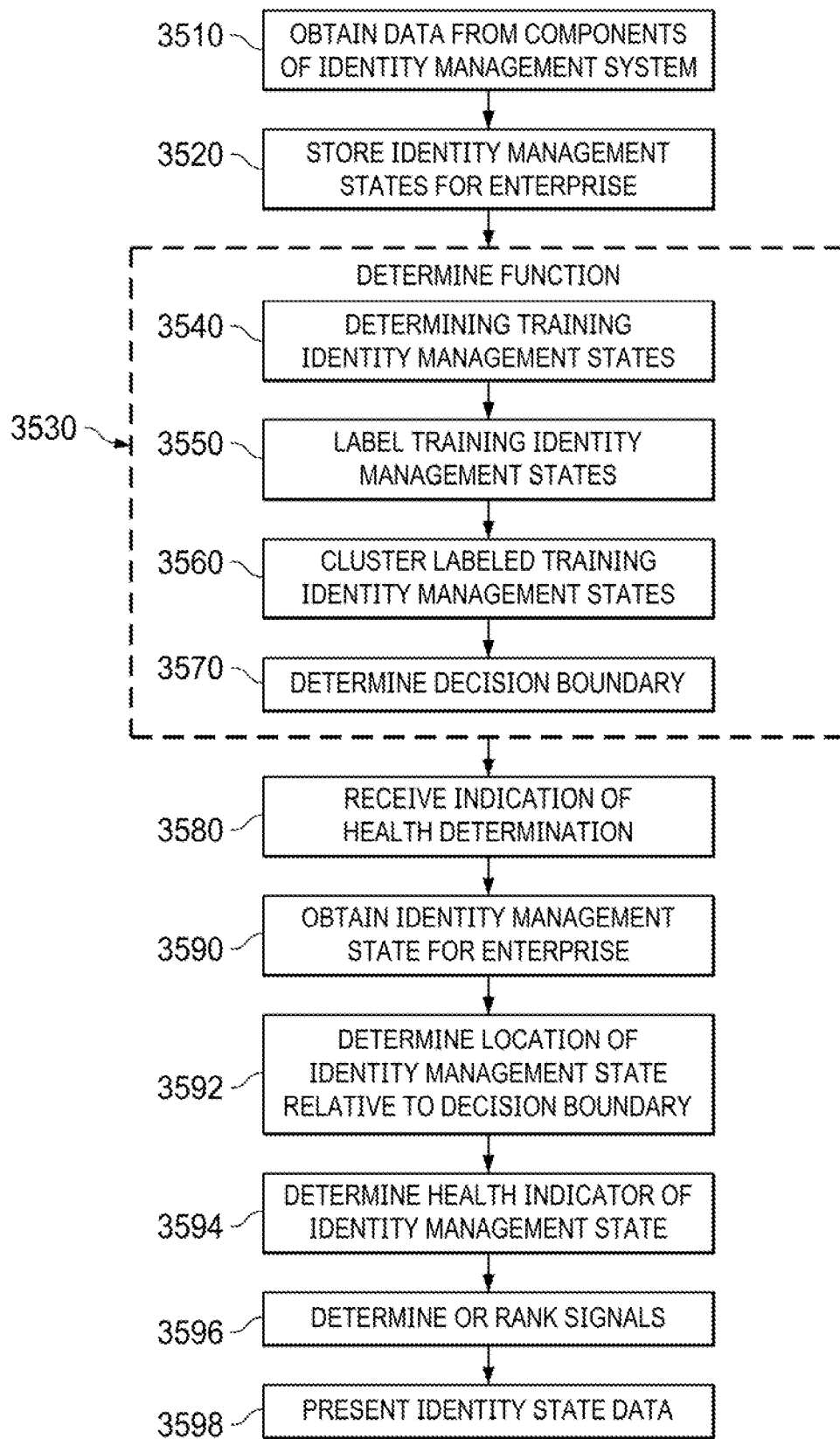
FIG. 35 is a flow diagram of one embodiment of a method that can be employed by an identity governance management agent.

Looking now at FIG. 35, a flow diagram for one embodiment of a method that may be utilized by an IGMA to evaluate an identity management state of an enterprise is depicted. IGMA may collect, receive or otherwise obtain data from components of an identity management system over a time interval or at a particular point in time (STEP 3510). More specifically, each of multiple components of an identity management system may provide input signals to the IGMA for a particular enterprise at some point in time or over some time interval. The IGMA can then determine a set of values a set of values for a feature space for each enterprise on which data is collected based on the received input signals and store the values for the set of features for the feature space as an identity management state for the enterprise (STEP 3520). This determination of values for the features of this feature space may be determined (e.g., regularly) at some time interval (e.g., at a point in time or over a time interval). The features of this feature space may include the signals (or a subset thereof) received from components of the identity management system over the time interval. The features of the feature space may also include event (e.g., usage) data associated with the enterprise, including what (e.g., identity management) actions were taken over that time interval.

The features may also include features that may be derived, or determined, from such received input signals received from the components of the identity management system over the time interval. A set of values for the feature space may thus be associated with the time interval, such that the set of values for the feature space received or determined over that time interval may comprise the identity management state for an enterprise at a particular point in time (or over that interval). Specifically, the data points (e.g., values) corresponding to, or derived from, the input signals from the components of the identity management system may each comprise values for a feature, the set of which form a (e.g., multi-dimensional) feature space.

The IGMA may thus store an identity management state for enterprise for multiple point in time (or over multiple time intervals). Thus, in some embodiments, the features of a feature space may include one or more dynamic features that are reflective of a dynamic change in one or more input signals across multiple identity management states. Such dynamic features may be determined, for example, by obtaining one or more identity management states for the enterprise for one or more past points in time (or past time intervals) and determine values for these dynamic features at the time that values for a current identity management state for an enterprise are determined.

Accordingly, an IGMA may maintain a set of identity management states for each enterprise, where each identity management state for an enterprise may comprise a value for each of a set of static or dynamic features and corresponding to a particular point in time or time interval. Based on the set of identity management states a global objective or loss function for use in performing a qualitative assessment of the health of an enterprise's identity management state may be determined (STEP 3530). Embodiments of such a function may be defined heuristically as a set of rules (e.g., based on knowledge of the identity management domain or enterprise knowledge). Other embodiments may utilize regression models based on data points derived from or corresponding to input signals. Still other embodiments may utilize reinforcement learning and determine such a function through the optimization of q-values in association with such reinforcement learning.

In a particular embodiment, clustering may be performed the IGMA to define a global objective or loss function for use by the IGMA. Specifically, the data points (e.g., values) corresponding to, or derived from, the input signals from the components of the identity management system for an enterprise at a time interval may each comprise values for a feature, the set of which form a (e.g., multi-dimensional) feature space (the identity management state 3342 of an enterprise) as discussed. Thus a training set of identity management states for use in defining such a global objective or loss function can be determined (STEP 3540).

In one embodiment, then, a set of example feature spaces (e.g., identity management states) for labeling may be determined. For example, in some embodiments, identity management system may be a multi-tenant system servicing as an identity management system in association with multiple enterprises. Thus, an example feature space may comprise randomly selected identity management states (or a curated set of identity management states) from the identity management states determined by the IGMA over past time intervals. An example training set may also be determined based on other methodology, for example, manual generation of example values for the features of the identity management states, computer generated values for the set of features comprising the feature space identity management states, sampling of values for the feature space comprising the feature space identity management states, or another methodology. These example identity management states can then form a training set.

Each of these determined identity management states (e.g., feature spaces comprising values for a set of features) of the training set may then be assigned a label (STEP 3550).

Specifically, an interface may be provided by which a user may access the training set of identity management states and assign a label to each identity management state represented by the values for the set of features. For example, feature sets may be provided through this interface to a domain expert or other type of user that may provide a label for at least some of the training identity governance states based on the values of the associated feature spaces. Such a label may indicate the health of an identity management state of an enterprise as represented by the values of the associated labeled feature space of the identity management state. This may be a binary label such as good/bad, acceptable/unacceptable, secure/unsecure, healthy/unhealthy, or may be another type of label.

Once at least some of the example identity management states of the training set are labeled, these labeled identity management states may be clustered based on the assigned label (STEP 3560). In this manner, similar identity management states may be identified or clustered across all of the example identity management states represented by their corresponding example feature spaces. This clustering may be k-means clustering or almost any suitable clustering algorithm desired. Based on the resulting clusters of the example label identity management states a decision boundary may be determined wherein the decision boundary comprises a corresponding functional definition for such a decision boundary (STEP 3570). This decision boundary definition may represent, for example, a boundary between "acceptable" or "good" identity management states of an enterprise and "unacceptable" or "bad" identity management states of an enterprise.

Accordingly, at some point the IGMA may perform an overall analysis or assessment of the identity management health of the enterprise based on the identity management state of the enterprise (e.g., one or a set of most recent identity management states associated with the enterprise) or prioritize and rank the features for an identity management state associated with an enterprise (e.g., the signals, including alerts, recommended actions or notifications associated with a most recent identity management state of the enterprise). These signals (e.g., a feature associated with an identity management state), including recommended actions or notifications can then be ranked for the enterprise according to, for example, which of the actions will have a most significant or beneficial impact on the overall identity management health of that enterprise.

Specifically, an indication that a health determination for an identity management state for a particular enterprise should be determined may be received (STEP 3580). For example, a user associated with a particular enterprise may access an interface of the identity management system to obtain data regarding the health of the identity management state of the enterprise, or to access an administrator interface that presents alerts, recommendations or otherwise surfaces identity management data to the user. In one embodiment such an interface may present a scalar value (or other type of value) or other indication (e.g., color based indication, iconic indication, etc.) of the health of the identity management state of the enterprise (e.g., based on a determined scalar value).

To determine such a scalar value (or other indication), the IGMA may obtain the identity management state for the enterprise of interest (e.g., the values for the feature space for the identity management state of that particular enterprise) associated with a most recent time interval or point in time (or associated with another time period where a user desires to ascertain the health of the identity management state of the enterprise) (STEP 3590). The location of this obtained identity management state of the enterprise relative to the decision boundary can then be determined using the functional definition of the decision boundary (STEP 3592). Specifically, in certain embodiments, such a functional definition of the decision boundary may be utilized by the IGMA to determine the scalar value representing the health of the identity management state for the enterprise based on, for example, a nearest (or other) distance measure from the location of the identity management state of the enterprise to a closest (or other) point on the determined decision boundary as defined by the definition of the decision boundary. The health indicator or scalar value determined for the obtained identity management state of the enterprise can then be determined based on this distance, along with any other indication of the health of the identity management state of the enterprise is desired to present to the user through the interface (STEP 3594).

The state or location of an identity management state for an enterprise relative to the decision boundary or other clusters (or the scalar value determined therefrom) may also allow IGMA to determine or rank input signals (e.g., collected as input signals from the components of the identity management system) (STEP 3596). In particular, once the identity management state of the enterprise is located relative to the decision boundary (or the scalar value determined therefrom), the IGMA can determine which of the (change of) values of the data points of the obtained identity management state for the enterprise would have a highest or greatest influence on moving the location of the identity management state of the enterprise closer to, or across, the decision boundary (e.g., at the closest point of the identity management state to the decision boundary) as defined by the functional definition of the decision boundary. In other words, the IGMA may determine which of the signals received as an input signal, or otherwise determined, may have the greatest influence on the identity management state, or would result in, or effect, the largest of amount of movement or change of the (e.g., position of the) identity management state toward the decision boundary (e.g., closer to an "acceptable" or "good" identity governance state). The IGMA can then rank or prioritize these signals for presentation to a user through the interface.

The determined indication of the health of the identity management state of the enterprise along with any prioritized or ranked signals or other identity state data may be presented to the user through the interface (STEP 3598). In this manner, embodiments of an IGMA may be utilized to provide health indicators of the identity management state of an enterprise and to rank, surface or otherwise expose important signals (e.g., alerts or notifications) from each of the components of the identity management system from which signals are received.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention.

While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. An identity management system, comprising:
a data store;
a processor;
a non-transitory, computer-readable storage medium, including computer instructions for:
obtaining identity management data from one or more source systems in a distributed enterprise computing environment of an enterprise, the identity management data comprising data on identity management artifacts utilized in identity management in the distributed enterprise computing environment;
evaluating the identity management data to determine the identity management artifacts;
representing the identity management artifacts in an identity management data structure;
receiving input signals for the enterprise at a first time, where the input signals were determined by a set of components of the identity management system based on the identity management data structure;
determining values for a first identity management state of the enterprise at the first time based on the input signals, wherein the first identity management state comprises a feature space including a set of features associated with the set of components that determined the input signals based on the identity management data structure and the values for the first identity management state include a value for each of the set of features;
determining a health indicator of the first identity management state of the enterprise based on the values for the set of features of the first identity management state; and
presenting the health indicator for the first identity management state of the enterprise to a user of the identity management system through an interface of the identity management system.

2. The system of claim 1, wherein at least one feature of the set of features is a dynamic feature and the value for that at least one feature is determined based on a previous value for that at least one feature from a previous time.

3. The system of claim 2, wherein the identity management data structure is an identity graph.

4. The system of claim 3, wherein at least one the values is determined utilizing the identity graph.

5. The system of claim 1, wherein the health indicator is determined by applying a global objective function to the values for the set of features of the first identity management state.

6. The system of claim 5, wherein the global objective function was determined based on a plurality of past identity management states.

7. The system of claim 1, wherein the instructions are further for:
   determining a remedial action based on the first identity management state and providing the remedial action in association with the health indicator for the first identity management state of the enterprise.

8. A method, comprising:
   obtaining identity management data from one or more source systems in a distributed enterprise computing environment of an enterprise, the identity management data comprising data on identity management artifacts utilized in identity management in the distributed enterprise computing environment;
   evaluating the identity management data to determine the identity management artifacts;
   representing the identity management artifacts in an identity management data structure;
   receiving input signals for the enterprise at a first time, where the input signals were determined by a set of components of the identity management system based on the identity management data structure;
   determining values for a first identity management state of the enterprise at the first time based on the input signals, wherein the first identity management state comprises a feature space including a set of features associated with the set of components that determined the input signals based on the identity management data structure and the values for the first identity management state include a value for each of the set of features;
   determining a health indicator of the first identity management state of the enterprise based on the values for the set of features of the first identity management state; and
   presenting the health indicator for the first identity management state of the enterprise to a user of the identity management system through an interface of the identity management system.

9. The method of claim 8, wherein at least one feature of the set of features is a dynamic feature and the value for that at least one feature is determined based on a previous value for that at least one feature from a previous time.

10. The method of claim 9, wherein the identity management data structure is an identity graph.

11. The method of claim 10, wherein at least one the values is determined utilizing the identity graph.

12. The method of claim 8, wherein the health indicator is determined by applying a global objective function to the values for the set of features of the first identity management state.

13. The method of claim 12, wherein the global objective function was determined based on a plurality of past identity management states.

14. The method of claim 8, further comprising: determining a remedial action based on the first identity management state and providing the remedial action in association with the health indicator for the first identity management state of the enterprise.

15. A non-transitory computer readable medium, comprising instructions for:
   obtaining identity management data from one or more source systems in a distributed enterprise computing environment of an enterprise, the identity management data comprising data on identity management artifacts utilized in identity management in the distributed enterprise computing environment;
   evaluating the identity management data to determine the identity management artifacts;
   representing the identity management artifacts in an identity management data structure;
   receiving input signals for the enterprise at a first time, where the input signals were determined by a set of components of the identity management system based on the identity management data structure;
   determining values for a first identity management state of the enterprise at the first time based on the input signals, wherein the first identity management state comprises a feature space including a set of features associated with the set of components that determined the input signals based on the identity management data structure and the values for the first identity management state include a value for each of the set of features;
   determining a health indicator of the first identity management state of the enterprise based on the values for the set of features of the first identity management state; and
   presenting the health indicator for the first identity management state of the enterprise to a user of the identity management system through an interface of the identity management system.

16. The non-transitory computer readable medium of claim 15, wherein at least one feature of the set of features is a dynamic feature and the value for that at least one feature is determined based on a previous value for that at least one feature from a previous time.

17. The non-transitory computer readable medium of claim 16, wherein the identity management data structure is an identity graph.

18. The non-transitory computer readable medium of claim 17, wherein at least one the values is determined utilizing the identity graph.

19. The non-transitory computer readable medium of claim 15, wherein the health indicator is determined by applying a global objective function to the values for the set of features of the first identity management state.

20. The non-transitory computer readable medium of claim 19, wherein the global objective function was determined based on a plurality of past identity management states.

21. The non-transitory computer readable medium of claim 15, further comprising instructions for: determining a remedial action based on the first identity management state and providing the remedial action in association with the health indicator for the first identity management state of the enterprise.

* * * * *